(12) United States Patent
Jon et al.

(10) Patent No.: US 11,765,114 B2
(45) Date of Patent: Sep. 19, 2023

(54) VOICE COMMUNICATION METHOD

(71) Applicant: Apple Inc., Cupertino, CA (US)

(72) Inventors: Tiffany S. Jon, Sunnyvale, CA (US); Freddy Allen Anzures, San Francisco, CA (US); Stephen O. Lemay, Palo Alto, CA (US); Matthew J. Sundstrom, Campbell, CA (US)

(73) Assignee: Apple Inc., Cupertino, CA (US)

( * ) Notice: Subject to any disclaimer, the term of this patent is extended or adjusted under 35 U.S.C. 154(b) by 374 days.

(21) Appl. No.: 17/079,216

(22) Filed: Oct. 23, 2020

(65) Prior Publication Data

US 2022/0131822 A1    Apr. 28, 2022

Related U.S. Application Data

(63) Continuation of application No. 15/981,828, filed on May 16, 2018, now Pat. No. 10,819,840.

(60) Provisional application No. 62/507,195, filed on May 16, 2017, provisional application No. 62/507,167, filed on May 16, 2017, provisional application No. 62/671,991, filed on May 15, 2018.

(51) Int. Cl.
*G06F 3/048* (2013.01)
*H04L 51/10* (2022.01)
*G06F 3/04883* (2022.01)
*H04W 76/18* (2018.01)
*G06F 3/0488* (2022.01)

(52) U.S. Cl.
CPC .......... *H04L 51/10* (2013.01); *G06F 3/04883* (2013.01); *H04W 76/18* (2018.02); *G06F 3/0488* (2013.01)

(58) Field of Classification Search
CPC .... H04L 51/10; H04W 76/18; G06F 3/04883; G06F 3/0488
See application file for complete search history.

(56) References Cited

U.S. PATENT DOCUMENTS

| | | |
|---|---|---|
| 5,146,231 A | 9/1992 | Ghaem et al. |
| 5,303,286 A | 4/1994 | Wiedeman |
| 5,446,465 A | 8/1995 | Diefes et al. |
| 5,583,514 A | 12/1996 | Fulop |
| 5,587,717 A | 12/1996 | Jang |
| 5,812,932 A | 9/1998 | Wiedeman et al. |
| 5,863,057 A | 1/1999 | Wessels |
| 5,937,349 A | 8/1999 | Andresen |
| 5,995,041 A | 11/1999 | Bradley et al. |
| 6,006,068 A | 12/1999 | Elkin et al. |

(Continued)

FOREIGN PATENT DOCUMENTS

| | | |
|---|---|---|
| CN | 1538773 A | 10/2004 |
| CN | 1758778 A | 4/2006 |

(Continued)

OTHER PUBLICATIONS

Chinese Patent Office in an Office Action for related Patent Application No. 202080039636.0 dated Apr. 24, 2022.

(Continued)

*Primary Examiner* — David Phantana-angkool
(74) *Attorney, Agent, or Firm* — DLA Piper LLP (US)

(57) ABSTRACT

Audio inputs are detected at an electronic device and translated into electronic communications for playback at an external electronic device.

30 Claims, 115 Drawing Sheets

(56) References Cited

U.S. PATENT DOCUMENTS

| | | | |
|---|---|---|---|
| 6,052,587 A | 4/2000 | Moraes et al. | |
| 6,108,538 A | 8/2000 | Blasiak et al. | |
| 6,147,644 A | 11/2000 | Castles et al. | |
| 6,157,896 A | 12/2000 | Castles et al. | |
| 6,169,881 B1 | 1/2001 | Astrom et al. | |
| 6,208,858 B1 | 3/2001 | Antonio et al. | |
| 6,240,366 B1 | 5/2001 | Nagatsuma et al. | |
| 6,263,280 B1 | 7/2001 | Stingone, Jr. | |
| 6,272,316 B1 | 8/2001 | Wiedeman et al. | |
| 6,278,861 B1 | 8/2001 | Ward et al. | |
| 6,317,689 B1 | 11/2001 | Lee | |
| 6,549,848 B1 | 4/2003 | Green et al. | |
| 6,580,452 B1 | 6/2003 | Gangitano | |
| 6,690,934 B1 | 2/2004 | Conrad et al. | |
| 6,754,342 B1 | 6/2004 | Surazski et al. | |
| 6,763,226 B1 | 7/2004 | Mczeal, Jr. | |
| 6,992,991 B2 | 1/2006 | Duske et al. | |
| 7,184,744 B1 | 2/2007 | Schnabel | |
| 7,233,795 B1 | 6/2007 | Ryden | |
| 7,311,608 B1* | 12/2007 | Danieli | A63F 13/795 |
| | | | 463/42 |
| 7,683,925 B2 | 3/2010 | Lee | |
| 7,865,205 B1 | 1/2011 | Lundy et al. | |
| 8,064,398 B2 | 11/2011 | Agashe et al. | |
| 8,095,665 B1 | 1/2012 | Bau | |
| 8,249,585 B2 | 8/2012 | Tronc et al. | |
| 8,254,970 B1 | 8/2012 | Oshinsky et al. | |
| 8,559,356 B2 | 10/2013 | Shiizaki et al. | |
| 8,606,576 B1 | 12/2013 | Barr et al. | |
| 8,676,121 B1 | 3/2014 | Monte et al. | |
| 8,855,012 B1 | 10/2014 | Suri | |
| 8,970,662 B2 | 3/2015 | Kerger et al. | |
| 8,971,946 B2 | 3/2015 | Ahmed et al. | |
| 9,037,164 B2 | 5/2015 | Keerthi | |
| 9,179,277 B2 | 11/2015 | Kerger et al. | |
| 9,235,923 B1 | 1/2016 | Robinson et al. | |
| 9,325,852 B2* | 4/2016 | Forstall | G06F 3/0482 |
| 9,369,832 B1 | 6/2016 | Noble et al. | |
| 9,408,077 B1 | 8/2016 | David et al. | |
| 9,430,186 B2 | 8/2016 | Faaborg et al. | |
| 9,503,177 B1 | 11/2016 | Shi et al. | |
| 9,521,378 B1 | 12/2016 | Palaganas et al. | |
| 9,575,720 B2 | 2/2017 | Faaborg et al. | |
| 9,947,363 B2 | 4/2018 | Moon et al. | |
| 10,116,893 B1 | 10/2018 | Reis et al. | |
| 10,284,812 B1 | 5/2019 | Van Os et al. | |
| 10,419,712 B2 | 9/2019 | Arrasvuori et al. | |
| 10,459,504 B2 | 10/2019 | Veloso et al. | |
| 10,511,707 B2 | 12/2019 | Johnson et al. | |
| 10,560,562 B1 | 2/2020 | Tandon | |
| 10,575,143 B2* | 2/2020 | Su | G06F 3/04883 |
| 10,623,451 B2* | 4/2020 | Rathod | H04L 51/04 |
| 10,645,561 B1 | 5/2020 | Guo et al. | |
| 10,791,536 B1 | 9/2020 | Murphy | |
| 10,797,785 B1 | 10/2020 | Rhee | |
| 10,853,410 B2 | 12/2020 | Herz | |
| 10,959,074 B1 | 3/2021 | Shuman et al. | |
| 11,003,315 B2 | 5/2021 | Sung et al. | |
| 11,144,176 B2* | 10/2021 | Chang | H04M 1/27475 |
| 11,349,559 B1 | 5/2022 | Reuss et al. | |
| 11,455,078 B1* | 9/2022 | Goodrich | G06F 3/0488 |
| 2002/0000931 A1 | 1/2002 | Petronic et al. | |
| 2003/0083816 A1 | 5/2003 | Imakado et al. | |
| 2004/0166811 A1 | 8/2004 | Moon | |
| 2004/0192368 A1 | 9/2004 | Edwards et al. | |
| 2004/0228531 A1 | 11/2004 | Fernandez et al. | |
| 2004/0257275 A1 | 12/2004 | Yee et al. | |
| 2005/0143135 A1 | 6/2005 | Brems et al. | |
| 2005/0181726 A1 | 8/2005 | Gottlieb et al. | |
| 2006/0017612 A1 | 1/2006 | Nagatani | |
| 2006/0030334 A1 | 2/2006 | Hashimoto | |
| 2006/0077996 A1 | 4/2006 | Lee | |
| 2006/0247915 A1 | 11/2006 | Bradford et al. | |
| 2006/0258365 A1 | 11/2006 | Cha et al. | |
| 2007/0047697 A1 | 3/2007 | Drewry et al. | |
| 2007/0109186 A1 | 5/2007 | Fujiwara et al. | |
| 2007/0123252 A1 | 5/2007 | Tronc et al. | |
| 2007/0141984 A1 | 6/2007 | Kuehnel et al. | |
| 2007/0150842 A1 | 6/2007 | Chaudhri et al. | |
| 2007/0188380 A1 | 8/2007 | Duong et al. | |
| 2008/0153538 A1 | 6/2008 | Oshaughnessy et al. | |
| 2008/0165022 A1 | 7/2008 | Herz et al. | |
| 2008/0166011 A1 | 7/2008 | Sever et al. | |
| 2008/0168361 A1* | 7/2008 | Forstall | G06F 3/0482 |
| | | | 455/566 |
| 2008/0168379 A1* | 7/2008 | Forstall | H04M 1/72403 |
| | | | 715/778 |
| 2008/0287099 A1 | 11/2008 | Zonana | |
| 2008/0303715 A1 | 12/2008 | Wang et al. | |
| 2008/0313686 A1 | 12/2008 | Matvey | |
| 2009/0005023 A1 | 1/2009 | Toorn | |
| 2009/0049905 A1 | 2/2009 | Lawhite et al. | |
| 2009/0083382 A1 | 3/2009 | Rosenberg et al. | |
| 2009/0135062 A1 | 5/2009 | Hori | |
| 2009/0161621 A1 | 6/2009 | Suga | |
| 2009/0191854 A1 | 7/2009 | Beason | |
| 2009/0191893 A1 | 7/2009 | Smith | |
| 2009/0205041 A1 | 8/2009 | Michalske | |
| 2009/0262033 A1 | 10/2009 | King et al. | |
| 2009/0267828 A1 | 10/2009 | Kobayashi et al. | |
| 2010/0062749 A1 | 3/2010 | Yasuda et al. | |
| 2010/0083159 A1 | 4/2010 | Mountain et al. | |
| 2010/0085255 A1 | 4/2010 | Wakabayashi | |
| 2010/0138756 A1 | 6/2010 | Saund et al. | |
| 2010/0167672 A1 | 7/2010 | Ahn et al. | |
| 2010/0271312 A1 | 10/2010 | Alameh et al. | |
| 2010/0311385 A1 | 12/2010 | Hurwitz | |
| 2011/0013075 A1 | 1/2011 | Kim et al. | |
| 2011/0092158 A1 | 4/2011 | Plamondon | |
| 2011/0130113 A1 | 6/2011 | Takuno | |
| 2011/0136428 A1 | 6/2011 | Ritter | |
| 2011/0157046 A1 | 6/2011 | Lee et al. | |
| 2011/0230161 A1 | 9/2011 | Newman | |
| 2011/0306292 A1 | 12/2011 | Wilson et al. | |
| 2012/0068899 A1 | 3/2012 | Ayotte et al. | |
| 2012/0124516 A1 | 5/2012 | Friedman | |
| 2012/0135715 A1 | 5/2012 | Kang et al. | |
| 2012/0140767 A1 | 6/2012 | Brothers et al. | |
| 2013/0109425 A1 | 5/2013 | Kerger et al. | |
| 2013/0109426 A1 | 5/2013 | Kerger et al. | |
| 2013/0127665 A1 | 5/2013 | Miller et al. | |
| 2013/0135146 A1 | 5/2013 | Ransom et al. | |
| 2013/0183924 A1 | 7/2013 | Saigh et al. | |
| 2013/0197951 A1 | 8/2013 | Watson et al. | |
| 2013/0205350 A1 | 8/2013 | Ling et al. | |
| 2013/0225118 A1 | 8/2013 | Jang et al. | |
| 2013/0271319 A1 | 10/2013 | Trerise | |
| 2013/0271320 A1 | 10/2013 | Trerise | |
| 2013/0295872 A1 | 11/2013 | Guday et al. | |
| 2013/0295982 A1 | 11/2013 | Lee et al. | |
| 2013/0301521 A1 | 11/2013 | Abdi | |
| 2013/0315108 A1 | 11/2013 | Lindner et al. | |
| 2014/0011533 A1 | 1/2014 | Lee | |
| 2014/0022192 A1 | 1/2014 | Hatanaka | |
| 2014/0039894 A1 | 2/2014 | Shostak | |
| 2014/0064463 A1 | 3/2014 | Reddy | |
| 2014/0134969 A1 | 5/2014 | Jin et al. | |
| 2014/0213214 A1 | 7/2014 | Reis | |
| 2014/0213236 A1 | 7/2014 | Jimbo et al. | |
| 2014/0267543 A1 | 9/2014 | Kerger et al. | |
| 2014/0287728 A1 | 9/2014 | Lim et al. | |
| 2015/0011220 A1 | 1/2015 | Buckle et al. | |
| 2015/0040012 A1 | 2/2015 | Faaborg et al. | |
| 2015/0063428 A1 | 3/2015 | Lever | |
| 2015/0089398 A1* | 3/2015 | Song | H04L 65/403 |
| | | | 715/753 |
| 2015/0097687 A1 | 4/2015 | Sloo et al. | |
| 2015/0126169 A1 | 5/2015 | Kerger et al. | |
| 2015/0127741 A1 | 5/2015 | Leacock et al. | |
| 2015/0137972 A1 | 5/2015 | Nepo | |
| 2015/0141072 A1 | 5/2015 | Mumick | |
| 2015/0257126 A1 | 9/2015 | Herz | |
| 2015/0261496 A1 | 9/2015 | Faaborg et al. | |
| 2015/0271317 A1 | 9/2015 | Nelson et al. | |

(56) References Cited

U.S. PATENT DOCUMENTS

| | | | |
|---|---|---|---|
| 2015/0338524 A1 | 11/2015 | Ben Moshe et al. | |
| 2015/0341759 A1 | 11/2015 | Kerger et al. | |
| 2016/0014059 A1* | 1/2016 | Rathod | H04M 1/72484 |
| | | | 715/752 |
| 2016/0056525 A1 | 2/2016 | Hansryd et al. | |
| 2016/0062540 A1 | 3/2016 | Yang et al. | |
| 2016/0062630 A1 | 3/2016 | Anzures et al. | |
| 2016/0065669 A1 | 3/2016 | Van Dijkman et al. | |
| 2016/0066277 A1 | 3/2016 | Yang et al. | |
| 2016/0088455 A1 | 3/2016 | Bozik et al. | |
| 2016/0183098 A1 | 6/2016 | Lim | |
| 2016/0191694 A1 | 6/2016 | Kim et al. | |
| 2016/0234664 A1* | 8/2016 | Vendrow | H04M 3/5141 |
| 2016/0255481 A9 | 9/2016 | Arnold et al. | |
| 2016/0260436 A1 | 9/2016 | Lemay et al. | |
| 2016/0277903 A1 | 9/2016 | Poosala et al. | |
| 2016/0302083 A1 | 10/2016 | Durick et al. | |
| 2016/0306051 A1 | 10/2016 | Hirabayashi et al. | |
| 2016/0374047 A1 | 12/2016 | Reis | |
| 2017/0021260 A1 | 1/2017 | Willett et al. | |
| 2017/0026110 A1 | 1/2017 | Richardson et al. | |
| 2017/0026509 A1 | 1/2017 | Rand | |
| 2017/0045623 A1 | 2/2017 | Zlogar et al. | |
| 2017/0048388 A1 | 2/2017 | Sharpe | |
| 2017/0085600 A1 | 3/2017 | Carter et al. | |
| 2017/0150060 A1 | 5/2017 | Herz | |
| 2017/0171636 A1 | 6/2017 | Devlin et al. | |
| 2017/0180964 A1 | 6/2017 | Mehta et al. | |
| 2017/0223162 A1 | 8/2017 | Wilder et al. | |
| 2017/0359302 A1 | 12/2017 | Van Os et al. | |
| 2018/0018701 A1 | 1/2018 | Berry et al. | |
| 2018/0035922 A1* | 2/2018 | Kim | G01S 19/13 |
| 2018/0040951 A1 | 2/2018 | Uchiyama | |
| 2018/0088242 A1 | 3/2018 | Eagling | |
| 2018/0092057 A1 | 3/2018 | Yamashita et al. | |
| 2018/0192264 A1 | 7/2018 | Kwok et al. | |
| 2018/0193753 A1 | 7/2018 | Kiwada et al. | |
| 2018/0270000 A1 | 9/2018 | Reis et al. | |
| 2018/0309801 A1 | 10/2018 | Rathod | |
| 2018/0316416 A1 | 11/2018 | Reis et al. | |
| 2018/0316885 A1 | 11/2018 | Reis et al. | |
| 2018/0338026 A1* | 11/2018 | Jon | H04M 1/576 |
| 2018/0338035 A1* | 11/2018 | Johnson | H04M 1/576 |
| 2018/0338237 A1 | 11/2018 | Maheswaranathan | |
| 2019/0049592 A1 | 2/2019 | Koontz et al. | |
| 2019/0102049 A1* | 4/2019 | Anzures | H04M 1/7243 |
| 2019/0102464 A1 | 4/2019 | Goenka et al. | |
| 2019/0280788 A1 | 9/2019 | Hardy et al. | |
| 2019/0318283 A1 | 10/2019 | Kelly et al. | |
| 2019/0387092 A1 | 12/2019 | Tessier | |
| 2020/0025944 A1 | 1/2020 | Mellier et al. | |
| 2020/0053641 A1 | 2/2020 | Lee et al. | |
| 2020/0068066 A1 | 2/2020 | Johnson et al. | |
| 2020/0132644 A1 | 4/2020 | Micalizzi et al. | |
| 2020/0187295 A1 | 6/2020 | Li et al. | |
| 2020/0201540 A1 | 6/2020 | Zambetti et al. | |
| 2020/0213436 A1 | 7/2020 | Mumick | |
| 2020/0252780 A1 | 8/2020 | Mcclendon et al. | |
| 2020/0304444 A1 | 9/2020 | Aneja et al. | |
| 2020/0367069 A1 | 11/2020 | Struhsaker et al. | |
| 2020/0379617 A1 | 12/2020 | Chang et al. | |
| 2021/0006287 A1 | 1/2021 | Peeters et al. | |
| 2021/0011173 A1 | 1/2021 | Rhee | |
| 2021/0120394 A1 | 4/2021 | Martin et al. | |
| 2021/0144539 A1 | 5/2021 | Edge et al. | |
| 2021/0168581 A1 | 6/2021 | Van Den Dungen | |
| 2021/0175963 A1 | 6/2021 | Chang et al. | |
| 2021/0311203 A1 | 10/2021 | Reis et al. | |
| 2022/0043541 A1 | 2/2022 | Chang et al. | |
| 2022/0066048 A1 | 3/2022 | Diggelen et al. | |
| 2022/0091737 A1 | 3/2022 | Bower et al. | |
| 2022/0116105 A1 | 4/2022 | Robinson et al. | |
| 2022/0131822 A1* | 4/2022 | Jon | G06F 3/0482 |
| 2022/0256631 A1 | 8/2022 | Jain et al. | |
| 2022/0286314 A1* | 9/2022 | Meyer | G06F 3/013 |
| 2022/0374136 A1* | 11/2022 | Chang | G06F 3/04845 |
| 2023/0004264 A1* | 1/2023 | Anzures | G06F 3/0488 |
| 2023/0081032 A1 | 3/2023 | Ardaud et al. | |

FOREIGN PATENT DOCUMENTS

| | | |
|---|---|---|
| CN | 1859501 A | 11/2006 |
| CN | 101938287 B | 6/2013 |
| CN | 105191252 A | 12/2015 |
| CN | 105407408 A | 3/2016 |
| CN | 105453025 A | 3/2016 |
| CN | 105786394 A | 7/2016 |
| CN | 106104677 A | 11/2016 |
| CN | 107526745 A | 12/2017 |
| EP | 0963061 A2 | 12/1999 |
| EP | 1643738 A1 | 4/2006 |
| EP | 2782297 A1 | 9/2014 |
| EP | 2974206 A1 | 1/2016 |
| EP | 2981000 A1 | 2/2016 |
| EP | 2974206 B1 | 6/2019 |
| JP | 2008-257363 A | 10/2008 |
| KR | 10-2015-0094197 A | 8/2015 |
| KR | 10-2016-0018109 A | 2/2016 |
| KR | 10-2016-0097913 A | 8/2016 |
| WO | 2001/67363 A1 | 9/2001 |
| WO | 2005/031544 A2 | 4/2005 |
| WO | 2005/057890 A2 | 6/2005 |
| WO | 2007/139580 A1 | 12/2007 |
| WO | 2014/164666 A1 | 10/2014 |
| WO | 2015/017043 A1 | 2/2015 |
| WO | 2016/060848 A1 | 4/2016 |
| WO | 2016/116814 A1 | 7/2016 |

OTHER PUBLICATIONS

Apple Support, "Apple Information Collections Apple Support Tutorial How to use Walkie Talkie on your Apple Watch", Sep. 18, 2018, 3 pages., Chinese Patent Office in an Office Action for related Patent Application No. 202080039636.0 dated Apr. 24, 2022.

Notice of Allowance received for U.S. Appl. No. 16/565,257, dated Jun. 3, 2021, 11 pages.

Notice of Acceptance received for Australian Patent Application No. 2020210262, dated Jan. 20, 2022, 3 pages.

Peters Jay, "The iPhone 13's rumored satellite link sounds like it's just for emergencies", The Verge, Available online at: https://apple.news/A-xX1QS6IT2m8I8PPKtL52Q, Aug. 30, 2021, 2 pages.

European Search Report received for European Patent Application No. 21179101.7, dated Sep. 28, 2021, 5 pages.

Office Action received for European Patent Application No. 18730896.0, dated Oct. 6, 2021, 9 pages.

"Qualcomm Toq—smartwatch—User Manual", Available Online At: https://toq.qualcomm.com/sites/default/files/qualcomm_toq_user_manual.pdf, Nov. 27, 2013, pp. 1-38.

Motorola Solutions, "Wave 7000 Push-to-Talk for Mobile Devices", XP055709564, Available Online At: https://learning.motorolasolutions.com/es/node/2426/download, Jul. 2016, pp. 1-54.

Team On the Run, "Push-To-Talk Feature for Android", XP054980806, Available Online At: https://www.youtube.com/watch?v=dirC7q92KQ, Oct. 13, 2016, 1 page.

Office Action received for Australian Patent Application No. 2020210262, dated Jul. 28, 2021, 6 pages.

Applicant-Initiated Interview Summary received for U.S. Appl. No. 16/565,257, dated Mar. 11, 2021, 7 pages.

International Preliminary Report on Patentability received for PCT Patent Application No. PCT/US2020/035345, dated Dec. 16, 2021, 11 pages.

Applicant-Initiated Interview Summary received for U.S. Appl. No. 16/667,269, dated Jan. 25, 2021, 3 pages.

Final Office Action received for U.S. Appl. No. 16/565,257, dated Jan. 21, 2021, 21 pages.

Notice of Allowance received for Chinese Patent Application No. 202080039636.0, dated Sep. 7, 2022, 6 pages (3 pages of English Translation and 3 pages of Official Copy).

(56) References Cited

OTHER PUBLICATIONS

Chinese Patent Office in an Office Action for related Patent Application No. 202080039636.0 dated Sep. 7, 2022.
Notice of Allowance received for U.S. Appl. No. 16/667,269, dated Feb. 24, 2021, 9 pages.
Office Action received for European Patent Application No. 18730555.2, dated Feb. 25, 2021, 9 pages.
Notice of Allowance received for Chinese Patent Application No. 201880030421.5, dated Apr. 25, 2021, 2 pages (1 page of English Translation and 1 page of Official Copy).
Notice of Allowance received for Chinese Patent Application No. 201880036526.1, dated Apr. 22, 2021, 2 pages (1 page of English Translation and 1 page of Official Copy).
Certificate of Examination received for Australian Patent Application No. 2019100525, dated Aug. 6, 2019, 2 pages.
Decision to Grant received for Danish Patent Application No. PA201870383, dated Jun. 3, 2020, 2 pages.
Intention to Grant received for Danish Patent Application No. PA201870383, dated Feb. 11, 2020, 2 pages.
International Preliminary Report on Patentability received for PCT Patent Application No. PCT/US2018/033051, dated Nov. 28, 2019, 15 pages.
International Preliminary Report on Patentability received for PCT Patent Application No. PCT/US2018/033057, dated Nov. 28, 2019, 13 pages.
International Search Report and Written Opinion Received for PCT Patent Application No. PCT/US2018/033051, dated Nov. 22, 2018, 22 pages.
International Search Report and Written Opinion received for PCT Patent Application No. PCT/US2018/033057, dated Nov. 22, 2018, 19 pages.
Invitation to Pay Additional Fees and Partial International Search Report received for PCT Patent Application No. PCT/US2018/033051, dated Sep. 20, 2018, 14 pages.
Invitation to Pay Additional Fees and Partial Search Report received for PCT Patent Application No. PCT/US2018/033057, dated Sep. 20, 2018, 13 pages.
Invitation to Pay Search Fees received for European Patent Application No. 18730555.2, dated May 14, 2020, 3 pages.
Non-Final Office Action received for U.S. Appl. No. 15/719,344, dated Feb. 25, 2019, 18 pages.
Non-Final Office Action received for U.S. Appl. No. 15/981,828, dated Jan. 7, 2020, 8 pages.
Notice of Acceptance received for Australian Patent Application No. 2018269510, dated Apr. 17, 2020, 3 pages.
Notice of Allowance received for U.S. Appl. No. 15/719,344, dated Sep. 26, 2019, 11 pages.
Notice of Allowance received for U.S. Appl. No. 15/981,828, dated Jul. 13, 2020, 8 pages.
Office Action received for Australian Patent Application No. 2018269510, dated Feb. 21, 2020, 3 pages.
Office Action received for Chinese Patent Application No. 201880030421.5, dated May 22, 2020, 12 pages.
Office Action received for Danish Patent Application No. PA201770395, dated Apr. 11, 2019, 10 pages.
Office Action received for Danish Patent Application No. PA201770395, dated May 25, 2018, 10 pages.
Office Action received for Danish Patent Application No. PA201870383, dated Aug. 26, 2019, 3 pages.
Pocketnow, "AT&T Enhanced Push To Talk: A Guided Tour | Pocketnow", Online available at: https://www.youtube.com/watch?v=aagcgg07EEc, Dec. 25, 2012, 1 page.
Search Report and Opinion received for Danish Patent Application No. PA201770395, dated Sep. 5, 2017, 14 pages.
Search Report and Opinion received for Danish Patent Application No. PA201870383, dated Sep. 7, 2018, 8 pages.
Office Action received for European Patent Application No. 21179101.7, dated Oct. 8, 2021, 10 pages.
Applicant-Initiated Interview Summary received for U.S. Appl. No. 16/565,257, dated Oct. 20, 2020, 6 pages.
International Search Report and Written Opinion received for PCT Patent Application No. PCT/US2020/035345, dated Nov. 20, 2020, 16 pages.
Invitation to Pay Additional Fees received for PCT Patent Application No. PCT/US2020/035345, dated Sep. 29, 2020, 8 pages.
Non-Final Office Action received for U.S. Appl. No. 16/565,257, dated Sep. 4, 2020, 18 pages.
Non-Final Office Action received for U.S. Appl. No. 16/667,269, dated Dec. 1, 2020, 17 pages.
Search Report and Opinion received for Danish Patent Application No. PA202070167, dated Nov. 25, 2020, 9 pages.
Clover, Juli, "Howto Use Walkie-Talkie in watchOS 5", Available Online at: https://www.macrumors.com/how-to/use-walkie-talkie-in-watchos-5, Sep. 19, 2018, 7 pages.
Johnson, Leif, "How to use the Walkie-Talkie app on Apple Watch", Available Online at: https://www.macworld.com/article/3336863/how-to-use-the-walkie-talkie-app-on-apple-watch.html, Jan. 29, 2019, 5 pages.
Office Action received for Chinese Patent Application No. 201880036526.1, dated Aug. 21, 2020, 8 pages (3 pages of English Translation and 5 pages of Official Copy).
Office Action received for European Patent Application No. 18730555.2, dated Sep. 7, 2020, 11 pages.
"ProPTT2 Wearable App with Apple Watch", Available Online at: https://www.youtube.com/watch?v=iqOT30irl4A, Mar. 29, 2017, 3 pages.
Team On the Run, "Push-To-Talk Feature for Android", Available Online at: https://www.youtube.com/watch?v=_dlrC7q92KQ, Oct. 14, 2016, 3 pages.
Apple Support, "Apple Information Collections Apple Support Tutorial How to use Walkie Talkie on your Apple Watch", Online available at: https://m.baidu.com/video/page?pd=video_page&nid=8944198253082890949&sign=499271186905027855&word=how+to+use+walkietalkie+in+watchos&oword=how+to+use+walkietalkie+in+watchos&atn=index&top=%7B%22_hold%22%3A2%7D&_t=1654000172593, Sep. 18, 2018, 3 pages (Official Copy Only). {See Communication under 37 CFR § 1.98(a)(3)}.
Office Action received for Chinese Patent Application No. 202080039636.0, dated Apr. 24, 2022, 19 pages (9 pages of English Translation and 10 pages of Official Copy).
Applicant-Initiated Interview Summary received for U.S. Appl. No. 17/899,530, dated Feb. 3, 2023, 6 pages.
Extended European Search Report received for European Patent Application No. 22197430.6, dated Jan. 26, 2023, 8 pages.
Extended European Search Report received for European Patent Application No. 22197456.1, dated Feb. 2, 2023, 9 pages.
Exultationpictures, "Align Satellite Dish on Astra 19.2 with the App Satellite Finder (Pro) and DUR Line SF4000", Online available at: https://www.youtube.com/watch?v=n5EEZ6rcYcQ, Mar. 29, 2021, 2 pages.
Intention to Grant received for European Patent Application No. 20746418.1, dated Nov. 28, 2022, 8 pages.
Non-Final Office Action received for U.S. Appl. No. 17/497,557, dated Jan. 3, 2023, 15 pages.
Applicant-Initiated Interview Summary received for U.S. Appl. No. 17/497,557, dated Feb. 21, 2023, 5 pages.
International Search Report and Written Opinion received for PCT Patent Application No. PCT/US2022/042069, dated Feb. 14, 2023, 22 pages.
Notice of Allowance received for U.S. Appl. No. 17/899,315, dated Feb. 24, 2023, 9 pages.
Office Action received for Australian Patent Application No. 2022202360, dated Feb. 17, 2023, 4 pages.
International Search Report and Written Opinion received for PCT Patent Application No. PCT/US2022/043183, dated Jan. 23, 2023, 17 pages.
Invitation to Pay Additional Fees received for PCT Patent Application No. PCT/US2022/043183, dated Nov. 30, 2022, 10 pages.
Non-Final Office Action received for U.S. Appl. No. 17/899,510, dated Mar. 16, 2023, 16 pages.
Applicant-Initiated Interview Summary received for U.S. Appl. No. 17/899,315, dated Jan. 24, 2023, 3 pages.

(56) References Cited

OTHER PUBLICATIONS

Clark, Mitchell, "Qualcomm's going toe-to-toe with Apple's satellite messaging feature", Available online at: https://www.theverge.com/2023/1/5/23538207/qualcomm-satellite-messaging-snapdragon-android, Jan. 6, 2023, 18 pages.
Invitation to Pay Additional Fees and Partial International Search Report received for PCT Patent Application No. PCT/US2022/042069, dated Dec. 22, 2022, 14 pages.
Non-Final Office Action received for U.S. Appl. No. 17/899,315, dated Dec. 22, 2022, 20 pages.
Non-Final Office Action received for U.S. Appl. No. 17/899,315, dated Nov. 4, 2022, 20 pages.
Non-Final Office Action received for U.S. Appl. No. 17/899,530, dated Jan. 3, 2023, 67 pages.
Office Action received for Danish Patent Application No. PA202070167, dated Jul. 2, 2021, 5 pages.
Notice of Acceptance received for Australian Patent Application No. 2022202360, dated Apr. 14, 2023, 3 pages.
Office Action received for European Patent Application No. 21179101.7, dated Jul. 7, 2023, 8 pages.

\* cited by examiner

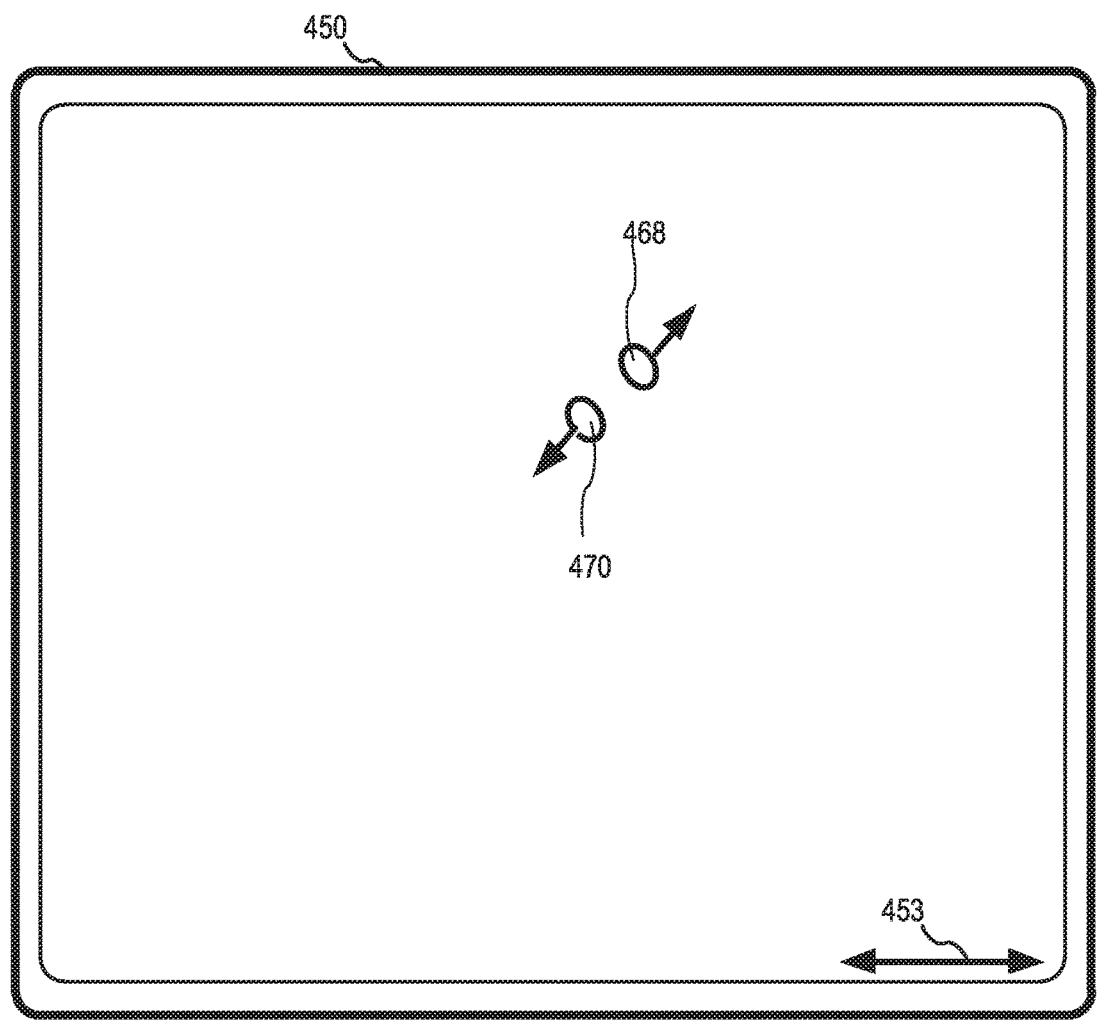
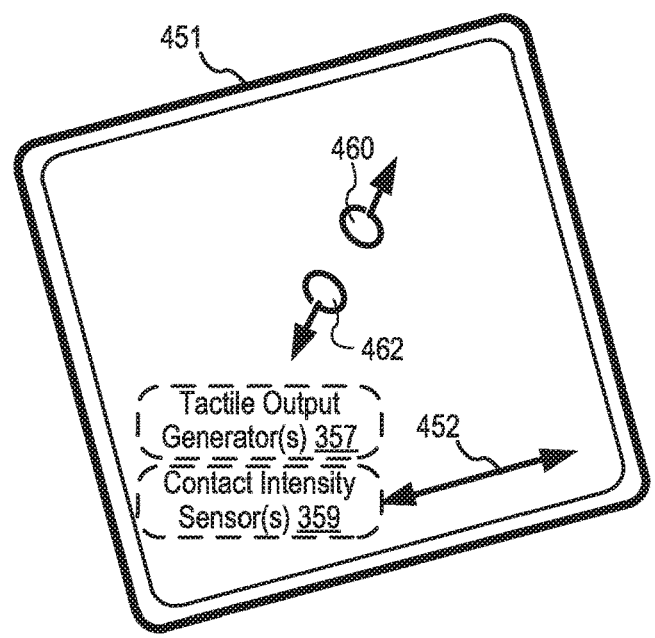
*FIG. 4B*

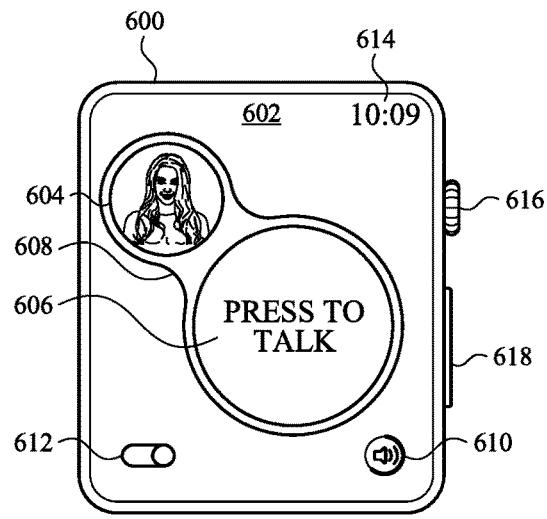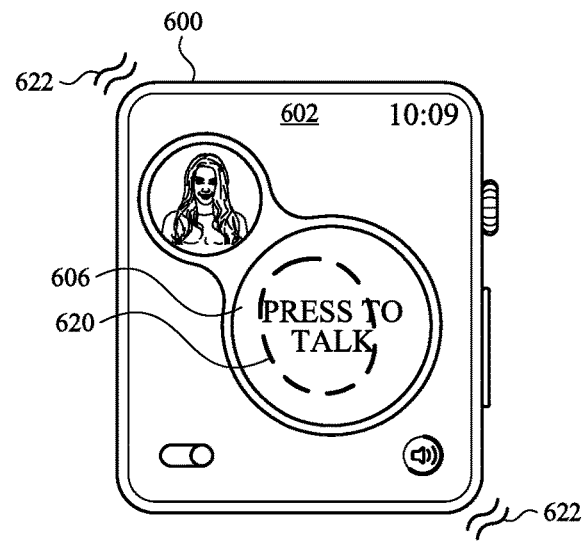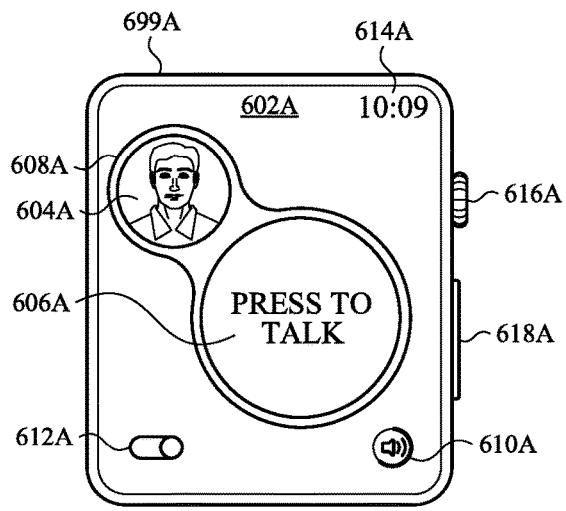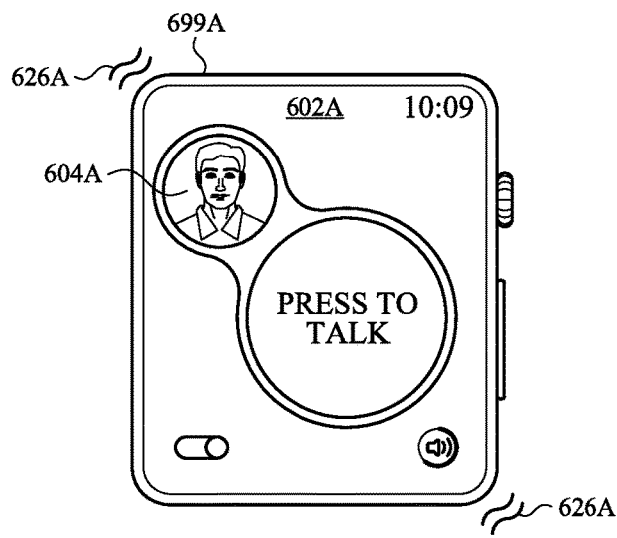
*FIG. 6AA*  *FIG. 6AB*

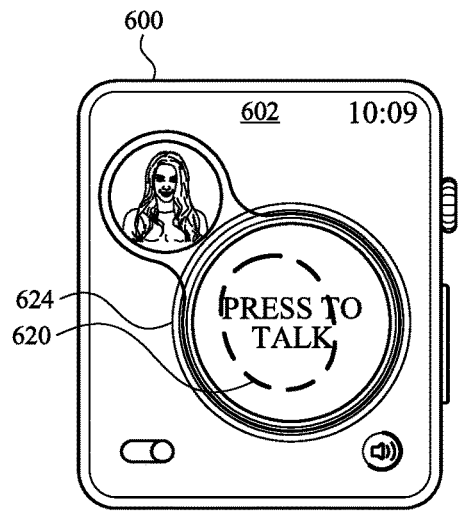
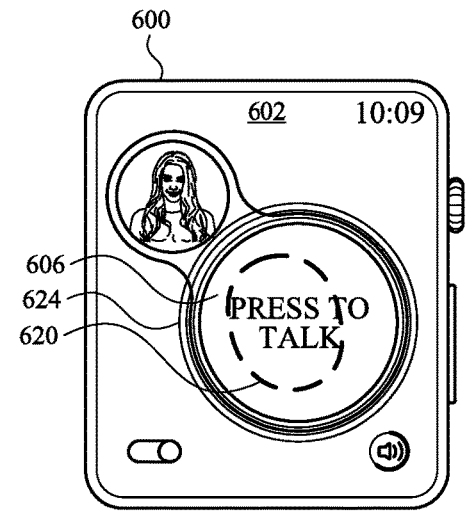
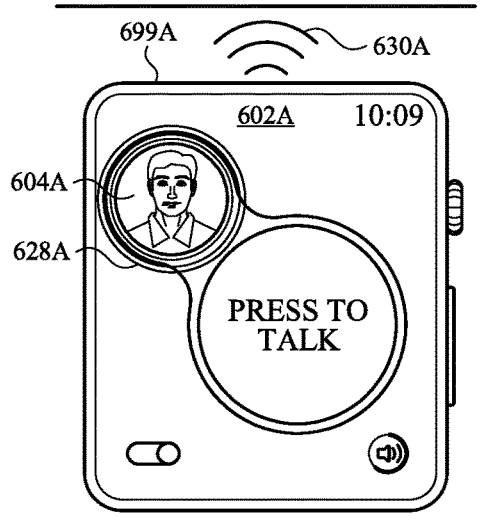
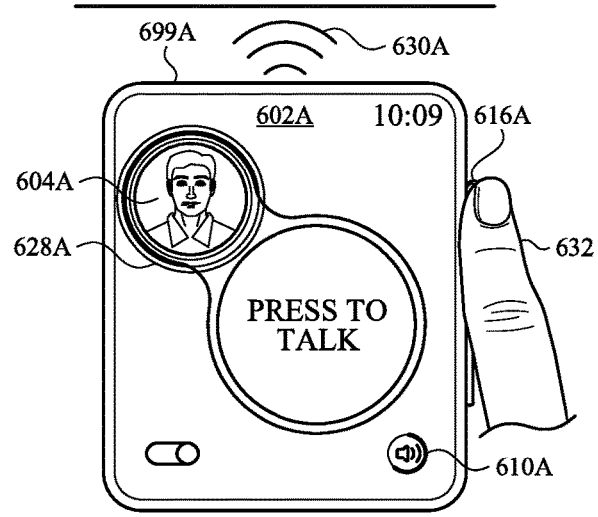
*FIG. 6AC*     *FIG. 6AD*

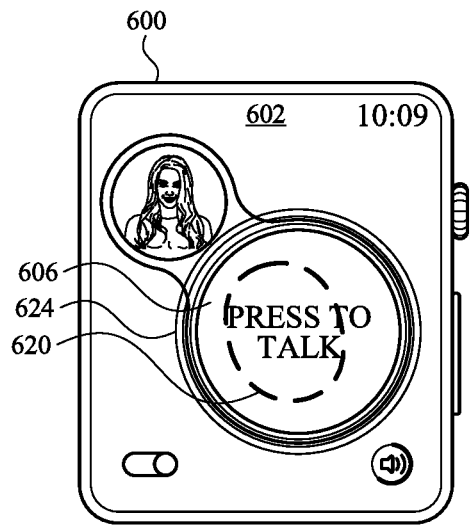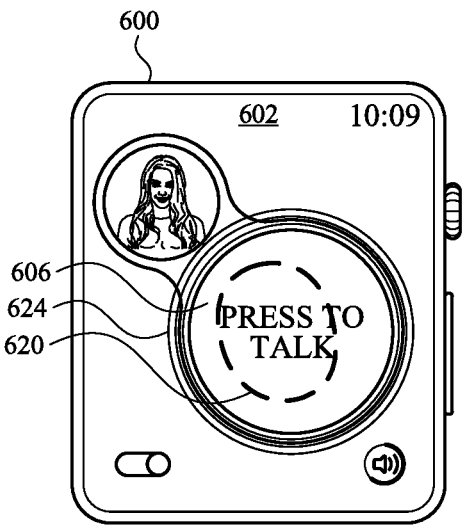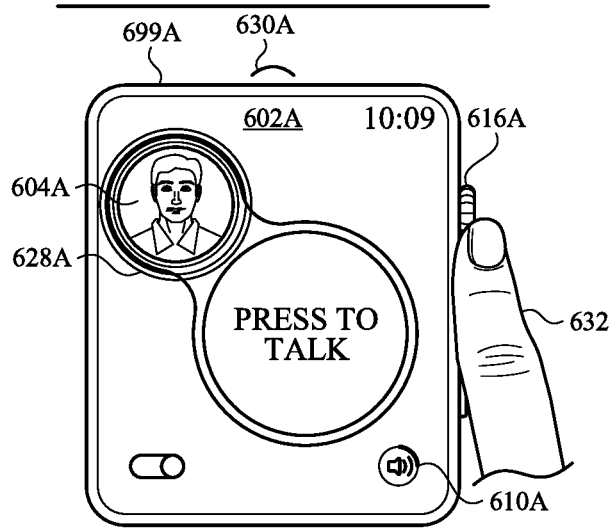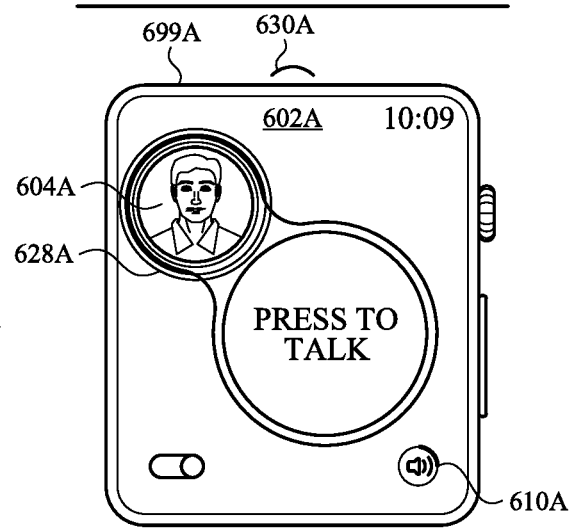
*FIG. 6AE*  *FIG. 6AF*

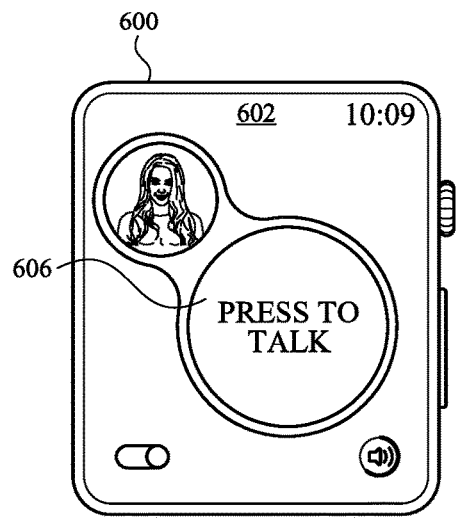
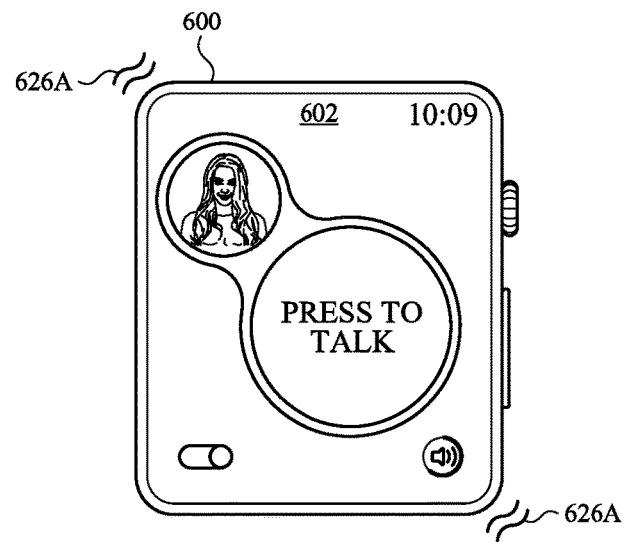
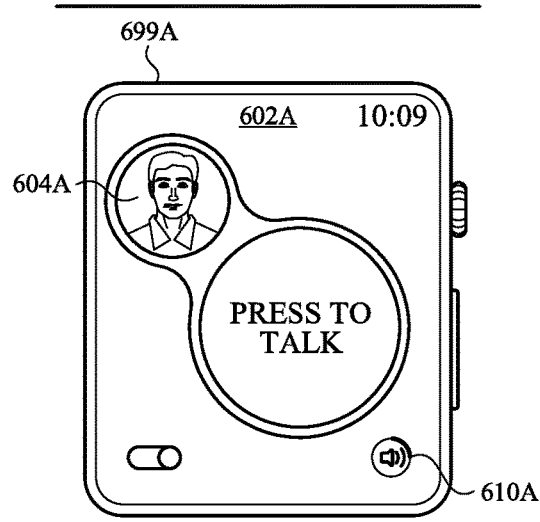
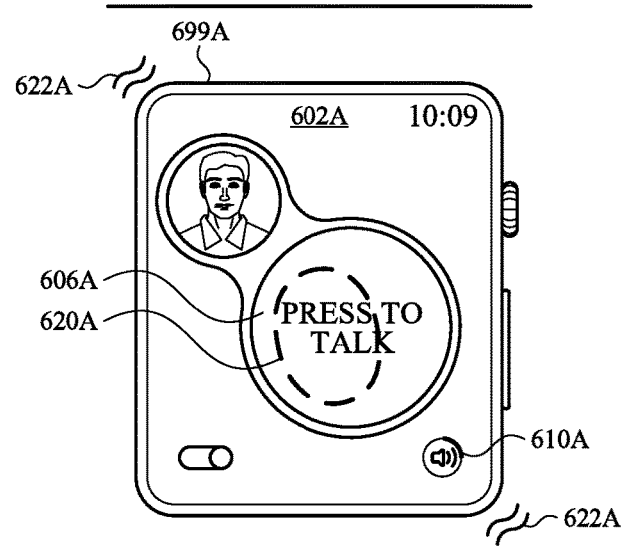
FIG. 6AG
FIG. 6AH

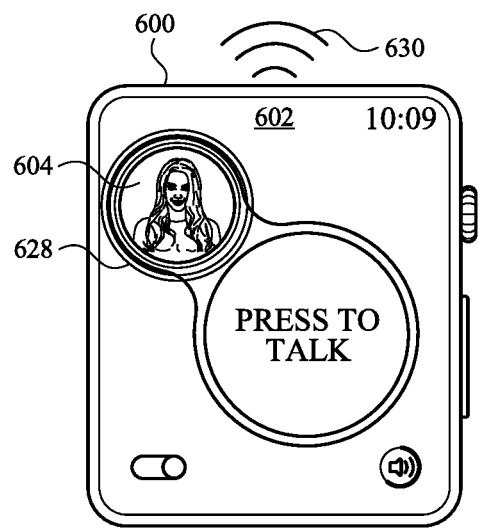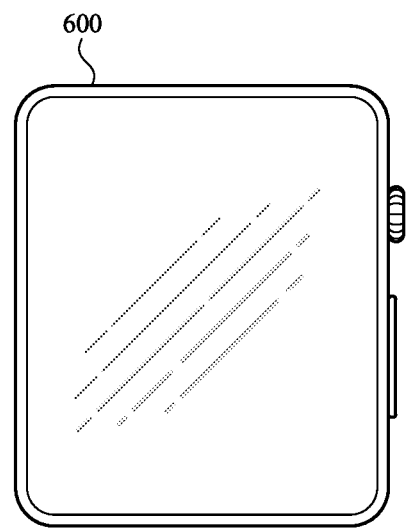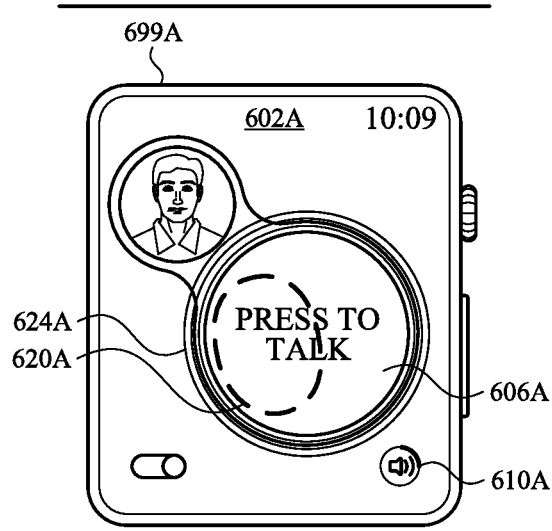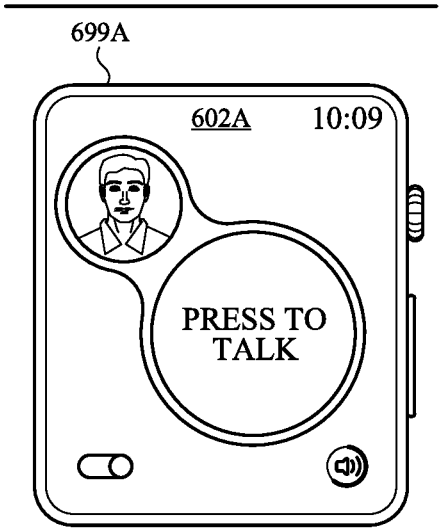
*FIG. 6AI*  *FIG. 6BA*

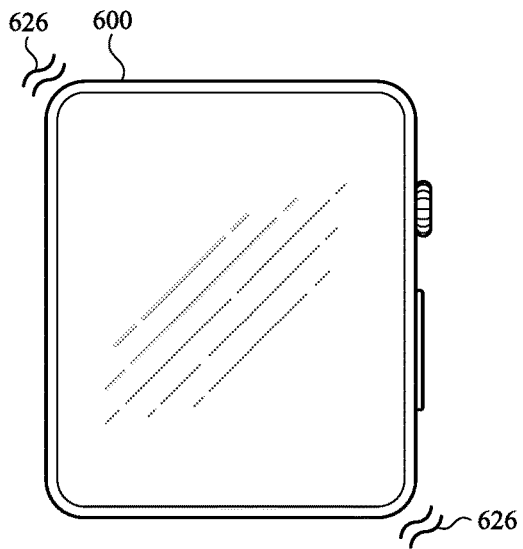
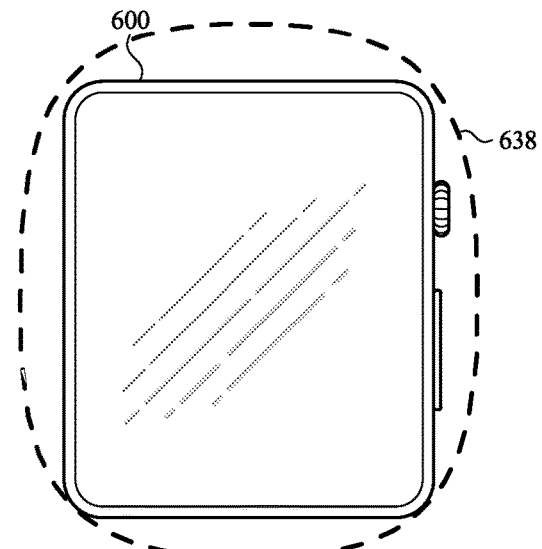
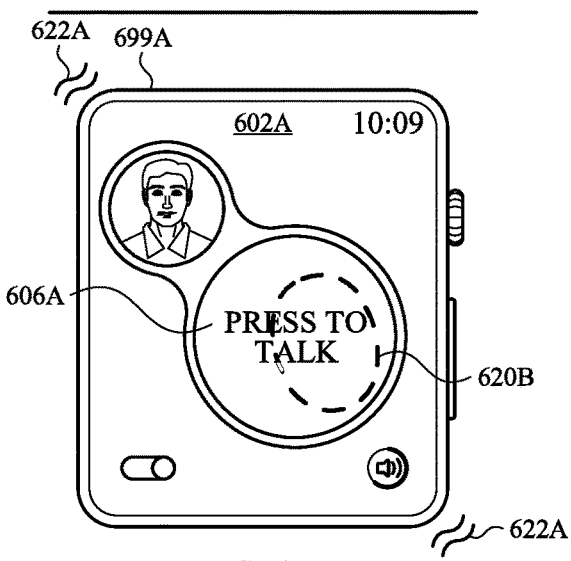
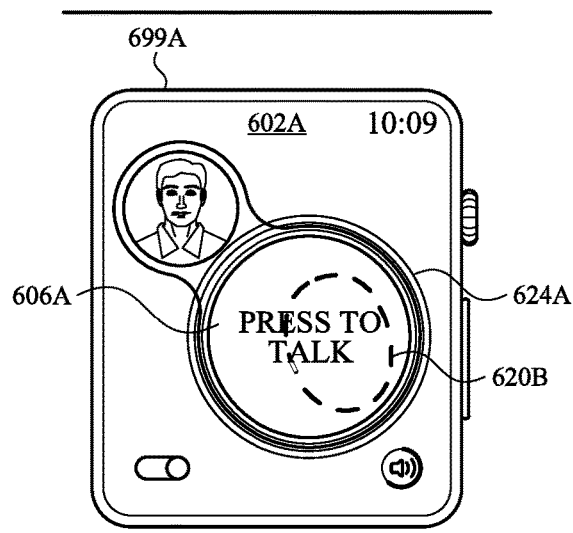
*FIG. 6BB*　　　　　　*FIG. 6BC*

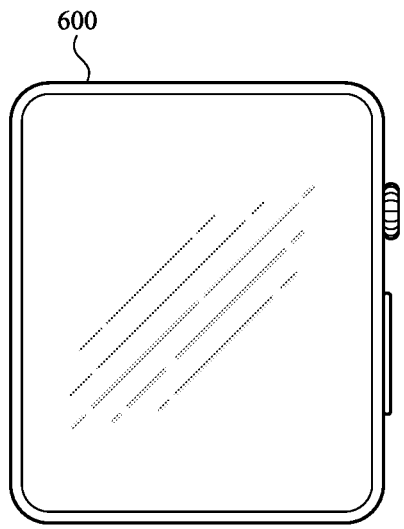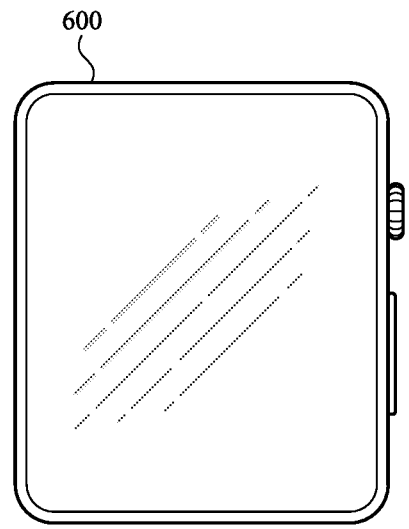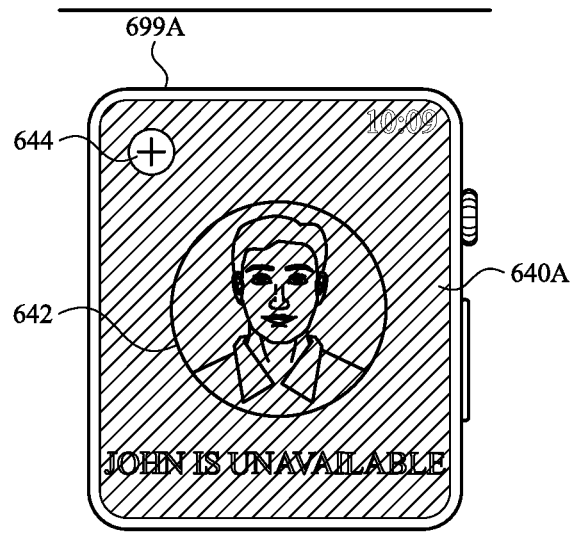
FIG. 6BD                FIG. 6CA

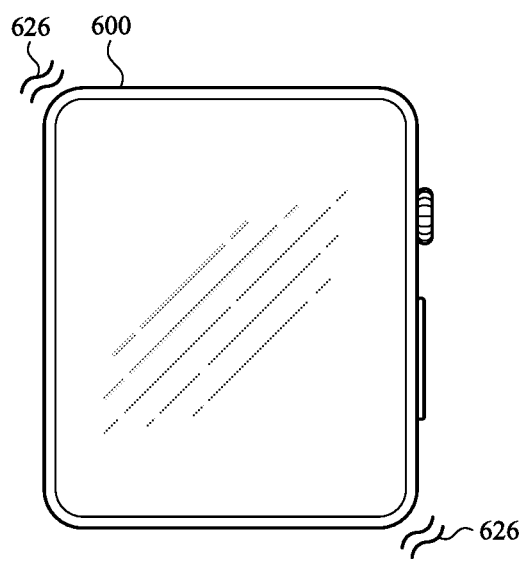
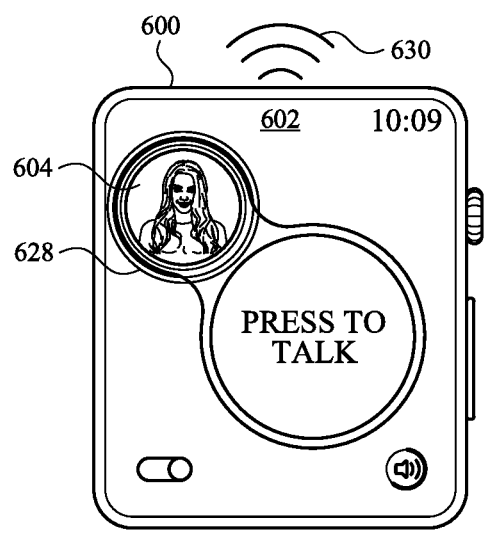
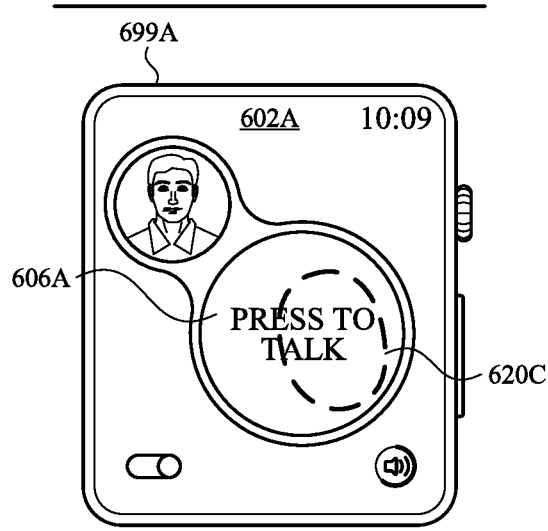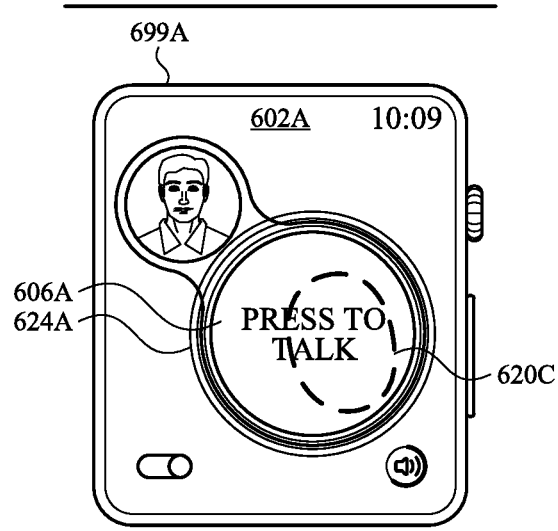
FIG. 6CB            FIG. 6CC

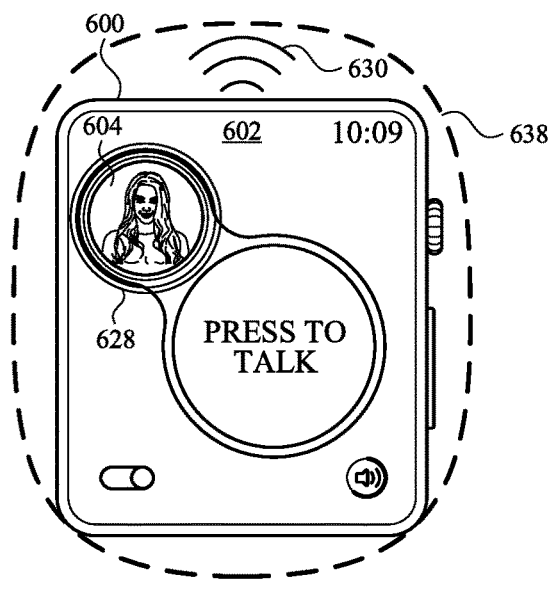
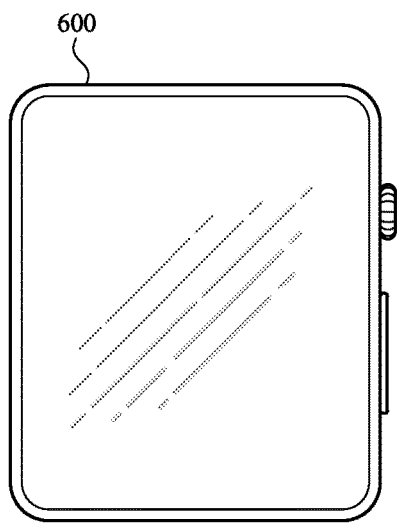
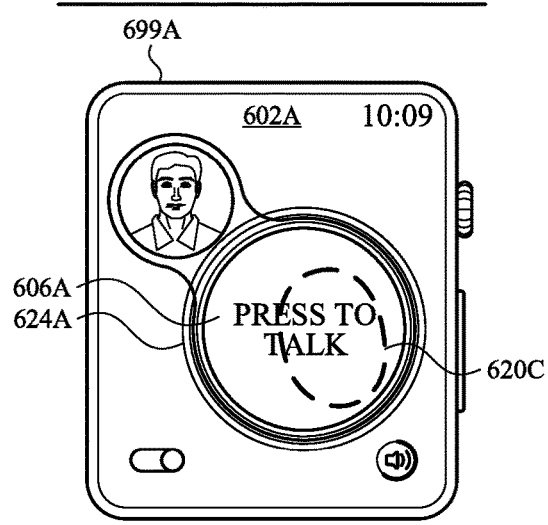
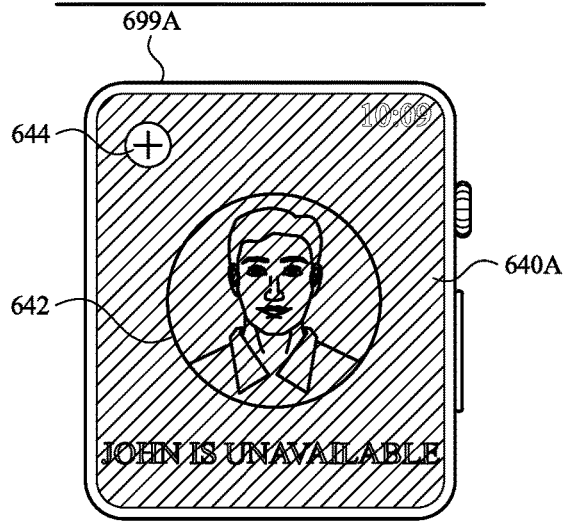
FIG. 6CD
FIG. 6CE

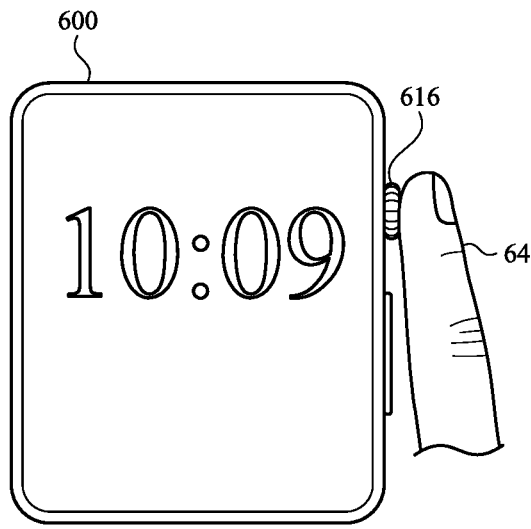
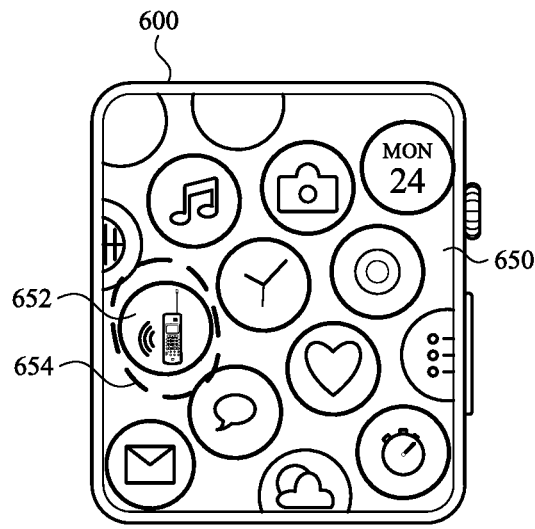
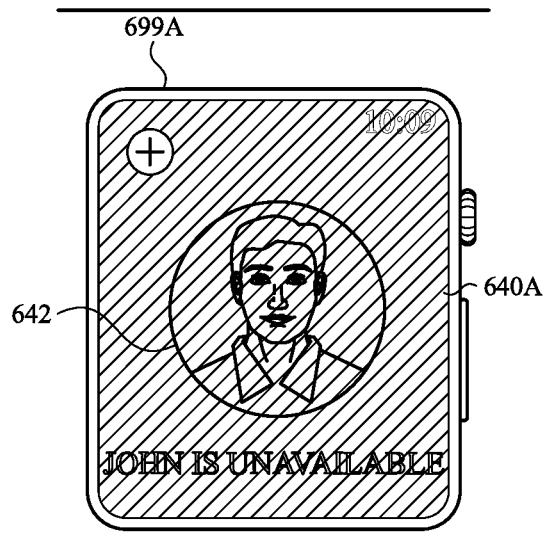
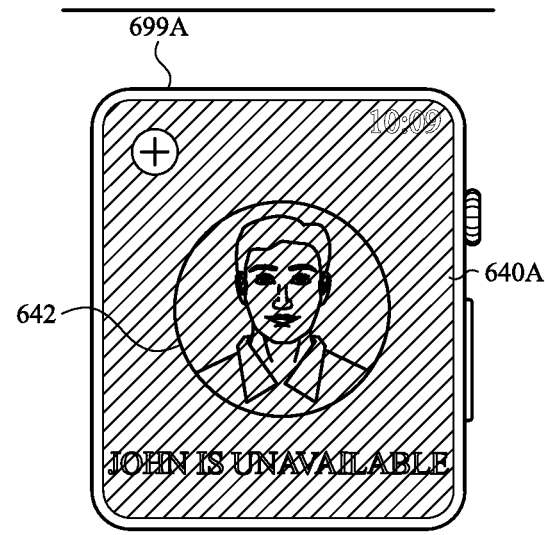
FIG. 6DA                    FIG. 6DB

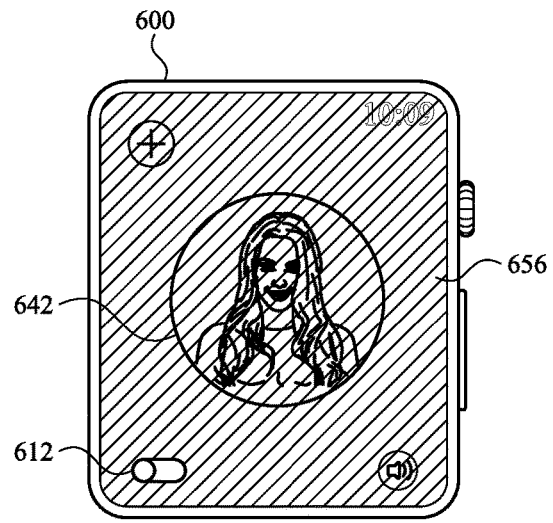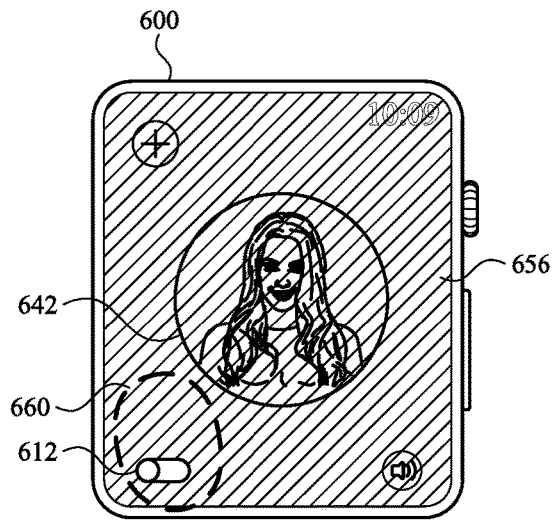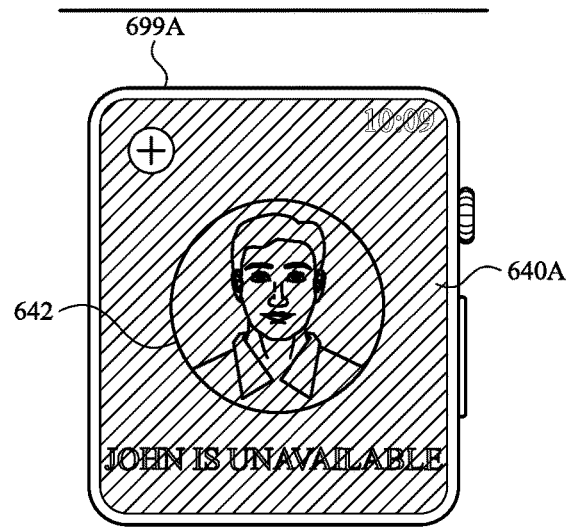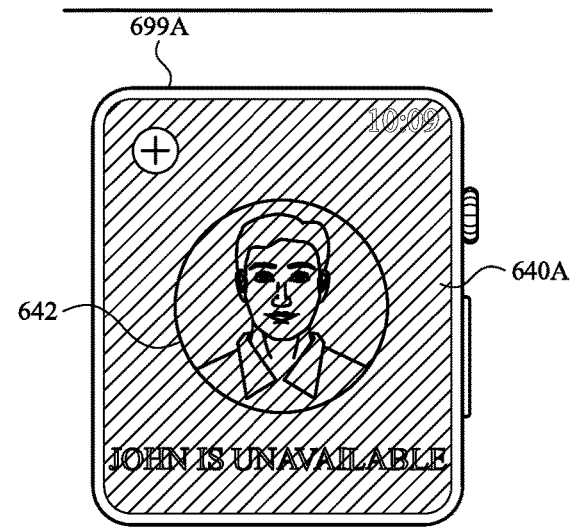
FIG. 6DC          FIG. 6DD

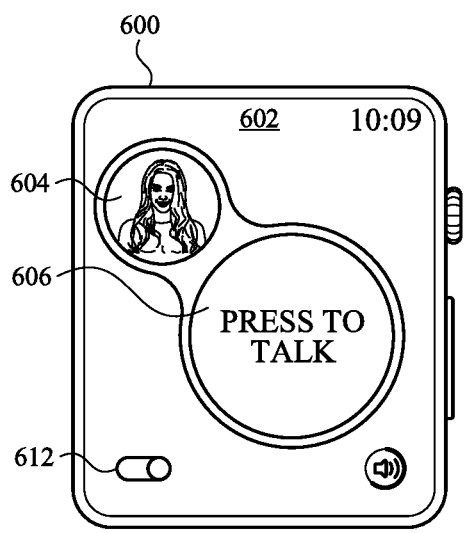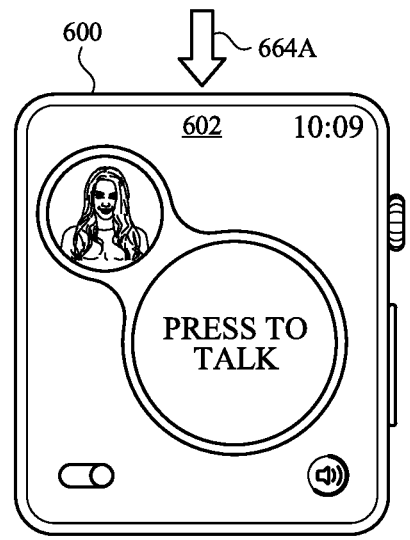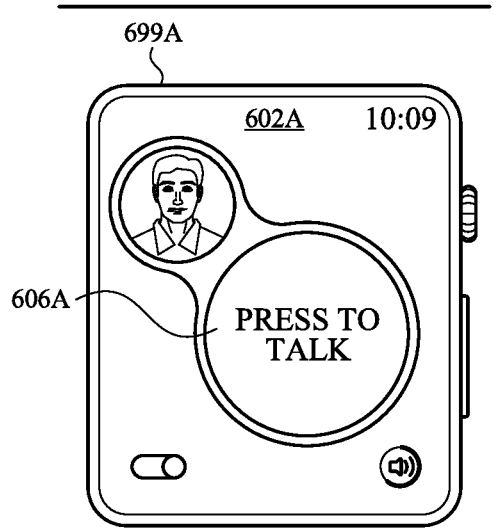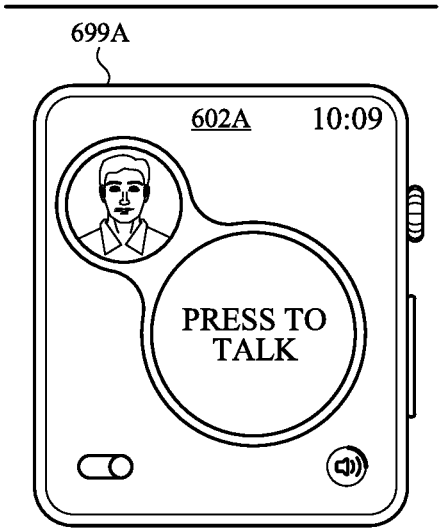
*FIG. 6DE*  *FIG. 6EA*

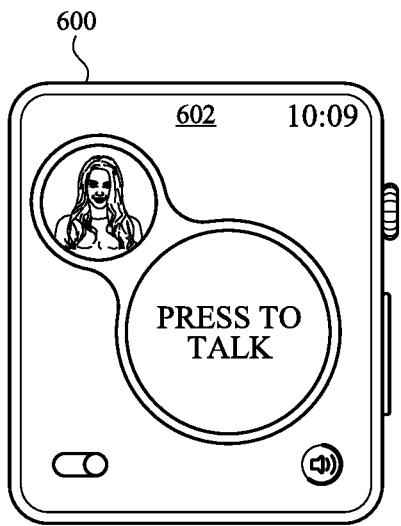
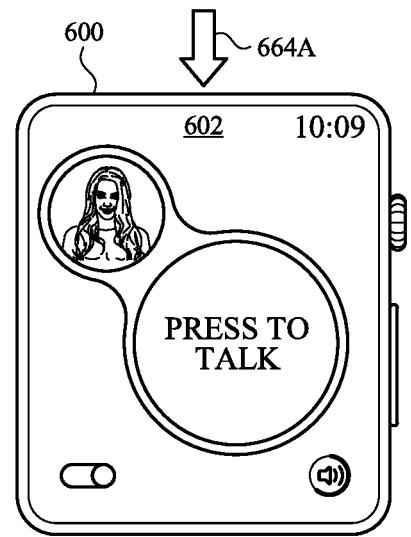
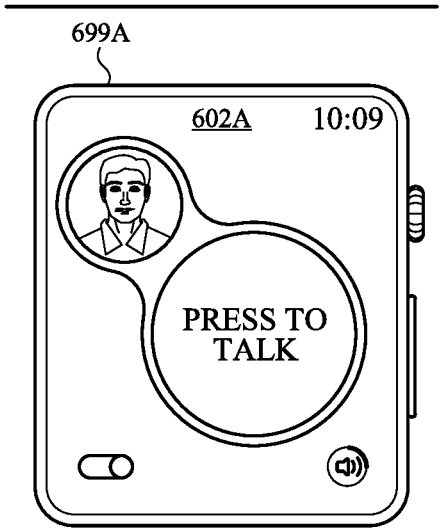
*FIG. 6EB*  *FIG. 6FA*

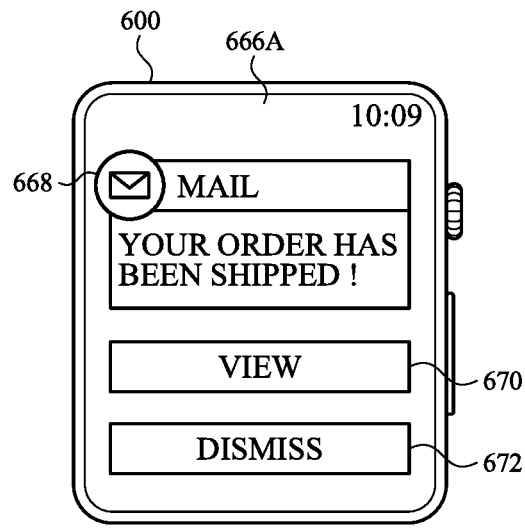
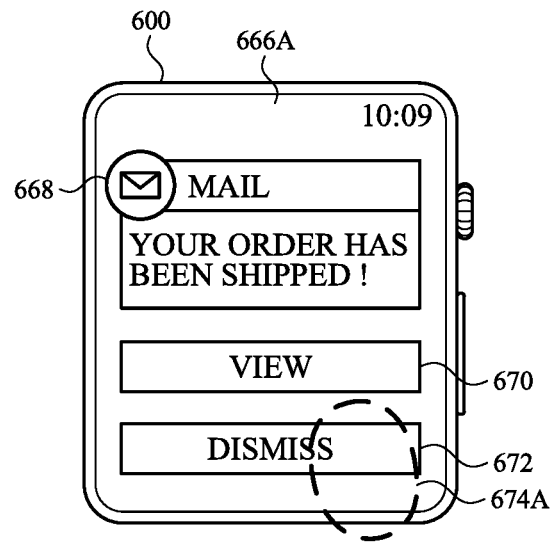
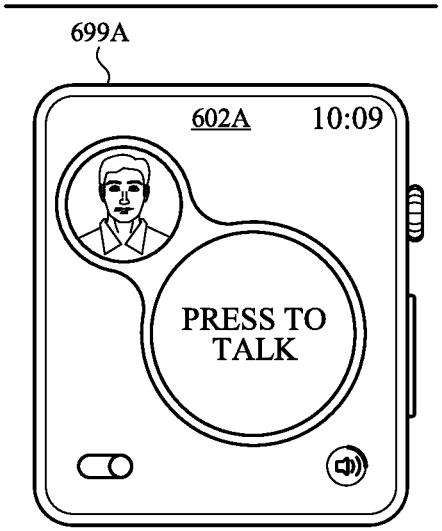
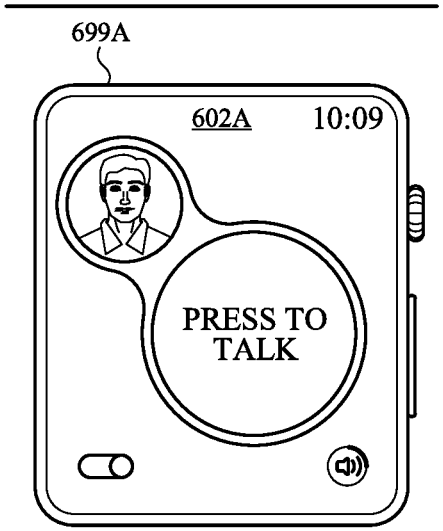
*FIG. 6FB*  *FIG. 6FC*

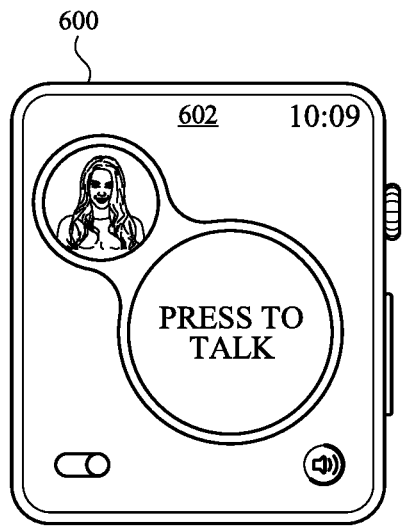
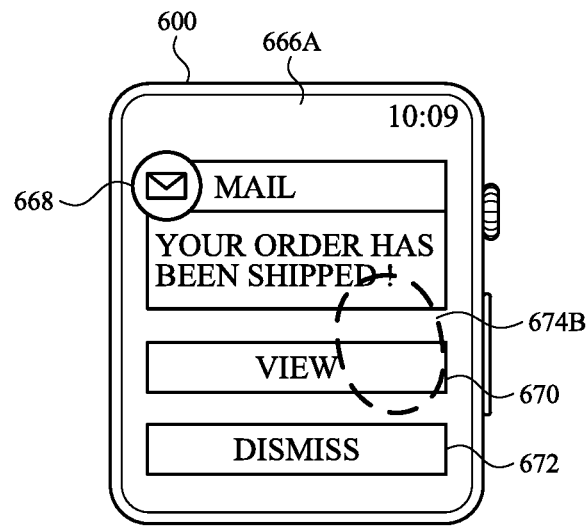
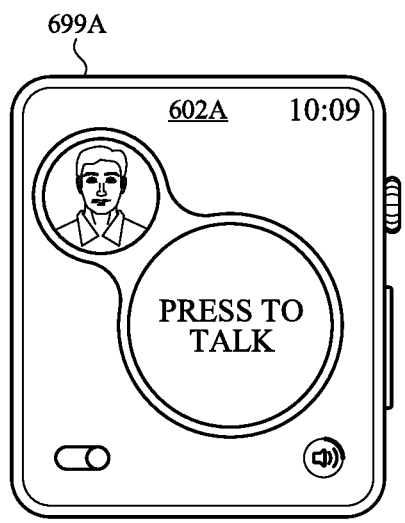
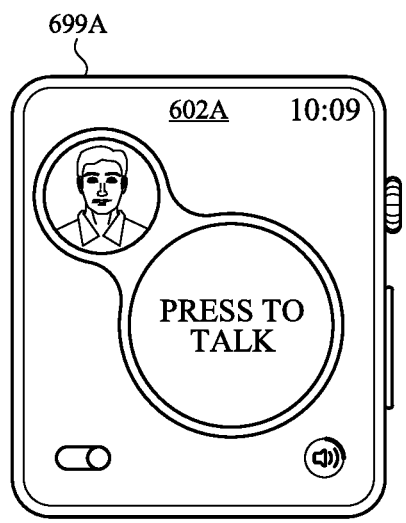
*FIG. 6FD*  *FIG. 6FE*

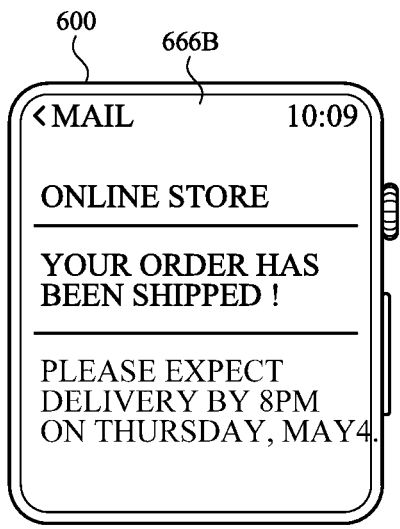
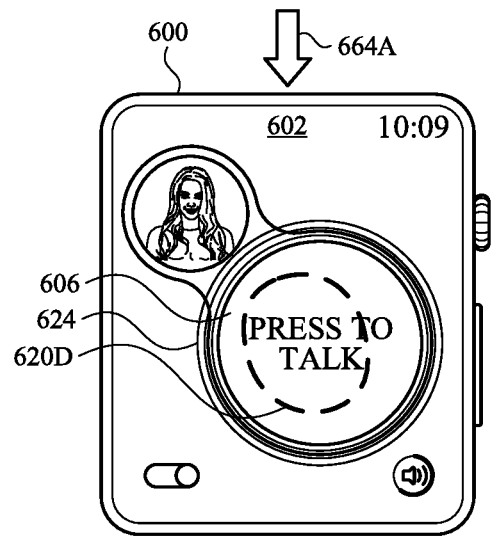
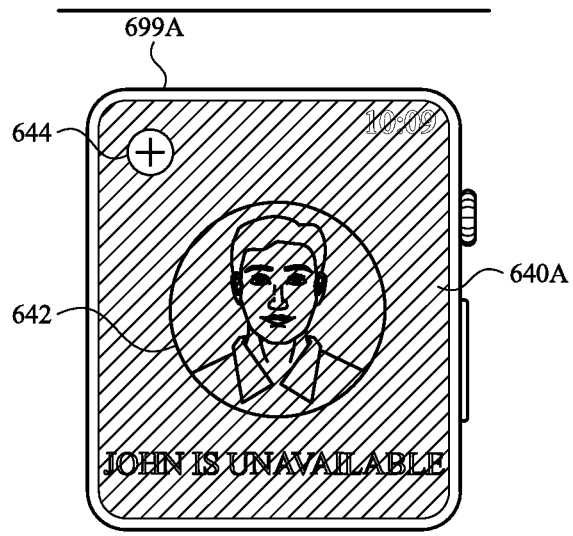
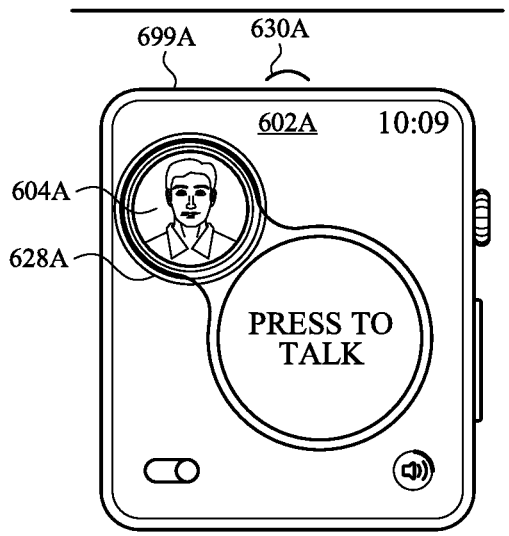
FIG. 6FF
FIG. 6GA

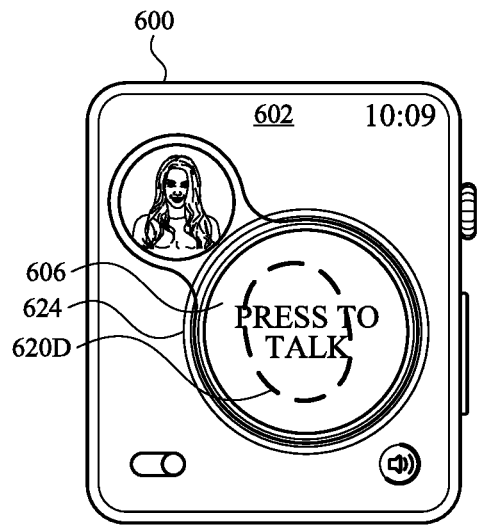
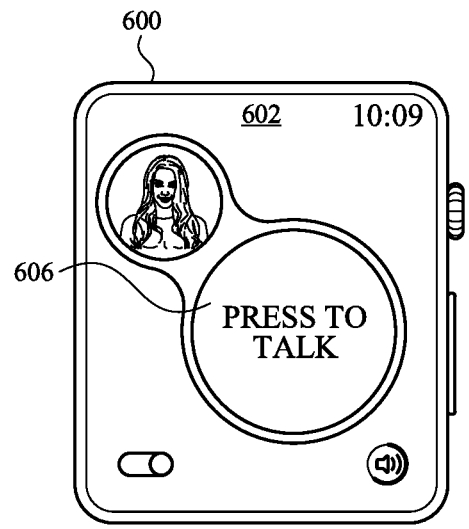
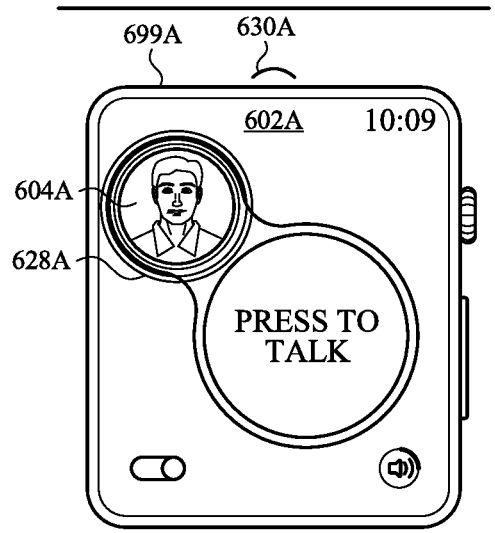
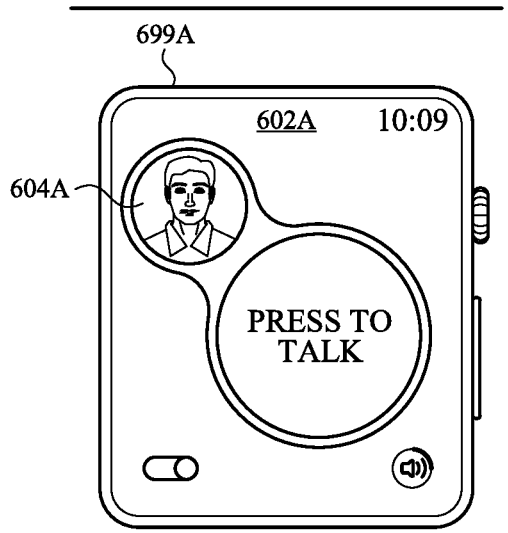
*FIG. 6GB*     *FIG. 6GC*

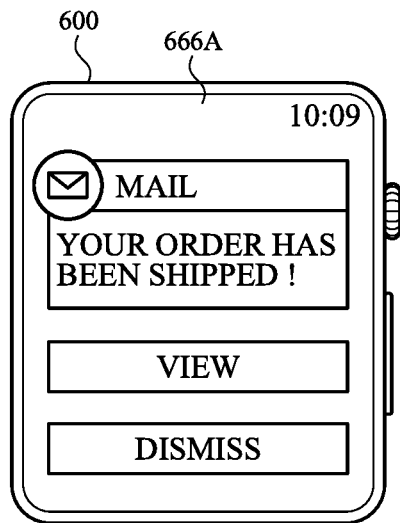
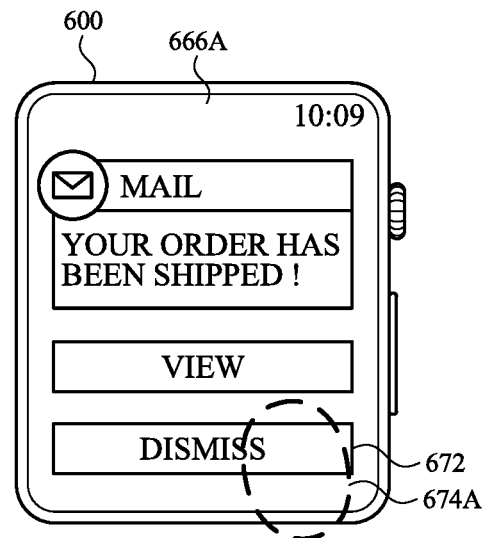
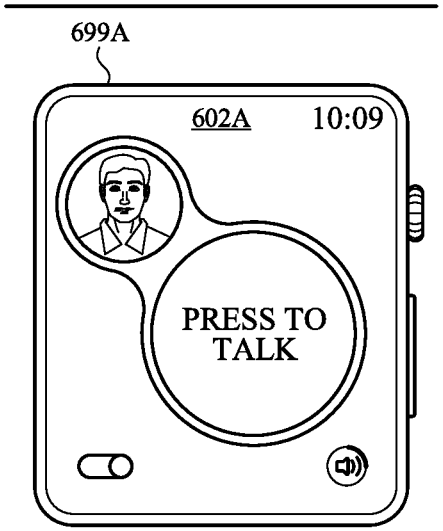
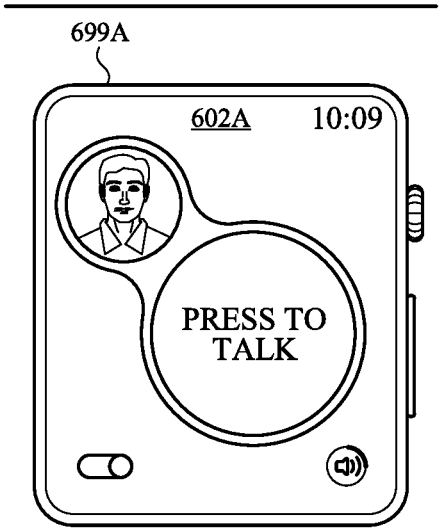
*FIG. 6GD*            *FIG. 6GE*

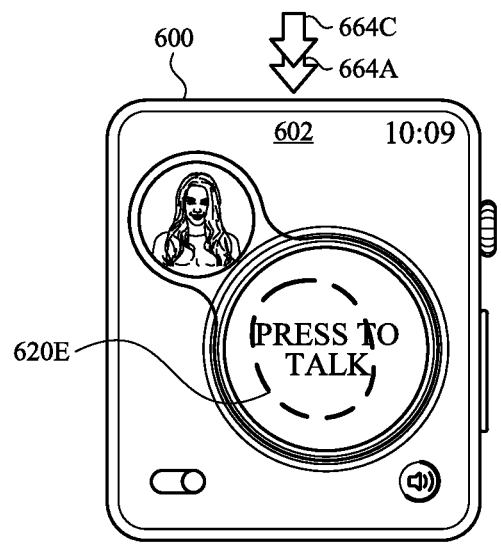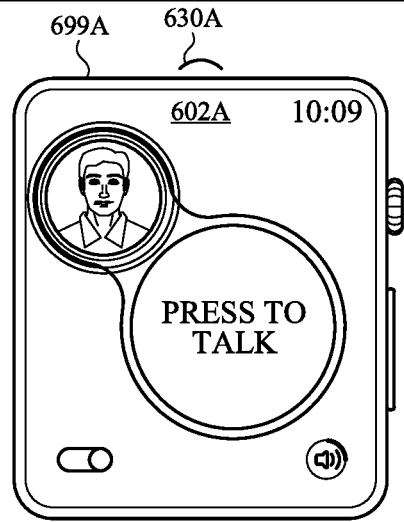
FIG. 6GF          FIG. 6HA

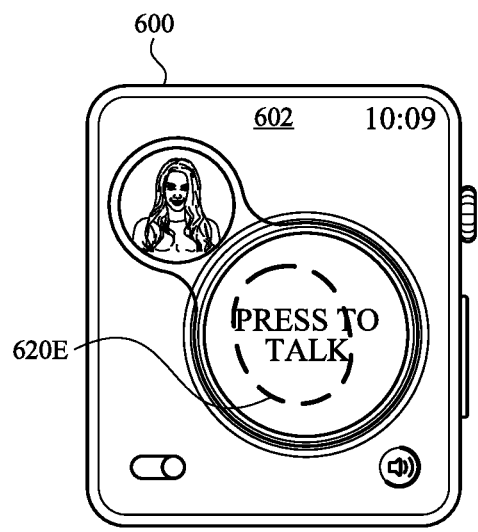
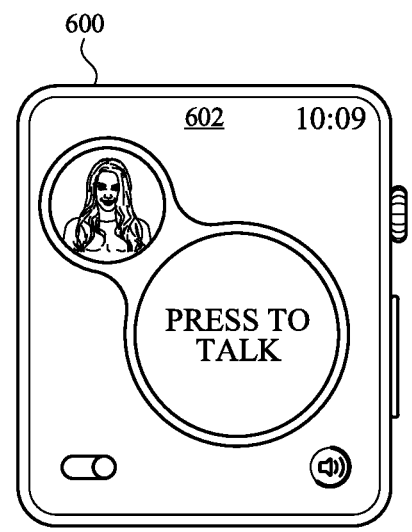
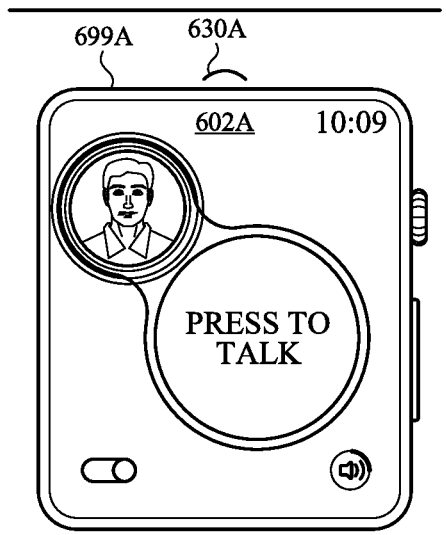
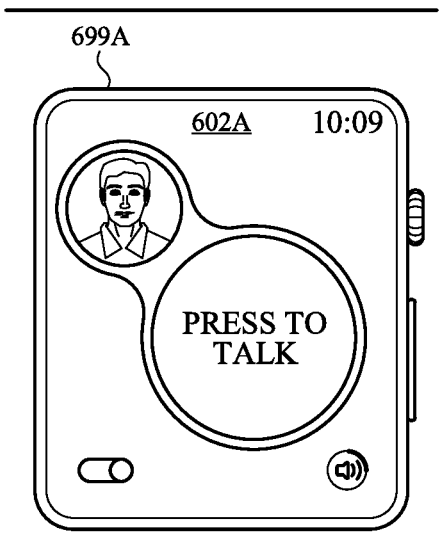
FIG. 6HB　　　　　　　　　　　FIG. 6HC

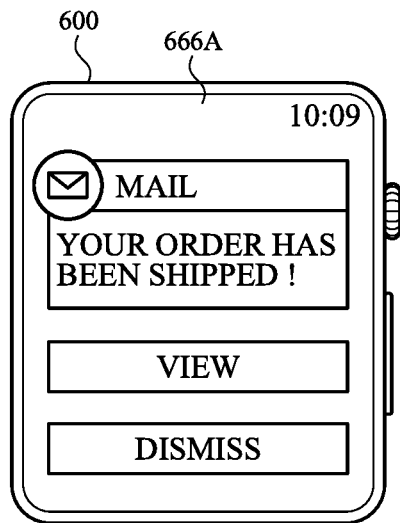
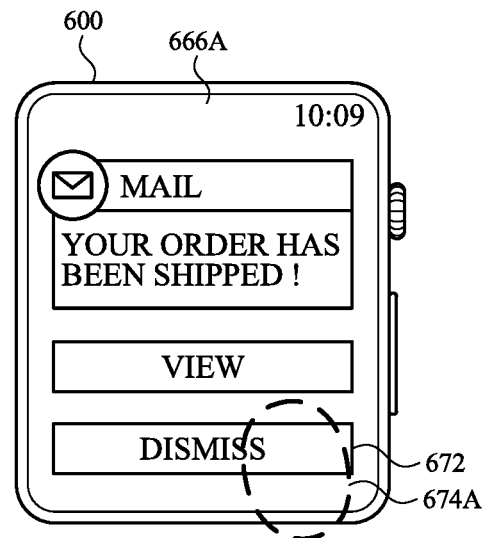
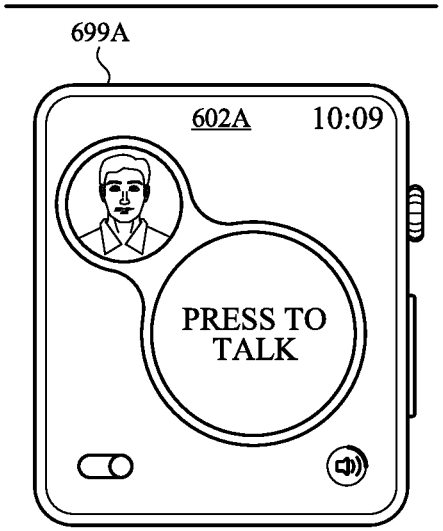
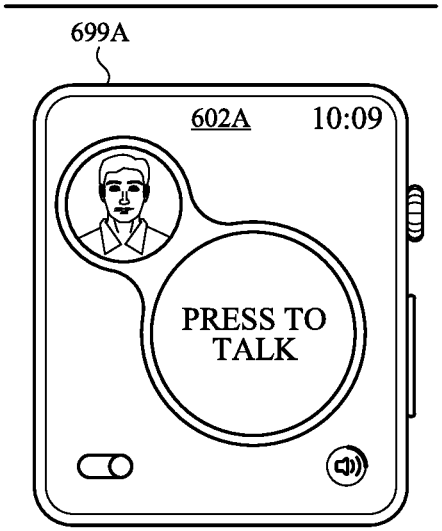
*FIG. 6HD*     *FIG. 6HE*

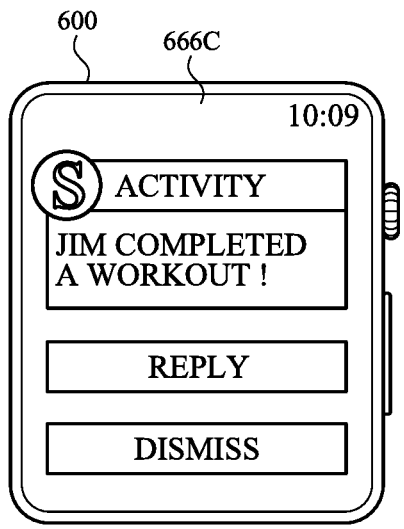 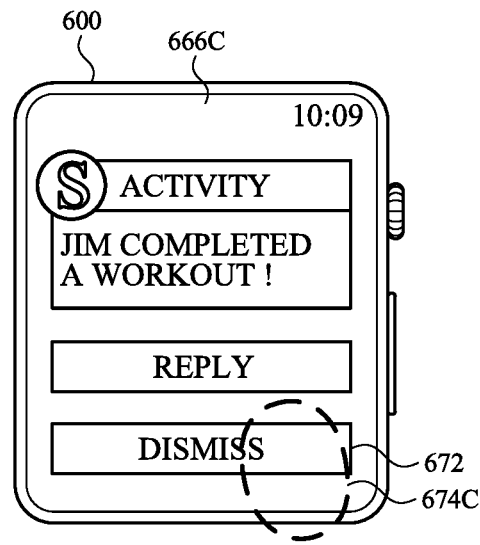
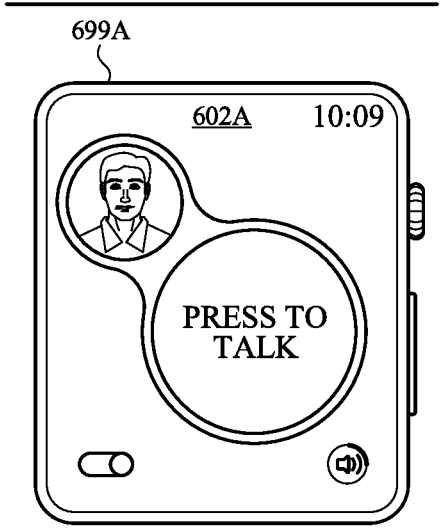 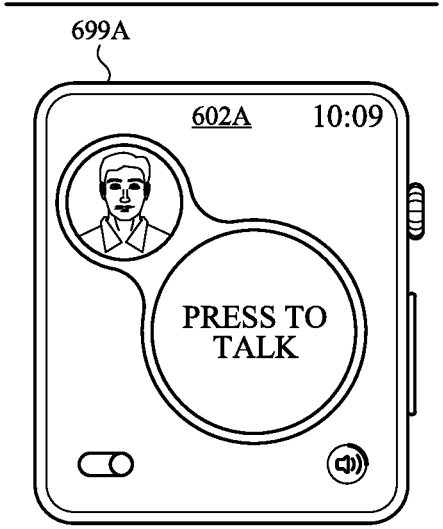
FIG. 6HF    FIG. 6HG

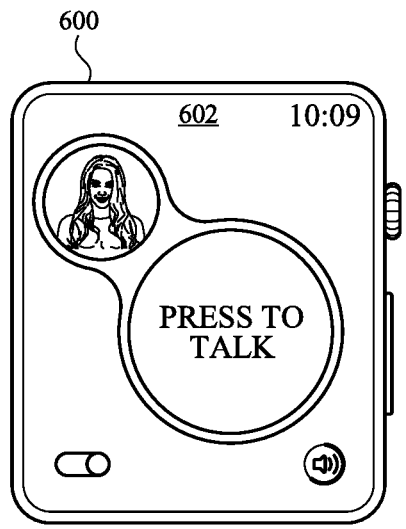
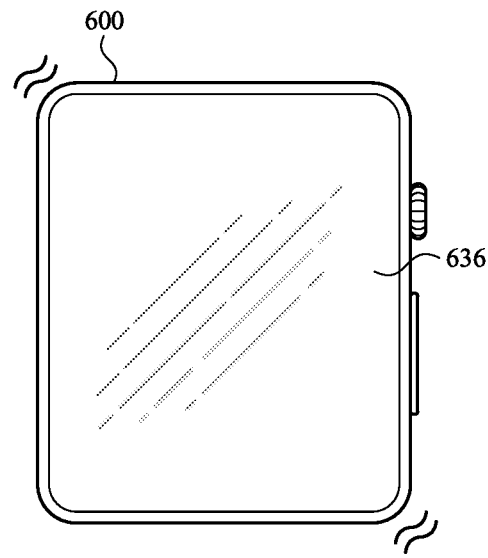
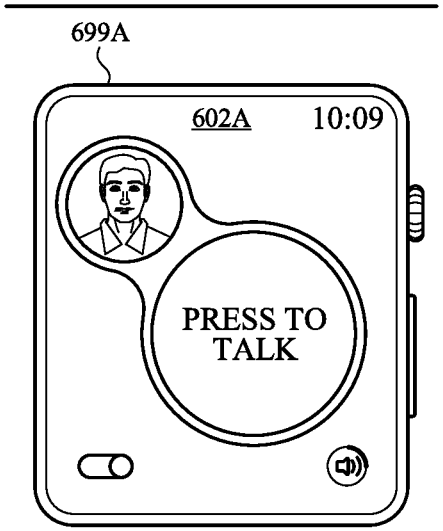
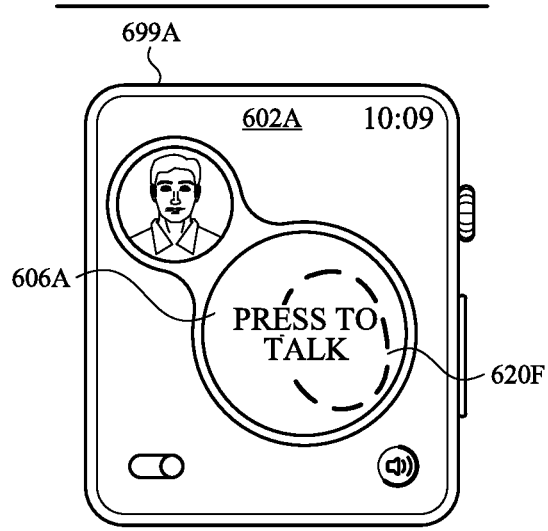
FIG. 6HH FIG. 6IA

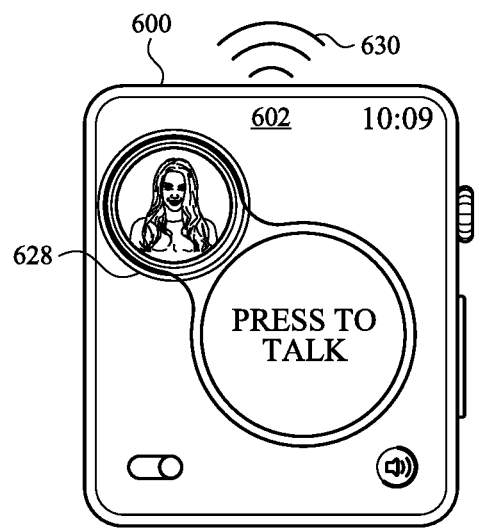
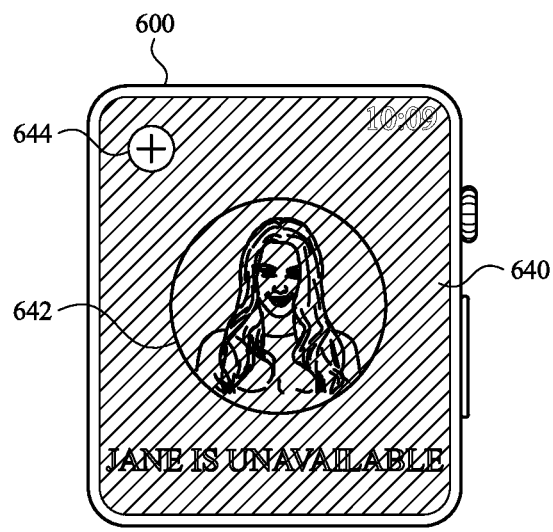
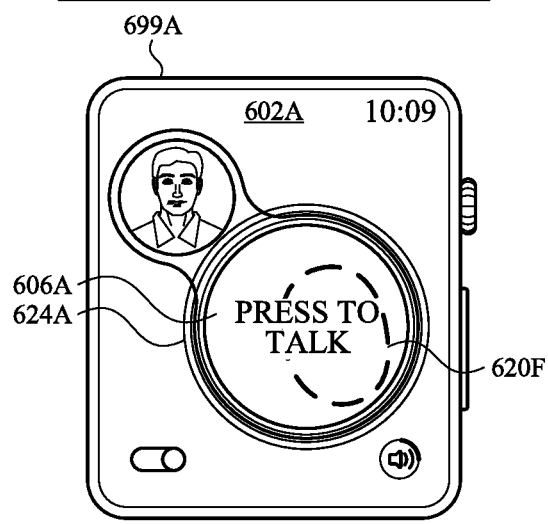
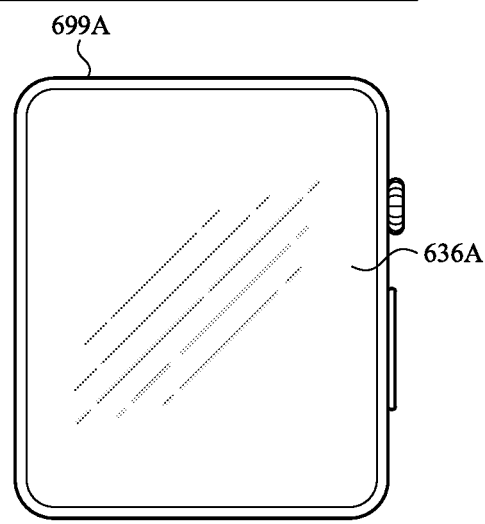
FIG. 6IB
FIG. 6IC

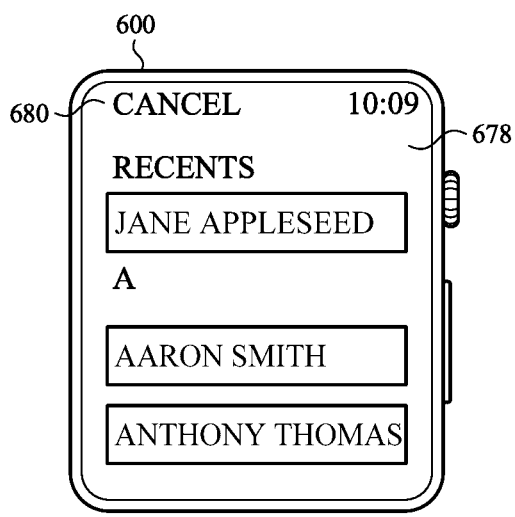 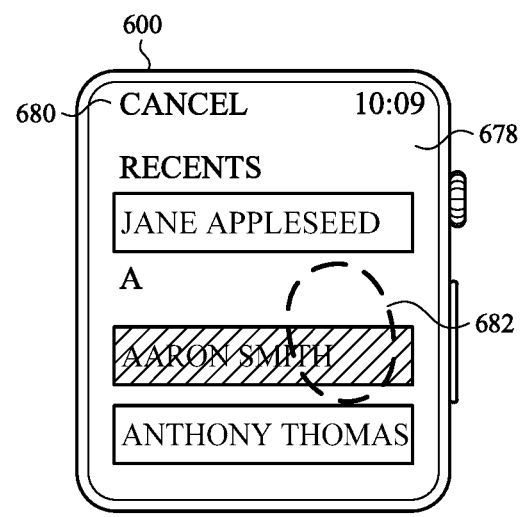
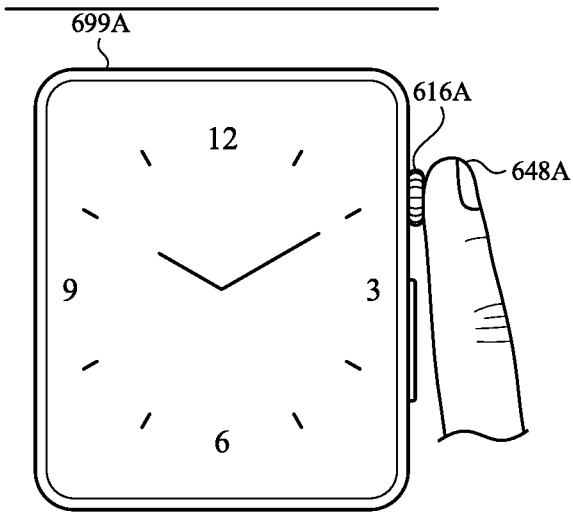 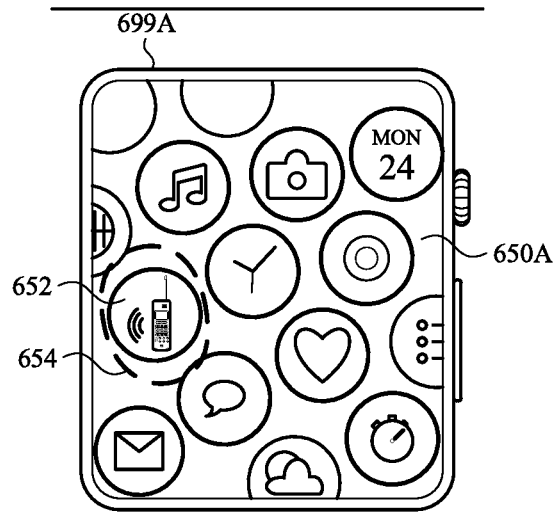
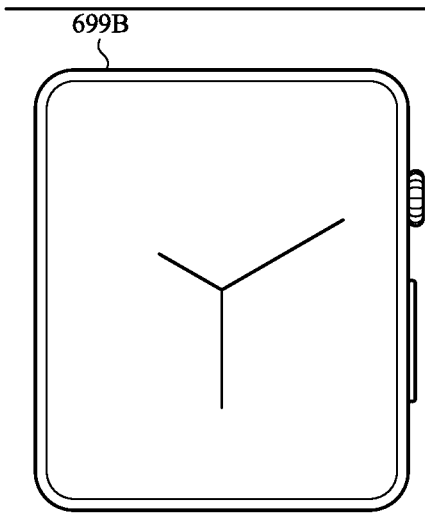 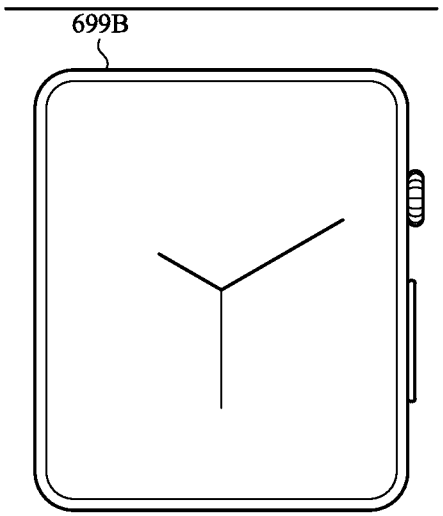
FIG. 6JB　　　　　　　　　FIG. 6JC

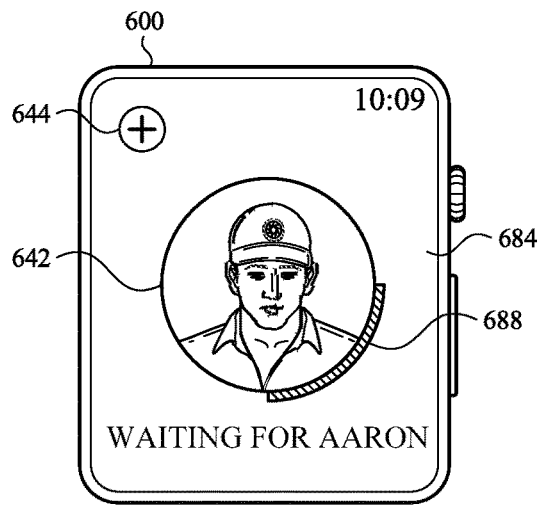
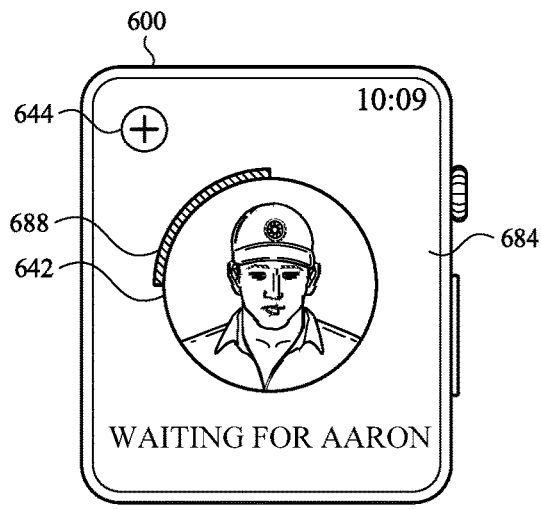
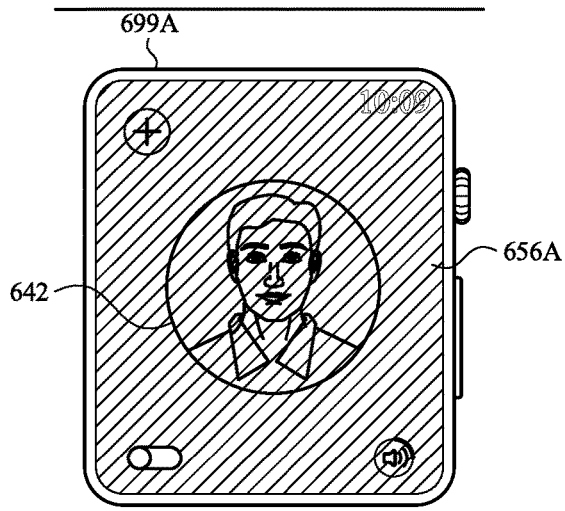
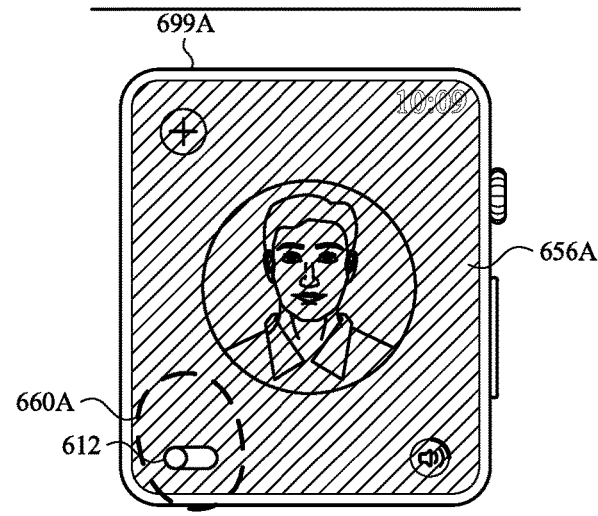
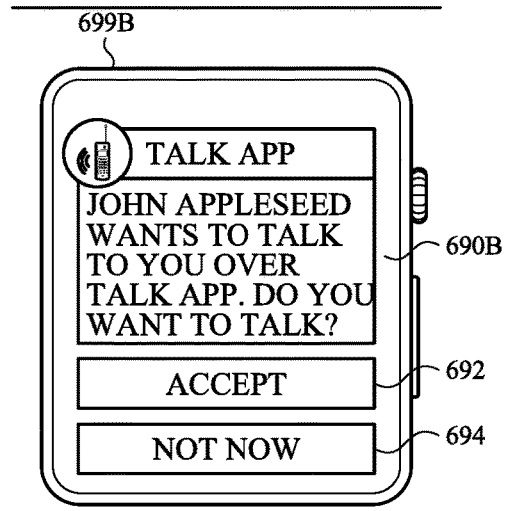
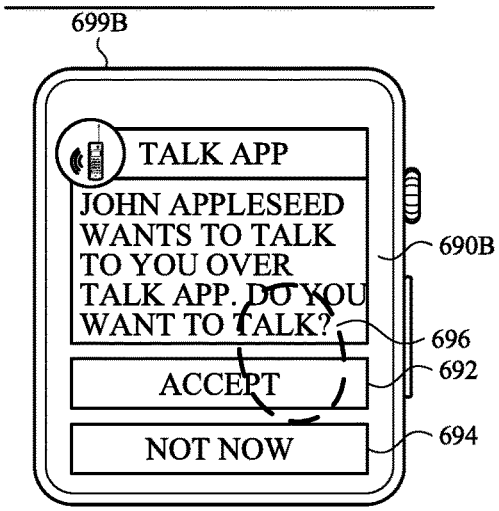
*FIG. 6JD*    *FIG. 6JE*

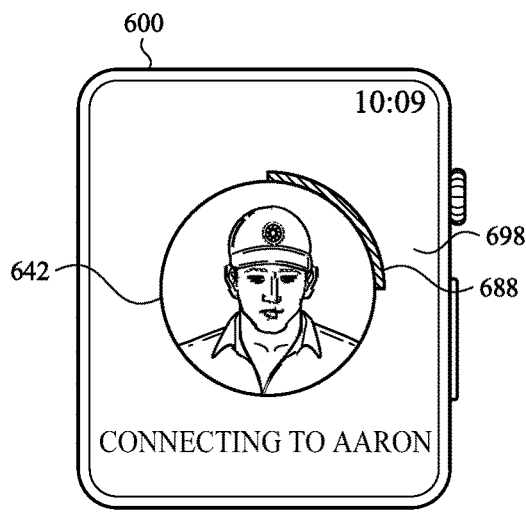
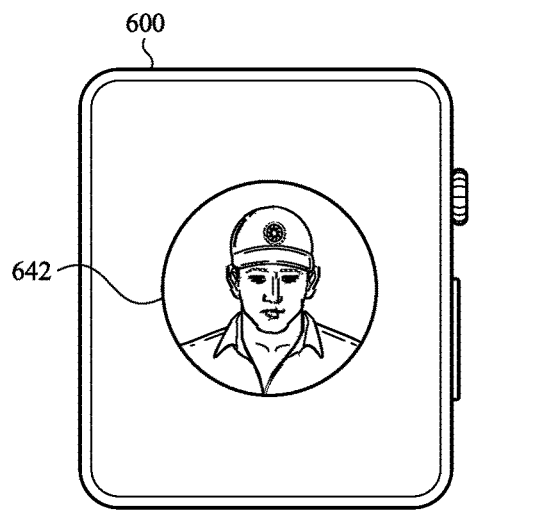
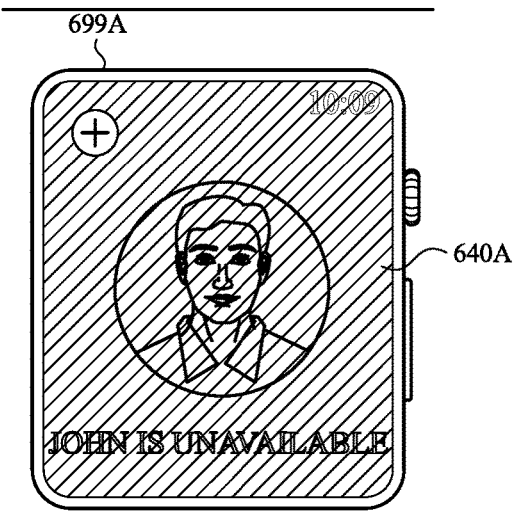
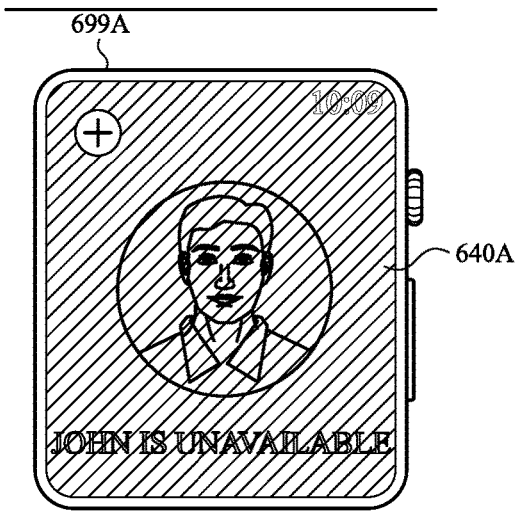
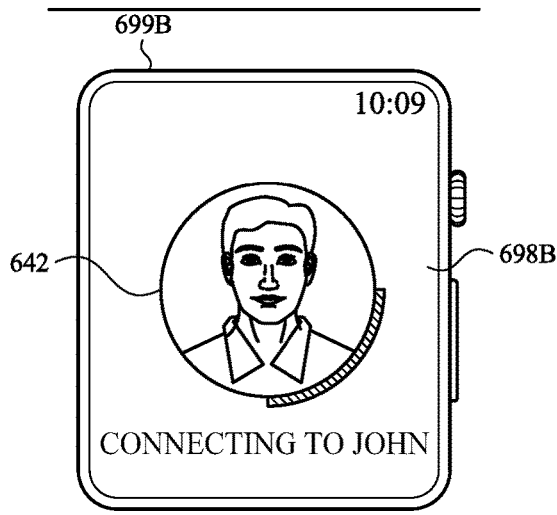
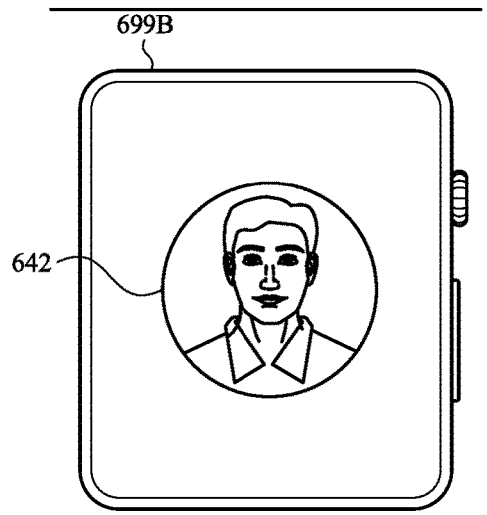
*FIG. 6JF*          *FIG. 6JG*

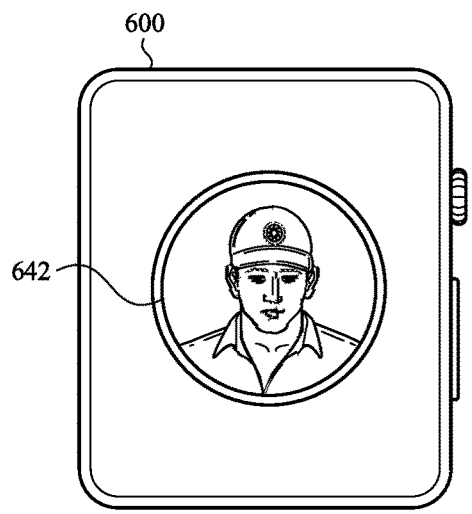
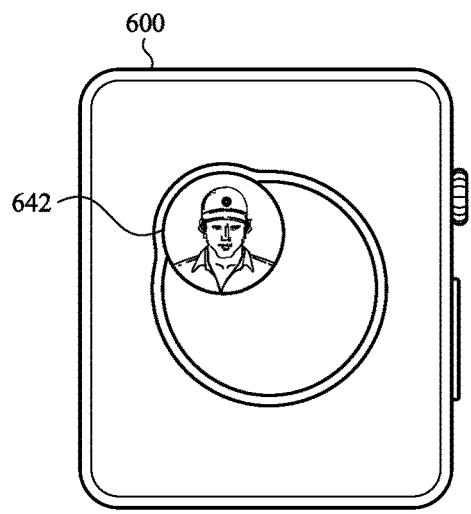
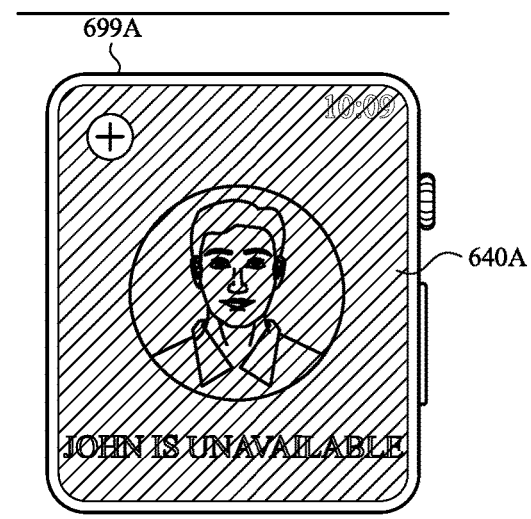
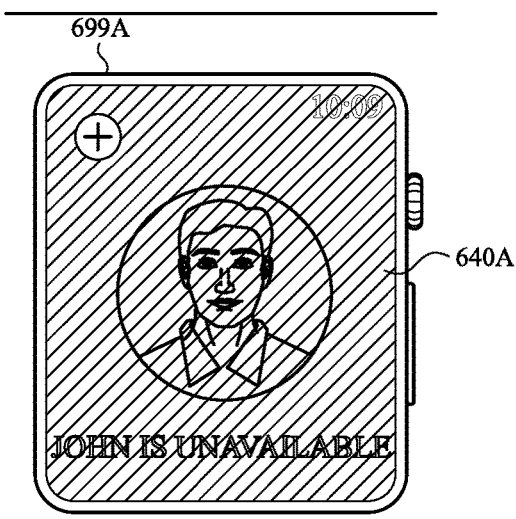
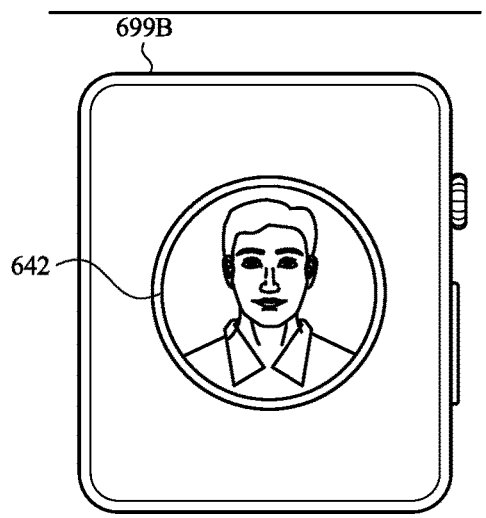
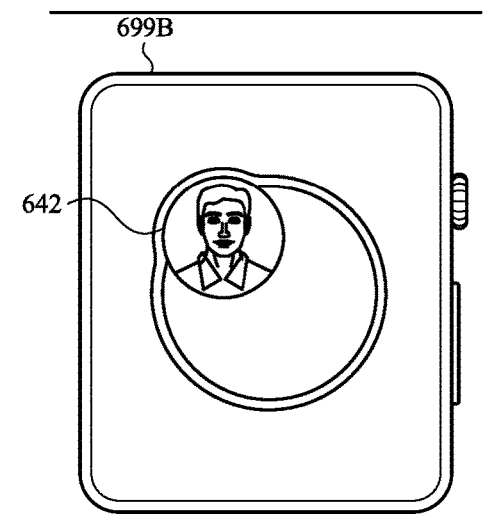
*FIG. 6JH*      *FIG. 6JI*

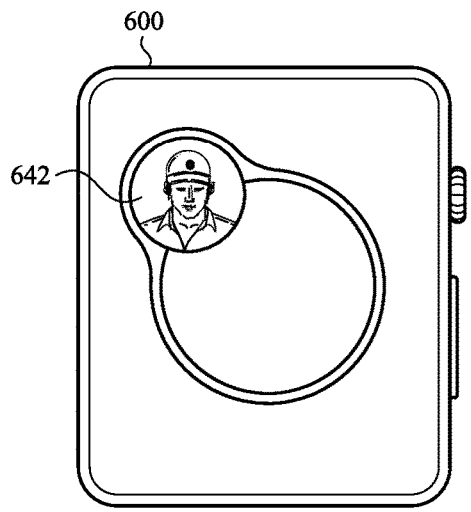
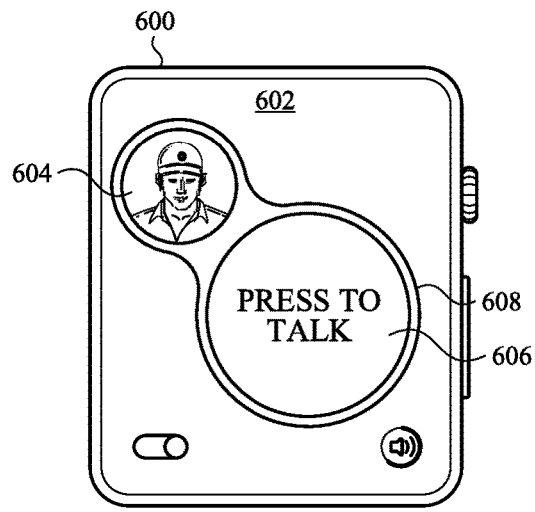
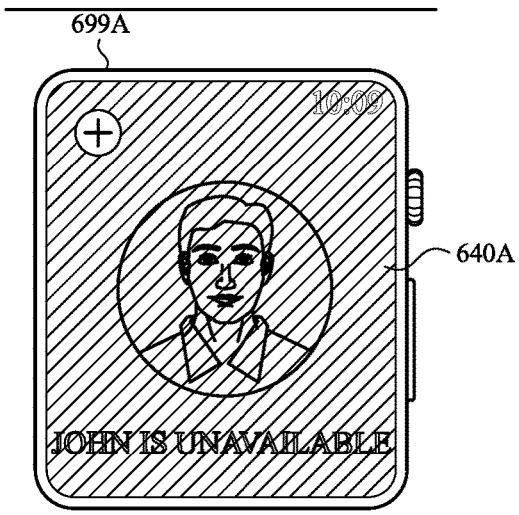
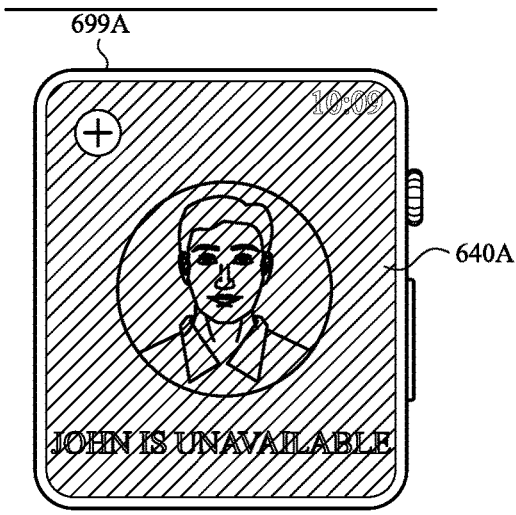
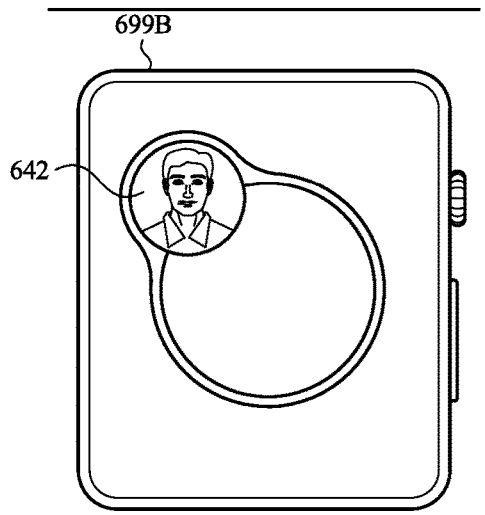
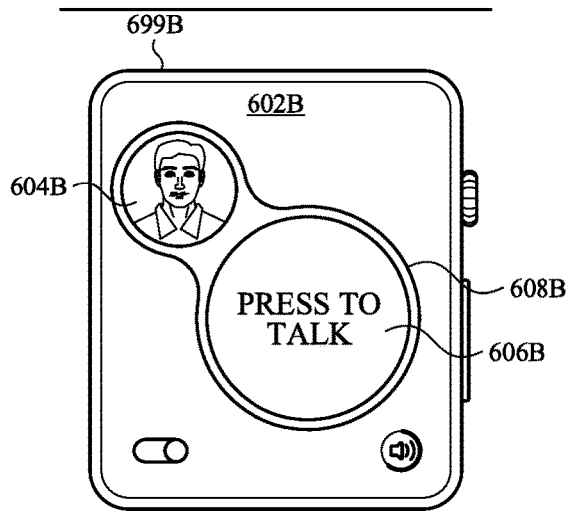
FIG. 6JJ                FIG. 6JK

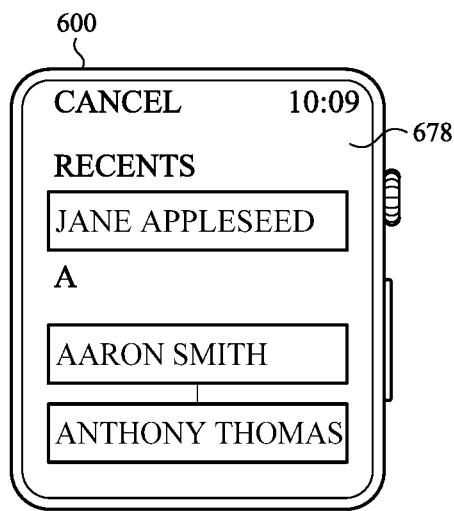
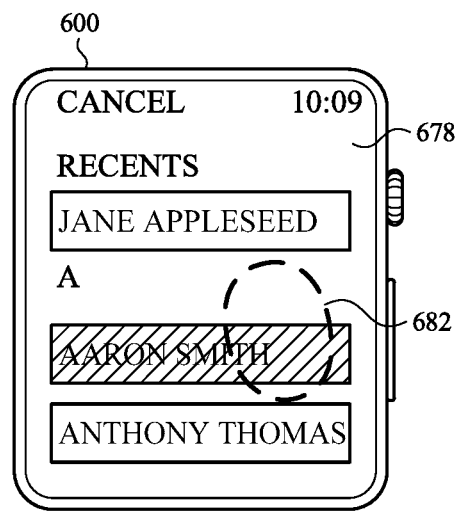
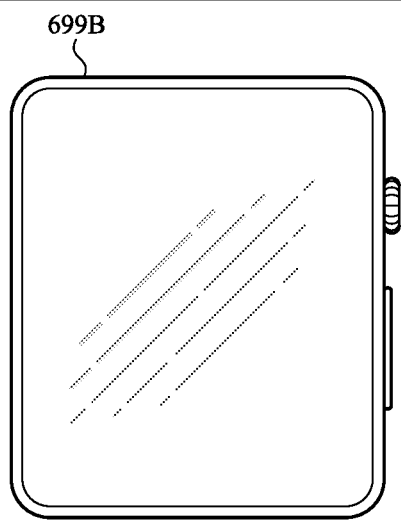
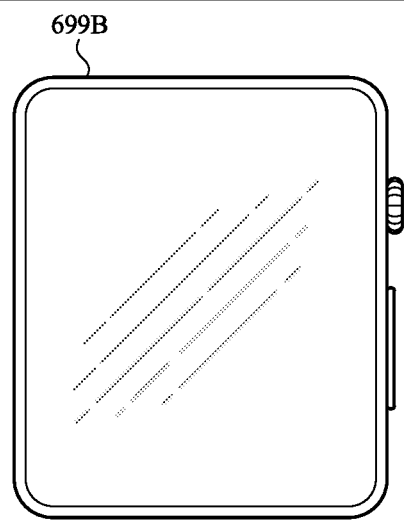
*FIG. 6KA*                    *FIG. 6KB*

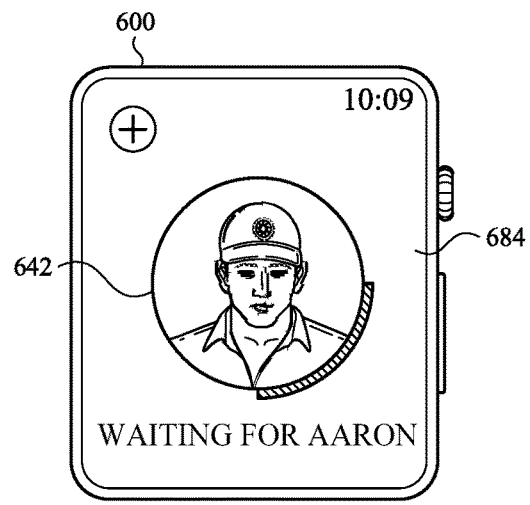 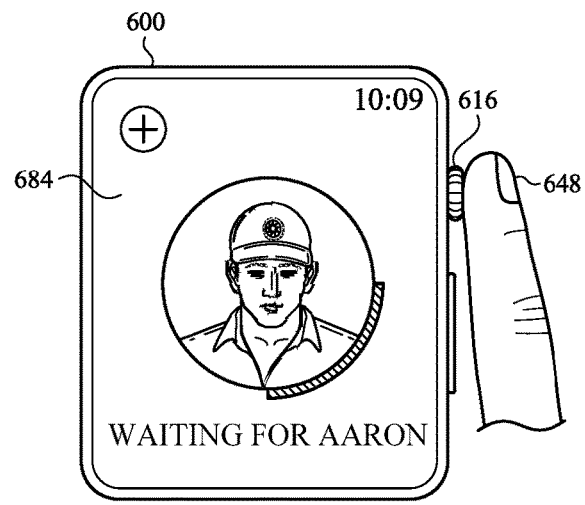
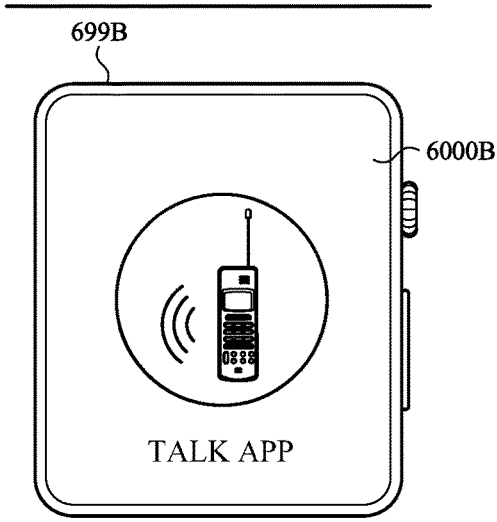 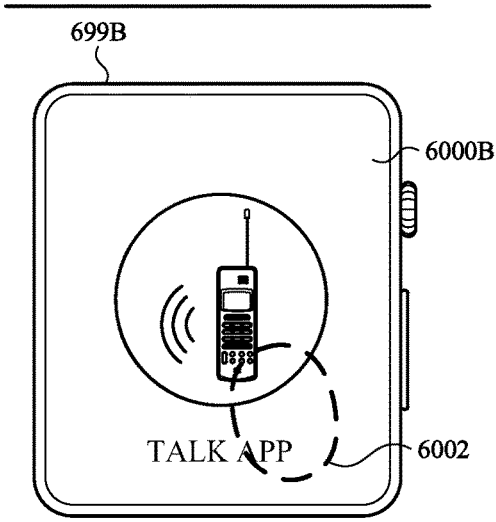
FIG. 6KC                FIG. 6KD

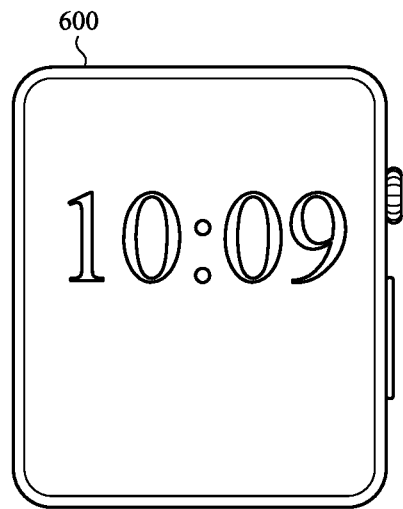 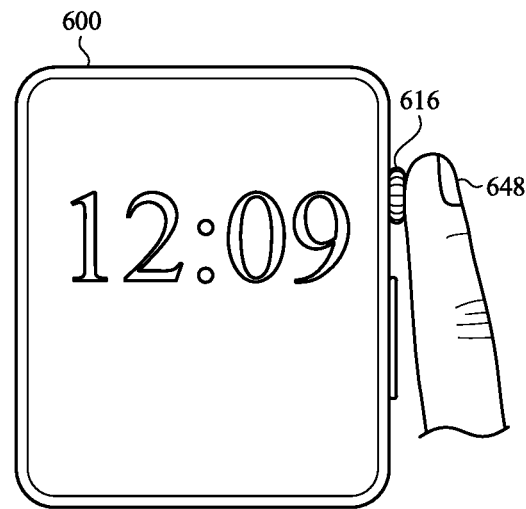
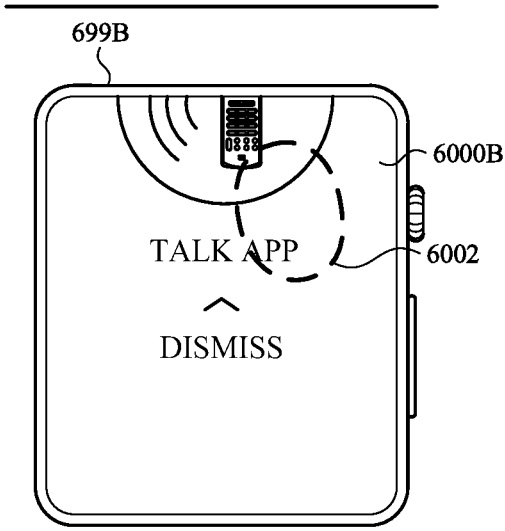 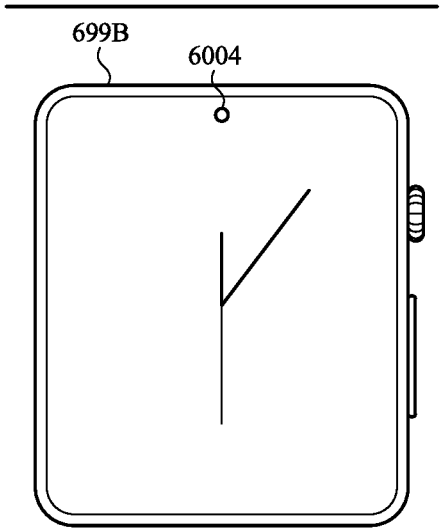
FIG. 6KE                FIG. 6KF

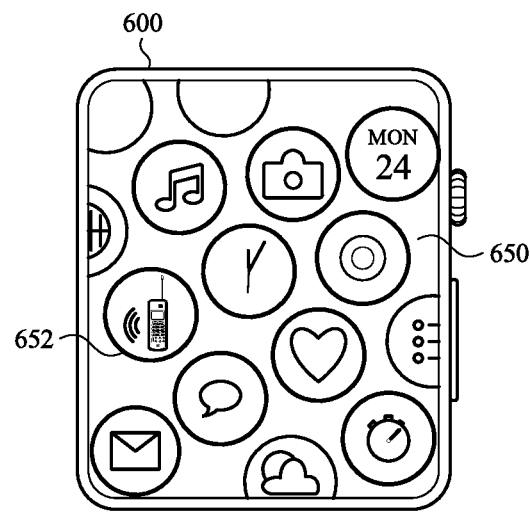
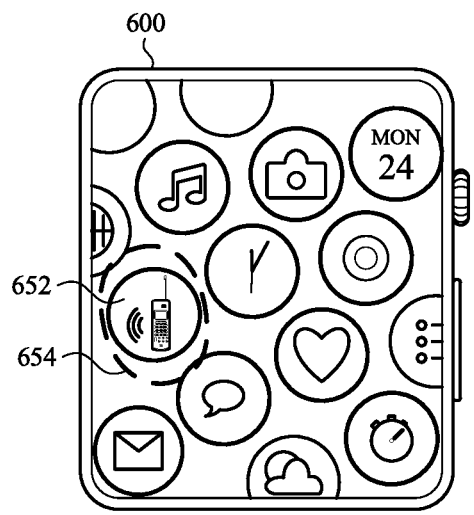
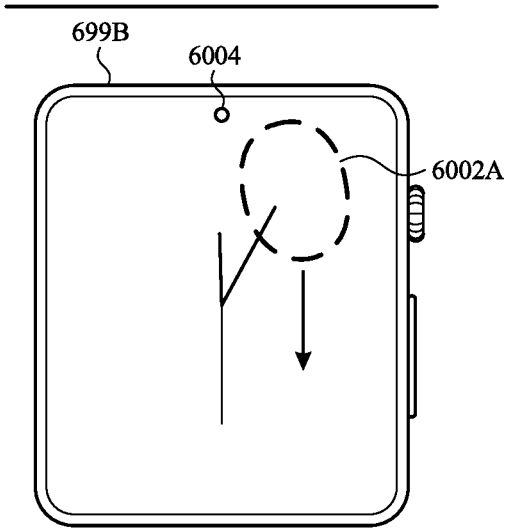
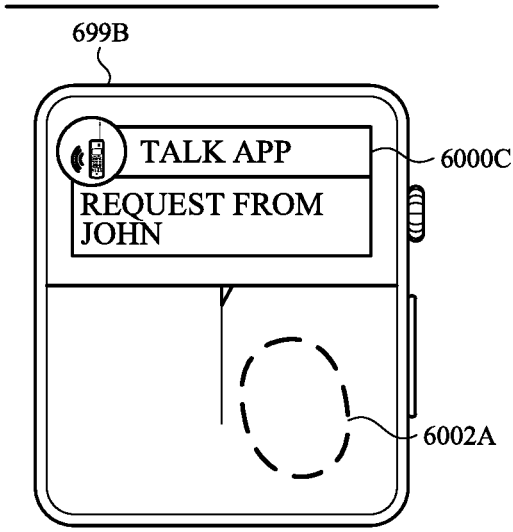
*FIG. 6KG*  *FIG. 6KH*

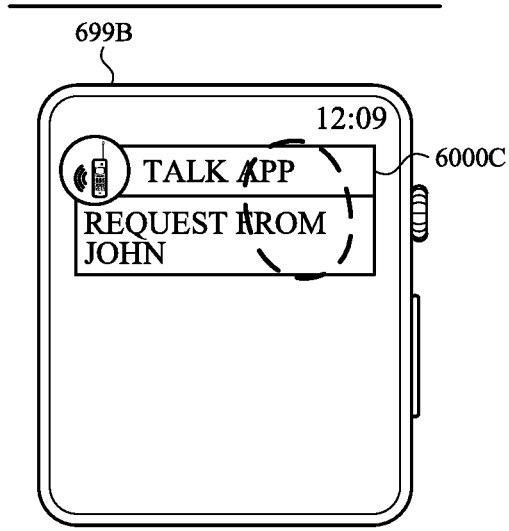
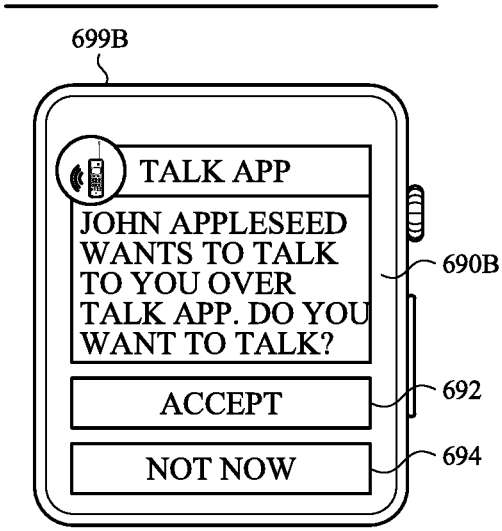
FIG. 6KI  FIG. 6KJ

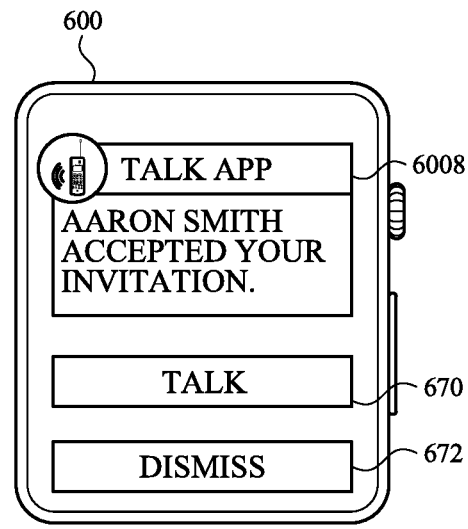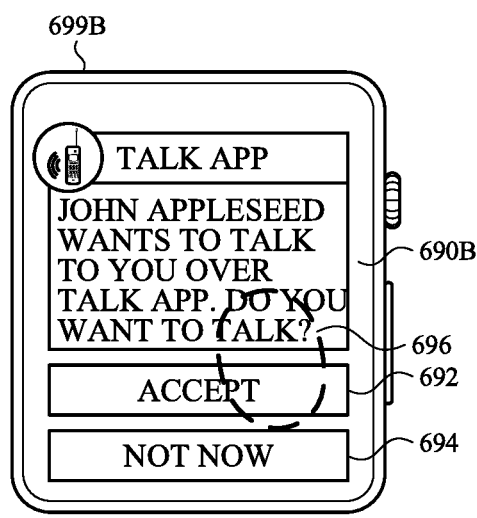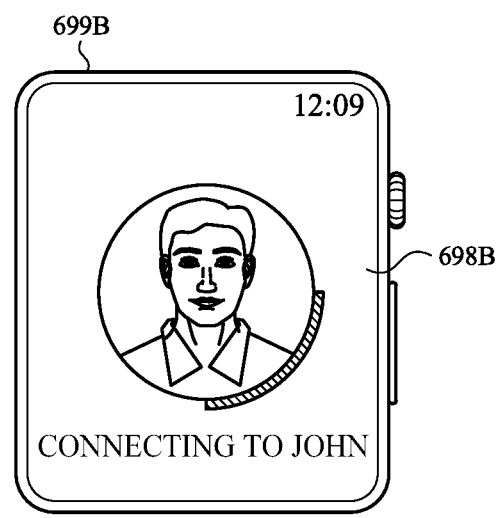
*FIG. 6KK*  *FIG. 6KL*

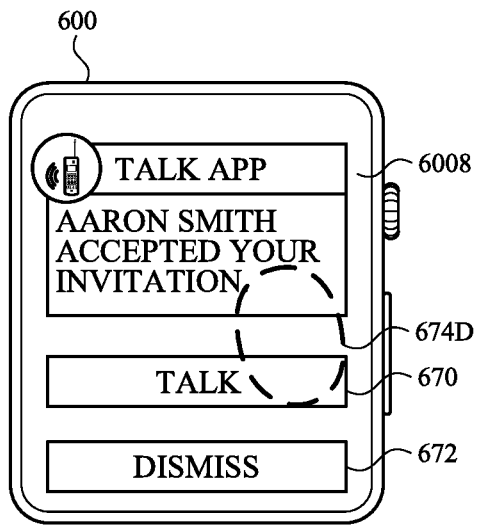
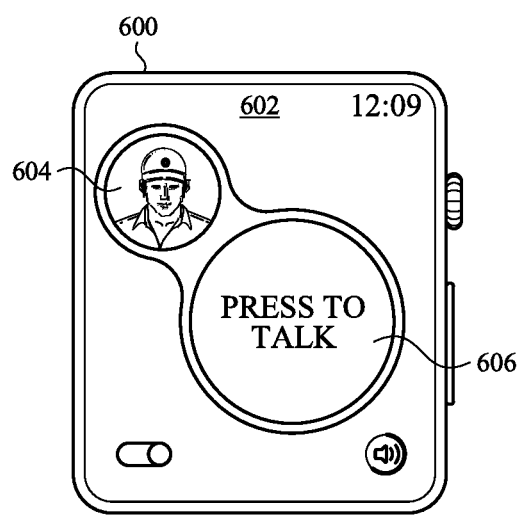
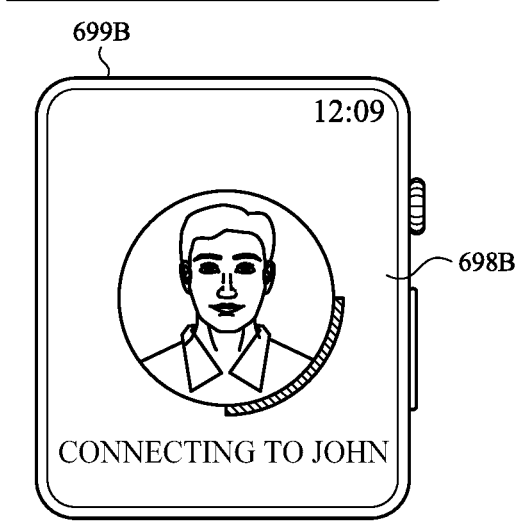
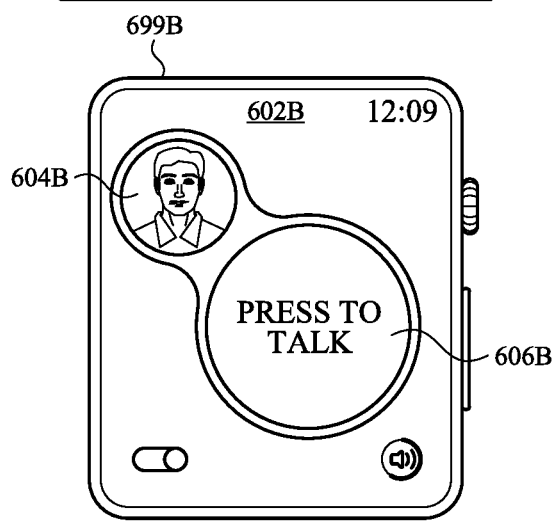
*FIG. 6KM*  *FIG. 6KN*

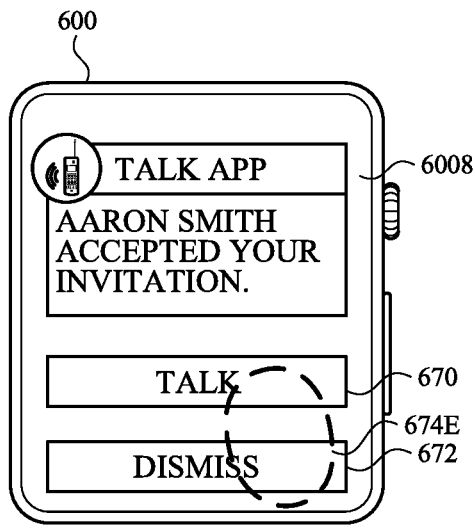
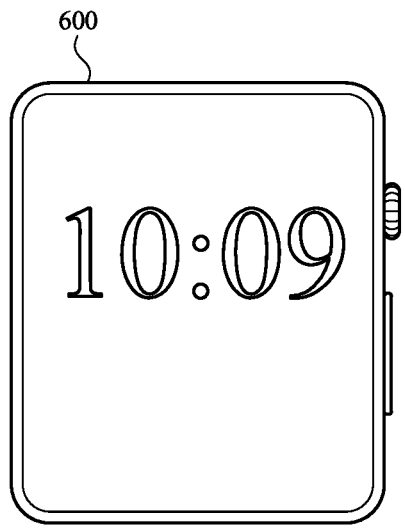
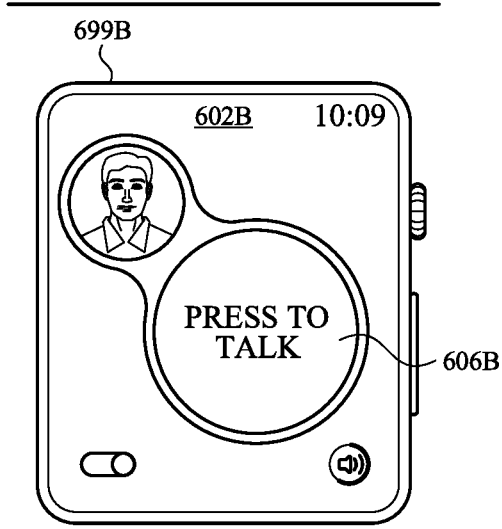
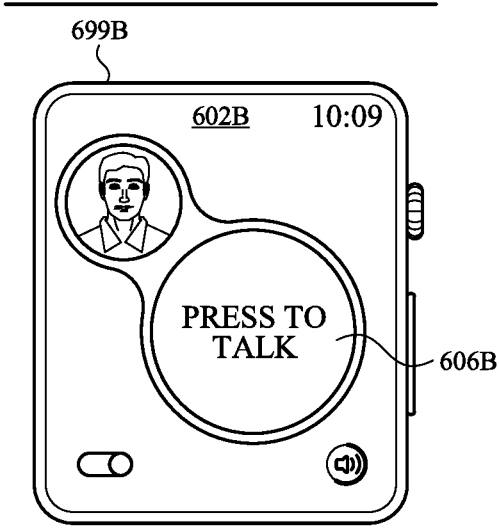
FIG. 6LA                FIG. 6LB

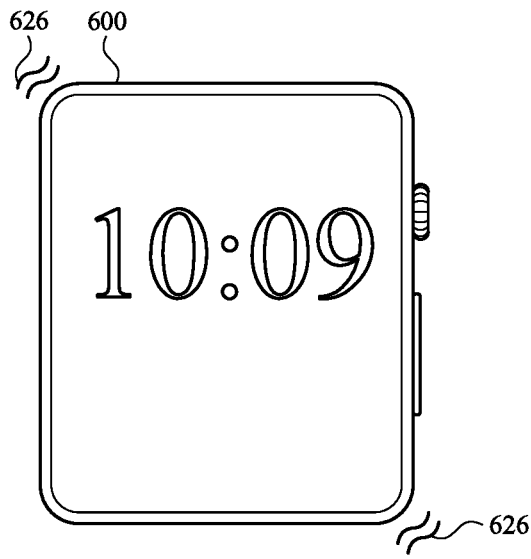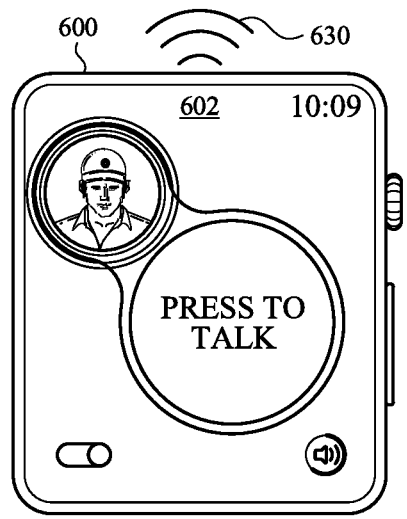
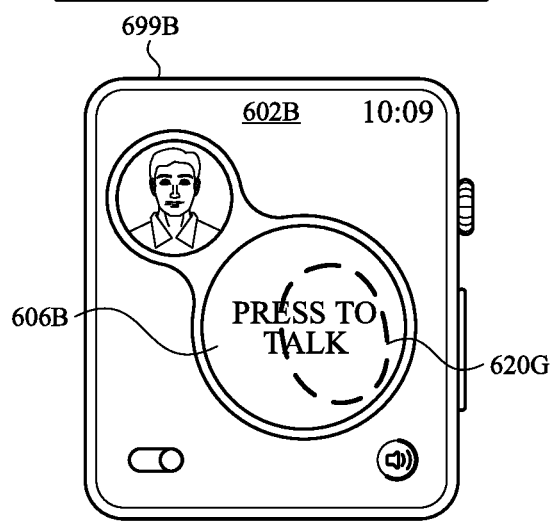
FIG. 6LC
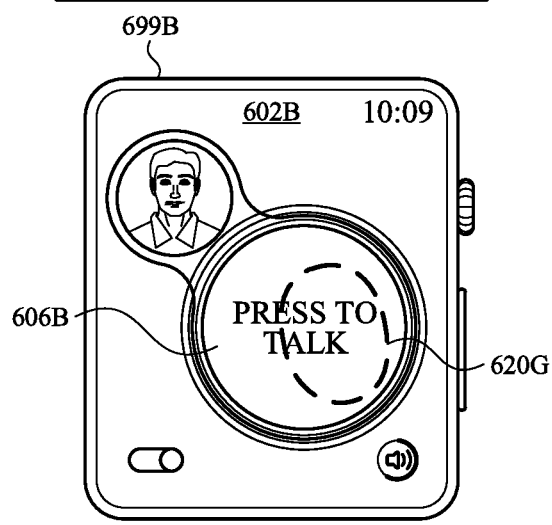
FIG. 6LD

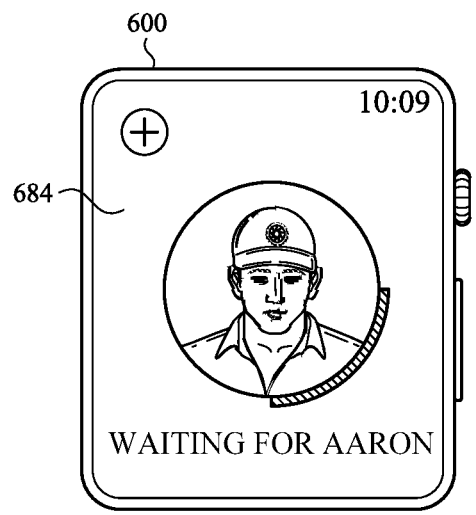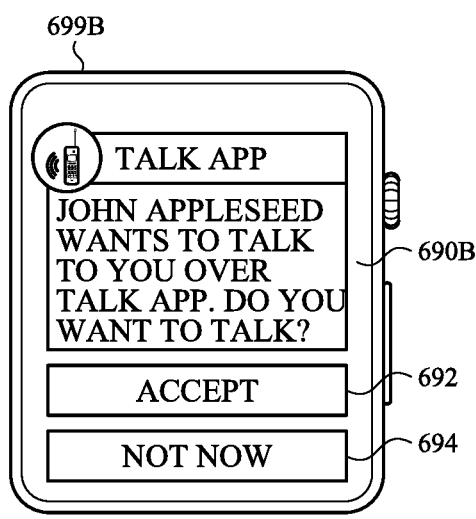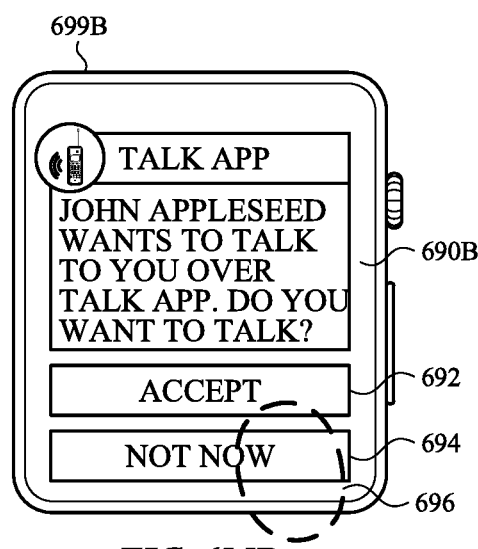
*FIG. 6MA*  *FIG. 6MB*

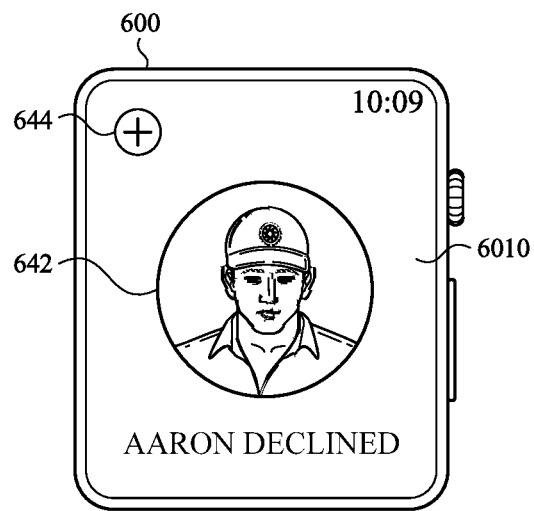
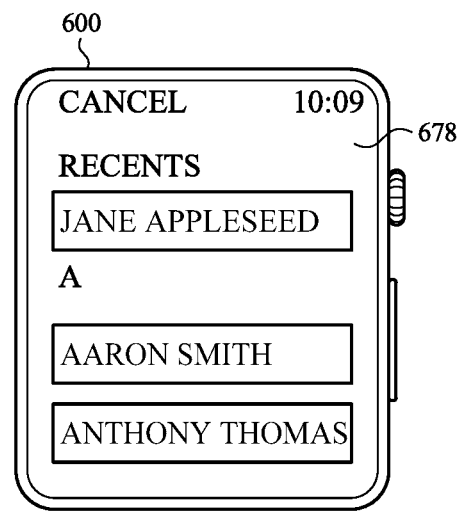
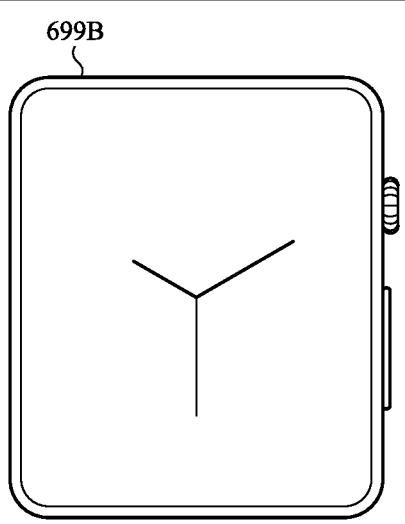
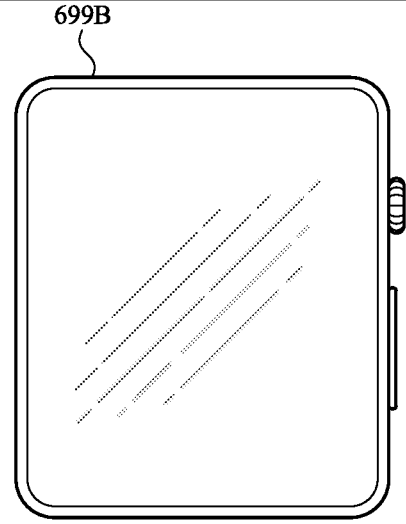
FIG. 6MC                FIG. 6NA

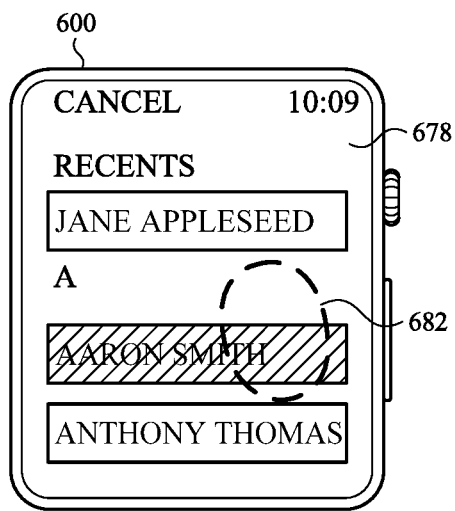
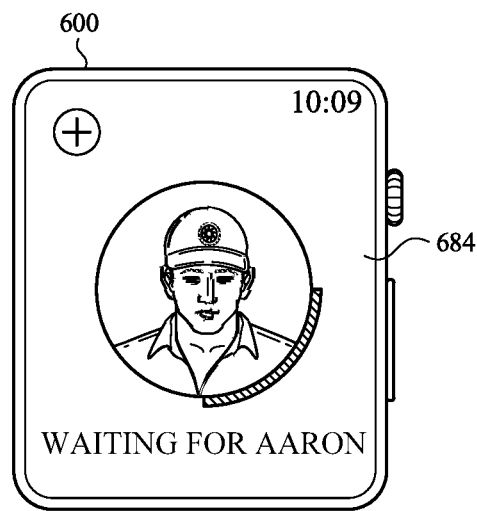
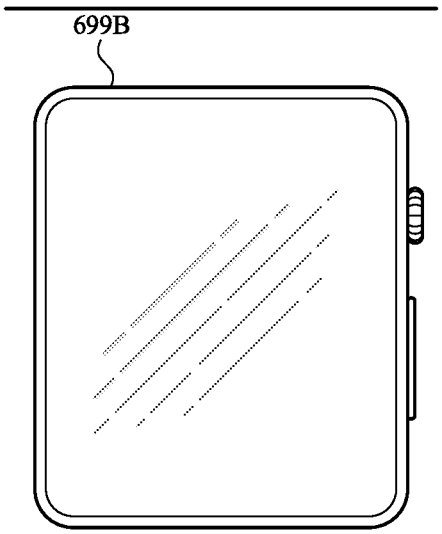
*FIG. 6NB*
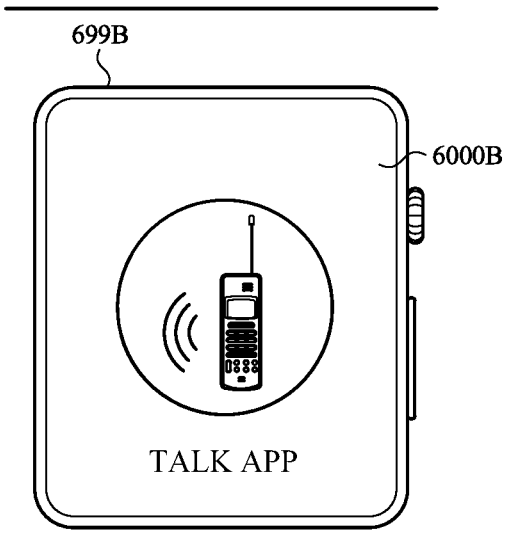
*FIG. 6NC*

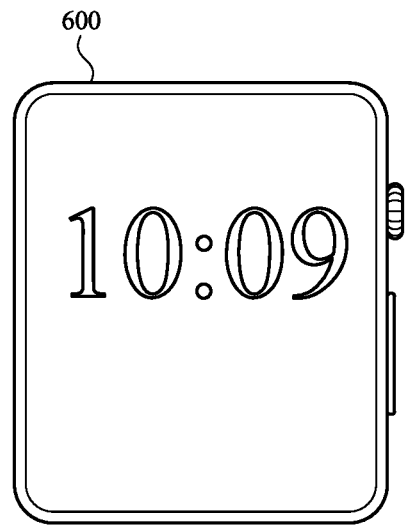
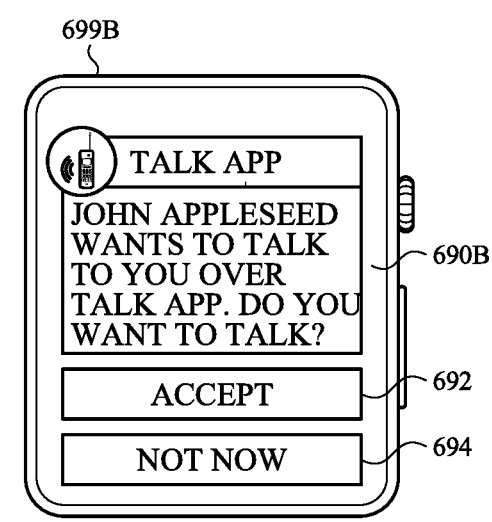
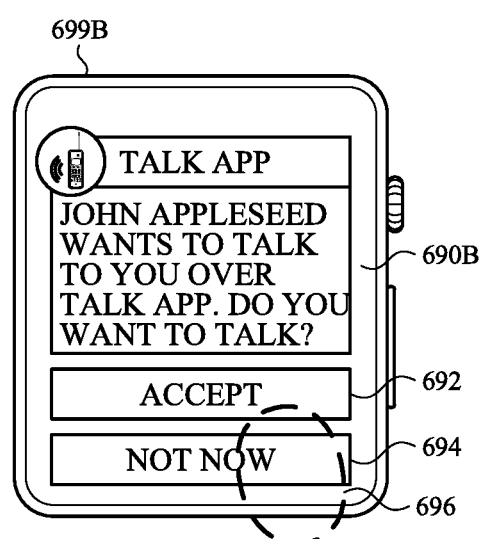
*FIG. 6ND*  *FIG. 6NE*

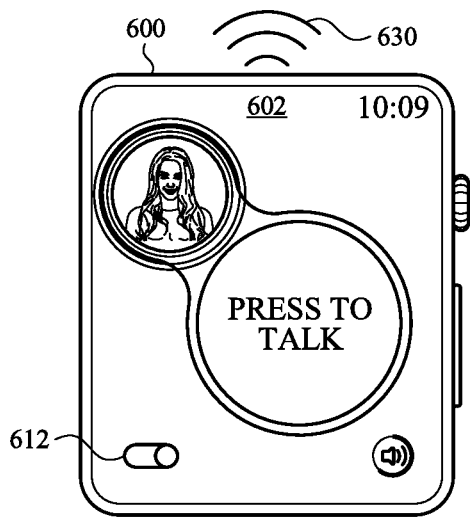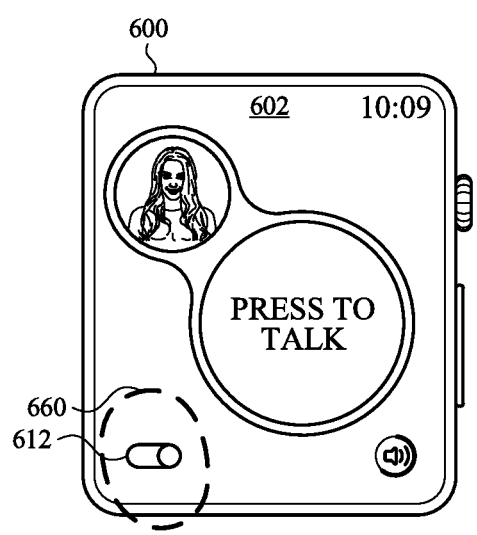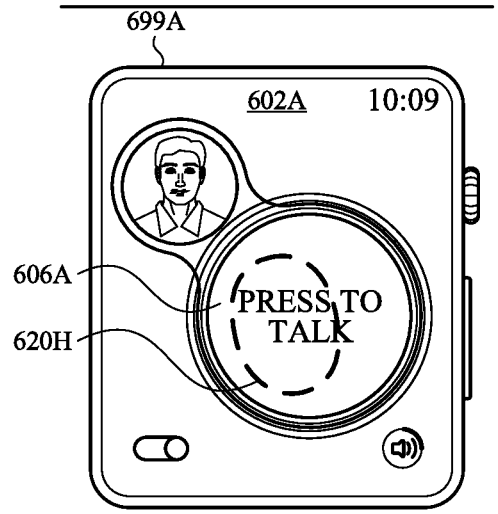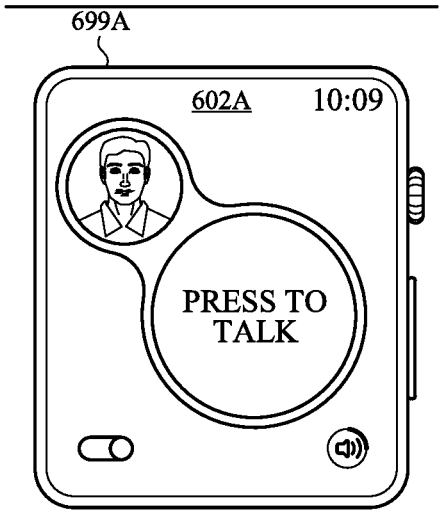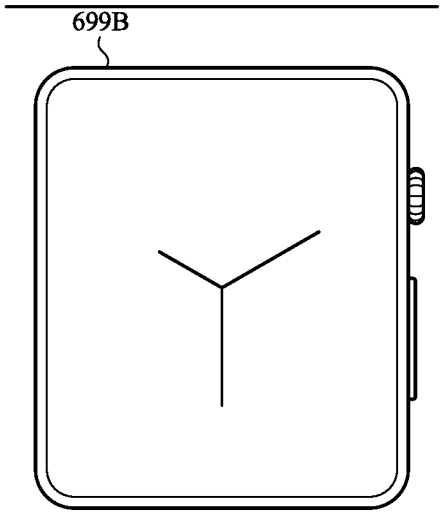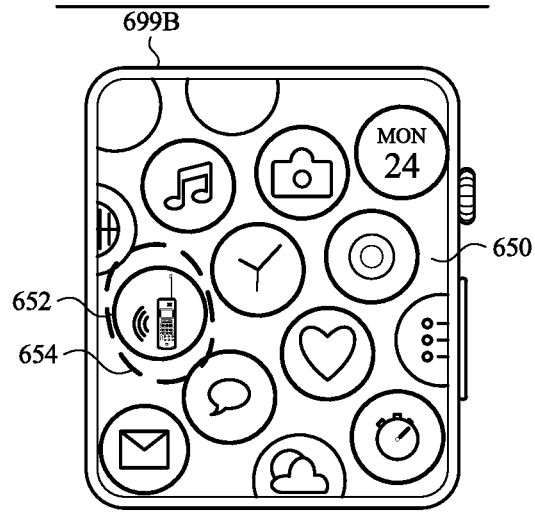
*FIG. 60A*  *FIG. 60B*

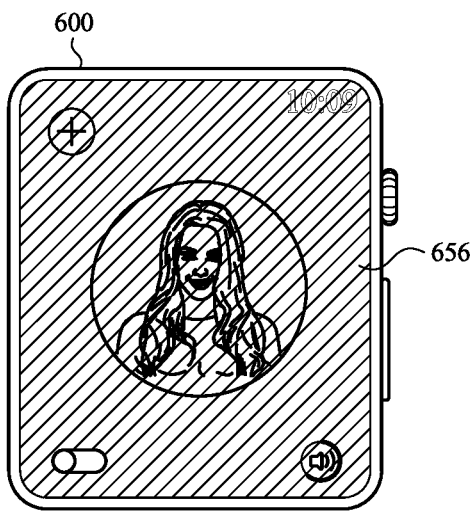
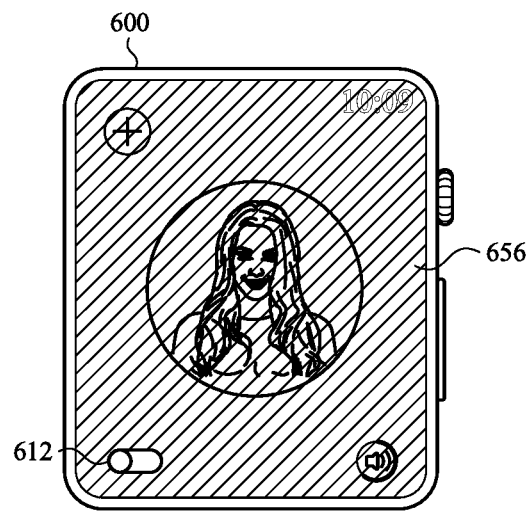
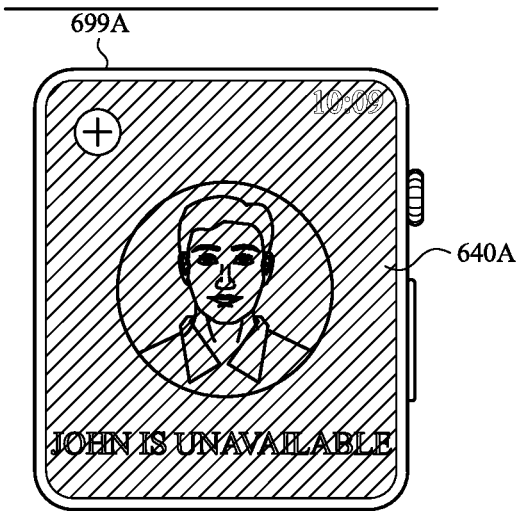
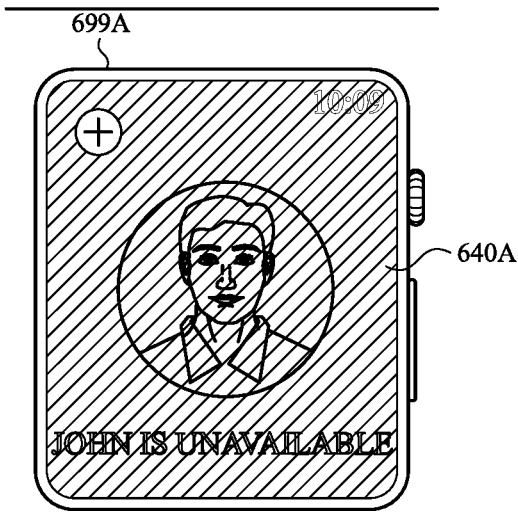
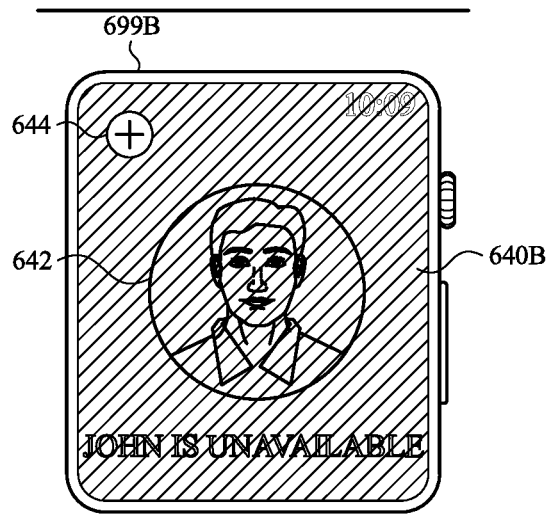
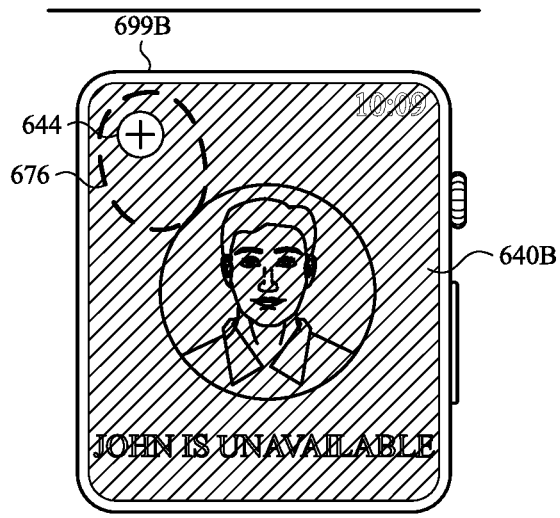
*FIG. 6OC*    *FIG. 6OD*

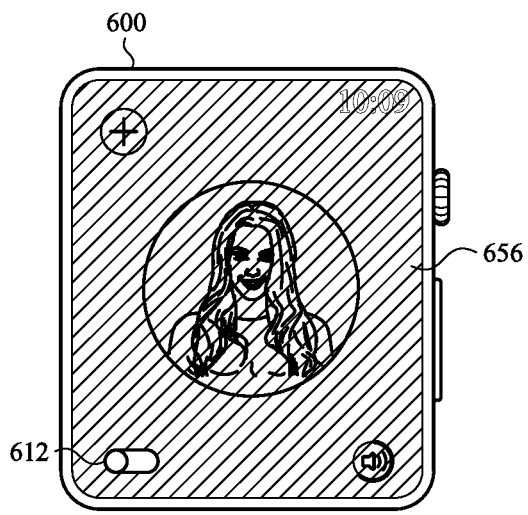
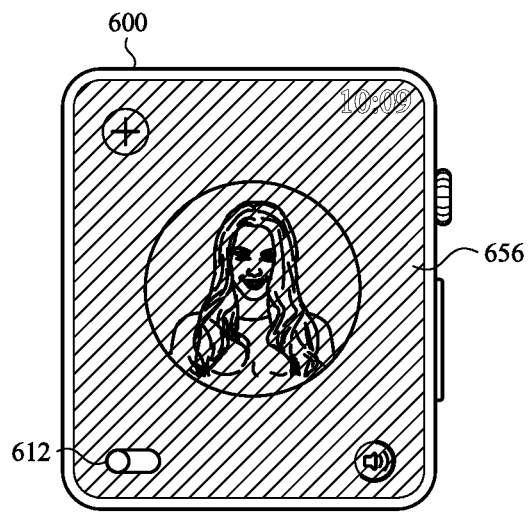
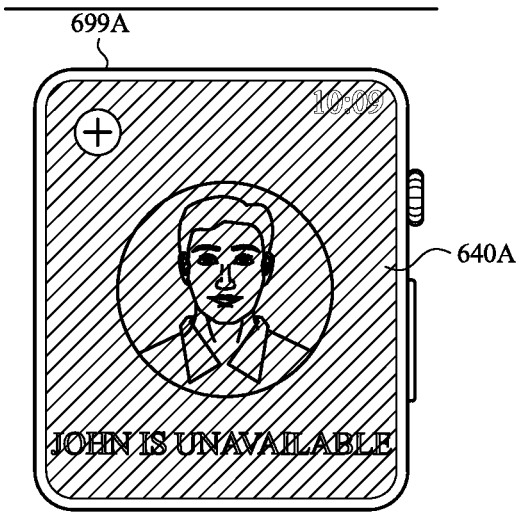
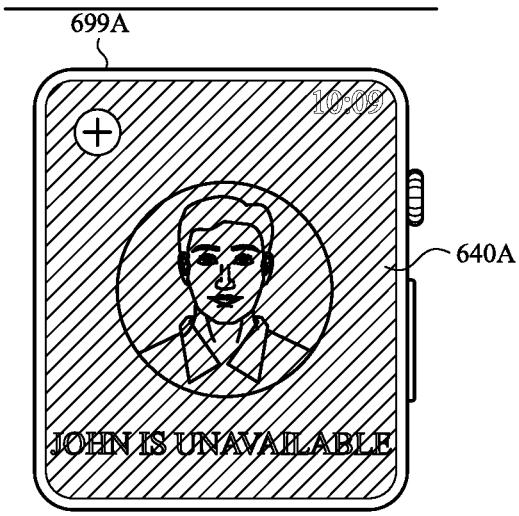
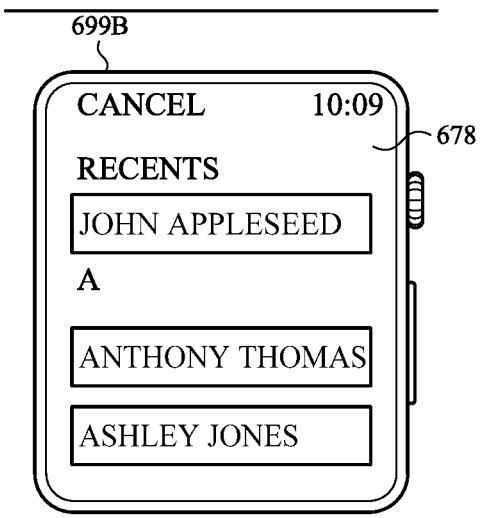
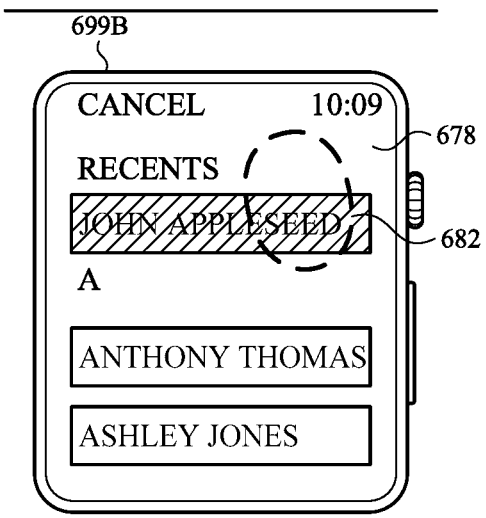
*FIG. 6OE*  *FIG. 6OF*

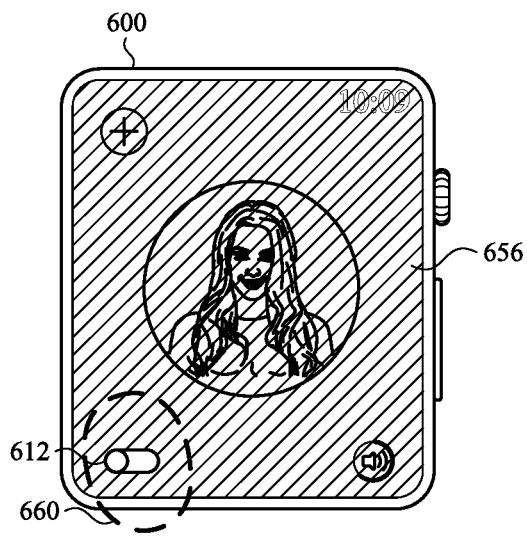
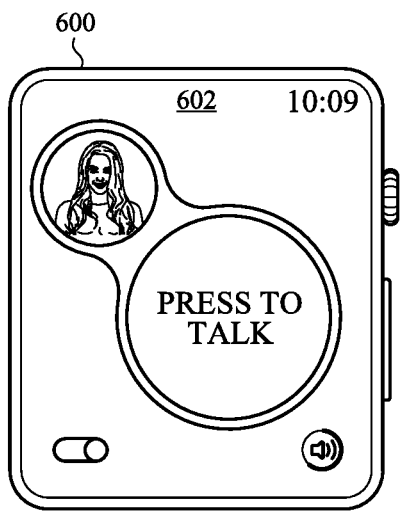
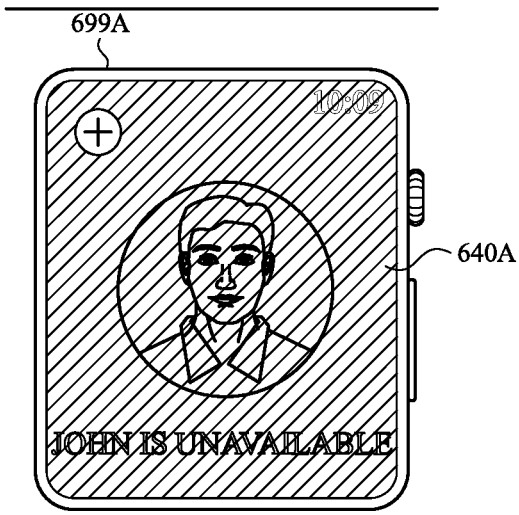
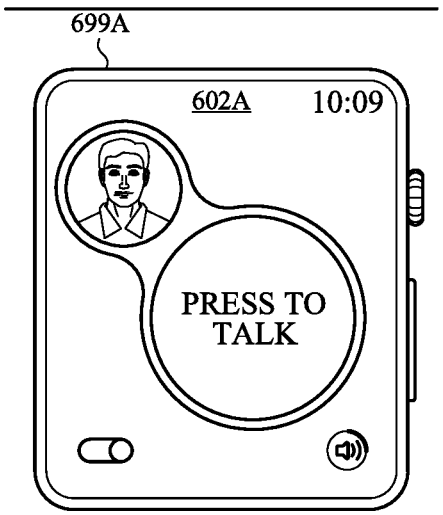
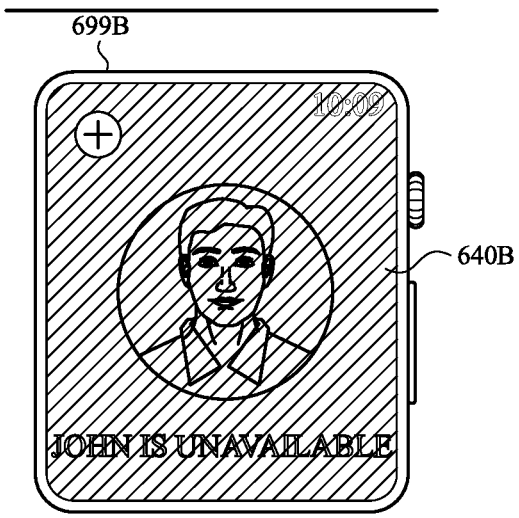
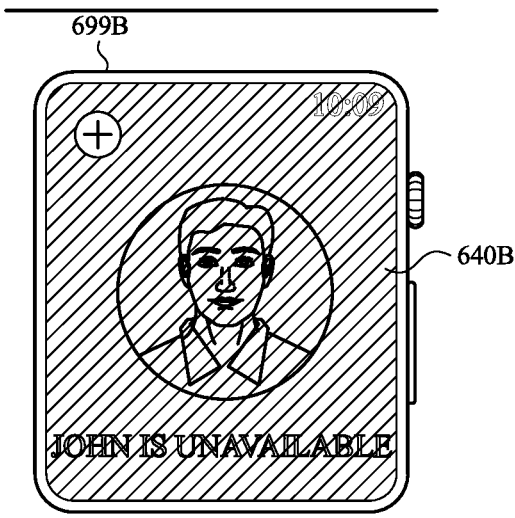
*FIG. 6OG*        *FIG. 6OH*

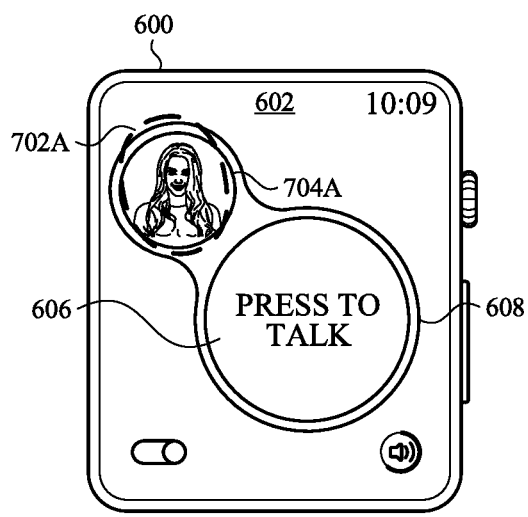 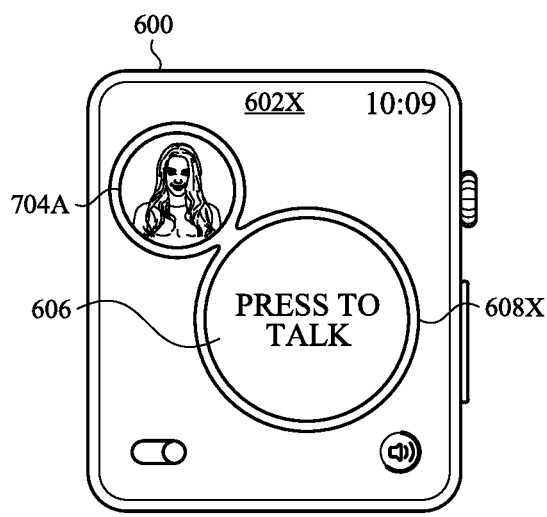
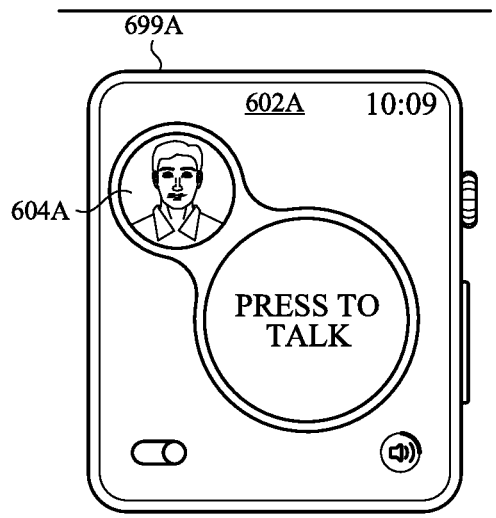 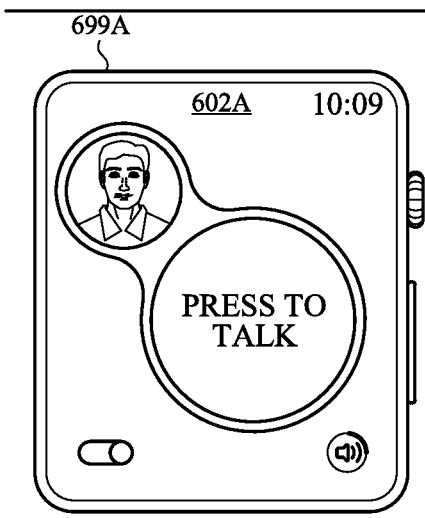
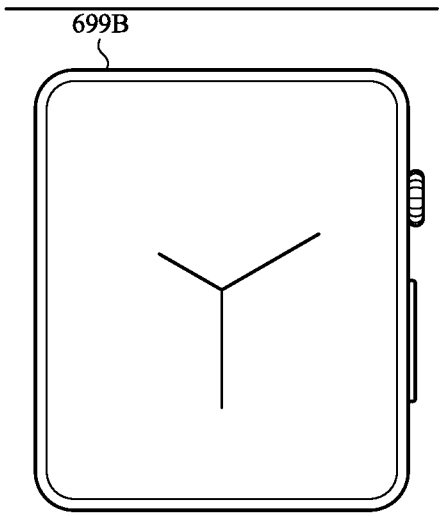 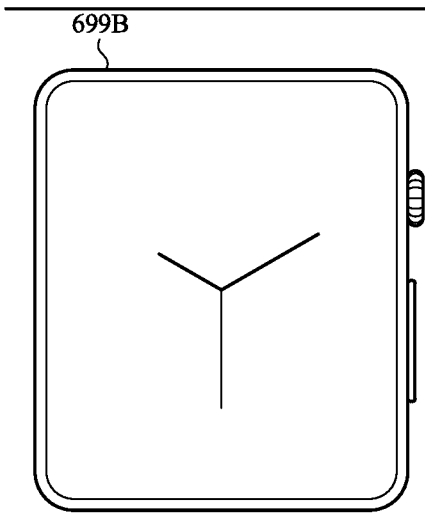
*FIG. 7AA*        *FIG. 7AB*

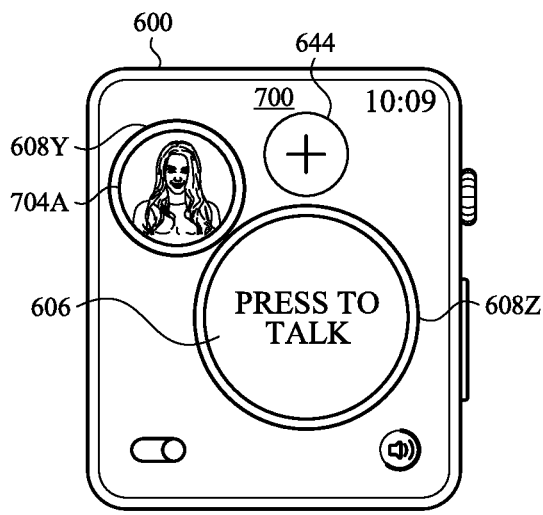
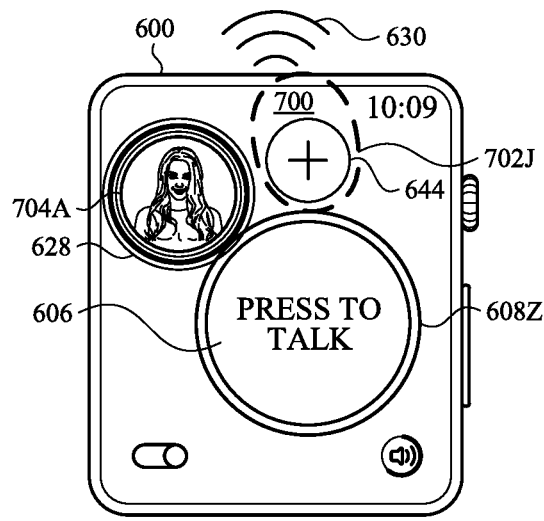
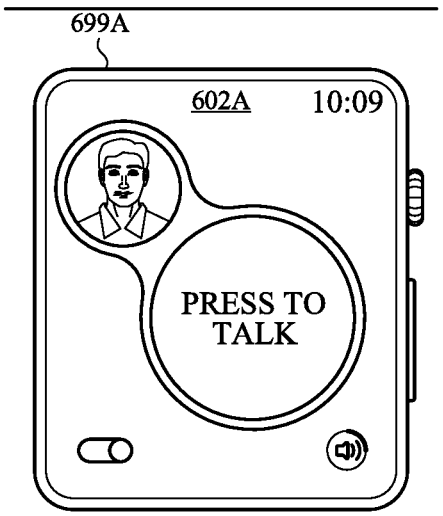
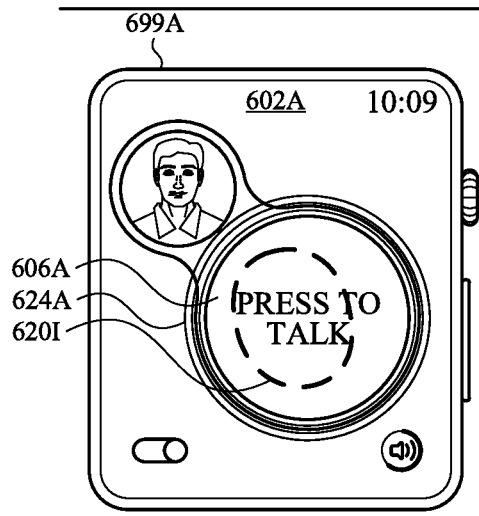
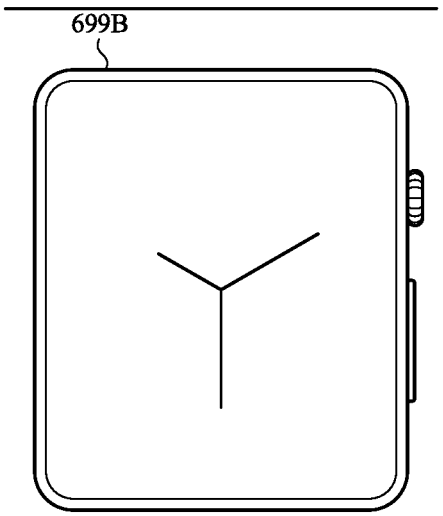
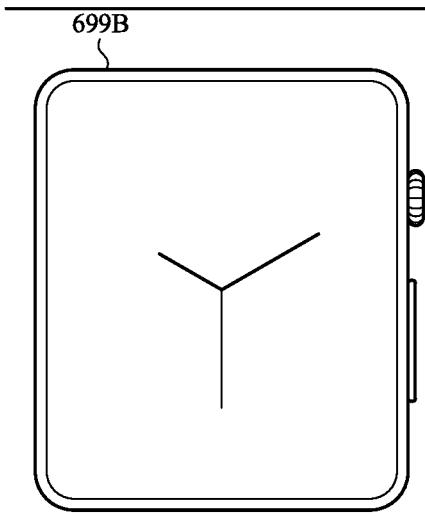
*FIG. 7AC*  *FIG. 7AD*

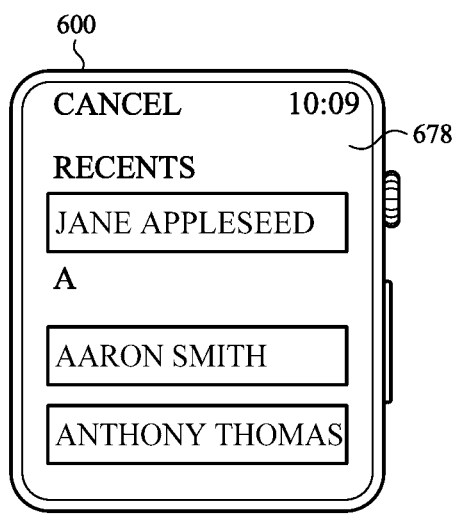
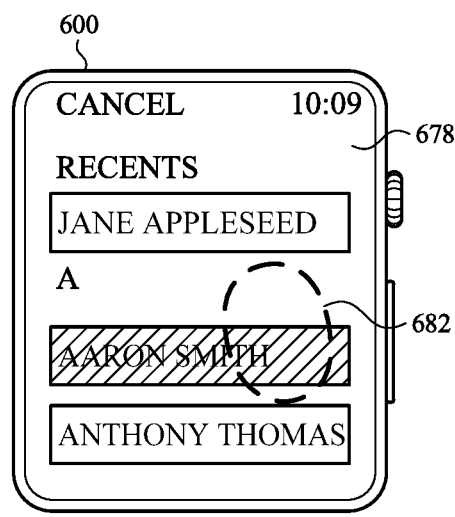
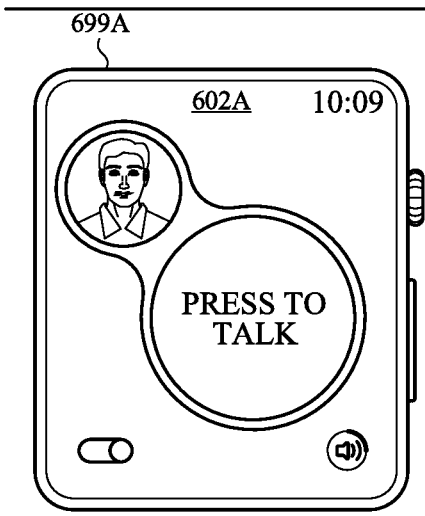
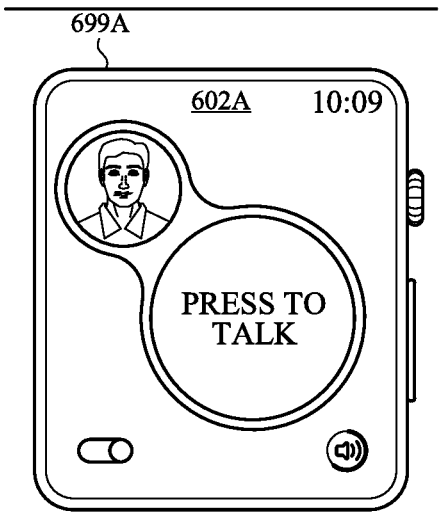
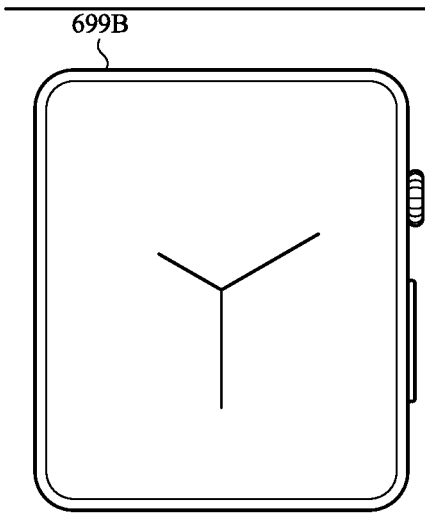
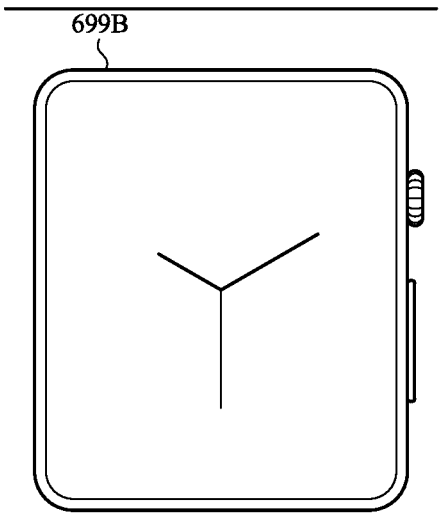
*FIG. 7AE*  *FIG. 7AF*

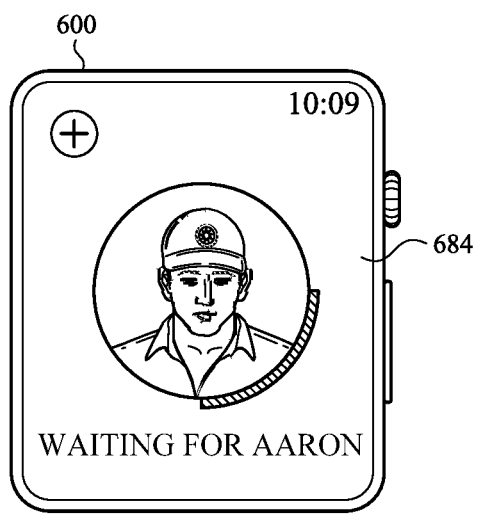
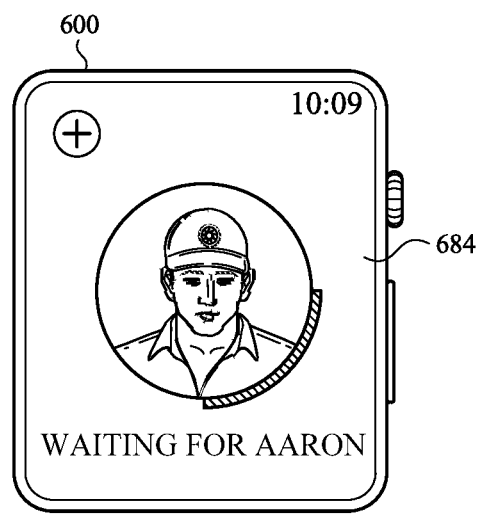
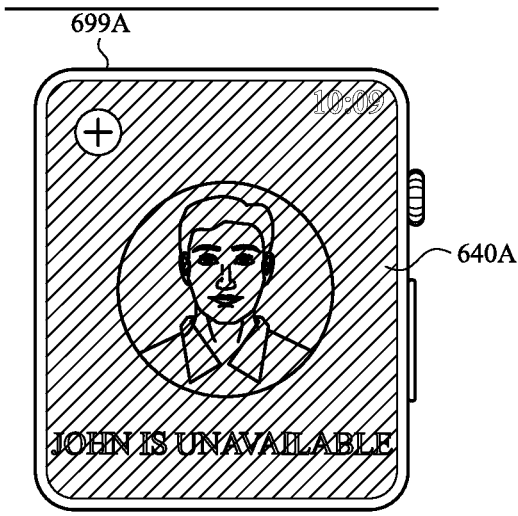
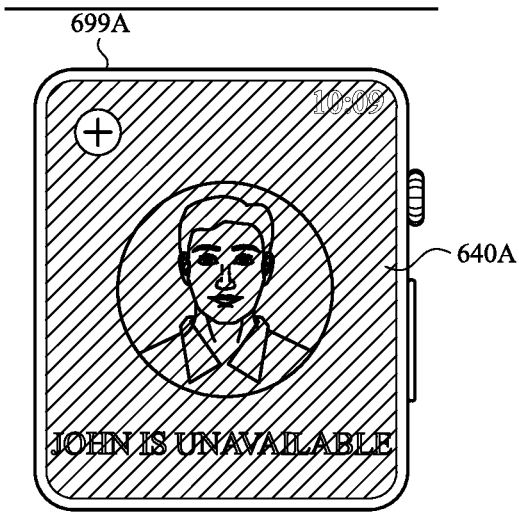
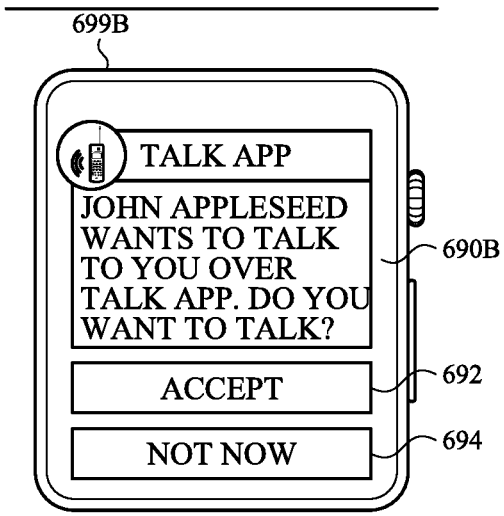
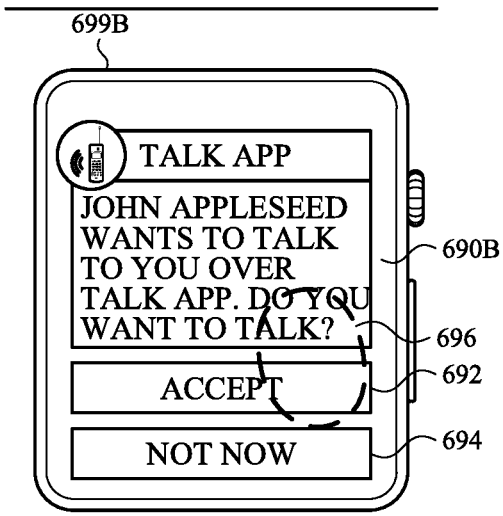
*FIG. 7AG*    *FIG. 7AH*

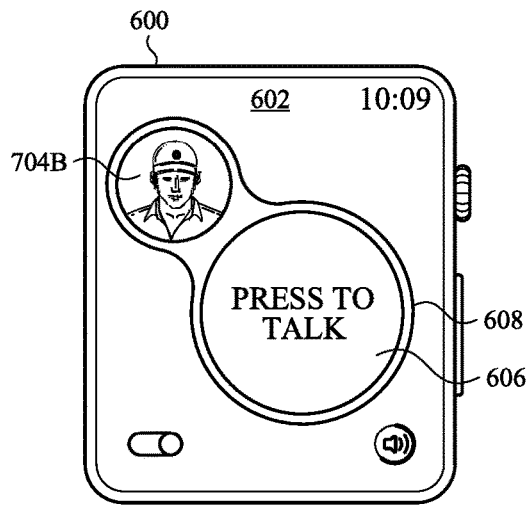
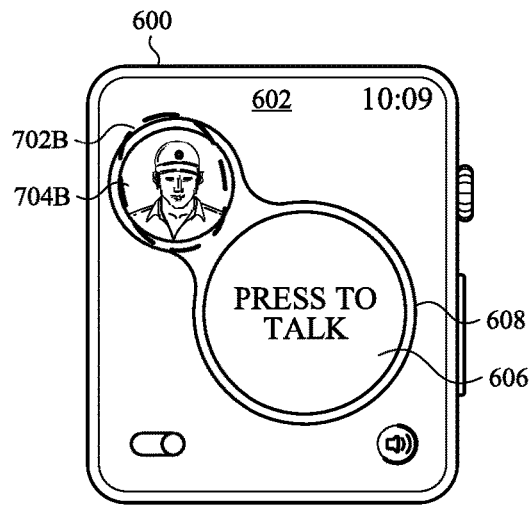
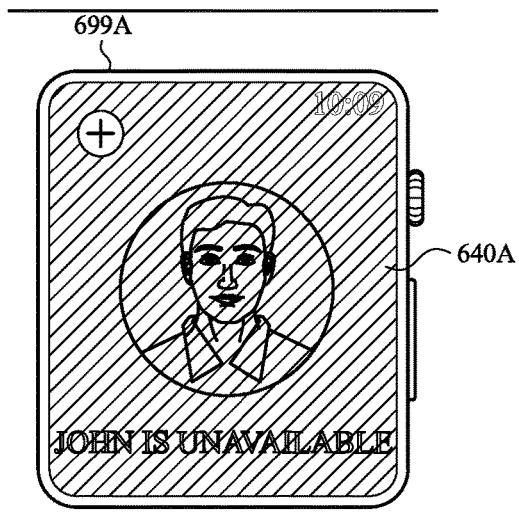
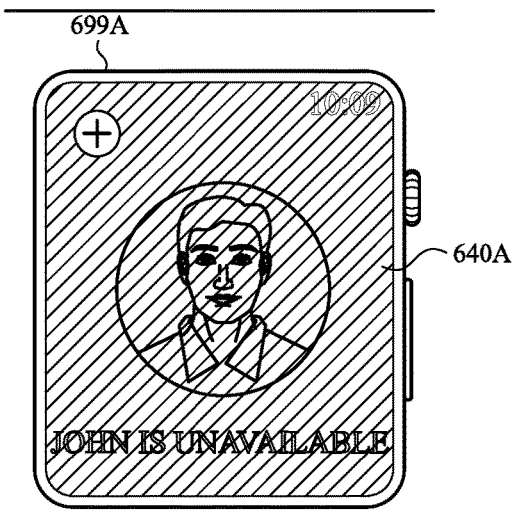
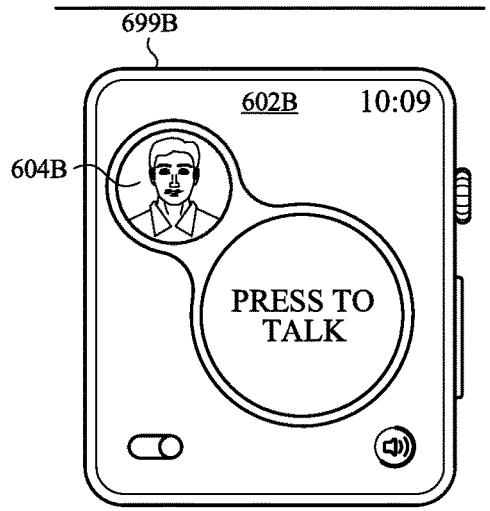
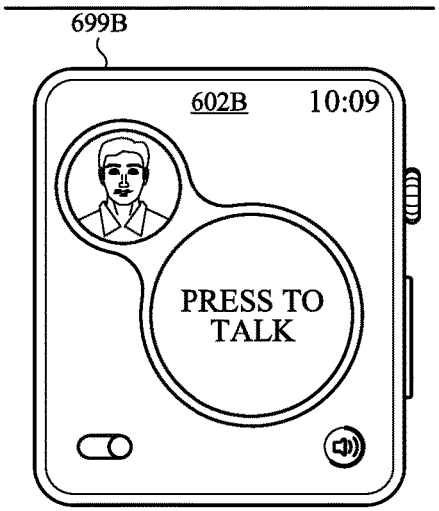
*FIG. 7AI*    *FIG. 7BA*

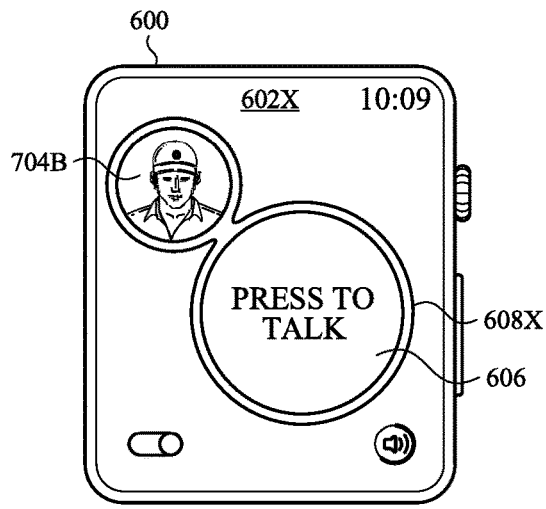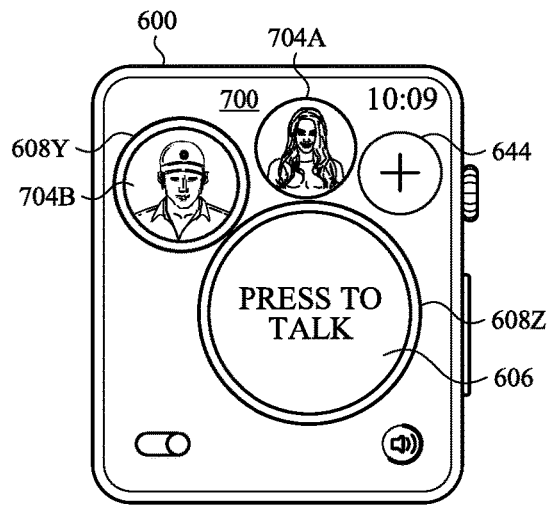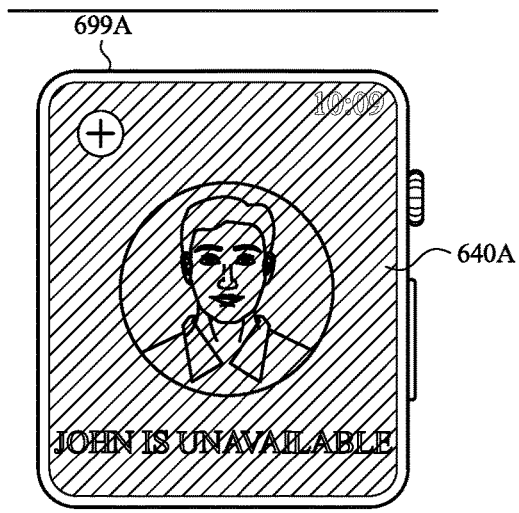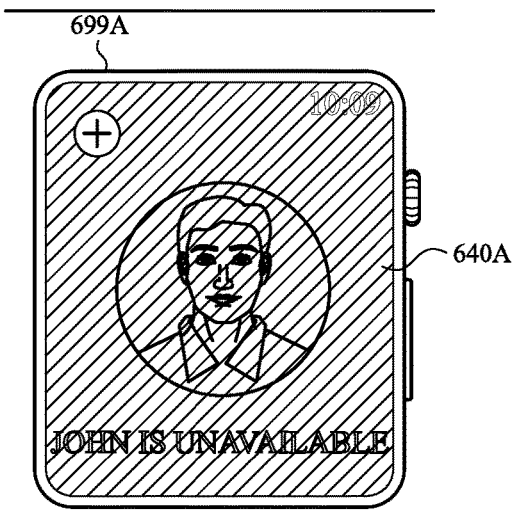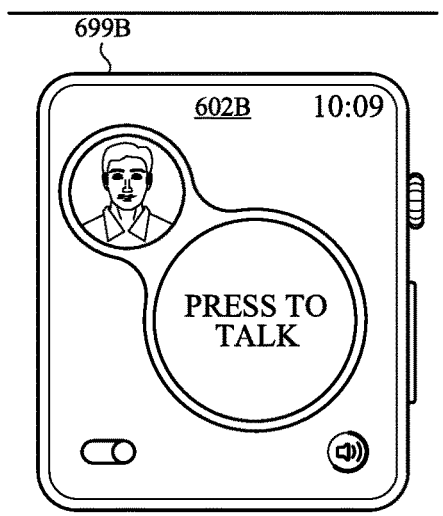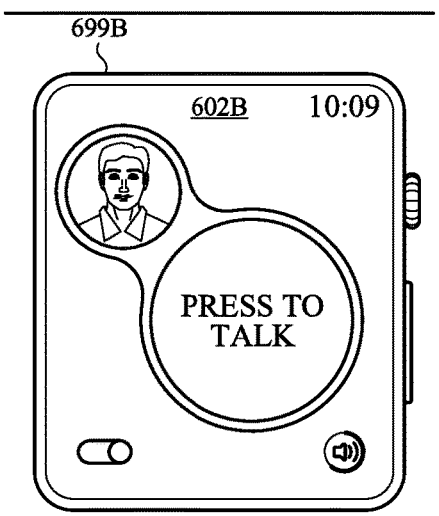
*FIG. 7BB*  *FIG. 7BC*

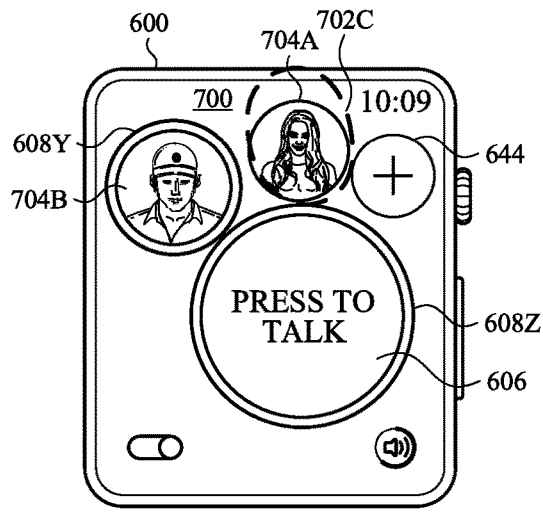
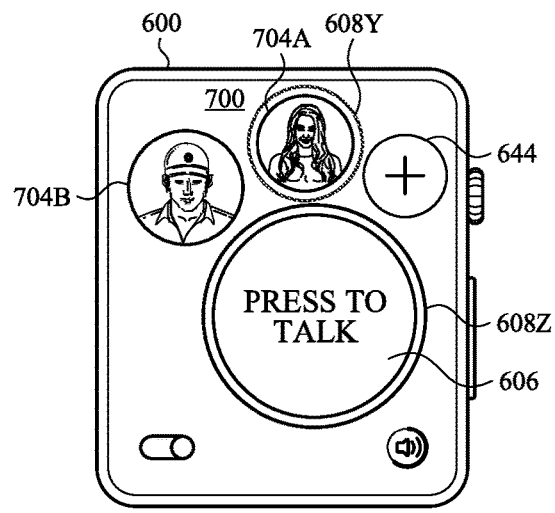
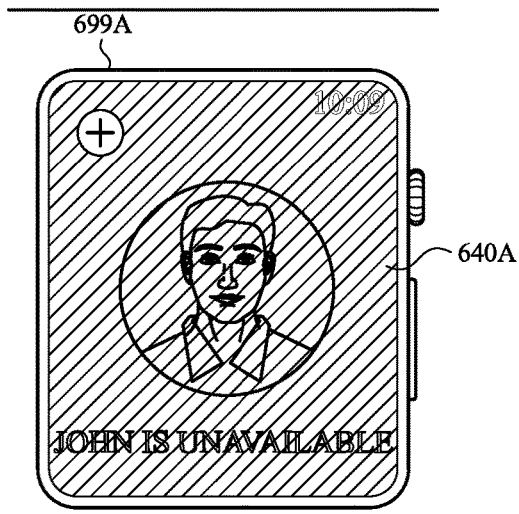
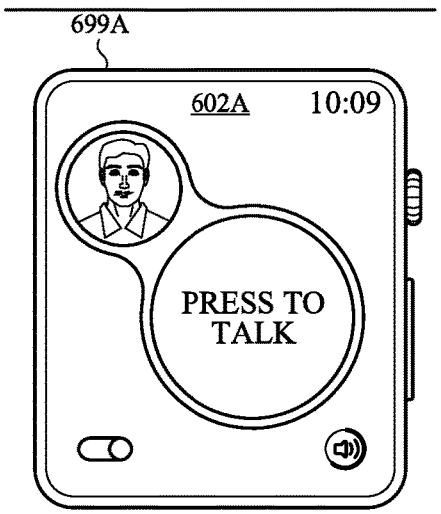
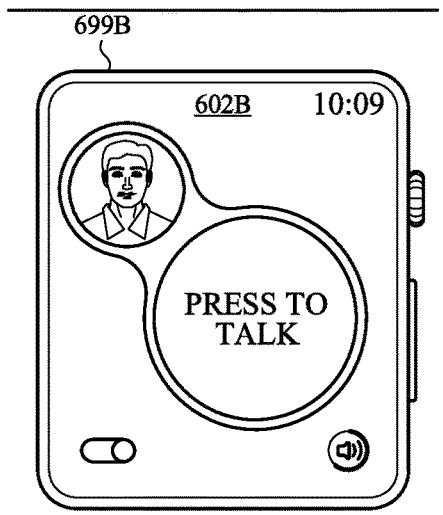
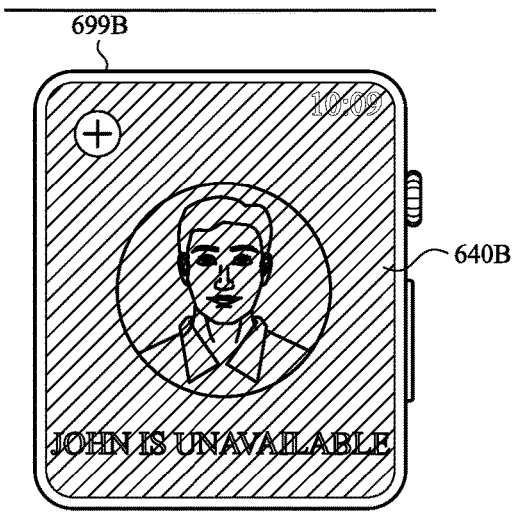
*FIG. 7BD*  *FIG. 7BE*

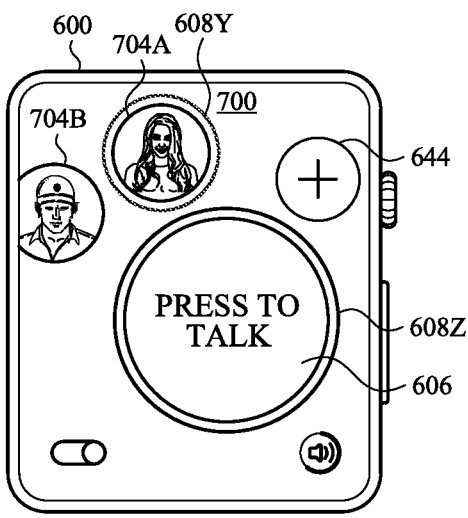
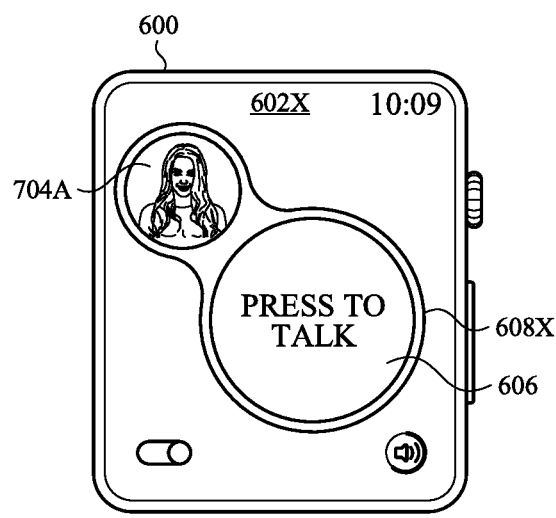
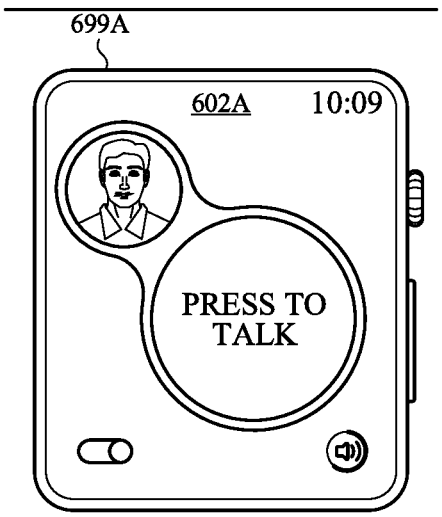
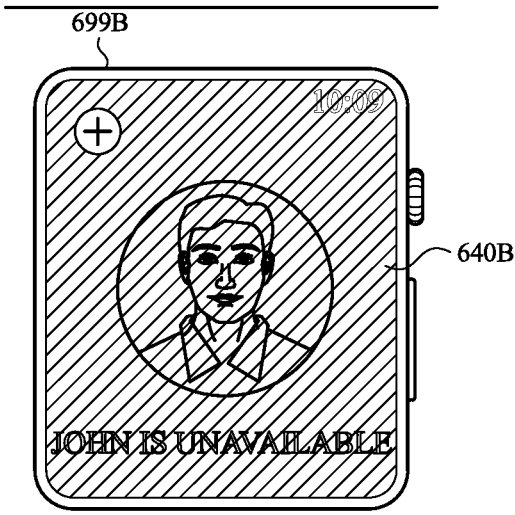
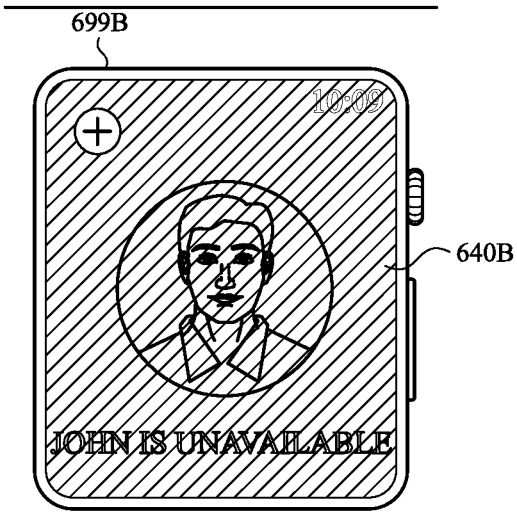
*FIG. 7BF*  *FIG. 7BG*

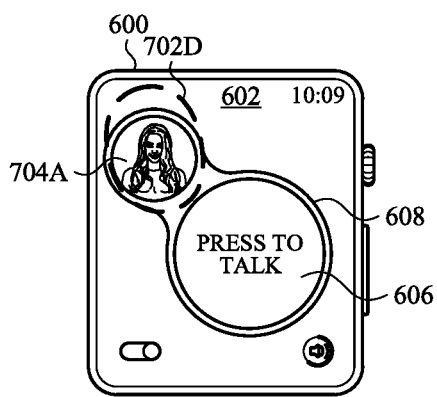
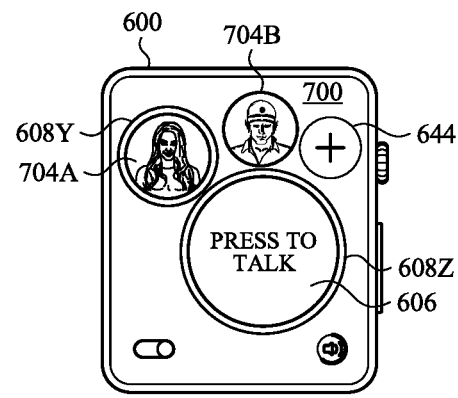
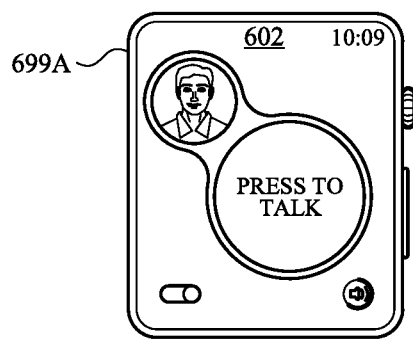
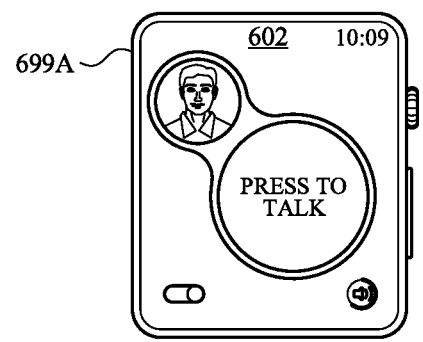
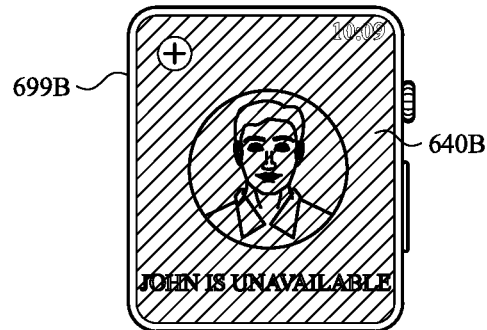
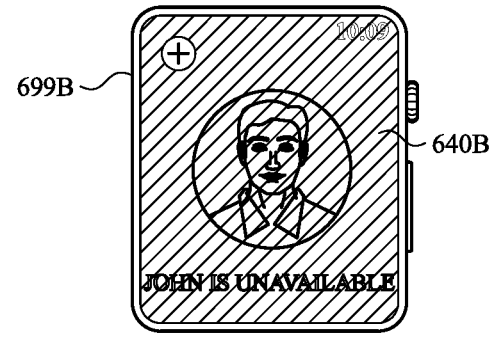
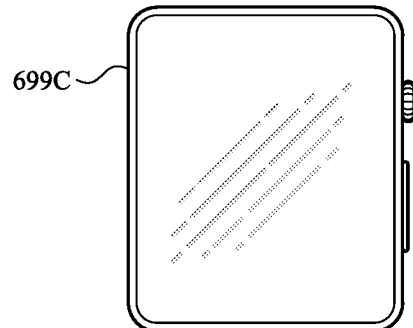
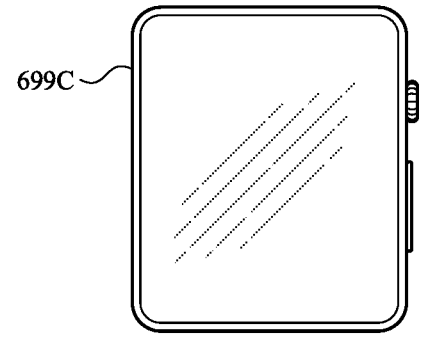
*FIG. 7CA*  *FIG. 7CB*

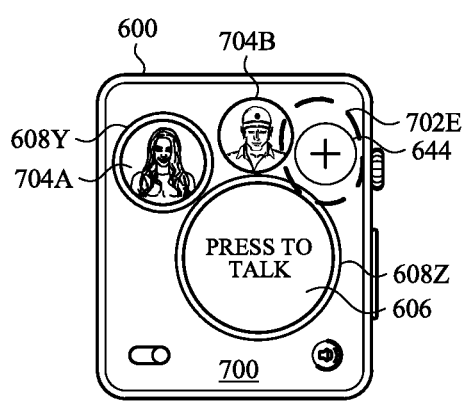
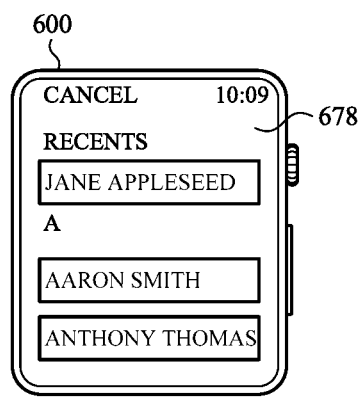
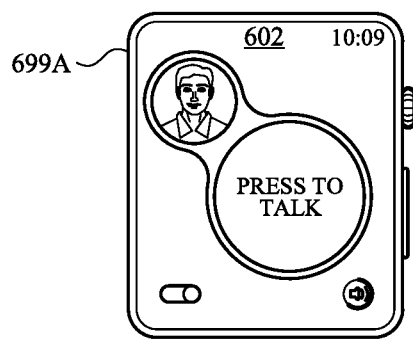
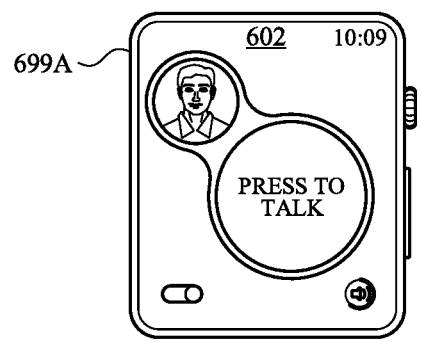
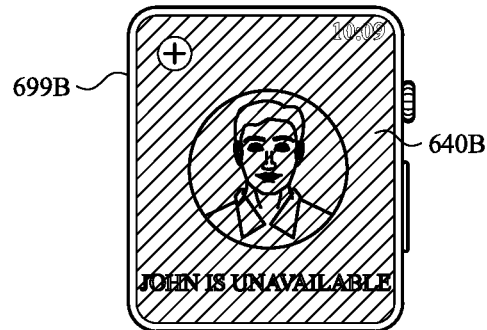
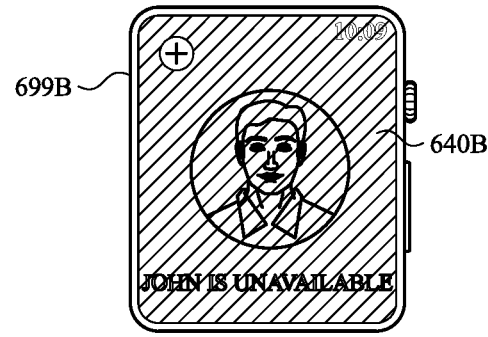
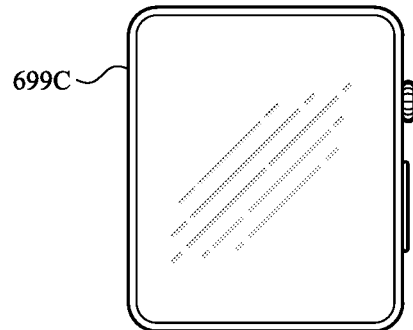
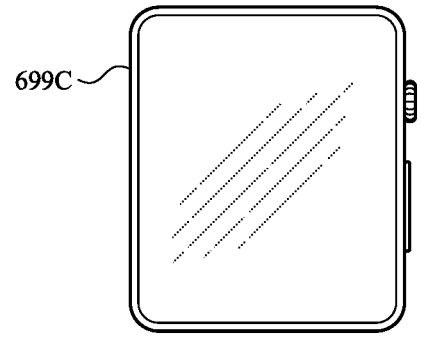
*FIG. 7CC*  *FIG. 7CD*

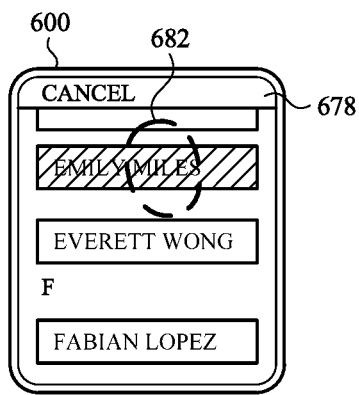
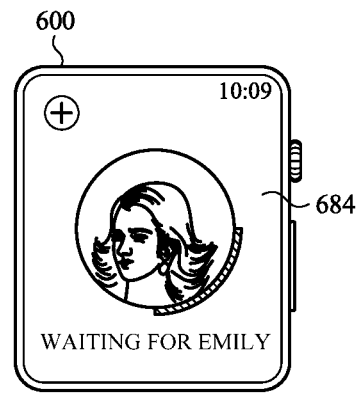
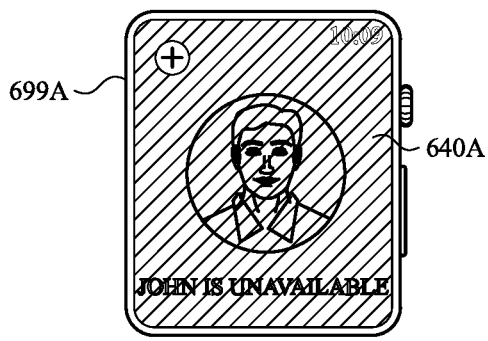
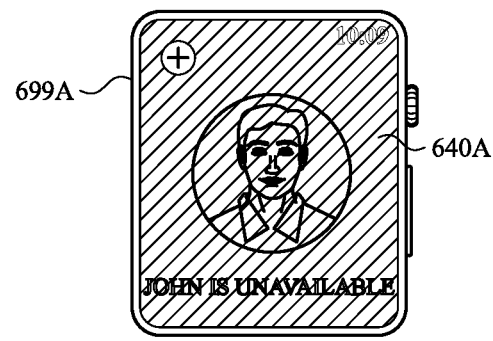
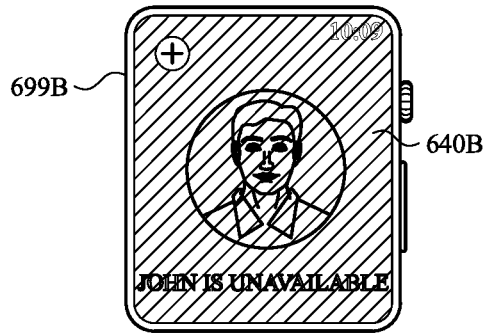
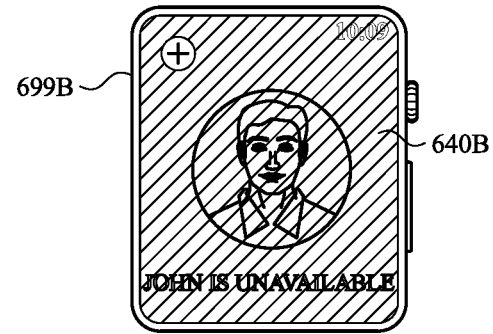
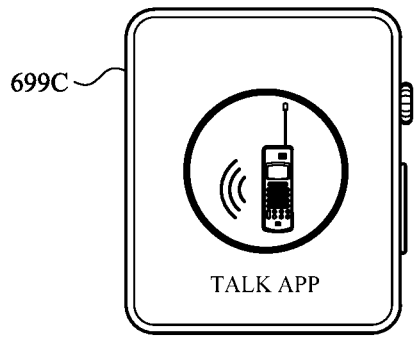
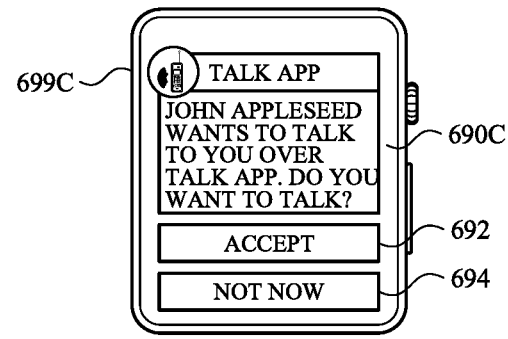
*FIG. 7CE*  *FIG. 7CF*

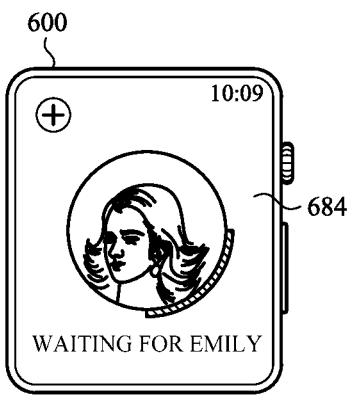
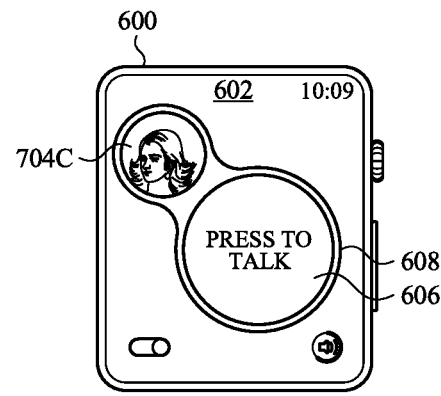
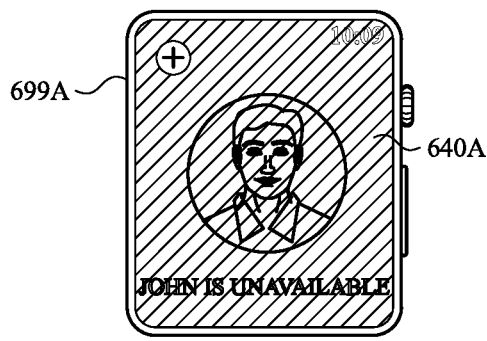
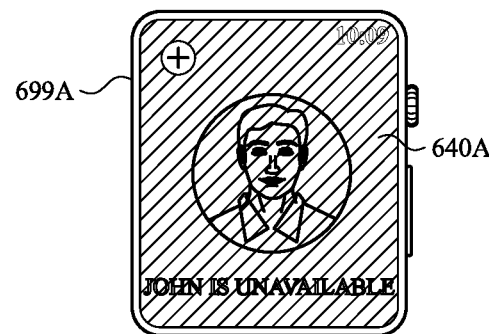
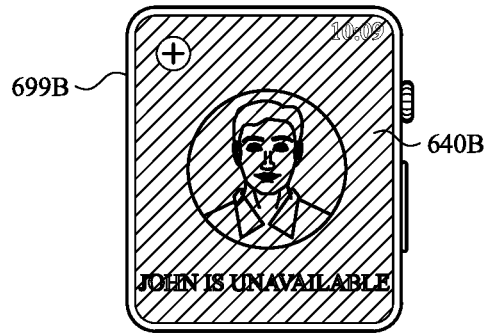
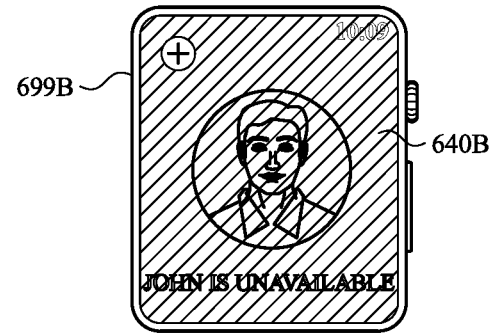
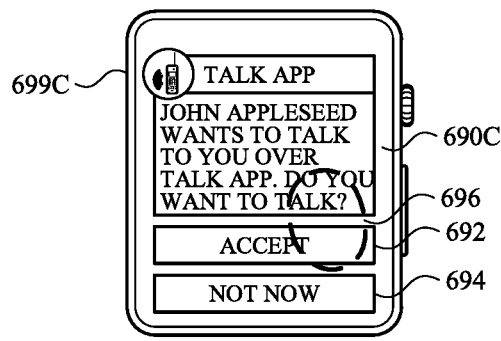
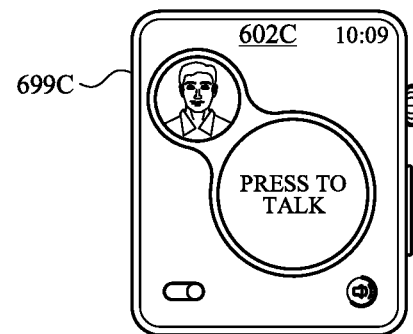
*FIG. 7CG*  *FIG. 7CH*

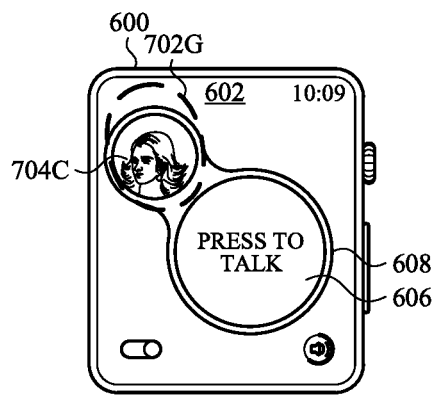
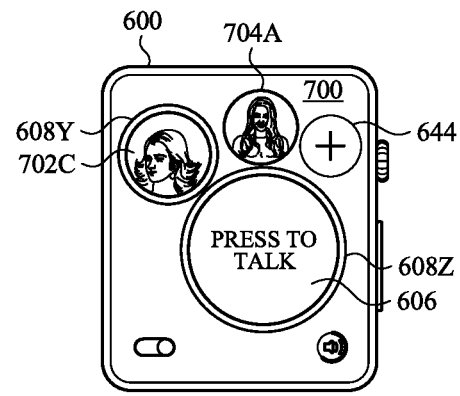
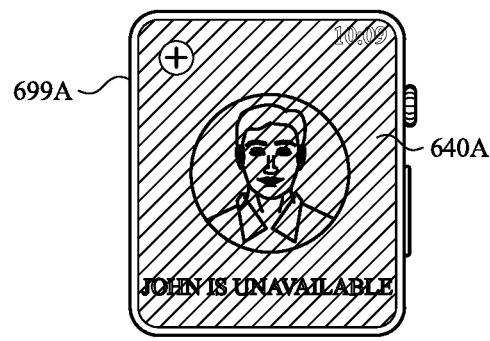
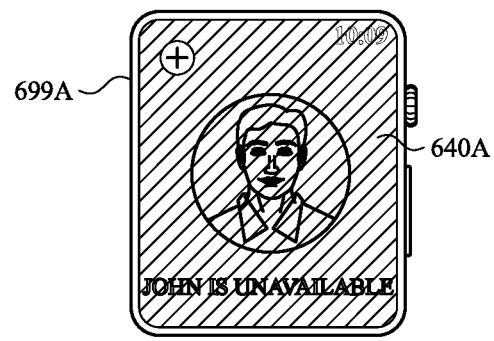
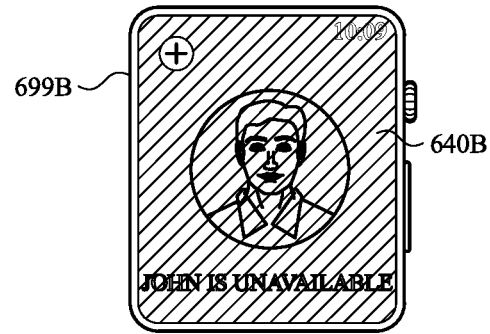
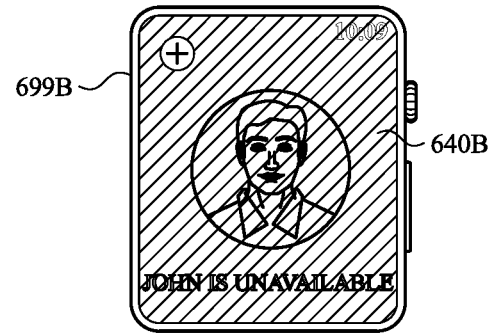
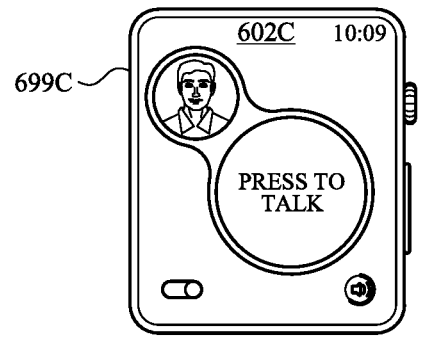
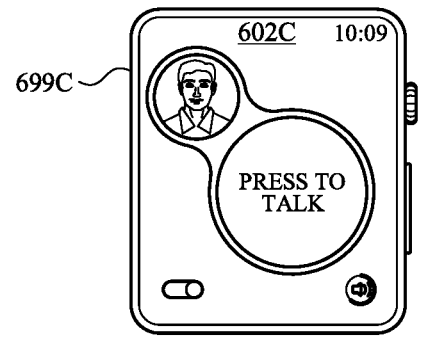
*FIG. 7DA*   *FIG. 7DB*

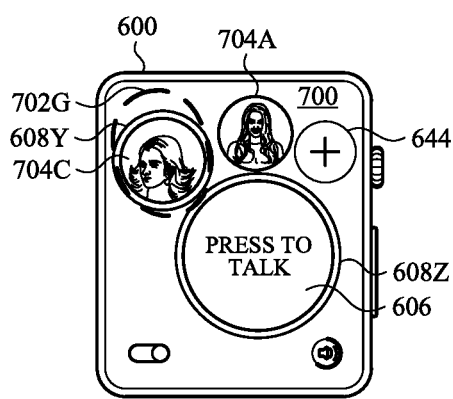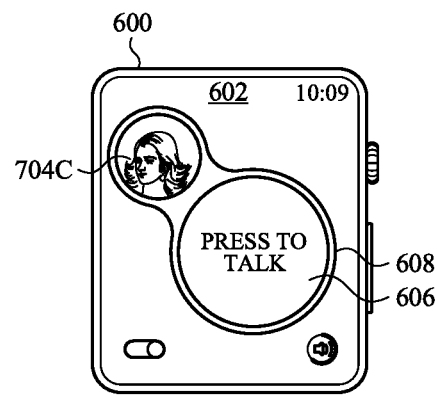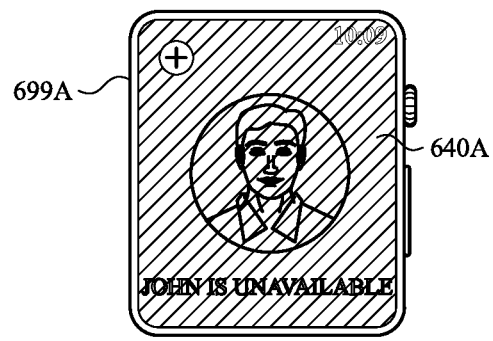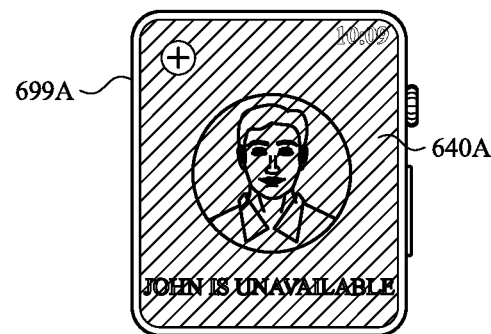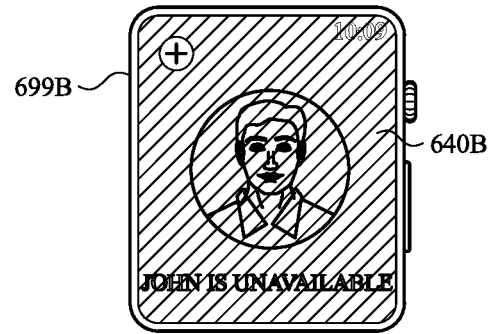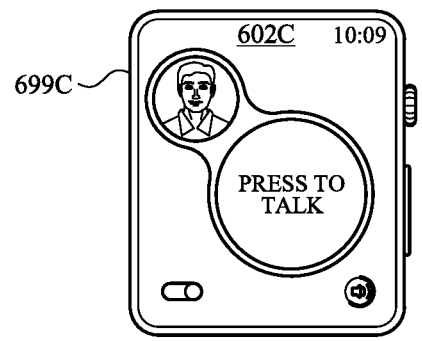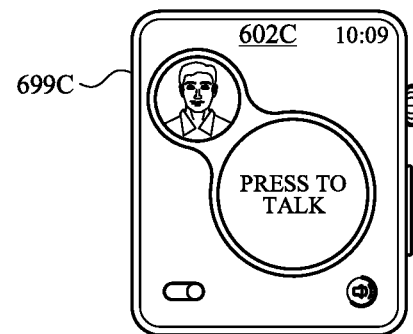
*FIG. 7DC*  *FIG. 7DD*

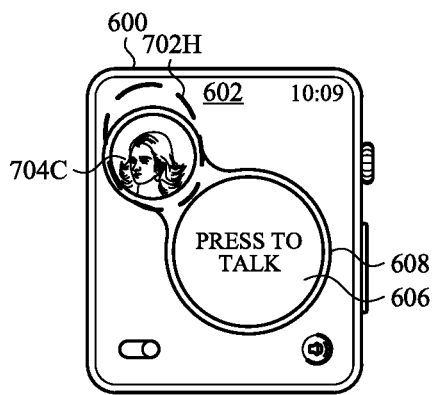
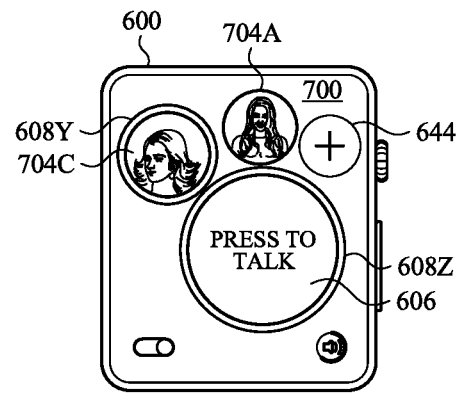
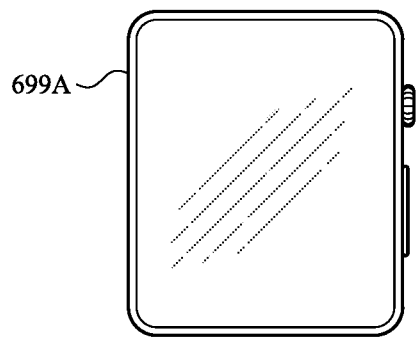
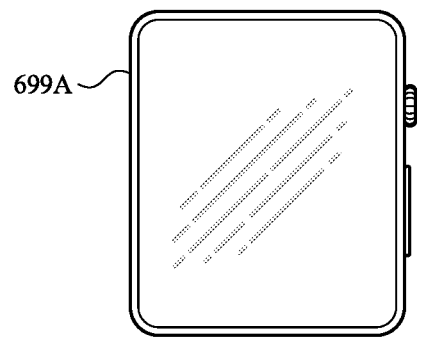
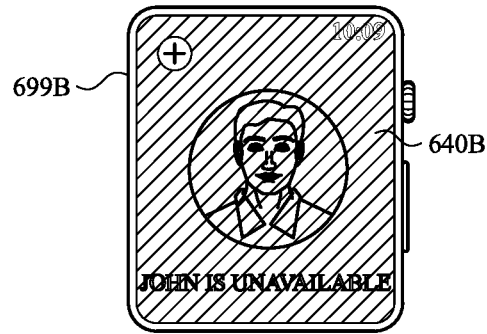
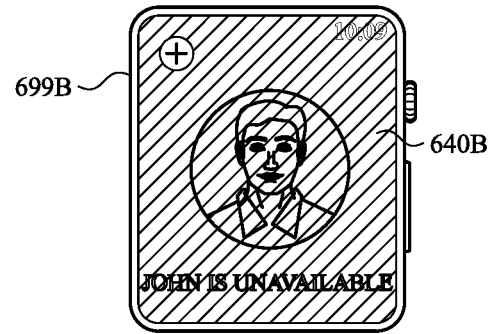
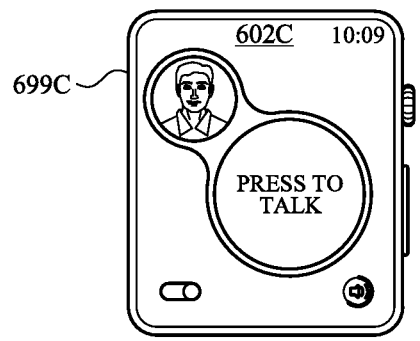
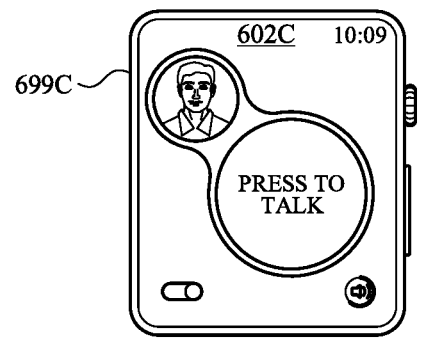
*FIG. 7EA*  *FIG. 7EB*

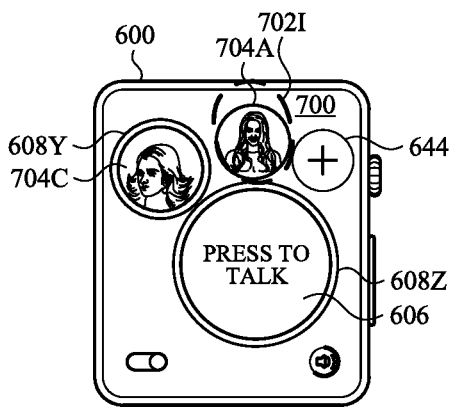
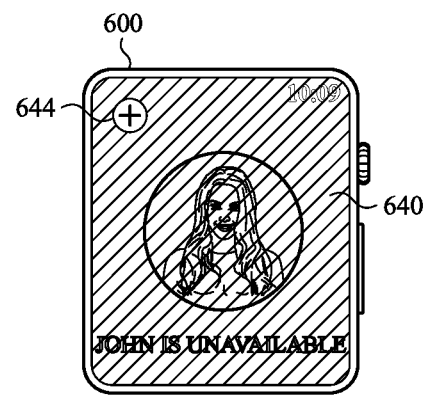
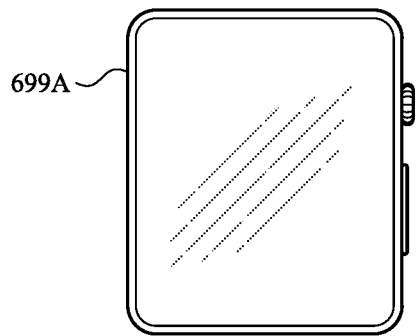
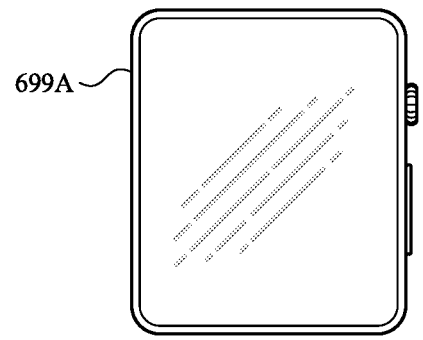
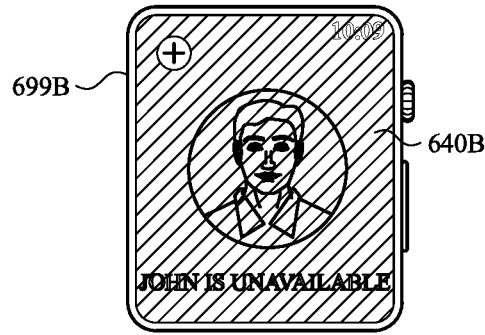
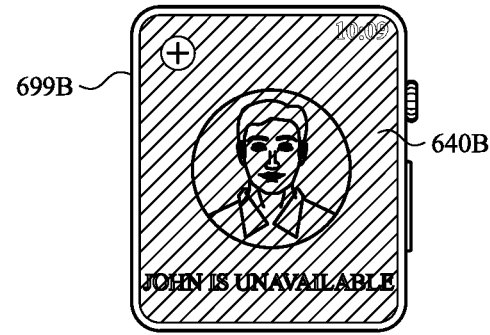
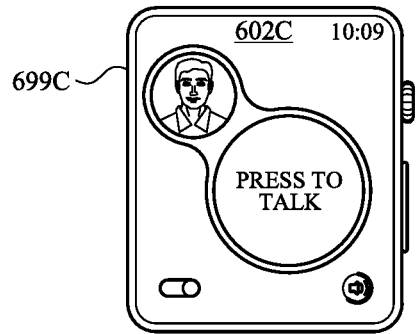
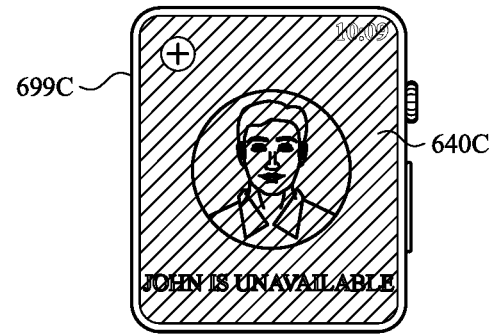
*FIG. 7EC*  *FIG. 7ED*

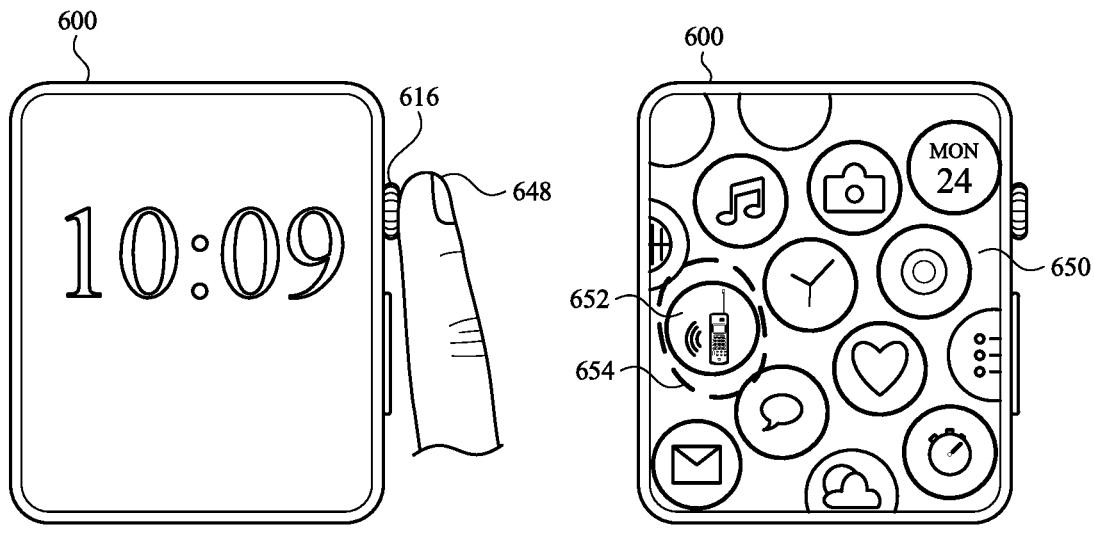
FIG. 8A                    FIG. 8B

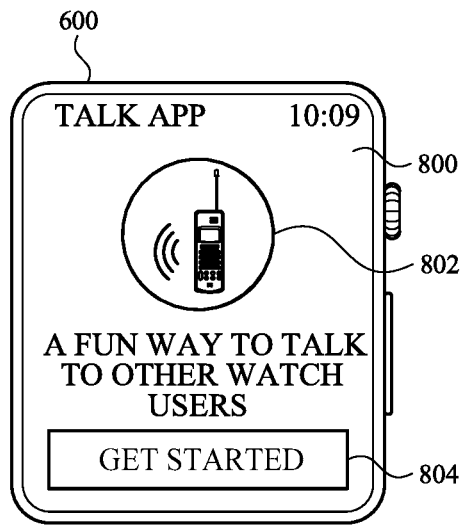
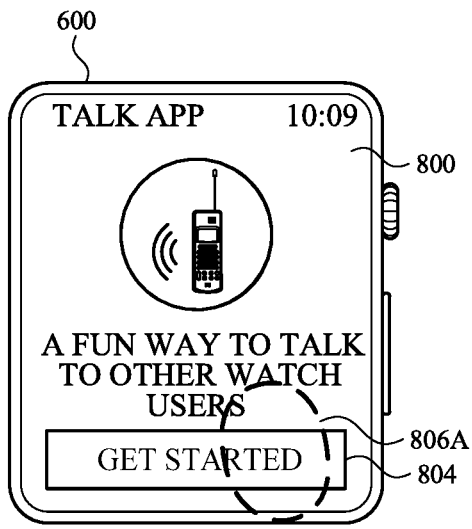
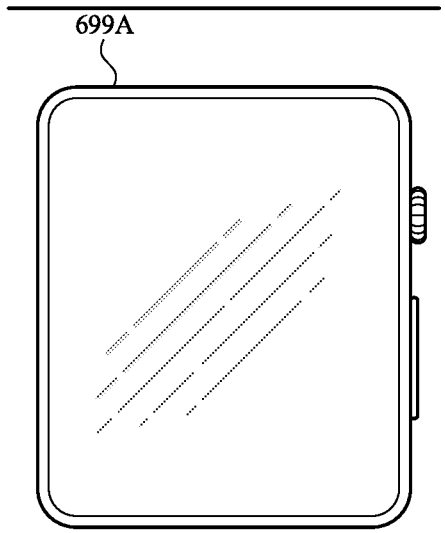
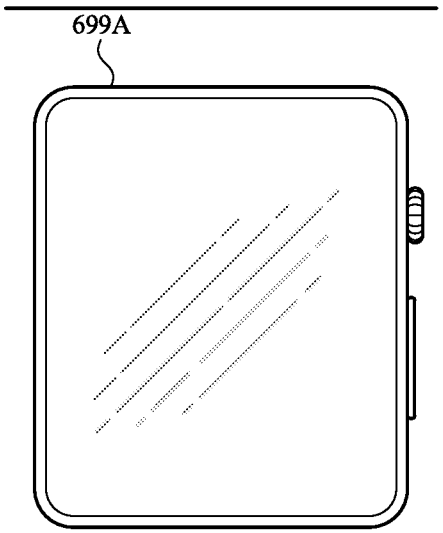
FIG. 8CFIG. 8D

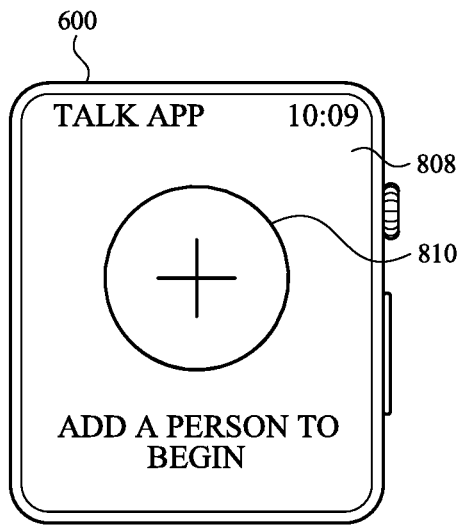
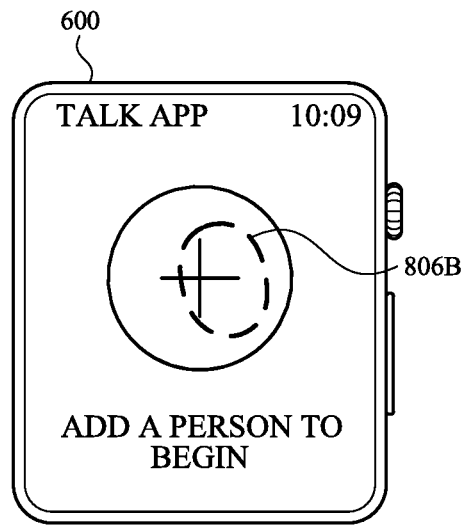
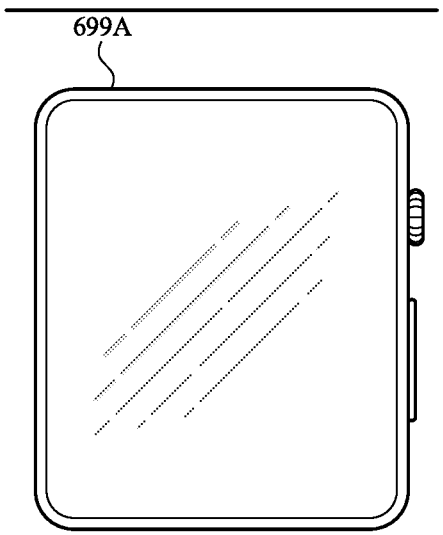
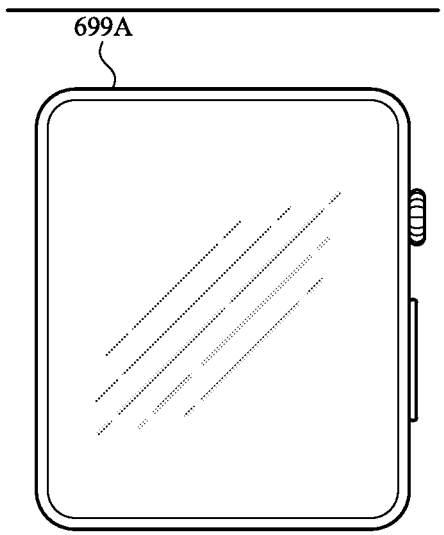
FIG. 8E    FIG. 8F

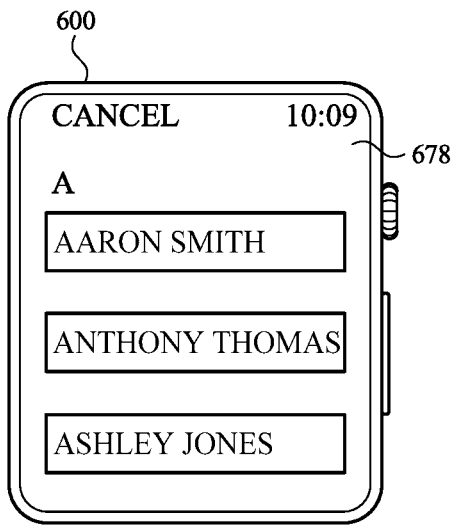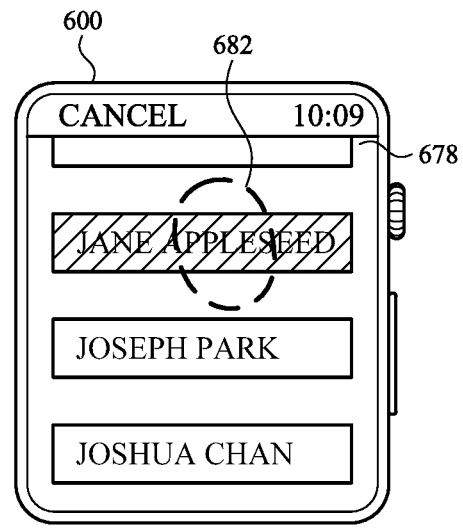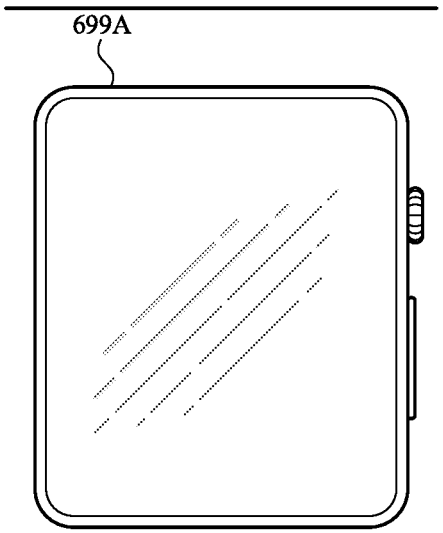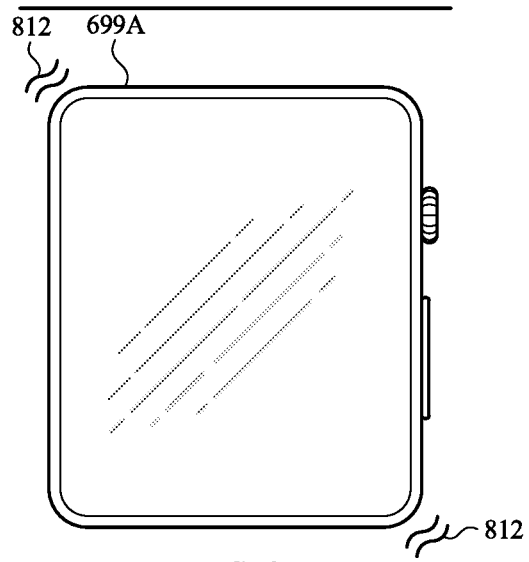
*FIG. 8G*     *FIG. 8H*

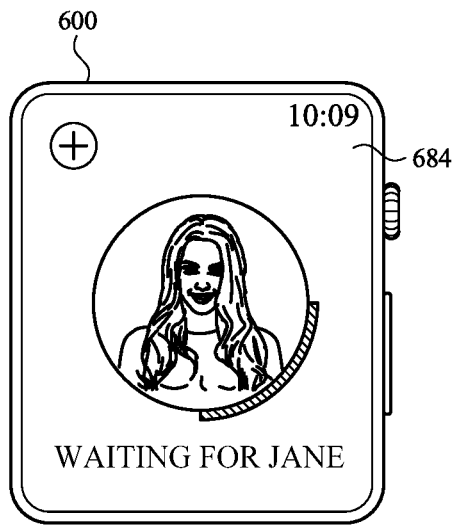
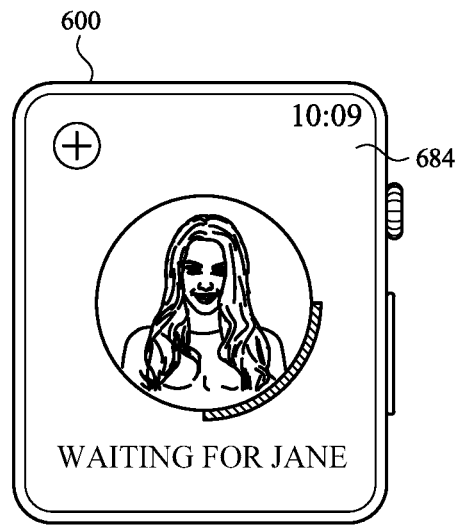
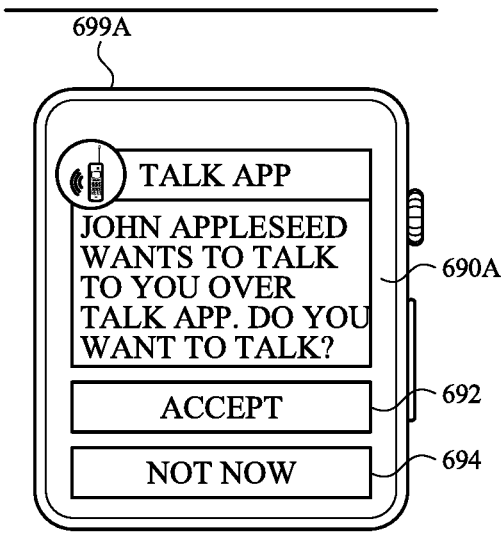
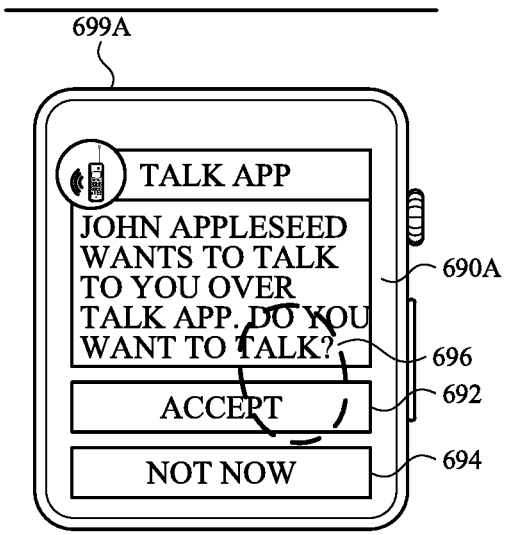
*FIG. 8I*  *FIG. 8J*

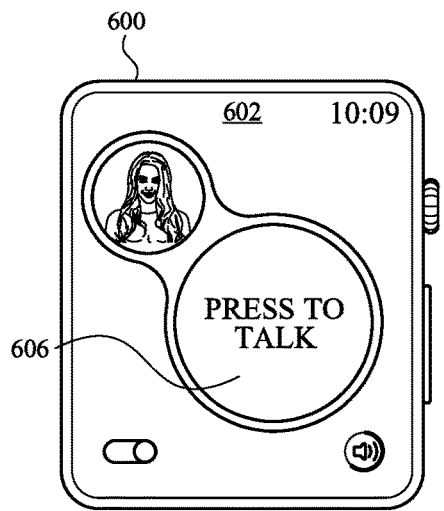 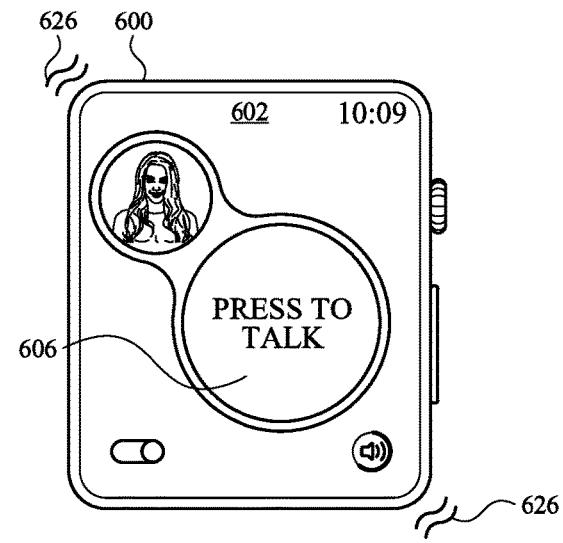
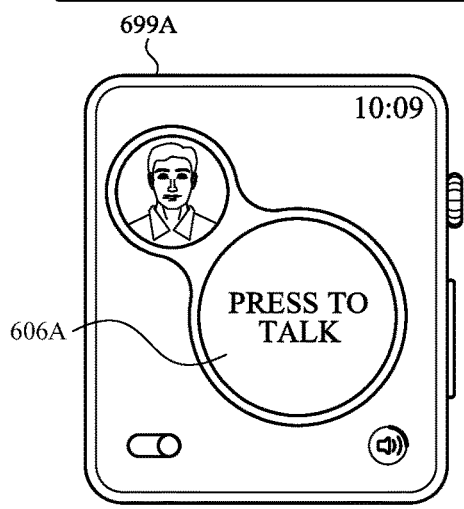
FIG. 8K
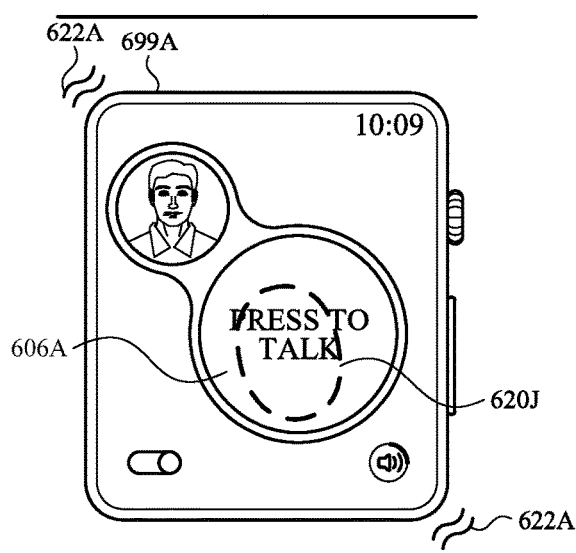
FIG. 8L

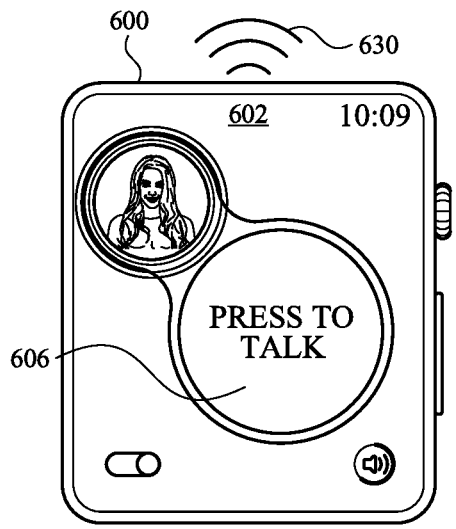
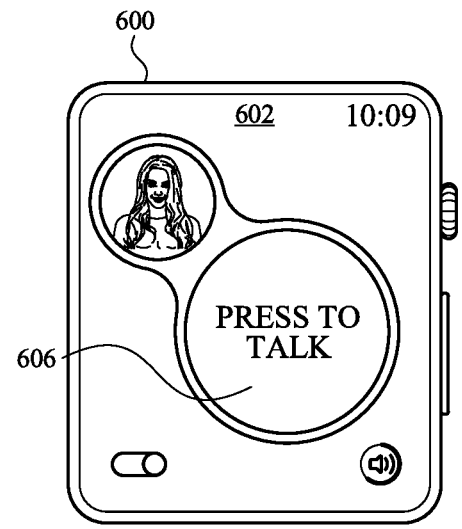
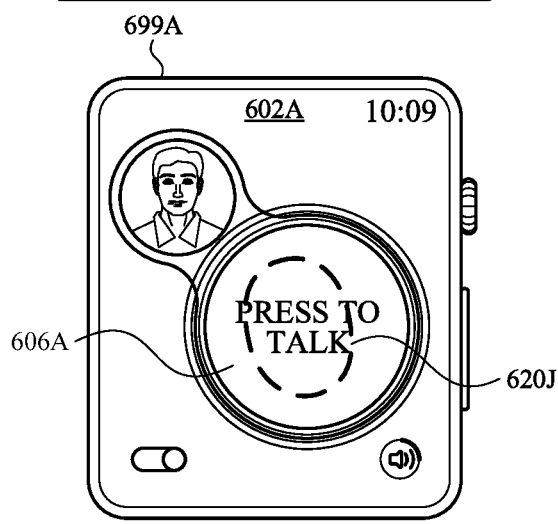
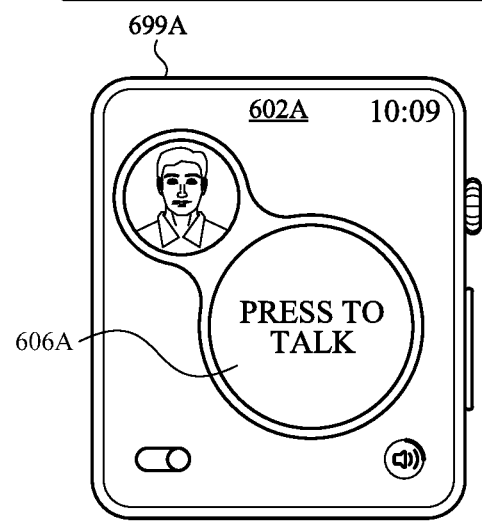
*FIG. 8M*      *FIG. 8N*

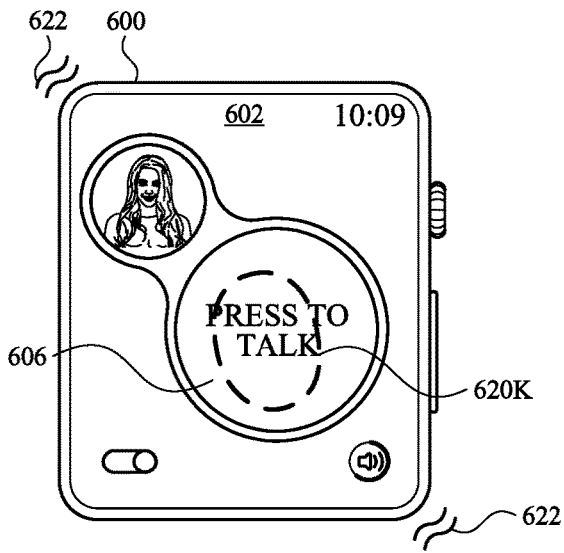
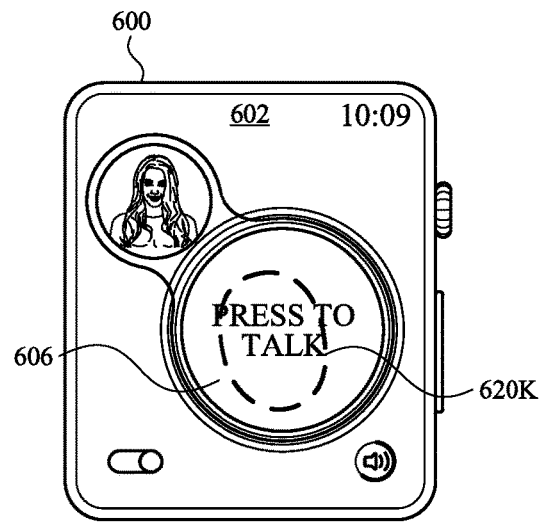
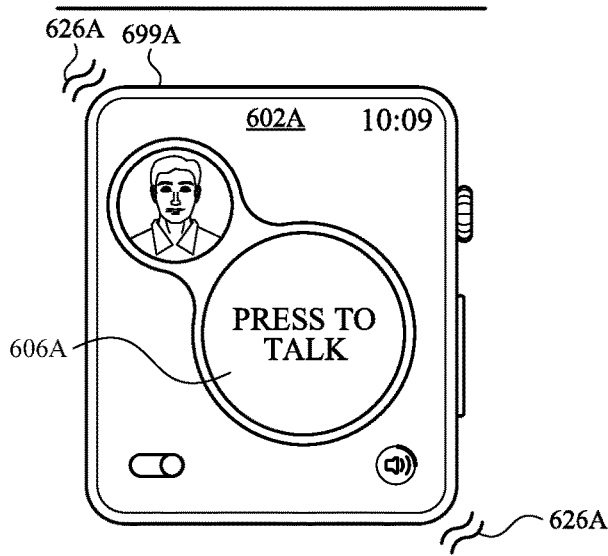
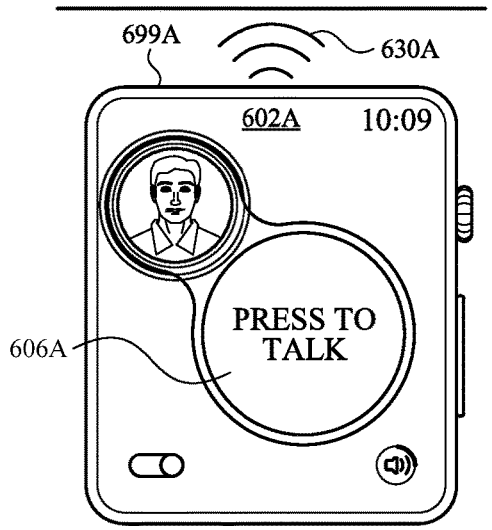
FIG. 8O  FIG. 8P

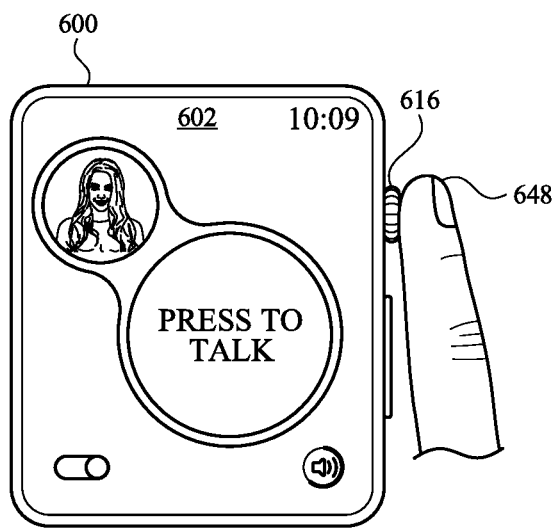 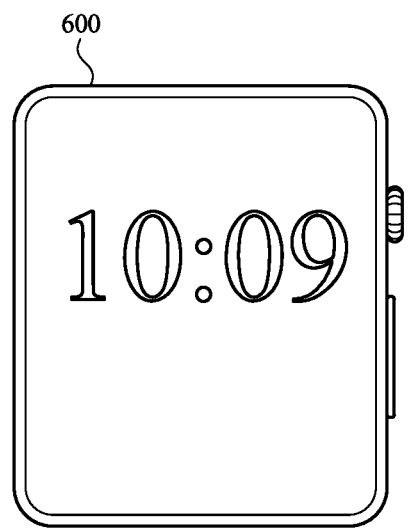
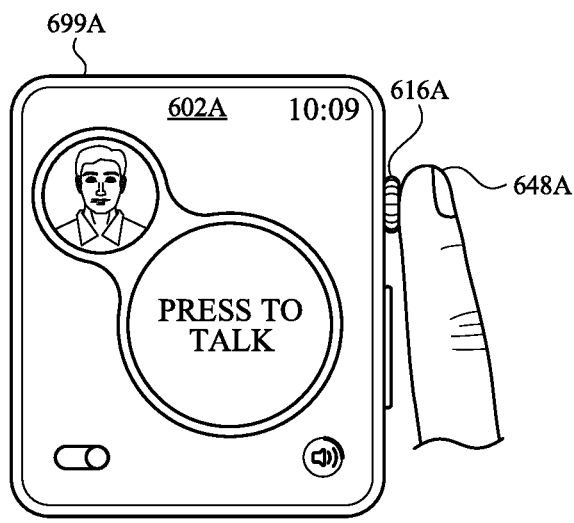 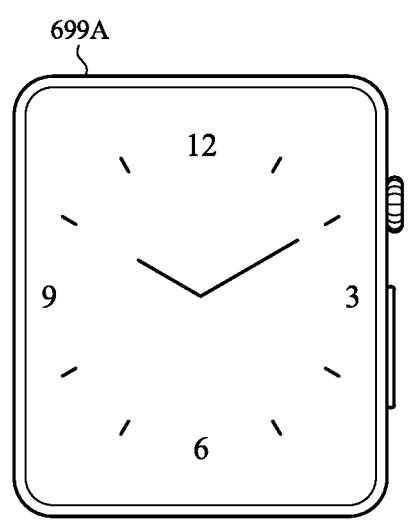
*FIG. 8Q*        *FIG. 8R*

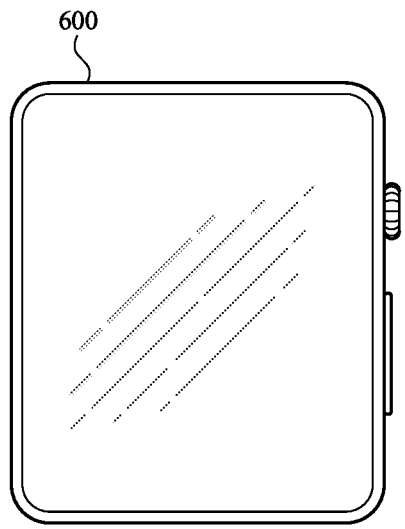
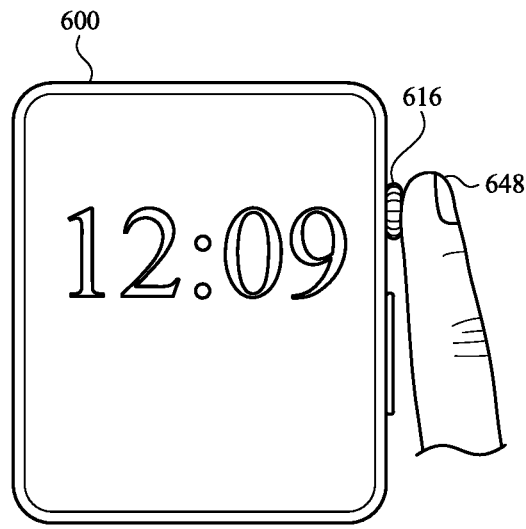
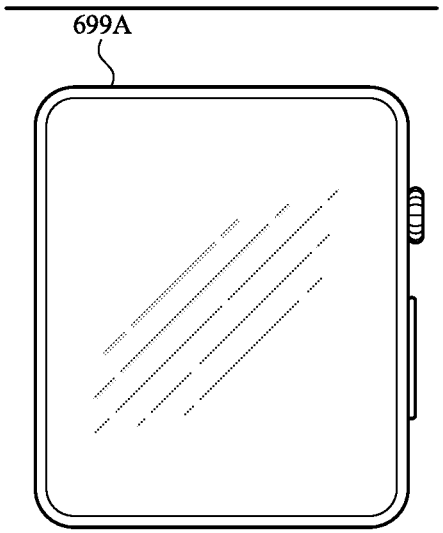
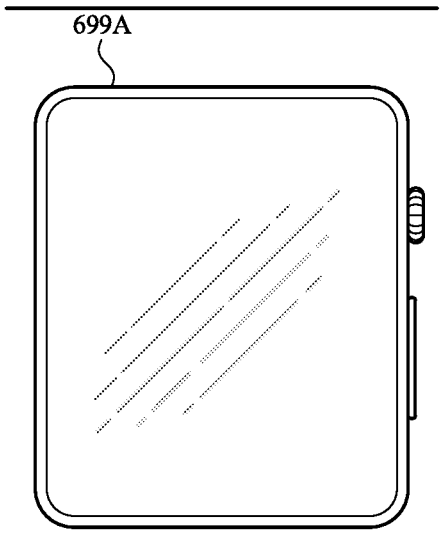
*FIG. 8S*  *FIG. 8T*

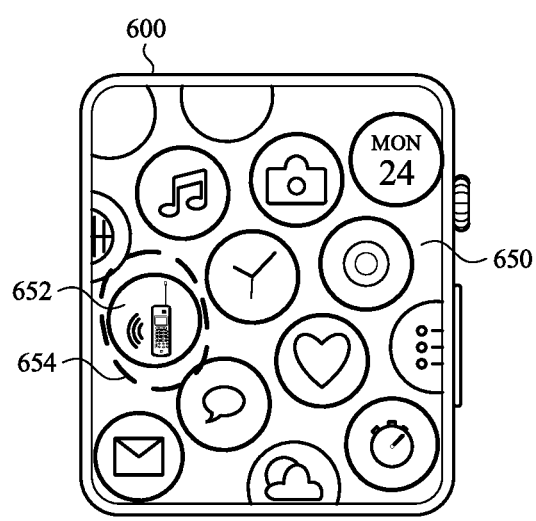
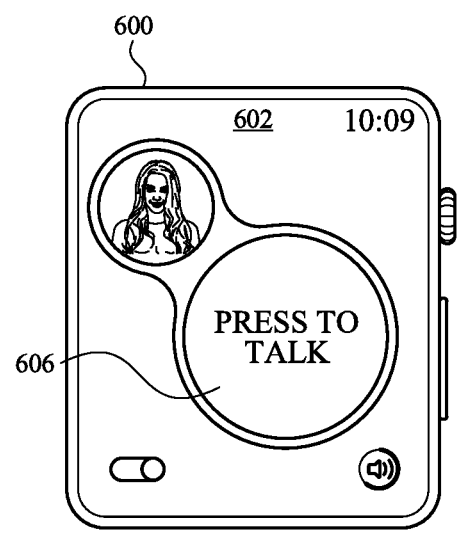
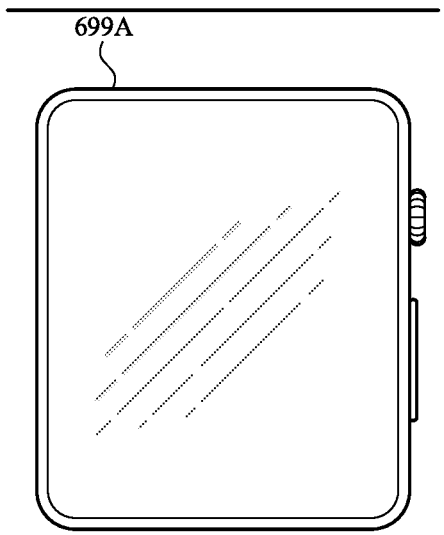
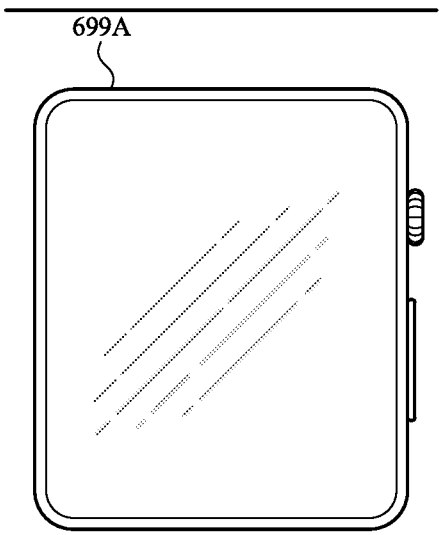
*FIG. 8U*  *FIG. 8V*

1000 ⤳

While the device is connected to a first communication channel associated with a first external device of a first contact and not connected to a second communication channel associated with a second external device of a second contact:

1002
Concurrently display a first affordance associated with the first contact and a second affordance associated with the second contact.

1004
The second contact is a most-recent contact that is determined based on meeting a set of most-recent contact criteria, including a criterion that is met when the second communication channel corresponding to the second contact is a most-recently-connected channel that was connected prior to connecting to a currently connected channel, wherein the currently connected channel is the first communication channel.

1006
Detect a touch input on the second affordance.

1008
Subsequent to detecting the touch input on the second affordance, disconnect from the first communication channel and connect to the second communication channel.

1010
Display a visual indication indicating that the device is not connected to the first communication channel and is connected to the second communication channel.

1012
While the device is connected to the second communication channel and not connected to the first communication channel, display the second affordance and a second talk affordance for communicating data through the second communication channel.

While in a full-duplex live audio communication session with an external device, the full-duplex live audio communication session configured to transmit control signal data and separately transmit audio data:

1202
Receive control signal data from an external device

1204
In response to receiving the control signal data, issuing a perceptual notification

1206
In response to receiving the control signal data, preventing audio input to a microphone

1208
In response to receiving the control signal data, preventing other applications from issuing perceptual notifications for a third predetermined time period

1210
After a first predetermined time period since receiving the control signal data, receive audio data from the external device

1212
After a second predetermined time period since issuing the perceptual notification, outputting the audio data from a speaker

*FIG. 12*

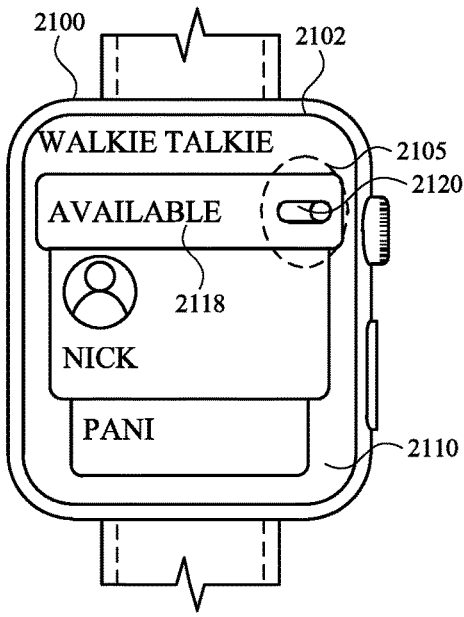
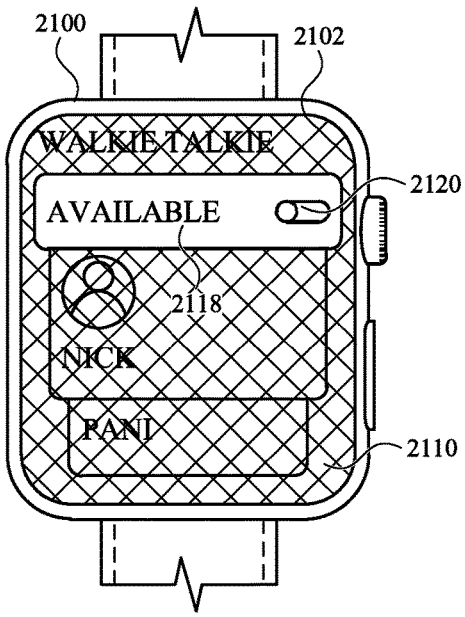
*FIG. 21E*  *FIG. 21F*
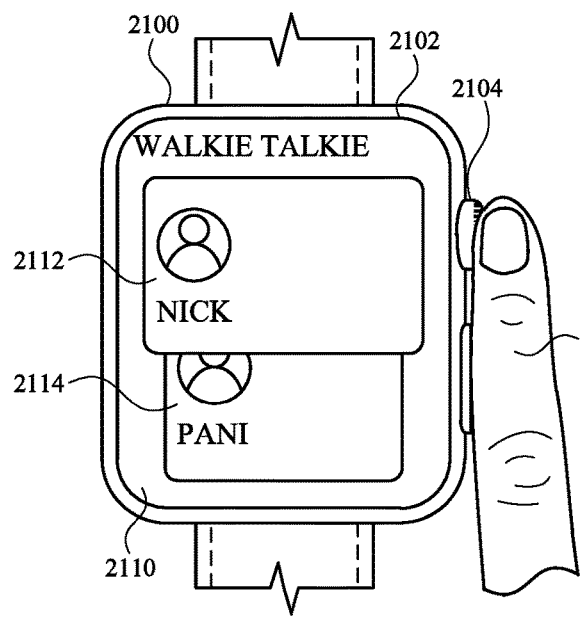
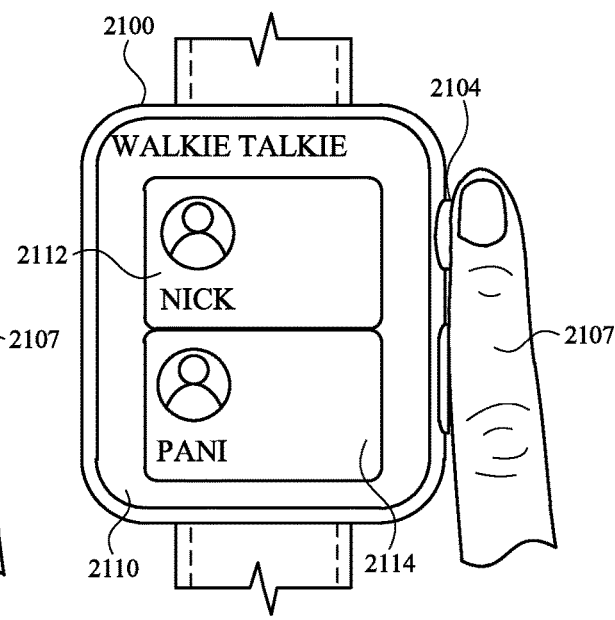
*FIG. 21G*  *FIG. 21H*

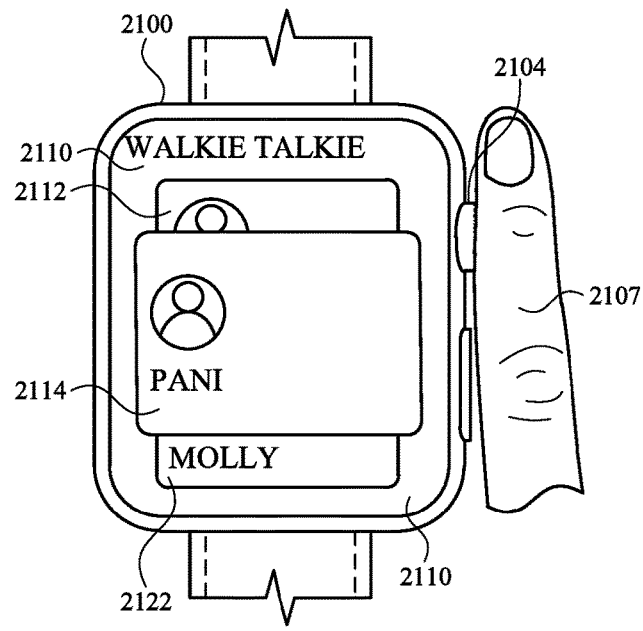
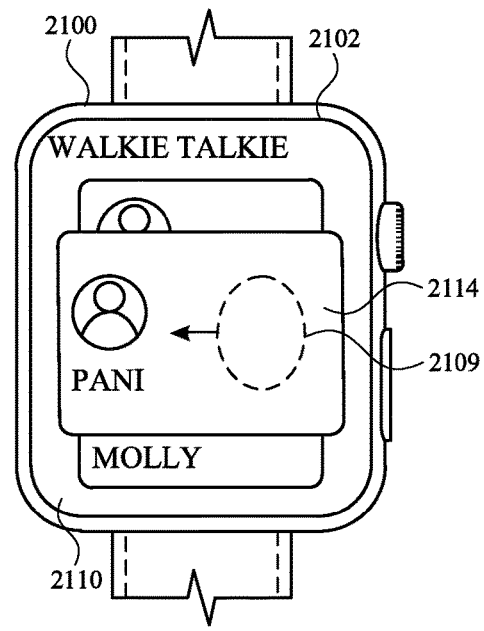
FIG. 21I                    FIG. 21J
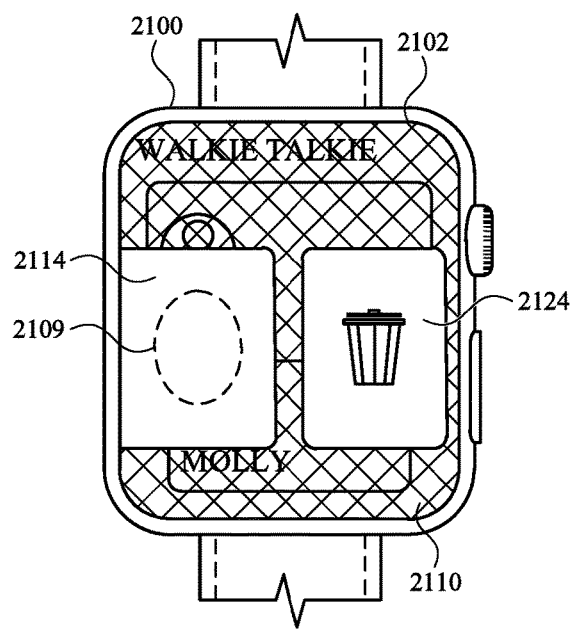
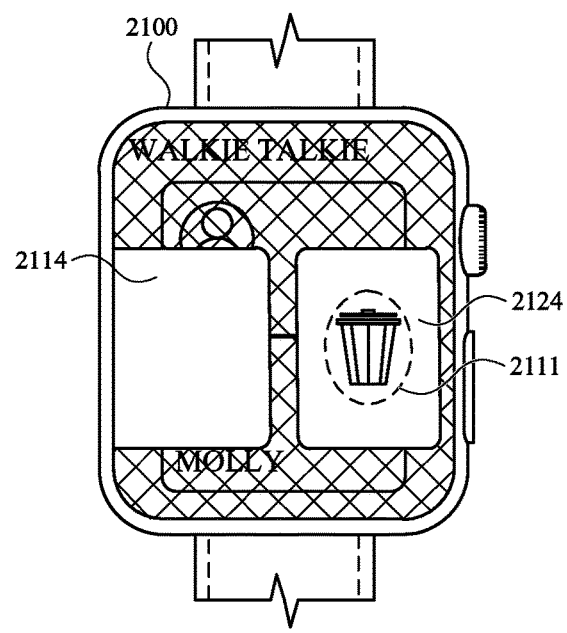
FIG. 21K                    FIG. 21L

Ⓑ
↓

2240
While the first application is in a first availability mode, receive, from a second electronic device, an incoming communication via the first application, where the incoming communication includes audio information.

↓

2242
In response to receiving the incoming communication, play the audio information of the incoming communication.

↓

2244
Display, on the display, a communication user interface of the first application while playing the incoming communication, where the communication user interface includes a type of visual feedback indicating that the incoming communication is being played.

Ⓑ
↓

2246
While the first application is in a second availability mode, receive, from a second electronic device, an incoming communication via the first application.

↓

2248
In response to receiving the incoming communication, forgo playing the incoming communication.

2250
In response to receiving the incoming communication corresponding to the first application, transmit an error communication via the first application to the second electronic device, where the error communication indicates that a user of the electronic device is unavailable for the incoming communication.

*FIG. 22C*

VOICE COMMUNICATION METHOD

CROSS-REFERENCE TO RELATED APPLICATIONS

This application is a continuation of U.S. application Ser. No. 15/981,828, entitled "Voice Communication Method," filed on May 16, 2018 which claims priority to U.S. Provisional Application Ser. No. 62/671,991, entitled "Voice Communication Method," filed on May 15, 2018, U.S. Provisional Application Ser. No. 62/507,195, entitled "Voice Communication Method," filed on May 16, 2017, and U.S. Provisional Application Ser. No. 62/507,167, entitled "Voice Communication Method," filed on May 16, 2017, the contents of which are hereby incorporated by reference in their entireties.

FIELD

The present disclosure relates generally to electronic communications, and more specifically, to computer user interfaces and techniques for electronic voice communications.

BACKGROUND

Electronic devices can provide various forms of communication for their users. For example, some electronic devices can provide voice communications such as phone calls, video calls, and recorded messages such as voicemail.

BRIEF SUMMARY

Some techniques for communicating with others using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for electronic communications, such as voice communications. Such methods and interfaces optionally complement or replace other methods for communication. Such methods and interfaces reduce the cognitive burden on a user and produce a more efficient human-machine interface, for example by reducing or eliminating a number of unnecessary, extraneous, and repetitive inputs at the device. For battery-operated computing devices, such methods and interfaces conserve power and increase the time between battery charges. For example, the methods and interfaces contemplated herein offer reduced processing power, reduced memory usage, and reduced battery usage by a display at the device.

In some embodiments, a method is described. The method includes, at an electronic device with a display and a touch-sensitive surface: receiving a data signal, including voice data, from an external device associated with a contact; in response to receiving the data signal, issuing a perceptual notification distinct from the voice data; subsequent to issuing the perceptual notification and in accordance with a determination that a user input is not detected on the display within a predetermined delay period, causing audio output of the voice data; and subsequent to issuing the perceptual notification and in accordance with a determination that the user input is detected on the display within the predetermined delay period, forgoing causing audio output of the voice data.

In some embodiments, a method is described. The method includes, at an electronic device with a display and a touch-sensitive surface: while the device is connected to a first communication channel associated with a first external device of a first contact and not connected to a second communication channel associated with a second external device of a second contact: concurrently displaying a first affordance associated with the first contact and a second affordance associated with the second contact; detecting a touch input on the second affordance; and subsequent to detecting the touch input on the second affordance, disconnecting from the first communication channel and connecting to the second communication channel. The example method includes, at the electronic device with the display and the touch-sensitive surface, displaying a visual indication indicating that the device is not connected to the first communication channel and is connected to the second communication channel.

In some embodiments, a method is described. The method includes, at an electronic device with a display and a touch-sensitive surface: launching a voice communication application; in accordance with a determination that a communication channel between the device and an external device associated with a contact meets a set of availability criteria: displaying a talk affordance associated with the contact; and in response to detecting a touch input on the talk affordance at the touch-sensitive display: capturing voice input, and sending voice data representing the voice input to the external device associated with the contact. The example method includes, at the electronic device with the display and the touch-sensitive surface, in accordance with a determination that the communication channel does not meet the set of availability criteria, forego displaying the talk affordance.

In some embodiments, an electronic device is described. The electronic device includes a touch-sensitive display, one or more processors, and memory storing one or more programs configured to be executed by the one or more processors. The one or more programs include instructions for receiving a data signal, including voice data, from an external device associated with a contact and in response to receiving the data signal, issuing a perceptual notification distinct from the voice data. The one or more programs include instructions for, subsequent to issuing the perceptual notification and in accordance with a determination that a user input is not detected on the touch-sensitive display within a predetermined delay period, causing audio output of the voice data. The one or more programs include instructions for, subsequent to issuing the perceptual notification and in accordance with a determination that the user input is detected on the touch-sensitive display within the predetermined delay period, forgoing causing audio output of the voice data.

In some embodiments, an electronic device is described. The electronic device includes a touch-sensitive display, one or more processors, and memory storing one or more programs configured to be executed by the one or more processors. The one or more programs include instructions for, while the device is connected to a first communication channel associated with a first external device of a first contact and not connected to a second communication channel associated with a second external device of a second contact: concurrently displaying a first affordance associated with the first contact and a second affordance associated with the second contact, detecting a touch input on the second affordance, and subsequent to detecting the touch input on the second affordance, disconnecting from the first communication channel and connecting to the second communication channel. The one or more programs include instructions for displaying a visual indication indicating that the device is not connected to the first communication channel and is connected to the second communication channel.

In some embodiments, an electronic device is described. The electronic device includes a touch-sensitive display, one or more processors, and memory storing one or more programs configured to be executed by the one or more processors. The one or more programs include instructions for launching a voice communication application. The one or more programs include instructions for, in accordance with a determination that a communication channel between the device and an external device associated with a contact meets a set of availability criteria: displaying a talk affordance associated with the contact, and in response to detecting a touch input on the talk affordance at the touch-sensitive display: capturing voice input, and sending voice data representing the voice input to the external device associated with the contact. The one or more programs include instructions for, in accordance with a determination that the communication channel does not meet the set of availability criteria, forgoing displaying the talk affordance.

In some embodiments, a non-transitory computer-readable storage medium is described. The non-transitory computer-readable storage media are disclosed herein. An example non-transitory computer-readable storage medium stores one or more programs configured to be executed by one or more processors of an electronic device with a display and a touch-sensitive surface, the one or more programs including instructions for: receiving a data signal, including voice data, from an external device associated with a contact; in response to receiving the data signal, issuing a perceptual notification distinct from the voice data; subsequent to issuing the perceptual notification and in accordance with a determination that a user input is not detected on the display within a predetermined delay period, causing audio output of the voice data; and subsequent to issuing the perceptual notification and in accordance with a determination that the user input is detected on the display within the predetermined delay period, forgoing causing audio output of the voice data.

In some embodiments, a non-transitory computer-readable storage medium is described. The non-transitory computer-readable storage medium stores one or more programs configured to be executed by one or more processors of an electronic device with a display and a touch-sensitive surface, the one or more programs including instructions for: while the device is connected to a first communication channel associated with a first external device of a first contact and not connected to a second communication channel associated with a second external device of a second contact: concurrently displaying a first affordance associated with the first contact and a second affordance associated with the second contact; detecting a touch input on the second affordance; and subsequent to detecting the touch input on the second affordance, disconnecting from the first communication channel and connecting to the second communication channel. The one or more programs include instructions for displaying a visual indication indicating that the device is not connected to the first communication channel and is connected to the second communication channel.

In some embodiments, a non-transitory computer-readable storage medium is described. The non-transitory computer-readable storage medium stores one or more programs configured to be executed by one or more processors of an electronic device with a display and a touch-sensitive surface, the one or more programs including instructions for: launching a voice communication application; in accordance with a determination that a communication channel between the device and an external device associated with a contact meets a set of availability criteria: displaying a talk affordance associated with the contact; in response to detecting a touch input on the talk affordance at the touch-sensitive display: capturing voice input, and sending voice data representing the voice input to the external device associated with the contact. The one or more programs include instructions for, in accordance with a determination that the communication channel does not meet the set of availability criteria, forego displaying the talk affordance.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

In some embodiments, a transitory computer-readable storage medium is described. The transitory computer-readable storage medium stores one or more programs configured to be executed by one or more processors of an electronic device with a display and a touch-sensitive surface, the one or more programs including instructions for: receiving a data signal, including voice data, from an external device associated with a contact; in response to receiving the data signal, issuing a perceptual notification distinct from the voice data; subsequent to issuing the perceptual notification and in accordance with a determination that a user input is not detected on the display within a predetermined delay period, causing audio output of the voice data; and subsequent to issuing the perceptual notification and in accordance with a determination that the user input is detected on the display within the predetermined delay period, forgoing causing audio output of the voice data.

In some embodiments, a transitory computer-readable storage medium is described. The transitory computer-readable storage medium stores one or more programs configured to be executed by one or more processors of an electronic device with a display and a touch-sensitive surface, the one or more programs including instructions for: while the device is connected to a first communication channel associated with a first external device of a first contact and not connected to a second communication channel associated with a second external device of a second contact: concurrently displaying a first affordance associated with the first contact and a second affordance associated with the second contact; detecting a touch input on the second affordance; and subsequent to detecting the touch input on the second affordance, disconnecting from the first communication channel and connecting to the second communication channel. The one or more programs include instructions for displaying a visual indication indicating that the device is not connected to the first communication channel and is connected to the second communication channel.

In some embodiments, a transitory computer-readable storage medium is described. The transitory computer-readable storage medium stores one or more programs configured to be executed by one or more processors of an electronic device with a display and a touch-sensitive surface, the one or more programs including instructions for: launching a voice communication application; in accordance with a determination that a communication channel between the device and an external device associated with a contact meets a set of availability criteria: displaying a talk affordance associated with the contact; in response to detecting a touch input on the talk affordance at the touch-sensitive display: capturing voice input, and sending voice data representing the voice input to the external device associated with the contact. The one or more programs include instructions for, in accordance with a determination that the communication channel does not meet the set of availability criteria, forego displaying the talk affordance.

In some embodiments, a method is described. The method is performed at an electronic device with a display, one or more input devices, one or more output devices, and a wireless communication radio. The method comprises: displaying, on the display, a communication user interface of a first application that includes an activatable indicator; while displaying the communication user interface and while communication is not occurring, detecting a start of communication via the first application; in conjunction with detecting the start of the communication via the first application, displaying feedback indicative of the communication while the communication is ongoing, including: in accordance with a determination that communication via the first application is an outgoing communication triggered by activation of the activatable indicator: recording, via the one or more input devices, an outgoing communication; and displaying, on the display, a first type of visual feedback in a respective region of the communication user interface that is proximate to the activatable indicator; and in accordance with a determination that communication via the first application is an incoming communication received via the wireless communication radio: playing, via the one or more output devices, the incoming communication; and while playing the incoming communication: displaying, on the display, a second type of visual feedback in the respective region of the communication user interface that is different from the first type of visual feedback; and disabling the activatable indicator from being activated to initiate an outgoing communication via the first application.

In some embodiments, a non-transitory computer-readable storage medium is described. The non-transitory computer-readable storage medium stores one or more programs configured to be executed by one or more processors of an electronic device with a display, one or more input devices, one or more output devices, and a wireless communication radio. The one or more programs include instructions for: displaying, on the display, a communication user interface of a first application that includes an activatable indicator; while displaying the communication user interface and while communication is not occurring, detecting a start of communication via the first application; in conjunction with detecting the start of the communication via the first application, displaying feedback indicative of the communication while the communication is ongoing, including: in accordance with a determination that communication via the first application is an outgoing communication triggered by activation of the activatable indicator: recording, via the one or more input devices, an outgoing communication; and displaying, on the display, a first type of visual feedback in a respective region of the communication user interface that is proximate to the activatable indicator; and in accordance with a determination that communication via the first application is an incoming communication received via the wireless communication radio: playing, via the one or more output devices, the incoming communication; and while playing the incoming communication: displaying, on the display, a second type of visual feedback in the respective region of the communication user interface that is different from the first type of visual feedback; and disabling the activatable indicator from being activated to initiate an outgoing communication via the first application.

In some embodiments, a transitory computer-readable storage medium is described. The transitory computer-readable storage medium stores one or more programs configured to be executed by one or more processors of an electronic device with a display, one or more input devices, one or more output devices, and a wireless communication radio. The one or more programs include instructions for: displaying, on the display, a communication user interface of a first application that includes an activatable indicator; while displaying the communication user interface and while communication is not occurring, detecting a start of communication via the first application; in conjunction with detecting the start of the communication via the first application, displaying feedback indicative of the communication while the communication is ongoing, including: in accordance with a determination that communication via the first application is an outgoing communication triggered by activation of the activatable indicator: recording, via the one or more input devices, an outgoing communication; and displaying, on the display, a first type of visual feedback in a respective region of the communication user interface that is proximate to the activatable indicator; and in accordance with a determination that communication via the first application is an incoming communication received via the wireless communication radio: playing, via the one or more output devices, the incoming communication; and while playing the incoming communication: displaying, on the display, a second type of visual feedback in the respective region of the communication user interface that is different from the first type of visual feedback; and disabling the activatable indicator from being activated to initiate an outgoing communication via the first application.

In some embodiments, an electronic device is described. The electronic device comprises a display; one or more input devices; one or more output devices; a wireless communication radio; one or more processors; and memory storing one or more programs configured to be executed by the one or more processors. The one or more programs include instructions for: displaying, on the display, a communication user interface of a first application that includes an activatable indicator; while displaying the communication user interface and while communication is not occurring, detecting a start of communication via the first application; in conjunction with detecting the start of the communication via the first application, displaying feedback indicative of the communication while the communication is ongoing, including: in accordance with a determination that communication via the first application is an outgoing communication triggered by activation of the activatable indicator: recording, via the one or more input devices, an outgoing communication; and displaying, on the display, a first type of visual feedback in a respective region of the communication user interface that is proximate to the activatable indicator: and in accordance with a determination that communication via the first application is an incoming communication received via the wireless communication radio: playing, via the one or more output devices, the incoming communication; and while playing the incoming communication: displaying, on the display, a second type of visual feedback in the respective region of the communication user interface that is different from the first type of visual feedback; and disabling the activatable indicator from being activated to initiate an outgoing communication via the first application.

In some embodiments, an electronic device is described. The electronic device comprises a display; one or more input devices; one or more output devices; a wireless communication radio; means for displaying, on the display, a communication user interface of a first application that includes an activatable indicator; means, while displaying the communication user interface and while communication is not occurring, for detecting a start of communication via the first application; means, in conjunction with detecting the start of the communication via the first application, for displaying feedback indicative of the communication while the communication is ongoing, including: means, in accordance with a determination that communication via the first application is an outgoing communication triggered by activation of the activatable indicator, for: recording, via the one or more input devices, an outgoing communication; and displaying, on the display, a first type of visual feedback in a respective region of the communication user interface that is proximate to the activatable indicator; and means, in accordance with a determination that communication via the first application is an incoming communication received via the wireless communication radio, for: playing, via the one or more output devices, the incoming communication; and while playing the incoming communication: displaying, on the display, a second type of visual feedback in the respective region of the communication user interface that is different from the first type of visual feedback; and disabling the activatable indicator from being activated to initiate an outgoing communication via the first application.

In some embodiments, a method is described. The method is performed at an electronic device with a display and one or more input devices. The method comprises: displaying, on the display, a first user interface of a first application, wherein the first user interface includes a plurality of representations of contactable users; while displaying the first user interface with a representation of a first contactable user displayed, detecting, via the one or more input devices, a user input; and in response to detecting the user input: in accordance with a determination that the user input corresponds to a request to move the plurality of representations of contactable users in a first direction, displaying, on the display, an availability affordance that, when activated, changes an availability mode of the first application; and in accordance with a determination that the user input corresponds to a request to move the plurality representations of contactable users in a second direction opposite to the first direction, ceasing to display the representation of the first contactable user and displaying, on the display, a representation of a second contactable user that is different from the first contactable user.

In some embodiments, a non-transitory computer-readable storage medium is described. The non-transitory computer-readable storage medium stores one or more programs configured to be executed by one or more processors of an electronic device with a display and one or more input devices. The one or more programs include instructions for: displaying, on the display, a first user interface of a first application, wherein the first user interface includes a plurality of representations of contactable users; while displaying the first user interface with a representation of a first contactable user displayed, detecting, via the one or more input devices, a user input; and in response to detecting the user input: in accordance with a determination that the user input corresponds to a request to move the plurality of representations of contactable users in a first direction, displaying, on the display, an availability affordance that, when activated, changes an availability mode of the first application; and in accordance with a determination that the user input corresponds to a request to move the plurality representations of contactable users in a second direction opposite to the first direction, ceasing to display the representation of the first contactable user and displaying, on the display, a representation of a second contactable user that is different from the first contactable user.

In some embodiments, a transitory computer-readable storage medium is described. The transitory computer-readable storage medium stores one or more programs configured to be executed by one or more processors of an electronic device with a display and one or more input devices. The one or more programs include instructions for: displaying, on the display, a first user interface of a first application, wherein the first user interface includes a plurality of representations of contactable users; while displaying the first user interface with a representation of a first contactable user displayed, detecting, via the one or more input devices, a user input; and in response to detecting the user input: in accordance with a determination that the user input corresponds to a request to move the plurality of representations of contactable users in a first direction, displaying, on the display, an availability affordance that, when activated, changes an availability mode of the first application; and in accordance with a determination that the user input corresponds to a request to move the plurality representations of contactable users in a second direction opposite to the first direction, ceasing to display the representation of the first contactable user and displaying, on the display, a representation of a second contactable user that is different from the first contactable user.

In some embodiments, an electronic device is described. The electronic device comprises a display; one or more input devices; one or more processors; and memory storing one or more programs configured to be executed by the one or more processors. The one or more programs include instructions for: displaying, on the display, a first user interface of a first application, wherein the first user interface includes a plurality of representations of contactable users; while displaying the first user interface with a representation of a first contactable user displayed, detecting, via the one or more input devices, a user input; and in response to detecting the user input: in accordance with a determination that the user input corresponds to a request to move the plurality of representations of contactable users in a first direction, displaying, on the display, an availability affordance that, when activated, changes an availability mode of the first application; and in accordance with a determination that the user input corresponds to a request to move the plurality representations of contactable users in a second direction opposite to the first direction, ceasing to display the representation of the first contactable user and displaying, on the display, a representation of a second contactable user that is different from the first contactable user.

In some embodiments, an electronic device is described. The electronic device comprises a display; one or more input devices; means for displaying, on the display, a first user interface of a first application, wherein the first user interface includes a plurality of representations of contactable users; means, while displaying the first user interface with a representation of a first contactable user displayed, for detecting, via the one or more input devices, a user input; and means, in response to detecting the user input, for: in accordance with a determination that the user input corresponds to a request to move the plurality of representations of contactable users in a first direction, displaying, on the display, an availability affordance that, when activated, changes an availability mode of the first application; and in accordance with a determination that the user input corresponds to a request to move the plurality representations of contactable users in a second direction opposite to the first direction, ceasing to display the representation of the first contactable user and displaying, on the display, a representation of a second contactable user that is different from the first contactable user.

Thus, devices are provided with faster, more efficient methods and interfaces for electronic voice communications, thereby increasing the effectiveness, efficiency, and user satisfaction with such devices. Such methods and interfaces may complement or replace other methods for communication.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 6AA to 6AI illustrate exemplary techniques and user interfaces for electronic voice communications, including sending and receiving voice communications, in accordance with some embodiments.

FIGS. 6BA to 6BD illustrate exemplary techniques and user interfaces for electronic voice communications, including preventing audio output of incoming voice data, in accordance with some embodiments.

FIGS. 6CA to 6CE illustrate exemplary techniques and user interfaces for electronic voice communications, including interrupting audio output of incoming voice data, in accordance with some embodiments.

FIGS. 6DA to 6DE illustrate exemplary techniques and user interfaces for electronic voice communications, including toggling a do-not-disturb mode, in accordance with some embodiments.

FIGS. 6EA to 6EB illustrate exemplary techniques and user interfaces for electronic voice communications, including handling incoming notifications during voice communications, in accordance with some embodiments.

FIGS. 6FA to 6FF illustrate exemplary techniques and user interfaces for electronic voice communications, including another example for handling incoming notifications during voice communications, in accordance with some embodiments.

FIGS. 6GA to 6GF illustrate exemplary techniques and user interfaces for electronic voice communications, including yet another example for handling incoming notifications during voice communications, in accordance with some embodiments.

FIGS. 6HA to 6HH illustrate exemplary techniques and user interfaces for electronic voice communications, including further examples for handling incoming notifications during voice communications, in accordance with some embodiments.

FIGS. 6IA to 6IC illustrate exemplary techniques and user interfaces for electronic voice communications, including examples of user unavailability during voice communications, in accordance with some embodiments.

FIGS. 6KA to 6KN illustrate exemplary techniques and user interfaces for electronic voice communications, including an example for handling invitations and connecting to new contacts, in accordance with some embodiments.

FIGS. 6LA to 6LD illustrate exemplary techniques and user interfaces for electronic voice communications, including further examples for handling invitations and connecting to new contacts, in accordance with some embodiments.

FIGS. 6MA to 6MC illustrate exemplary techniques and user interfaces for electronic voice communications, including another example for handling invitations and connecting to new contacts, in accordance with some embodiments.

FIGS. 6OA to 6OH illustrate exemplary techniques and user interfaces for electronic voice communications, including examples of when a contact is unavailable, in accordance with some embodiments.

FIGS. 7AA to 7AI illustrate exemplary techniques and user interfaces for electronic voice communications, including switching between different contacts, in accordance with some embodiments.

FIGS. 7CA to 7CH illustrate exemplary techniques and user interfaces for electronic voice communications, including further examples for switching between different contacts, in accordance with some embodiments.

FIGS. 7DA to 7DD illustrate exemplary techniques and user interfaces for electronic voice communications, including still further examples for switching between different contacts, in accordance with some embodiments.

FIGS. 7EA to 7ED illustrate exemplary techniques and user interfaces for electronic voice communications, including more examples for switching between different contacts, in accordance with some embodiments.

FIGS. 8A-8X illustrate exemplary techniques and user interfaces for electronic voice communications, including a first time user setup for voice communications, in accordance with some embodiments.

FIG. 10 is a flow diagram illustrating an example method for electronic voice communications, including switching between voice communications with different contacts, in accordance with some embodiments.

FIG. 12 is a flow diagram illustrating an example method for electronic voice communications, including receiving control signal data and audio data, in accordance with some embodiments.

FIGS. 22A-22C are a flow diagram for changing an availability mode and adding one or more contactable users, in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for communications, such as voice communications. Current techniques may require additional user inputs. Such techniques can reduce the cognitive burden on a user communicating with another user at another electronic device, thereby enhancing productivity. Further, such techniques can reduce processor and battery power otherwise wasted on redundant user inputs.

Figures 8W, 8X:
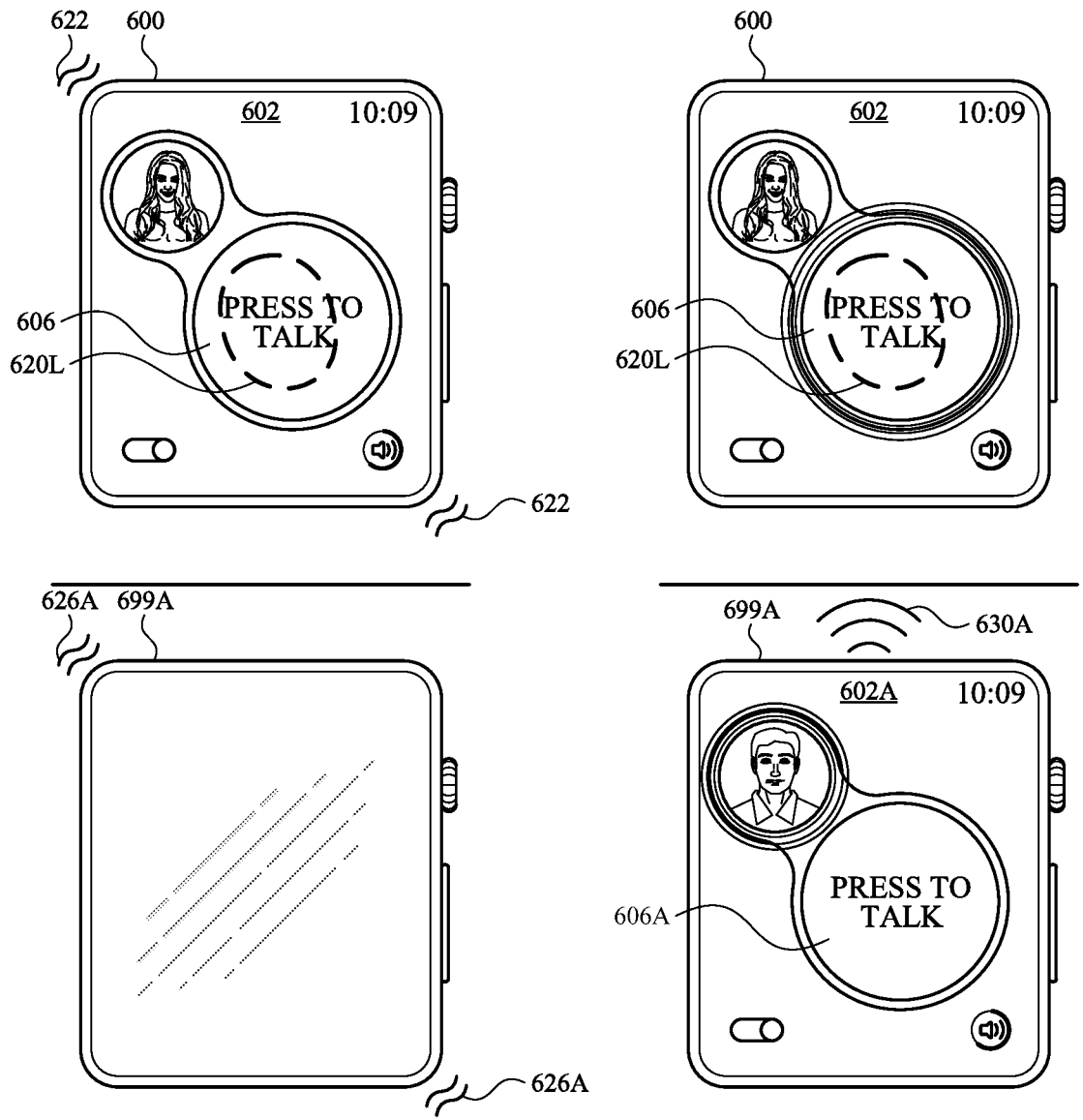
Figure 9:
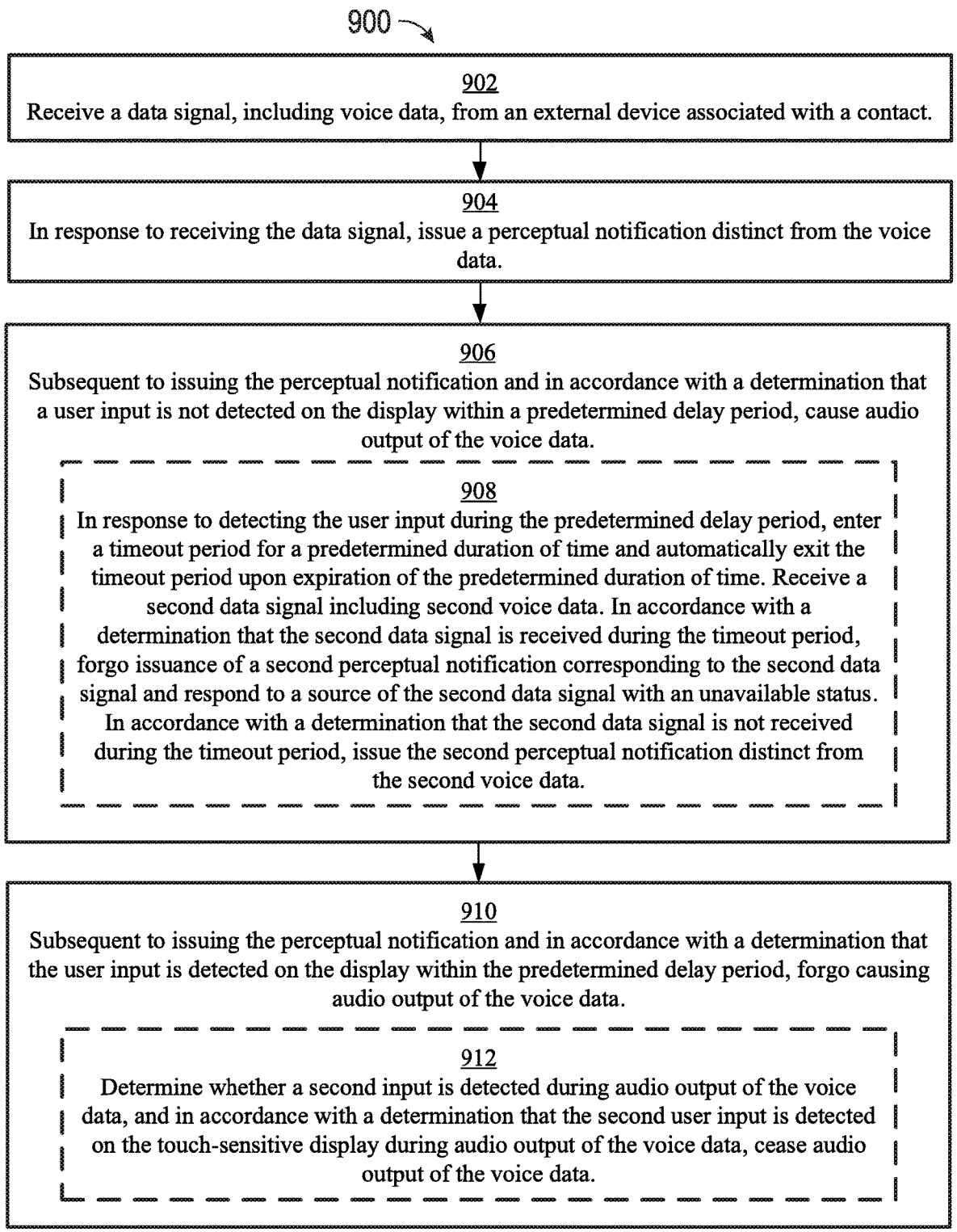
FIG. 9 is a flow diagram illustrating an example method for electronic voice communications, including sending and receiving voice communications, in accordance with some embodiments.
Figure 11:
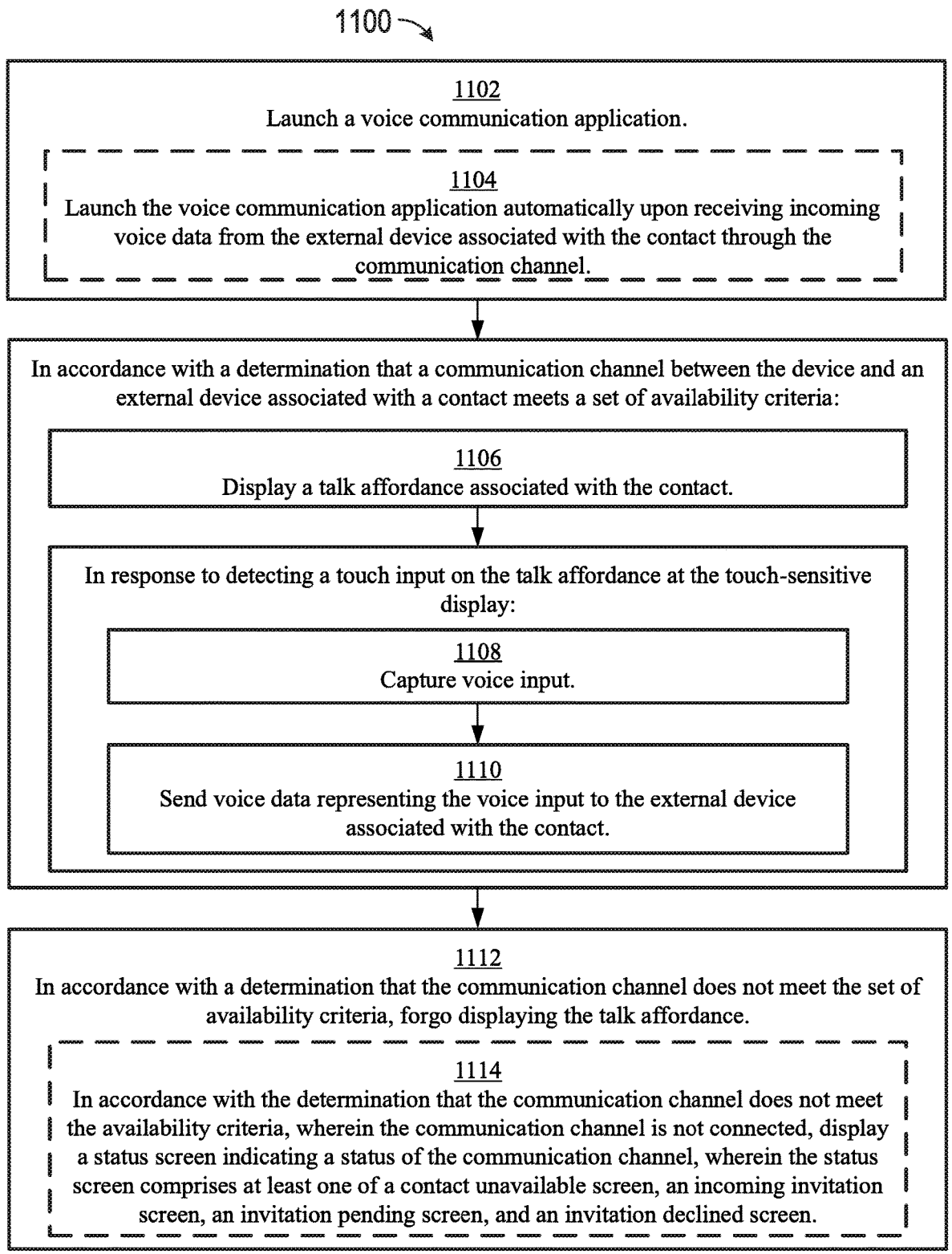
FIG. 11 is a flow diagram illustrating an example method for electronic voice communications, including establishing voice communications with new contacts, in accordance with some embodiments.
Figure 13:
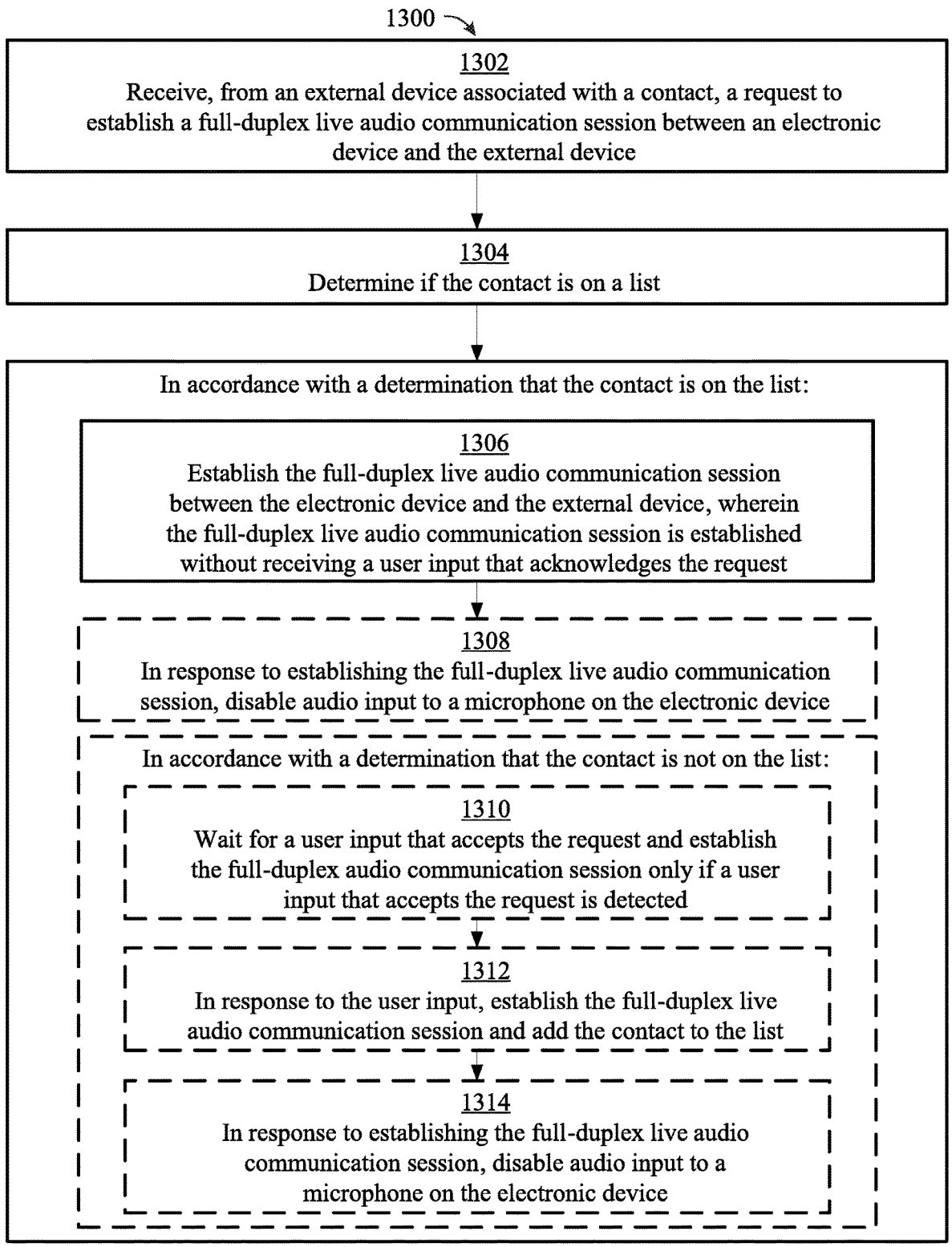
FIG. 13 is a flow diagram illustrating an example method for electronic voice communications, including establishing a live audio communication session, in accordance with some embodiments.
Figure 15:
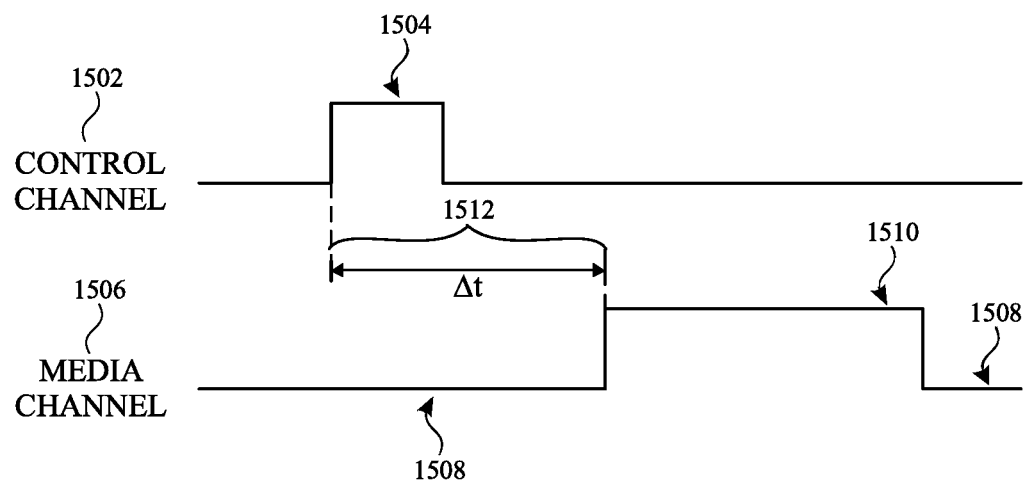
FIG. 15 illustrates receiving of control signal data on a first channel and receiving of audio data on a second channel during electronic voice communications, in accordance with some embodiments.
Figure 16:
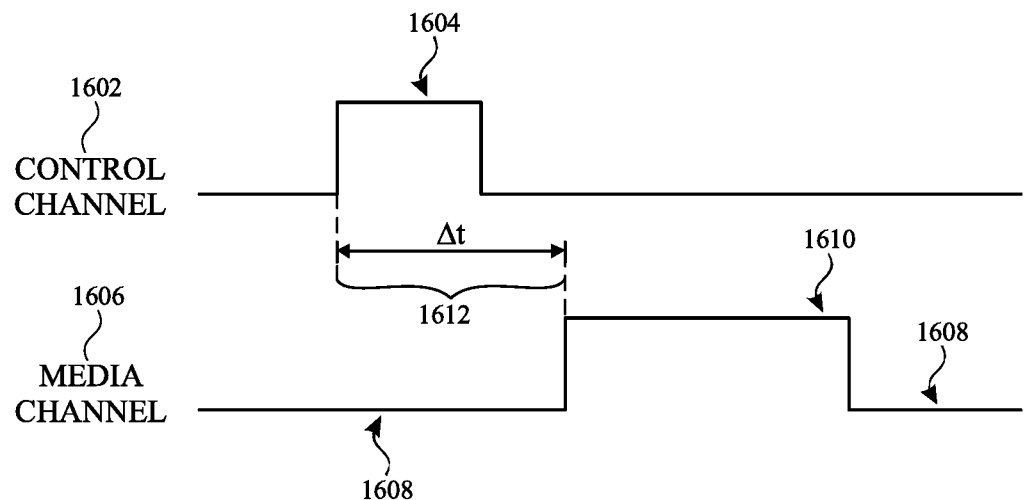
FIG. 16 illustrates transmitting control signal data on a first channel and transmitting audio data on a second channel during electronic voice communications, in accordance with some embodiments.
Figure 17:
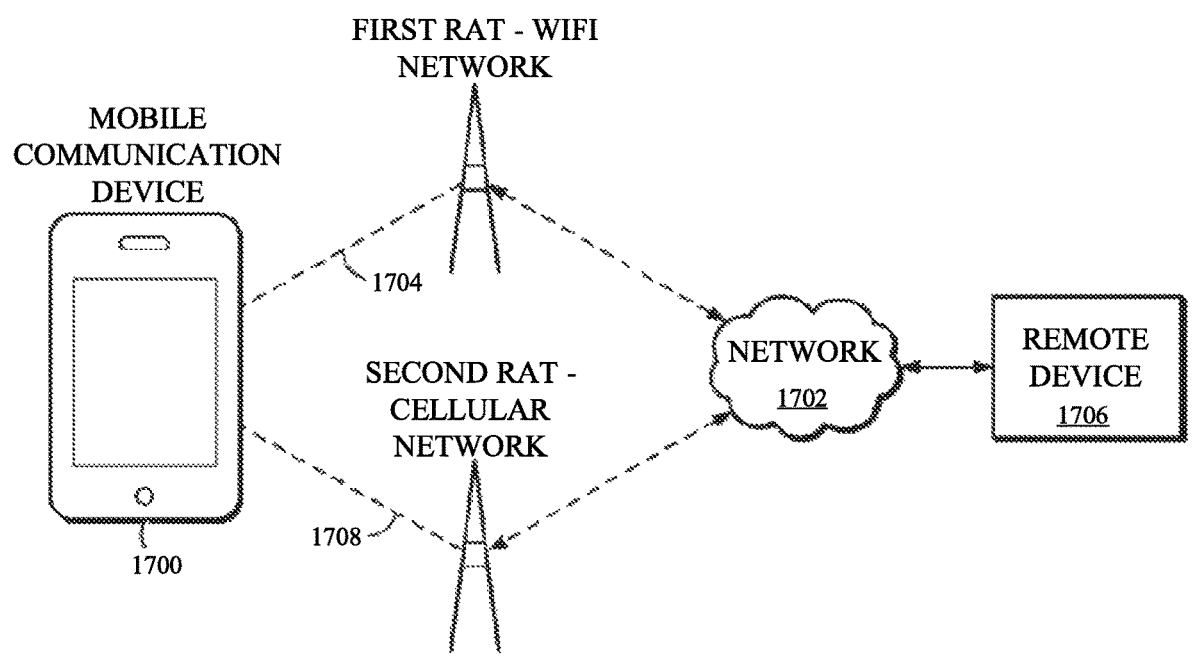
FIG. 17 illustrates an example wireless communication system in which an electronic device communicates with a network using two different channels, in accordance with some embodiments.
Figure 18:
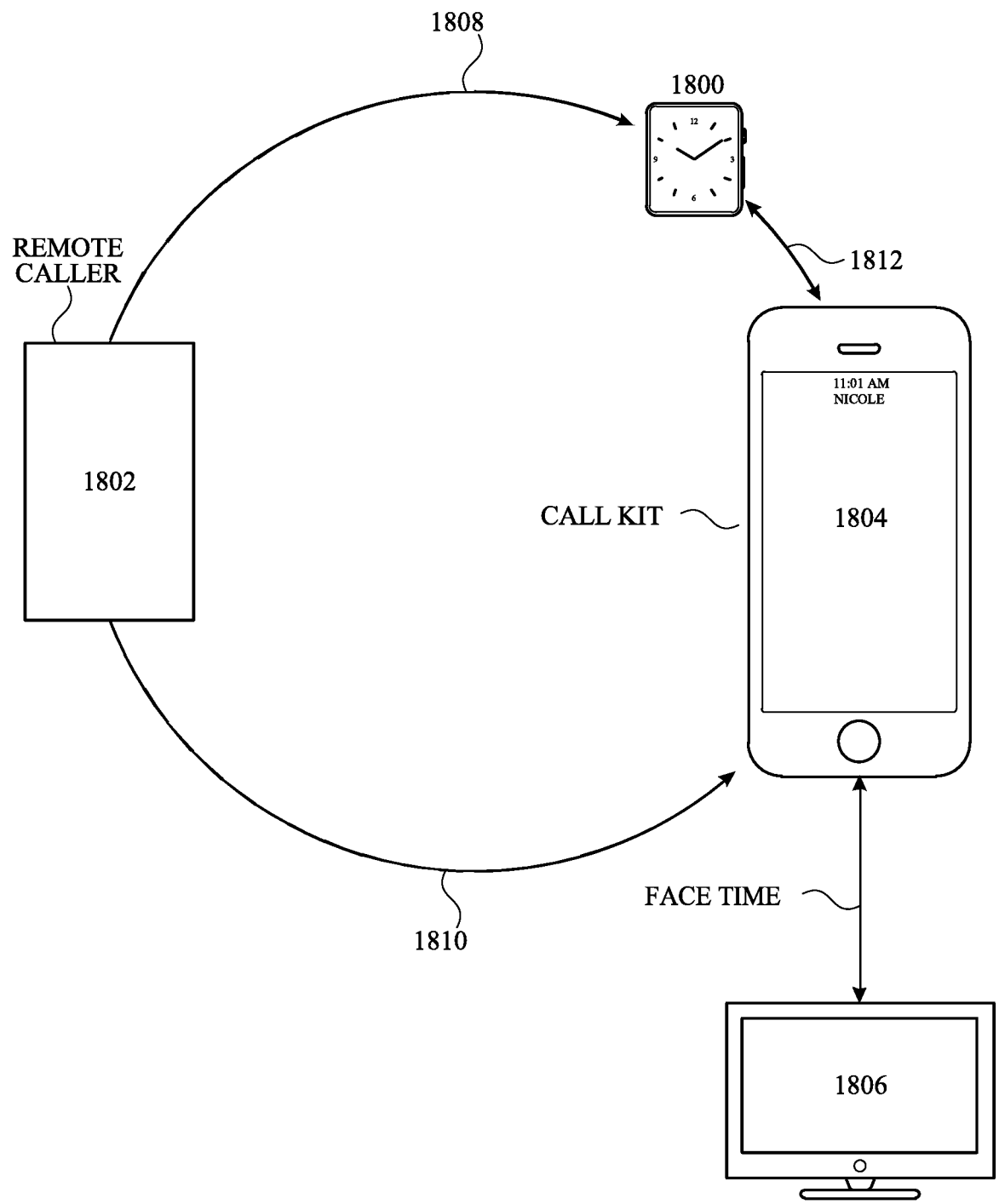
FIG. 18 illustrates two communication paths between an electronic device and an external device that is paired with a companion device, in accordance with some embodiments.
Figure 19A:
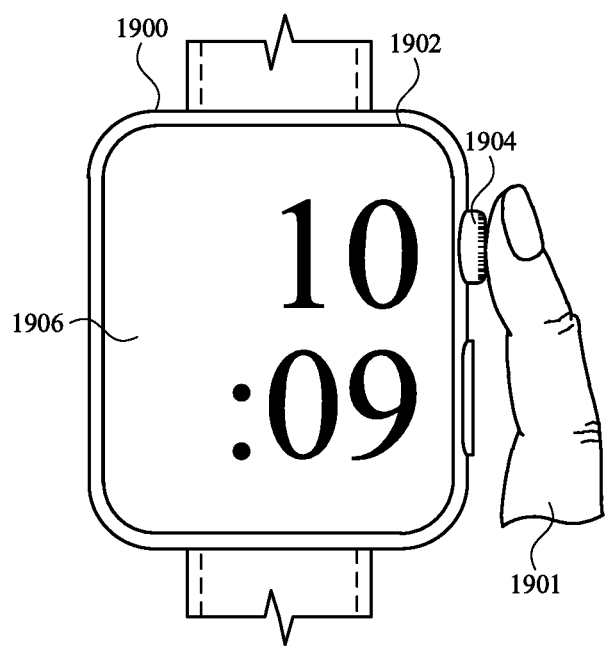
FIGS. 19A-19AC illustrate exemplary user interfaces for providing different types of feedback during a communication, in accordance with some embodiments.
Figure 20A:
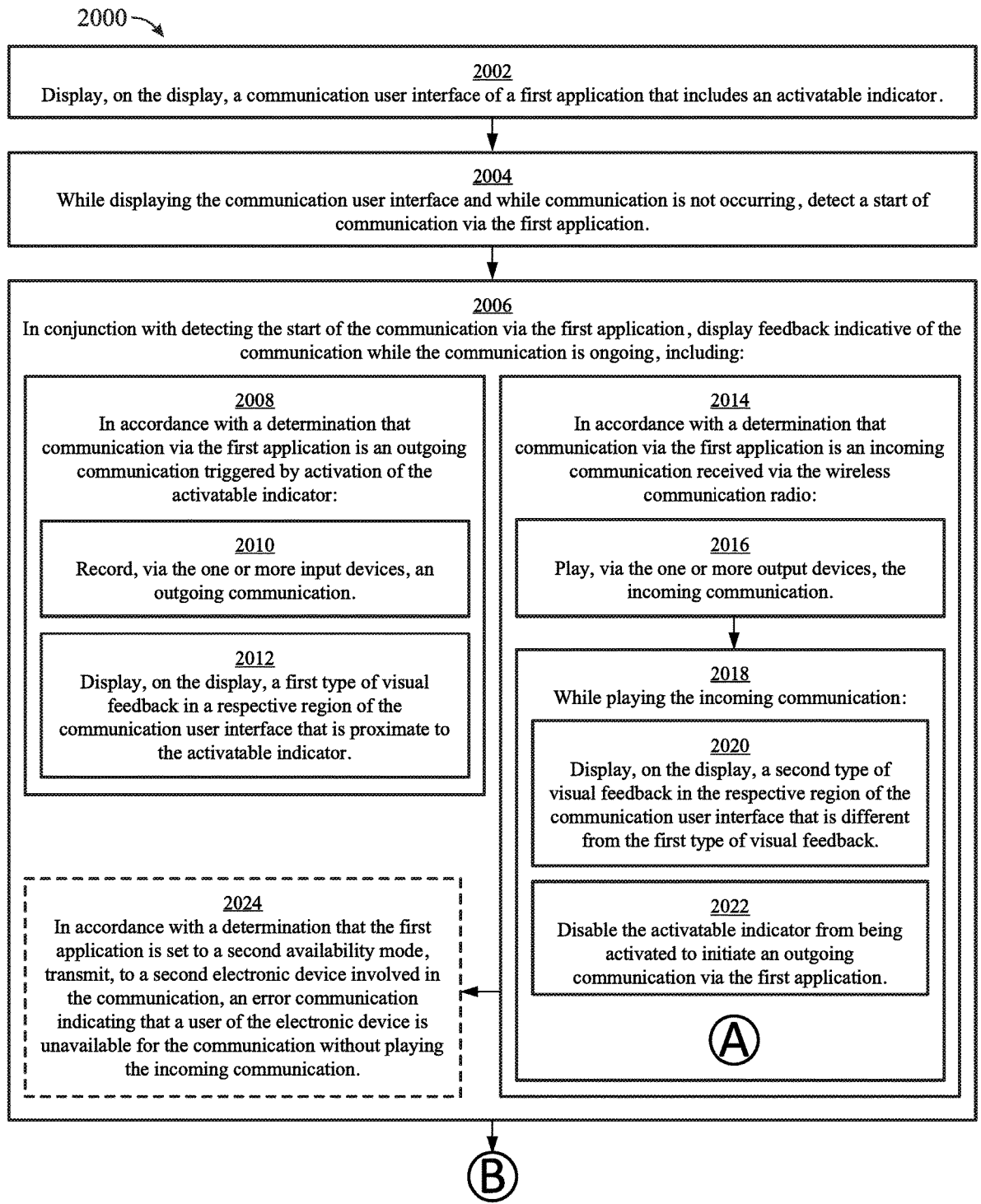
FIGS. 20A-20B are a flow diagram for providing different types of feedback during a communication, in accordance with some embodiments.
Figure 20B:
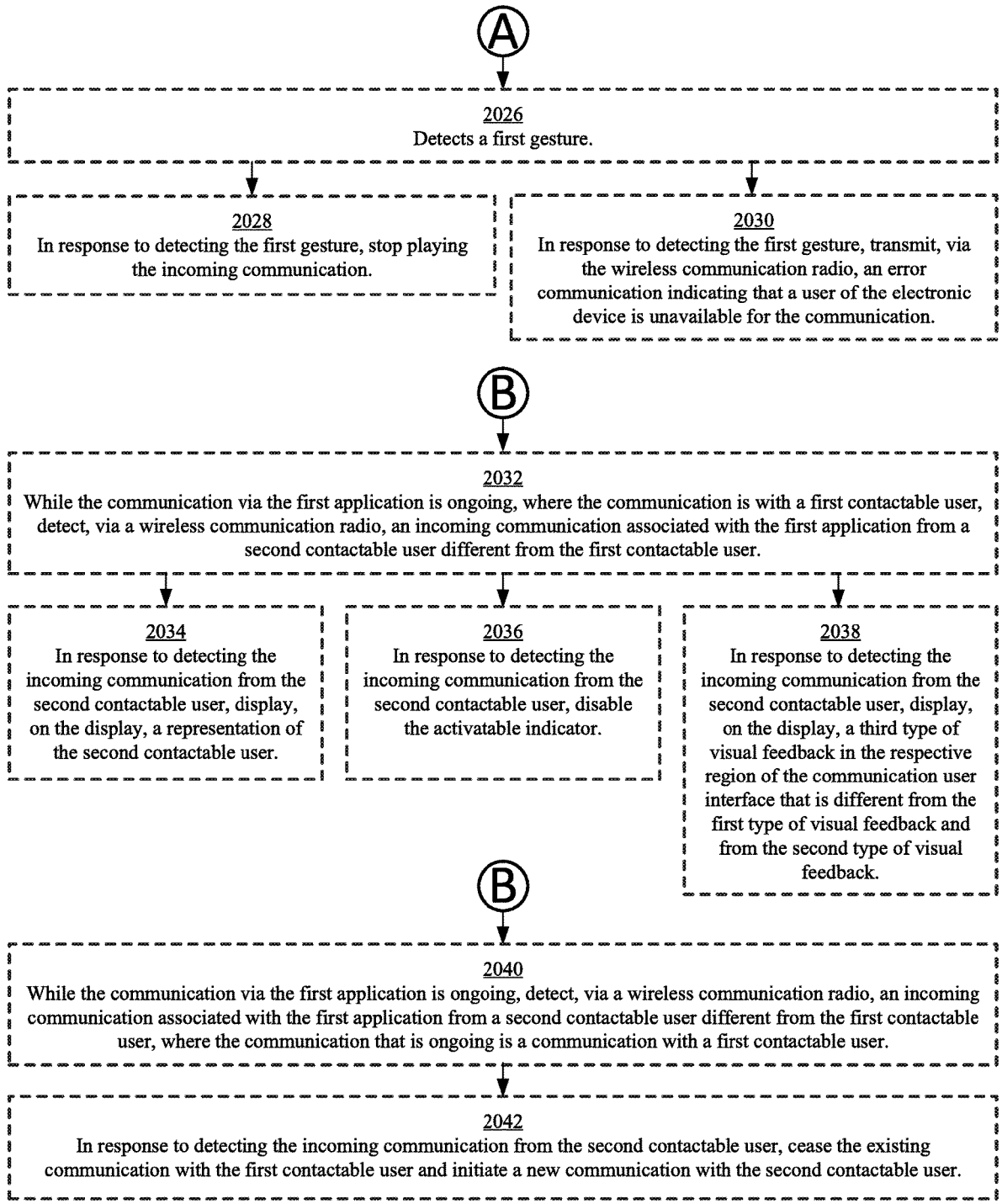
Figure 21A:
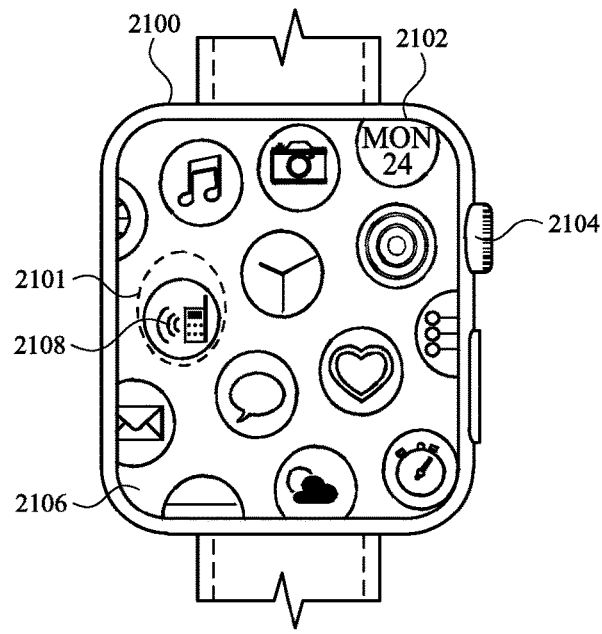
FIGS. 21A-21Y illustrate exemplary user interfaces for changing an availability mode and adding one or more contactable users, in accordance with some embodiments.
Figure 21Y:
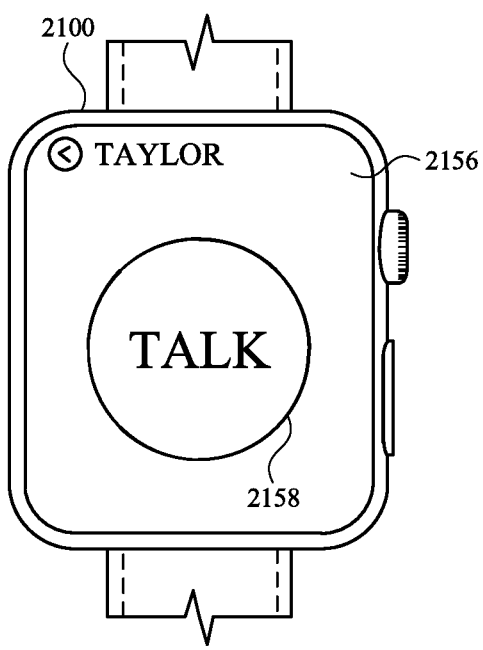
Figure 22A:
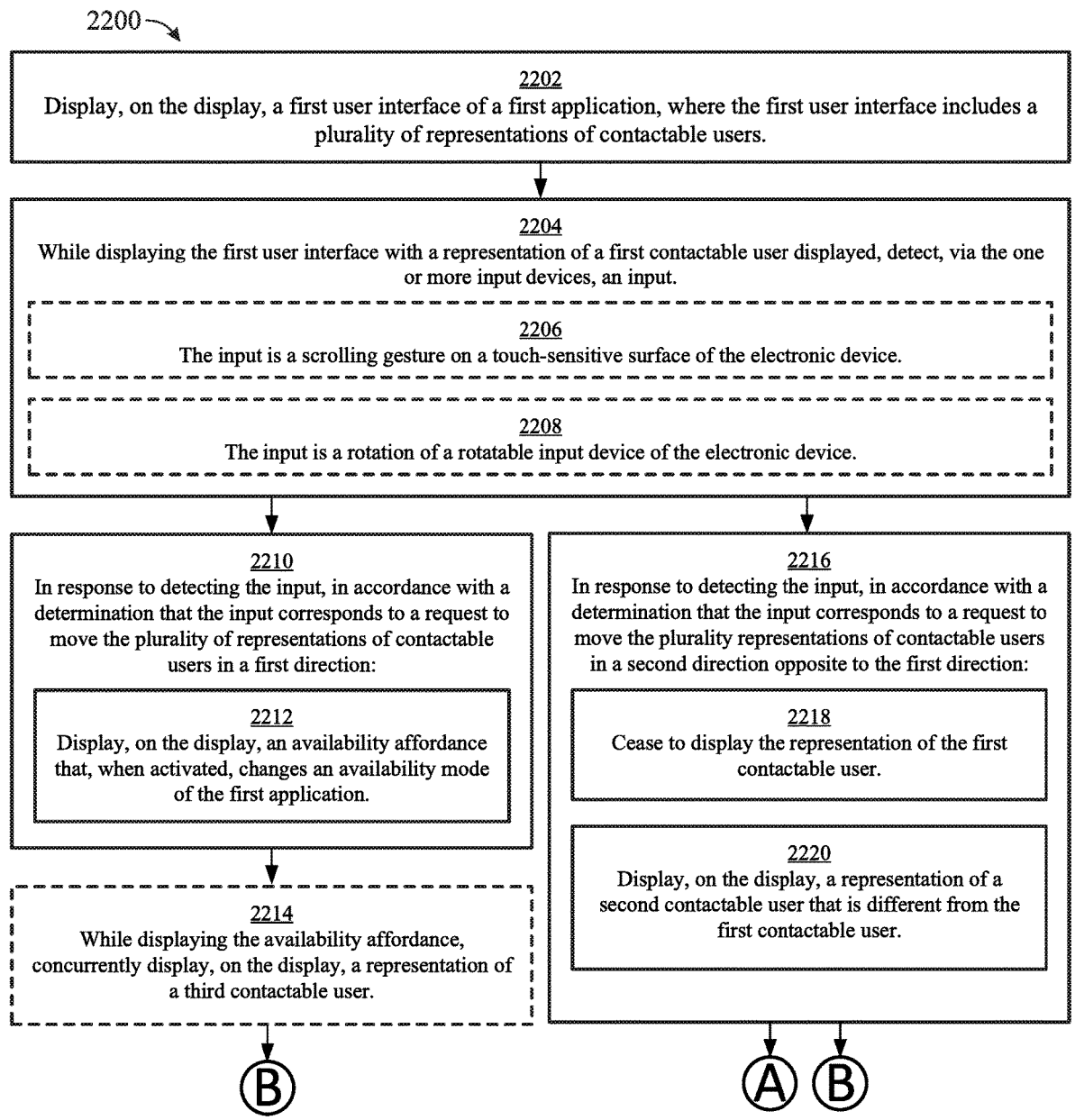
Figure 22B:
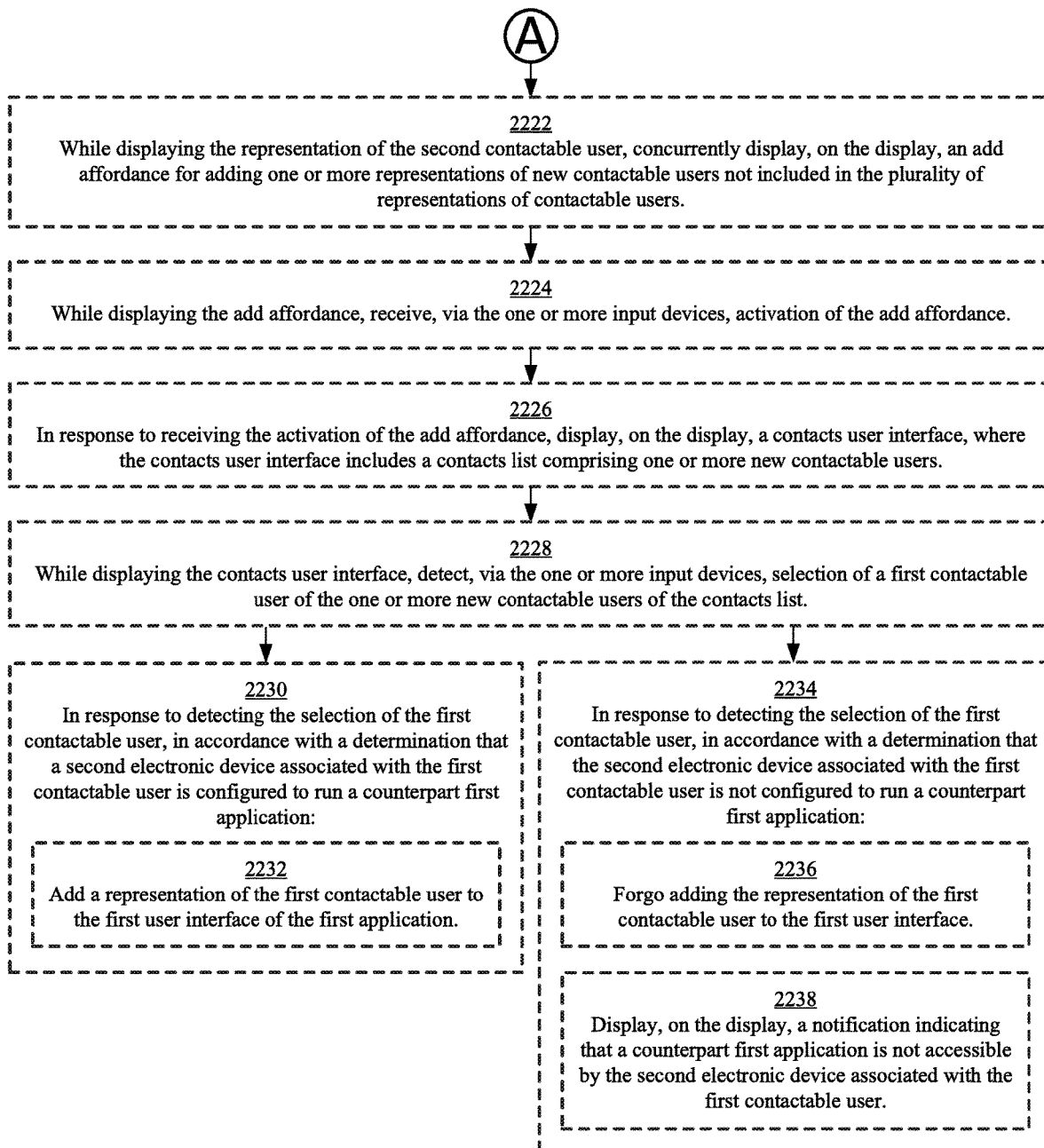

Below, FIGS. 1A-1B, 2, 3, 4A-4B, and 5A-5B provide a description of exemplary devices for performing the techniques for voice communications. In general, the set of FIGS. 6AA to 6AI through the set of FIGS. 6OA to 6OH illustrate exemplary techniques and user interfaces for voice communications. FIGS. 9 and 11 are flow diagrams illustrating methods for voice communications in accordance with some embodiments. The user interfaces in the set of FIGS. 6AA to 6AI through the set of FIGS. 6OA to 6OH are used to illustrate the processes described below, including the processes in FIGS. 9 and 11. The set of FIGS. 7AA to 7AI through the set of FIGS. 7EA to 7ED illustrate exemplary techniques and user interfaces for voice communications, including switching between contacts. FIG. 10 is a flow diagram illustrating methods for voice communications in accordance with some embodiments. The user interfaces in FIGS. 7AA to 7AI through the set of FIGS. 7EA to 7ED are used to illustrate the processes described below, including the processes in FIG. 10. FIGS. 8A-8X illustrate exemplary user interfaces for voice communications. FIG. 11 is a flow diagram illustrating methods of voice communications in accordance with some embodiments. The user interfaces in FIGS. 8A-8X are used to illustrate the processes described below, including the processes in FIG. 11. FIG. 12 is a flow diagram describing voice communication methods that include receiving control signal data and audio data. FIG. 13 is a flow diagram describing voice communication methods that include establishing live audio communication sessions. FIGS. 14A, 14B, 15, and 16 are used to further illustrate these techniques (including the processes depicted in FIGS. 9, 10, 11, 13, and 14) in accordance with some embodiments. FIG. 17 illustrates an exemplary wireless communication network for use in the voice communication methods of FIGS. 9, 10, 11, 13, and 14. FIG. 18 illustrates communication paths that include a companion device for use in the voice communication methods of FIGS. 9, 10, 11, 13, and 14. FIGS. 19A-19AC illustrate exemplary user interfaces for providing different types of feedback during a communication, in accordance with some embodiments. FIGS. 20A-20B are a flow diagram for providing different types of feedback during a communication, in accordance with some embodiments. The user interfaces in FIGS. 19A-19AC are used to illustrate the processes described below, including the processes in FIGS. 20A-20B. FIGS. 21A-21Y illustrate exemplary user interfaces for changing an availability mode and adding one or more contactable users, in accordance with some embodiments. FIGS. 22A-22C are a flow diagram for changing an availability mode and adding one or more contactable users, in accordance with some embodiments. The user interfaces in FIGS. 21A-21Y are used to illustrate the processes described below, including the processes in FIGS. 22A-22C.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
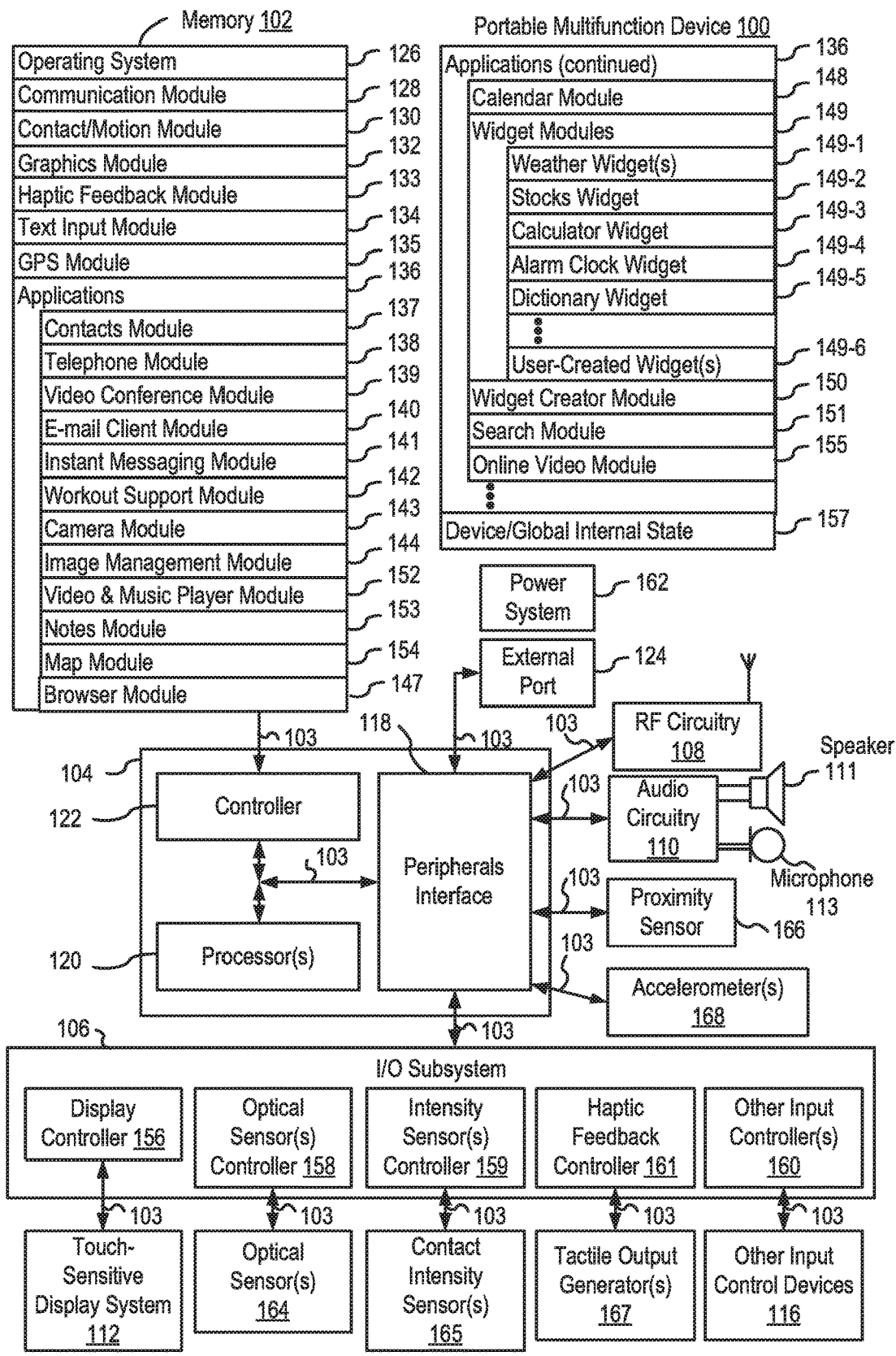
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (110) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.1 in, and/or IEEE 802.1 lac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, and joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
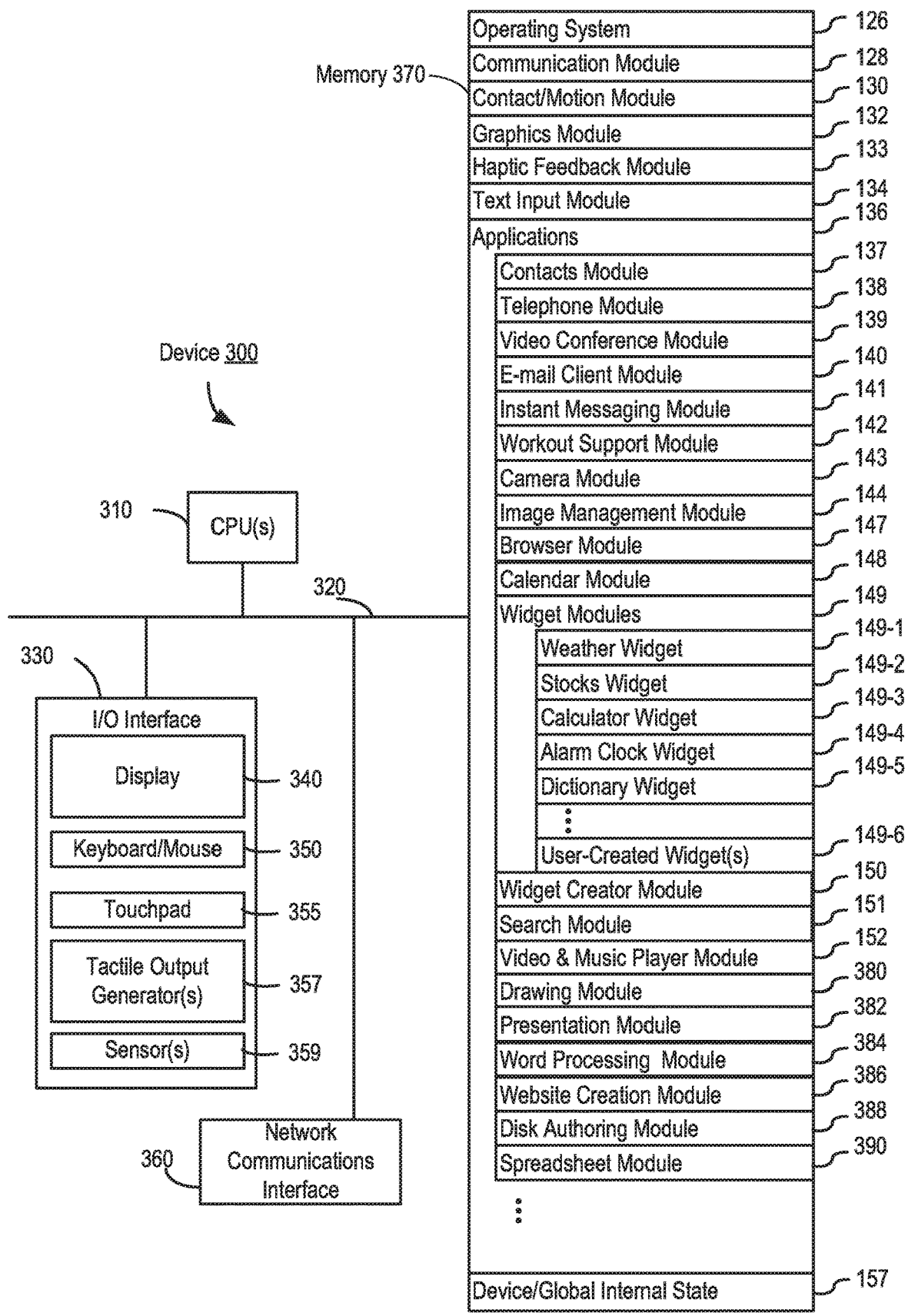
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module,
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout: and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo!Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
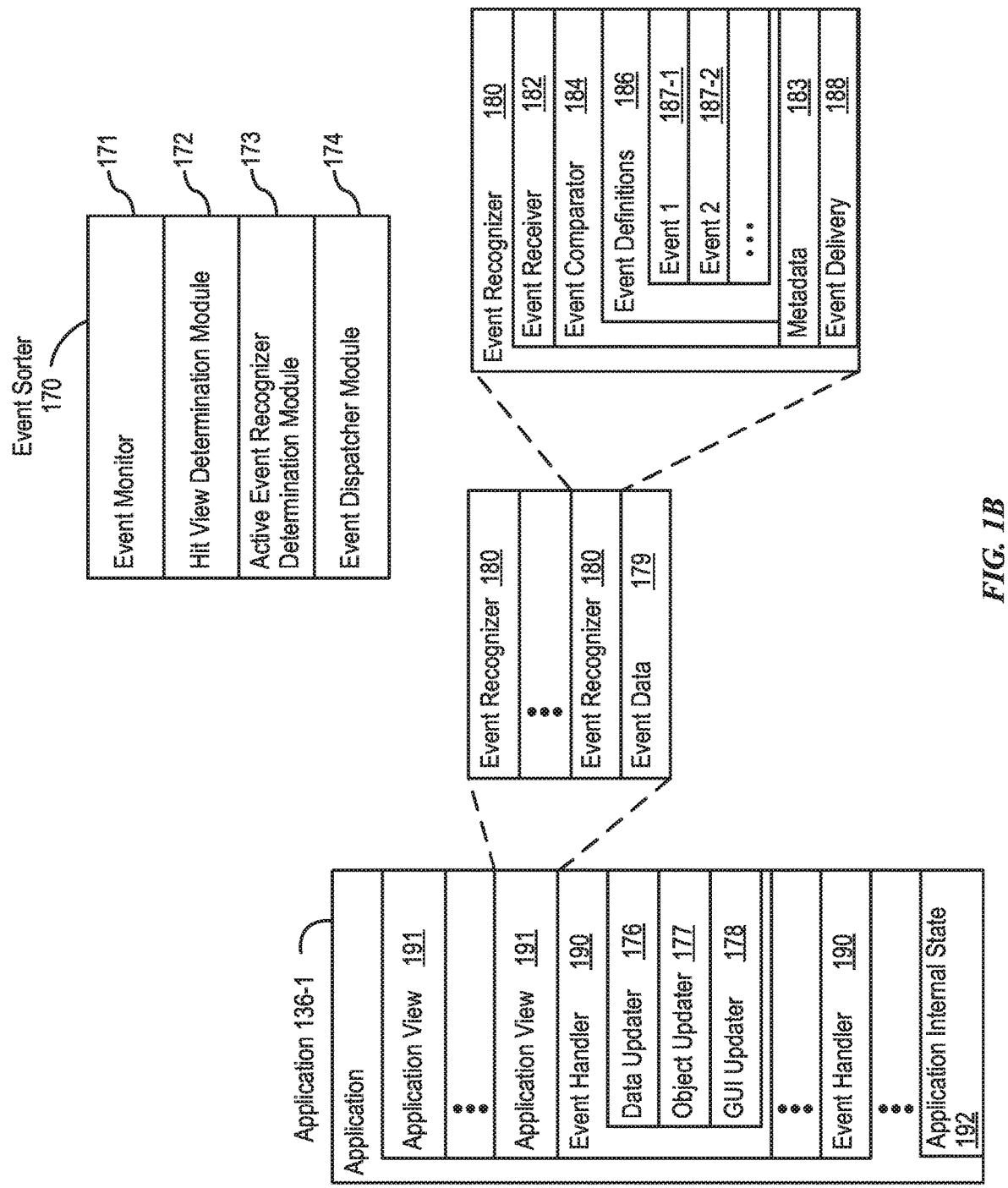
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
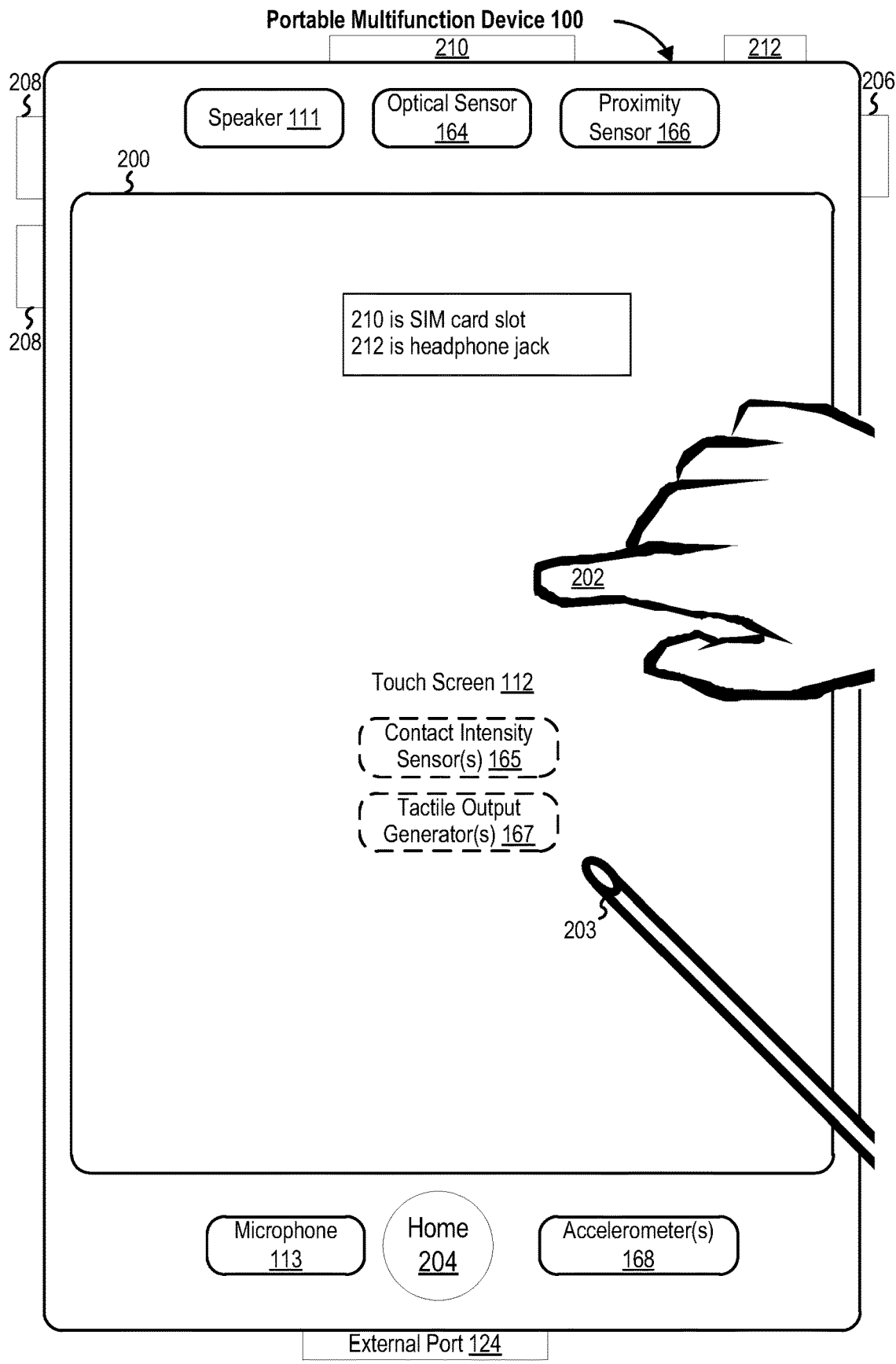
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
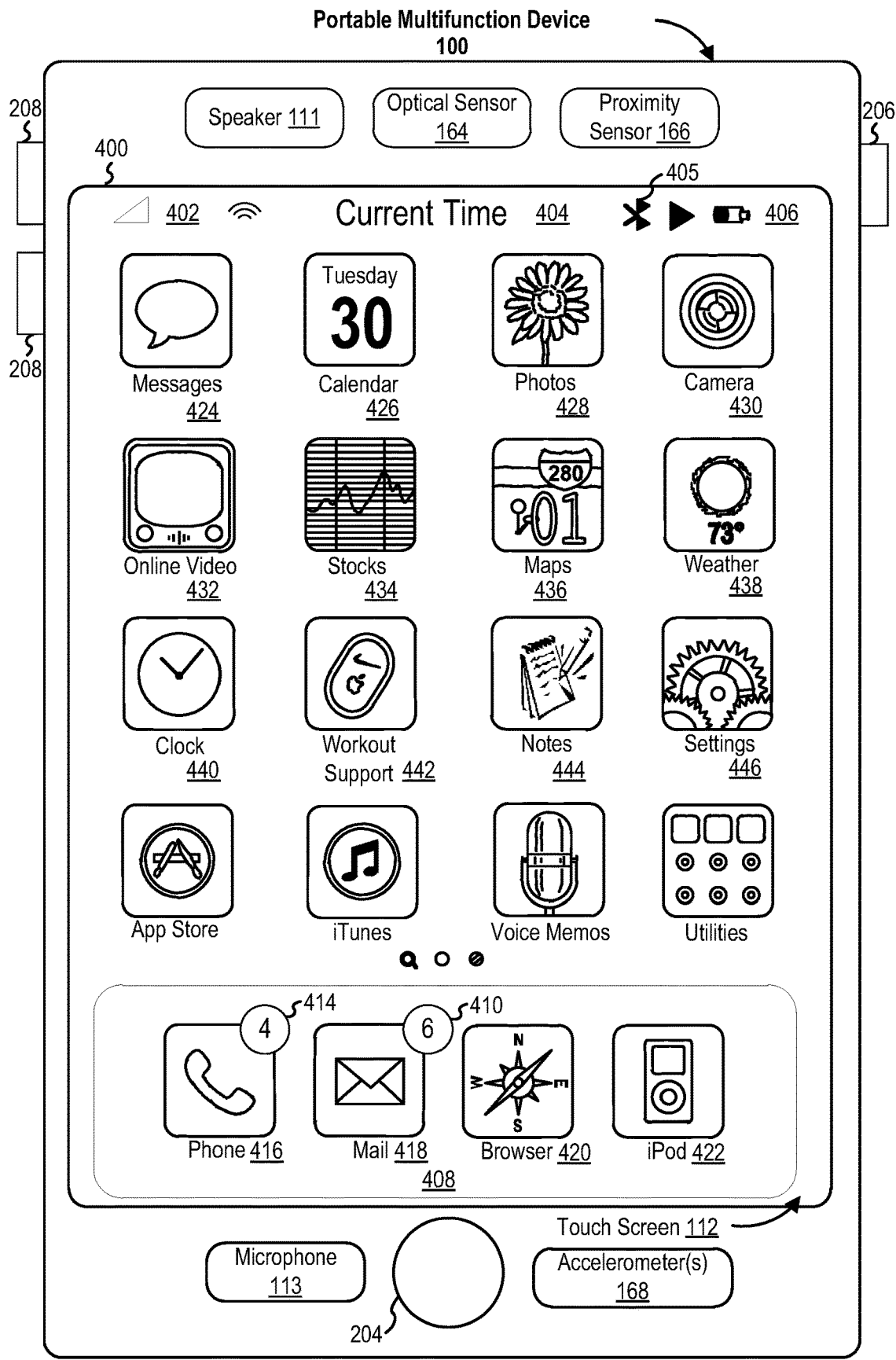
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
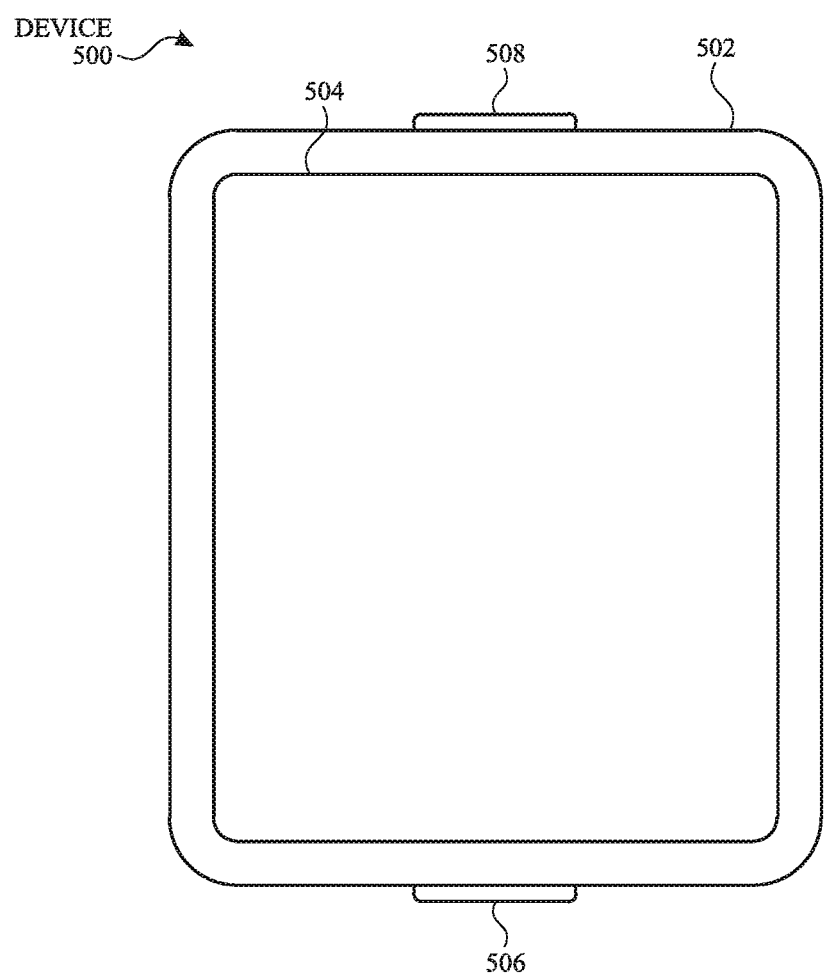
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
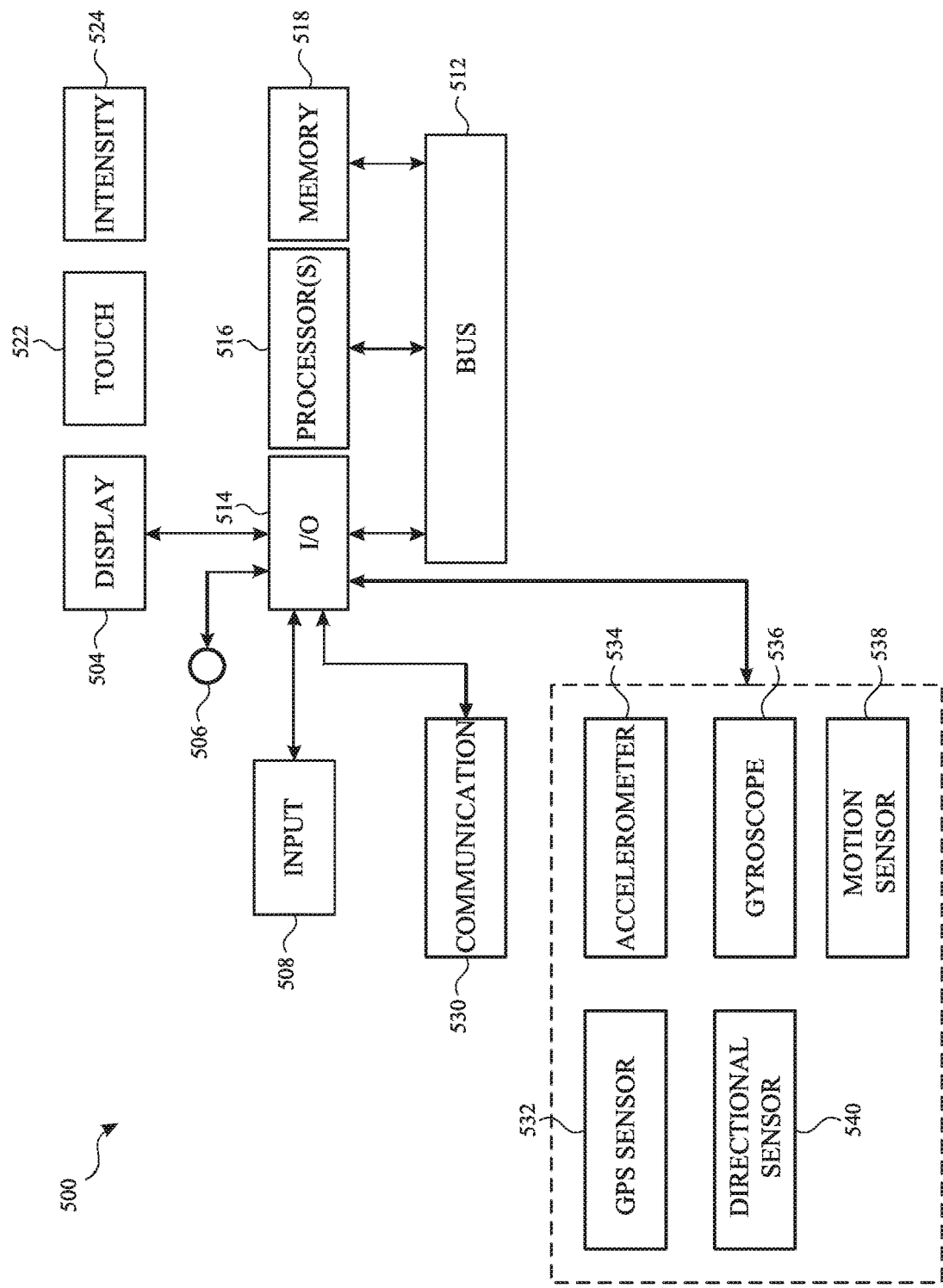
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 900-1100 (FIGS. 9-11) and processes 1200 and 1300 (FIGS. 12 and 13). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact.

In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:
  an active application, which is currently displayed on a display screen of the device that the application is being used on;
  a background application (or background processes), which is not currently displayed, but one or more processes for the application are being processed by one or more processors; and
  a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Referring now to an exemplary wireless communication network that is used by electronic devices, and to FIG. 17, mobile device 1700 (e.g., device 100, 300, or 500) communicates with network 1702 over primary communication channel 1704. Primary communication channel 1704 may allow transmission of media (e.g., voice, video, multimedia) data to and from mobile device 1700 according to various Voice over Internet Protocol (VoIP) methodologies. Generally, VoIP refers to technologies or methodologies by which multimedia and/or voice communication sessions are delivered over Internet Protocol (IP) networks (e.g., the public Internet), rather than traditional circuit switched networks such as the public switched telephone network. In particular, VoIP communications involve signaling and channel setup (sometimes referred to as session initiation) between VoIP-enabled devices and digital conversion of analog voice signals recorded on a device. Digitized media data is then transmitted in the form of IP data packets (encoded using a suitable audio or video codec) over one or more channels of a packet-switched network (e.g., communication channel 1704). Typically, these IP data packets are structured in standard formats according to a particular VoIP standard so that media, control, and other information is recognizable by VoIP enabled devices.

In the example of FIG. 17, primary communication channel 1704 is a WiFi network radio access technology (RAT), whereby mobile device 1700 (e.g., a device having one or more features of devices 100, 300, or 500) communicates with a remote device 1706 (e.g., an external device having one or more features of devices 100, 300, or 500) though network 1702 (e.g., a network including an internet server) using a WiFi access point. As discussed in more detail below, mobile device 1700 optionally also establishes a secondary communication channel 1708. In the example of FIG. 17, secondary communication channel 1708 is a cellular network RAT, whereby mobile device 1700 communicates with external device 1706 through a cellular base station. It should be appreciated that this example is merely illustrative. Secondary communication channel 1708 is, optionally, also a WiFi RAT or any other suitable radio access technology. Establishing secondary communication channel 1708 optionally allows mobile device 1700 to switch to another more suitable communication channel in case of deteriorating uplink quality on primary channel 1704.

Though not shown, external device 1706 optionally also has one or more communication channels to network 1702, which may be a WiFi, cellular, or any other suitable channel.

Exemplary techniques for voice communications (e.g., using VoIP) are found, for example, in related patents and patent application publications: U.S. Pat. No. 9,325,941, titled "Communication Channel Management for Real-Time Applications," filed May 30, 2014, U.S. Pat. No. 9,350,770, titled "Redundant Transmission Channels for Real-Time Applications on Mobile Devices," filed Jul. 23, 2014, U.S. Patent Publication No. 2014/0072000, titled "Adaptive Jitter Buffer Management for Networks with Varying Conditions," filed Sep. 6, 2013, published as WIPO Publication No. WO/2014/039843, and U.S. Pat. No. 9,628,758, titled "Communication Channel Management for Real-Time Applications," filed Mar. 15, 2016, each of which is hereby incorporated by reference with respect to their discussions of voice communication techniques and protocols.

Attention is now directed towards embodiments of user interfaces ("UI") and associated processes that are implemented on an electronic device, such as portable multifunction device 100, device 300, or device 500, to provide electronic communication functionalities, such as voice communications.

The following figures starting with the set of FIGS. 6AA to 6AI through ending with the set of FIGS. 6OA to 6OH illustrate exemplary user interfaces for electronic communications, and transitions between the user interfaces, in accordance with some embodiments. The user interfaces in these figures are used to illustrate the processes described below, including the processes shown at FIGS. 9 and 11. It is noted that the flow of the user interfaces presented herein are only some examples of a variety of possible flows available in the voice communications techniques disclosed herein, and that in some cases, the flow of user interfaces can be modified and/or rearranged without departing from the spirit of the invention.

FIGS. 6AA to 6AI depict exemplary user interfaces and transitions thereof for voice communications between the users of computing devices 600 and 699*a*. Each of devices 600 and 699*a* is device 100, 300, or 500 (FIGS. 1A-B, 3, and 5A-B) in some embodiments. For clarity, the top row of illustrations in FIGS. 6AA to 6AI corresponds to user interfaces displayed on device 600, and the bottom row of illustrations corresponds to user interfaces displayed on device 699*a*. For purposes of description, device 699*a* is referred to as external device 699*a*. It is contemplated that each of devices 600 and 699*a* displays user interfaces described below on a display screen in conjunction with a touch-sensitive surface, otherwise referred to as a touch-sensitive display screen. It is further contemplated that each of devices 600 and 699*a* includes a microphone (e.g., input mechanism 508, microphone 113, described above) for detecting voice input and a speaker (e.g., speaker 111, described above) for outputting audible data, including voice data, although such components can be provided externally in operative communication with the device (e.g., headphones).

As shown at FIG. 6AA, device 600 displays a talk user interface 602 for communicating with a user at external device 699*a*. For ease of description, the user at device 600 is named John Appleseed (also referred to as "John") and the user at external device 699*a* is a contact (herein also referred to as an external contact) named Jane Appleseed (also referred to as "Jane"). At device 600, the talk user interface 602 includes an affordance representing the external contact at the external device 699*a*, such as contact affordance 604 representing an image or headshot of Jane. In examples where an image of the contact is not available, other representations are provided at the affordance, such as a monogram based on first and last initials of the contact's name and/or an unknown silhouette. In some examples as discussed below, the contact affordance 604, and/or visual indications and animations displayed thereat, provide visual feedback indicating when voice communications are being received at device 600 from the contact's device 699*a*.

At device 600, the talk user interface 602 further includes a talk affordance 606 that when activated, initiates, captures, and/or sends voice communications from device 600 to the external device 699*a* in various methods described below. The talk affordance 606 can include text conveying instructions for activation, such as "press to talk." In some examples, talk affordance 606 is activated for a duration of time while a touch input remains detected on the affordance (e.g., at a location on the touch-sensitive display screen corresponding to the affordance, also referred to herein as a tap target area of the affordance). For instance, a press-and-hold gesture (e.g., finger gesture) that remains in contact with the touch-sensitive display screen for a prolonged duration before liftoff defines the duration of time that the talk affordance 606 is activated for causing capturing voice input from a speaker at the device 600 (e.g., John's device) and sending voice data corresponding to the voice input to the external device 699*a*.

For purposes of this disclosure, a press-and-hold gesture is utilized herein for activating the talk affordance 606. However, gestures other than press-and-hold gestures are contemplated, such as single or multiple tap inputs. Merely by way of example, a first tap on the talk affordance 606 activates the talk affordance 606 that stays activated until detection of a subsequent second tap input on the talk affordance 606 that deactivates its functionalities, thereby toggling the talk affordance on-and-off. Still, various other gestures, such as multiple-finger (e.g., multi-touch input) gestures, an on gesture (e.g., single tap) that is distinct from an off gesture (e.g., double tap), and/or activation of the talk affordance 606 via physical buttons, can be implemented for causing the functions associated with the talk affordance 606. In some examples as discussed below, the talk affordance 606, and/or visual indications and animations displayed thereat, provide visual feedback indicating when voice communications are being captured at device 600 and transmitted to the contact's device 699*a*.

At device 600, the talk user interface 602 provides a visual indication 608 that the talk affordance 606, or in general that voice communications occurring at the talk user interface 602 itself, is associated with the specific contact represented at the contact affordance 604. In the present example, visual indication 608 is a single border that surrounds contact affordance 604 and talk affordance 606, such as two merged circles surrounding the circle-shaped affordances 604,606. For example, the single border is a highlighted region or background displayed at or behind the affordances 604, 606 that is distinct from a background in remaining portions of the talk user interface 602. For example, the single border is a solid white background surrounding contact affordance 604 and talk affordance 606 while a remaining background of the talk user interface 602 is black. In some examples, the visual indication 608 distinguishes the contact in communication from other contacts not in communication when they are displayed in the talk user interface 602. Additional and/or alternative visual indications include matching colors at the contact affordance 604 and talk affordance 606, animations, visual linkages between the two separately displayed affordances 604,606, and so on. In another aspect, the talk user interface 602 including the talk affordance 606 and single contact affordance 604 without displaying other contacts is, in itself, a visual indication that the talk affordance 606 is currently associated with that contact only.

At device 600, the talk user interface 602 further includes a volume indicator 610 and a do-not-disturb toggle or switch 612. The volume indicator 610 provides visual indication of a volume level for outputting audio data, such as voice data representing Jane's speech that is received from the external device 699*a*. The switch 612 is displayed at an on position and can be toggled off (e.g., via tap input) to disconnect the device 600 from voice communications with the specific contact, Jane, and/or from all contacts, as described further below.

Further as shown in the present examples, while displaying the talk user interface 602, the device 600 further displays a current time 614 as an integrated element in the talk user interface 602 and/or displayed concurrently with the talk user interface 602. In some examples, the device 600 is a wearable electronic device, such as a smart watch having one or more input mechanisms 506 and 508 described above, such as a physically rotatable input mechanism 616 (e.g., a rotatable crown) and/or physical push-button mechanism 618. It is further noted that in the present example, the talk affordance 606 has a greater tap target area (e.g., activation area) and centralized placement on the touch-sensitive display than other affordances 604, 606, 610, 612 displayed in the talk user interface 602 to promote ease of activation while preventing accidental touch inputs from activating the other affordances.

Further as shown at FIG. 6AA, external device 699a is similar to device 600 and includes physically rotatable input mechanism 616a and/or physical push-button mechanism 618a. The external device 699a displays a similar talk user interface 602a having similar elements and voice communication functionalities as the talk user interface 614 described above, including a contact affordance 604a, talk affordance 606a, visual indication 608a, volume indicator 610a, do-not-disturb toggle or switch 612a, and current time 614a. At device 699a, the contact affordance 604a includes an image or headshot representation of John at device 600, and the visual indication 608a indicates that the talk affordance 606a, and in general that voice communications occurring at the displayed talk user interface 602a itself, is associated with John's device 600. It is noted that while in the present examples the talk user interfaces 602, 602a are largely similar, in some examples, various aspects of their display such as color, orientation and placement of graphical elements and affordances can be altered or adjusted by user customization. For clarity sake in the depiction of the figures, reference lines and numerals for the elements and affordances described herein may not be repeatedly shown at every figure, although the elements and affordances may be included or displayed in accordance with the embodiments being shown in the figures.

In FIG. 6AA, both devices 600 and 699a display the respective talk user interfaces 602, 602a indicating that they are both currently available and connected to a communication channel for voice communications with one another. For instance, in some examples, the talk user interface 602 is displayed at the device 600 only when both devices 600, 699a are currently available to capture voice inputs and send voice data corresponding to the voice inputs from the respective sending end to the respective receiving end where the received voice data is immediately and automatically output. In some examples, the communication channel is limited and dedicated to the devices 600, 699a only, such that additional external devices do not have access for connection to the communication channel. As described further below, in some examples the communication channel requires that each of the devices 600, 699a is directly connected to, and/or connected to via a relaying companion device, a communication network, such as a wireless communication networks described above, including Wi-Fi and cellular networks and Bluetooth connections.

Referring now to exemplary specifics of connections between devices, FIG. 18 illustrates two possible communication pathways between device 1800 (e.g., device 600 in FIG. 6AA) and an external device 1802 (e.g., device 699a in FIG. 6AA) associated with a remote caller. In some examples, external device 1802 is directly connected to device 1800 such that data transmitted (or received) by external device 1802 is transmitted a direct communication channel 1808 between devices 1800 and 1802 without an intermediary companion device (e.g., device 1804). In this case, a real-time voice communication session (e.g., according to processes 900, 1000, 1100, 1200 and/or 1300 described below) is established directly between device 1800 and external device 1802

In other examples, external device 1802 is connected to device 1800 through companion device 1804, which is paired to device 1800 (e.g., over WiFi or Bluetooth). In this case, a first voice communication session 1810 (e.g., a session according to processes 900, 1000, 1100, 1200 and/or 1300) is established between external device 1802 and companion device 1804, while a relay voice communication session 1812 (e.g., a session according to processes 900, 1000, 1100, 1200 and/or 1300) is simultaneously established between companion device 1804 and device 1800. Data received from external device 1802 through the first voice communication session 1810 may then be relayed to device 1800 using the relay voice communication session 1812.

In some embodiments, device 1800 and companion device 1804 may have multiple call kits that handle different types relay communication sessions between the two devices. For example, device 1800 and companion devices have standard call kits for a first type of communication session (e.g., a FaceTime Audio™ call or standard telephone call). This standard call kit may be made apparent by the user (e.g., by showing a banner notification on companion device during a call and other notification related to the call kit) and may be visible to other applications on device 1800 and companion device 1804 by their respective application program interfaces (APIs). However, the relay communication sessions of processes 900, 1000, 1100, 1200, and/or 1300 may be handled by a special call kit on device 1800 and companion device 1804. This special call kit may not provide any notifications on companion device 1804 and may be hidden from some or all other applications on companion device 1804 by its API, even if the data transmitted over the relay communication session is the same as a standard call. Since the special call kit handling voice communication sessions according to methods 900, 1000, 1100, 1200 and/or 1300 is less visible to companion device 1804 in one or more ways, a direct communication session between device 1800 and external device 1802 may present to the user in the same way as a relayed communication session involving companion device 1804.

In some embodiments, companion device 1804 is, optionally, configured to communicate over multiple radio access technologies (e.g., both WiFi and a cellular network, similar to mobile device 1700 of FIG. 17). In this case, companion device 1804 establishes the first voice communication session 1810 with external device 1802 on a primary communication channel using a first RAT (e.g., WiFi), and a secondary (redundant) communication channel with external device 1802 using a second RAT (e.g., a cellular network). In response to a deterioration or degradation in uplink quality on the primary communication channel (e.g., excessive data packet loss, latency issues, etc.), companion device 1804 optionally establishes the secondary communication channel to transmit voice and/or control data to external device 1802 in place of the primary communication channel. This ensures, under some circumstances, higher quality communications between device 1800 and external device 1802, as well as prevent dropped and interrupted sessions.

Optionally, companion device also establishes an additional voice communication session with a third device 1806, which may be a computer, TV, or any other suitable type of electronic device.

Turning now to FIG. 6AB, while devices 600, 699a are connected to the communication channel, device 600 detects a touch input 620 on talk affordance 606. In some examples, the touch input 620 is a press-and-hold gesture as described above. In some examples as shown at FIG. 6AB, in response to detecting the touch input 620 at talk affordance 606, device 600 issues a perceptual output 622 including a haptic output and/or audible output. In practice, perceptual output 622 contributes to simulation of a walkie-talkie communication experience and is issued prior to activating the microphone at device 600 and/or prior to capturing voice input at the microphone, thereby indicating to John that he is live, and that voice input is about to be captured and transmitted to Jane's external device 699a.

Turning now to FIG. 6AC, in some examples as shown at FIG. 6AC, a visual input indication 624 is displayed in response to detecting the touch input 620. For example, visual input indication 624 is displayed during and/or immediately following issuing the perceptual output 622. The visual input indication 624 provides visual feedback that the talk affordance 606 is activated, and in other words the device 600 is capturing (e.g., registering) any voice inputs detected at the microphone and concurrently sending the voice data corresponding to the voice input to external device 699a for the duration of the activation. For example, as shown in FIGS. 6AC to 6AF, visual input indication 624 is displayed for the duration of the touch input 620 while John is speaking out loud, where John's speech is being captured at the microphone and sent to external device 699a. In the current example, visual input indication 624 is an animation of ripples emerging from the talk affordance 606 and/or circles circling the talk affordance 606. Additionally and/or alternatively, visual input indications can include altering a color of the talk affordance 606 and/or the background of the talk user interface 602 during the activation to distinguish the talk affordance 606 from the inactivated state. As shown at FIGS. 6AB to 6AF, touch input 620 remains on talk affordance 606 for the duration of the activation and upon detecting liftoff of the sustained touch input 620 at FIG. 6A-7, activation of talk affordance 606 ceases. When talk affordance 606 is no longer activated, visual input indication 624 disappears, indicating device 600 is not currently capturing voice input and sending voice data to external device 699a, and in some cases turns off the microphone at device 600. In further examples, device 600 issues another perceptual output upon detecting liftoff or deactivation of the talk affordance 606 to further indicate that voice input is no longer being captured and outgoing data is no longer being sent from device 600.

Turning back to FIG. 6AB, Jane's external device 699a receives an indication from John's device 600 that talk affordance 606 at John's device 600 has been activated. In response, external device 699a issues perceptual notification 626a, which includes a haptic output and/or audible output. In some cases, perceptual notification 626a includes both haptic and audible outputs issued simultaneously (e.g., vibration and ding). In practice, perceptual notification 626a indicates that incoming voice data through the communication channel is being received and is soon to be output, automatically, at speakers at device 699a. In some examples, perceptual notification 626a is similar to perceptual output 622 issued at John's sending device 600 in response to the activation, and/or occurs simultaneously or near-simultaneously at both devices 600, 699a, depending on network latency and other factors. In some examples, perceptual notification 626a is distinct from perceptual output 622, and/or perceptual notification 626a is unique to the sending contact, such that the user at the receiving end can immediately distinguish the source of the incoming voice data without visually observing the talk user interface 602a. In some examples, perceptual notification 626a contributes to simulation of a walkie-talkie communication experience and is issued prior to initiating audio output corresponding to the incoming voice data itself, thereby providing an indication to Jane that voice data is being received and output thereof is about to occur.

Referring now to exemplary specifics of signal exchange from the perspective of device 699a, device 600 and device 699a are connected through a live audio communication in the example shown in FIGS. 6AA to 6AC (e.g., when both devices display talk user interfaces). The live audio communication session occupies one or more communication channels and is configured to transmit control signal data as well as media (e.g., audio) data between devices 600 and 699. In the embodiment of FIG. 15, the live audio communication session occupies a control channel 1502 and a separate media channel 1506 connecting devices 600 and 699b. For example, media channel 1506 is, optionally, a VoIP channel that transmits live audio data according to the Real-Time Transmission Protocol (RTP) standard. In this case, control channel 1502 is, optionally, a separate VoIP channel that transmits control signal data according to the Real-Time Transmission Control Protocol (RTCP) standard. In some embodiments, the live audio communication session between John's device 600 and Jane's device 699 is established before either talk affordance 606 or talk affordance 606a can be activated.

Referring still to the waveform diagram of FIG. 15, device 699a receives control signal data 1504 from external device 600 over control channel 1502 at some point after the live audio communication session has been established. In some embodiments, the control signal data 1504 is transmitted to device 699a when the user activates talk affordance 606 on device 600. In the example discussed above, control signal 1504 is, optionally, encoded in the application-specific data of a Real-Time Transfer Control Protocol (RTCP) signal. In the example of FIG. 15, control signal 1504 presents as a rising signal edge on control channel 1504 (e.g., signal goes high from a default-low state). In other embodiments not shown, control signal 1504 optionally presents as an interruption in a steady-state high signal (e.g., a falling signal edge on control channel 1502).

In response to receiving control signal data 1504, device 699a issues a perceptual notification (such as notification 626a) to the user. The perceptual notification is, optionally, an audio, visual, or haptic alert, or any combination thereof. As discussed above in connection with FIG. 6AB, under some circumstances, the perceptual notification indicates to a user of device 699a that the talk affordance on the external device (e.g., talk affordance 606 on device 600) has been activated and that corresponding audio data is incoming.

Referring still to FIG. 15, device 699a receives audio data 1510 from device 600 over media channel 1506 after receiving control signal data 1504. In the example of FIG. 15, voice audio data 1510 is provided in a digital data stream that encodes a voice signal (e.g., the voice signal picked up by the microphone (e.g., microphone 113) on external device 600 after activating talk affordance 606) and is interspersed in an existing audio data stream transmitted over media channel 1506. In the case of a full-duplex audio session, baseline audio data 1508 (e.g., a baseline signal from a muted microphone) is, optionally, still transmitted on media channel 1506 even though it does not encode a voice signal recorded at device 600. In this case, baseline audio data is optionally transmitted at a lower bit rate than audio data 1510, which encodes a voice signal. Audio data 1510 and baseline audio data 1508 is optionally compressed using MPEG, AWS, EVS, ACELD, or any other audio codec suitable for real-time applications. In the embodiment of FIG. 15, there is a predetermined time period 1512 between receiving control signal data 1504 and receiving voice audio data 1510. This predetermined time period may be 100 ms, 150 ms, 250 ms, 500 ms, 1s, or another other suitable time period.

After issuing the perceptual notification and receiving voice audio data 1510, device 699a outputs voice audio data from a speaker (e.g., speaker 111). In some examples, voice audio data 1510 is transcoded or otherwise converted into analog sound or voice signals prior to output. In some embodiments, there is a second predetermined time period between issuing the perceptual notification and playing back voice audio data 1510. This second predetermined time period may be 100 ms, 150 ms, 250 ms, 500 ms, 1s, or another suitable time period. In one such embodiment, the predetermined time period between receiving the control signal and receiving the audio data is the same duration as the predetermined time period between issuing the perceptual notification and outputting the audio data. In other embodiments, the first predetermined time period is a different duration than the second predetermined time period.

In some embodiments, device 699a is configured to disable audio input to its microphone (e.g., microphone 113) in response to receiving control signal data 1504. In one such embodiment, receiving control signal data 1504 disables talk affordance 606a, thereby preventing the user of device 699a from activating the microphone. In another such embodiment, device 699a optionally mutes its uplink connection to media channel 1506 in response to receiving the control signal, thereby preventing audio data from being sent to device 600. Since control signal data 1504 is received before incoming voice audio data 1510, disabling audio input to the microphone in this manner effectively prevents device 699a from sending voice audio data to device 600 immediately prior to receiving and during playback of incoming voice audio data 1510. Thus, even if the live audio communication session is a full-duplex connection between devices 699a and 600 (e.g., the session allows sending and receiving audio data simultaneously), disabling audio input in response to the control signal allows, in some cases, only one of devices 699a and 600 to transmit audio data at any given time. Alternatively or additionally, device 699a optionally does not transmit audio data on media channel 1506 while audio data 1510 is being received (e.g., device 699a mutes its uplink to media channel 1506). The microphone, the transmitter, the analog-to-digital converter associated with the transmitter and/or the audio codec associated with the transmitter on device 699a are, optionally, also powered down while receiving audio data 1510, lowering or eliminating power on media channel 1506 and/or control channel 1510. This configuration, in some embodiments effectively simulates a half-duplex connection (similar to the connection between two conventional walkie-talkie devices) in a full-duplex environment while also conserving power on device 699a.

In some embodiments, audio input to the microphone is optionally disabled for a predetermined time period in response to receiving the control signal. In other embodiments, audio input to the microphone is disabled until an additional control signal is received. The additional control signal, in some cases, indicates that transmission of audio data 1510 is complete, and is optionally generated in response to deactivation of the talk affordance (e.g., talk affordance 606) on the sending device. In other embodiments, audio input to the microphone is disabled in response to receiving control signal 1504 until the speaker on the receiving device (e.g., speaker 111 on device 699a) finishes outputting the accompanying voice audio data 1510.

As discussed below in connection with FIGS. 6EA and 6EB, devices 600 and/or 699a optionally suppresses perceptual notifications (e.g., alert banners, audio alerts, and haptic alerts) from external applications (e.g., outside notification 664a) for some or all of the time in which the live audio communication session is active. In particular, device 699a optionally forgoes issuing perceptual notifications from applications other than the application associated with the talk user interface in response to receiving control signal 1504. In some embodiments, notifications from other (e.g., external) applications are suppressed for a predetermined time period after receiving control signal 1504. Perceptual notifications from other applications suppressed in response to the control signal optionally include audio, visual and/or haptic alerts corresponding to receipt of a text message, e-mail alert, and so on. In some cases, the suppressed perceptual notifications are then issued after the predetermined time period elapses or after the live audio communication session between devices 600 and 699a is terminated.

In the example of FIG. 15, device 699a receives control signal data 1504 on control channel 1502 and receives audio data 1510 on a separate media channel 1506. In this case, the live audio communication session is allocated two separate communication channels for exchanging control and audio data. It should be appreciated that this example is merely illustrative. In other embodiments, control signal data (e.g., control signal data 1504) and audio data (e.g., audio data 1510) are received by device 699a on the same communication channel. For example, the audio data optionally contains a stream of audio data packets, each with a header (e.g., non-audio encoding information) and a payload that encodes a voice signal. In such embodiments, the control signal data is, optionally, encoded in the header of one or more data packets in the audio data steam (e.g., the first packet in the audio data stream). As an example, if audio data is transmitted to device 699a according to the RTP standard, the corresponding control signal data is, optionally, encoded in the RTP extension header of the first RTP packet in the audio data stream. Alternatively or additionally, if audio data is transmitted to device 699a according to the TCP standard, the corresponding control signal data is, optionally, encoded in the TCP extension header of the first TCP packet in the audio data steam.

While the above discussion of FIG. 15 mentions RTP as a possible signaling standard for exchanging audio data 1510 on media channel 1506, it should be appreciated that any VoIP standard suitable for transmission of real-time audio data between two devices can be used. In other embodiments, audio data is transmitted according to the Secure Real-Time Transfer Protocol (SRTP), Universal Datagram Protocol (UDP), Transmission Control Protocol (TCP), FaceTime Audio™, or any other signaling standard suitable for real-time media communications.

Similarly, while the above discussion of FIG. 15 mentions RTCP as a possible signaling standard for exchanging control signal data 1504 on control channel 1502, it should be appreciated that any VoIP standard suitable for transmitting signaling data in a real-time media communication session can be used. In other embodiments, control signal data is transmitted according to the Session Initiation Protocol (SIP), Real-Time Transfer Protocol (e.g., in an RTP extension header), Transmission Control Protocol (e.g., in a TCP extension header), or any other signaling standard suitable for exchanging control signals related to real-time media communications.

In some examples as shown at FIGS. 6AC to 6AF, visual output indication 628a is displayed at external device 699a during and/or immediately following issuing the perceptual output 622 and during audio output 630a of the voice data received from John. The visual output indication 628a provides visual feedback that John is activating the talk affordance 606 at his device 600, and that voice data corresponding to John's voice input is being sent to external device 699a and is being output. In some examples, visual output indication 628a is displayed for the duration of the audio output 630a, as shown through FIGS. 6AC to 6AF and disappears when John ceases activation of the talk affordance 606 at FIG. 6AG when John finishes talking. At FIG. 6AG, voice data is no longer being received at external device 699a since activation of the talk affordance 606 at sending device 600 has ceased. In the current example, visual output indication 628a is an animation of ripples emerging from the contact affordance 604a and/or animated circles at the contact affordance 604a, and/or similar to the visual input indication 624. Additionally and/or alternatively, visual output indications can include altering a color of contact affordance 604a and/or the background of the talk user interface 602a during the activation. In further examples, the external device 699a issues an end-of-message perceptual notification including a haptic output and/or audible output to indicate an end of the audio output 630a and/or serve as indication to Jane that the communication channel is now open for her to respond to John.

As shown at FIGS. 6AD to 6AE, a volume level of the audio output 630a of voice data is adjustable at external device 699a while outputting the voice data. In the present example at FIG. 6AD, rotational input 632 received at the rotatable input mechanism 616a decreases the volume level of audio output 630a, as reflected in the decreased audio output 630a of FIG. 6AE. A rotational input in the opposite direction of rotational input 632 increases the volume level. The volume indicator or volume icon 610a is animated in accordance with the rotational input 632 to reflect the adjusted volume level. In some examples, the volume level is decreased to a minimum level at the external device 699 such that external device 699a receives voice data and outputs audio corresponding to the voice data at a volume level that cannot be heard by the user, while visual output indication 628a is still displayed and perceptual notification 626a is still issued. The volume level remains at the adjusted volume level for at least a duration of a talk session between the users at the communication channel, in some embodiments, as shown through at the volume icon 610a through FIGS. 6AE to 6AI.

As further at FIGS. 6AG to 6AI, at FIG. 6AG John finishes talking at device 600 and both devices 600, 699a, display their respective talk user interfaces 602, 602a, indicating that the communication channel is open and no voice data is currently being communicated at the channel. At FIG. 6AH, Jane responds to John's message by touch input 620a at talk affordance 606a. In response to detecting touch input 620a, external device 699a issues a perceptual output 622a (similar to perceptual output 622) and signals John's device 600 that talk affordance 606a has been activated at the external device 699a. In response, John's device 600 issues perceptual notification 626 (similar to perceptual notification 626a). At FIG. 6AI, Jane's external device 699a detects voice input from Jane and transmits the voice data to John's device 600, causing audio output 630 of Jane's voice data while displaying visual output indication 628 (similar to visual output indication 628a) at the contact affordance 604 representing Jane, indicating that Jane is talking and audio is being output. Meanwhile at Jane's external device 699a, visual input indication 624a (similar to visual input indication 624) is displayed at talk affordance 606a while touch input 620a is detected at the talk affordance 606a, indicating that device 699a is capturing Jane's voice input at the microphone at device 699a and transmitting voice data corresponding to the voice input to device 600. It is contemplated that due at least in part to the immediateness of the voice communications described herein, where voice inputs at one end are immediately sent for automatic output at the receiving end, the voice communications techniques and user interfaces presented herein offer a heightened personal form of holding conversation through electronic communications.

Referring now to the specifics of transmitting voice audio data to an external device from the perspective of device 699a, device 600 and device 699a are still connected through the live audio communication in the example shown in FIGS. 6AG to 6AI (e.g., when both devices display talk user interfaces). In the embodiment of FIG. 16, the live audio communication session occupies a control channel 1602 and a separate media channel 1606 connecting devices 600 and 699a. Control channel 1602 and media channel 1606 are, optionally, the same communication channels as control channel 1502 and 1506 shown in FIG. 15, respectively. In some cases, control channel 1602 is different from control channel 1502 and/or media channel 1606, in some cases, is different from media channel 1506 (e.g., if the audio communication session between device 600 and 699a is dropped and subsequently re-established).

Referring to the example of FIG. 16, control signal data 1604 is transmitted to device 600 over control channel 1602 and audio input to the microphone (e.g., microphone 113) on device 699a is enabled. The audio input to the microphone is, optionally, enabled in response to receiving a user input at device 699a (e.g., user touch 620a that activates talk affordance 606a). In some embodiments, audio input to the microphone is enabled only if the user input is detected prior to receiving a control signal (e.g., control signal 1504) from device 600 or after playback of audio data sent by device 600 (e.g., voice audio data 1510) has finished. In response to an appropriate user input, device 699a outputs control signal data 1604 to device 600 on control channel 1602. As discussed above in connection with FIG. 15, control signal data 1604, in some cases, notifies device 600 that associated audio data (e.g., audio data 1610) is incoming. In some embodiments, audio input to the microphone on device 699a is enabled a predetermined time period after receiving the user input. This predetermined time period may be 100 ms, 150 ms, 250 ms, or any other suitable time period.

After outputting control signal data 1604 to device 600, device 699a outputs voice audio data 1610 to device 600 over media channel 1606. In the example of FIG. 16, voice audio data 1610 is a digital data stream that encodes a voice signal (e.g., the voice signal picked by the microphone (e.g., microphone 113) on device 699a after activating talk affordance 606a) and is interspersed in an existing audio data stream transmitted over media channel 1606. In the case of a full-duplex audio session, baseline audio data 1608 (e.g., a baseline signal from a muted microphone) is, in some cases, still transmitted on media channel 1606 even though it does not encode a voice signal. In this case, baseline audio data is, optionally, transmitted to device 600 at a lower bit rate than voice audio data 1610. Alternatively and/or additionally, device 699a optionally does not receive audio data on media channel 1606 while audio data 1610 is being transmitted (e.g., device 699a mutes its downlink on media channel 1606). The speaker, the receiver, the digital-to-analog converter associated with the receiver and/or the audio codec associated with the receiver on device 699a may also be powered down while transmitting audio data 1510.

In some examples, voice audio data 1610 and baseline audio data 1608 are compressed using MPEG, AWS, EVS, ACELD, or any other audio codec suitable for real-time applications. In the embodiment of FIG. 16, there is a predetermined time period 1612 between sending control signal data 1604 and sending voice audio data 1610. This predetermined time period may be 100 ms, 150 ms, 250 ms, 500 ms, 1 s, or any other suitable time period. This predetermined time period may or may not be the same as the predetermined time period between receiving the user input that activates talk affordance 606a and enabling audio input to the microphone.

In the example of FIG. 16, device 699a sends control signal data 1604 on control channel 1602 and sends audio data 1610 on a separate media channel 1606. In this case, the live audio communication session is allocated two separate communication channels for exchanging control and audio data. It should be appreciated that this example is merely illustrative. In other embodiments, control signal data (e.g., control signal data 1604) and audio data (e.g., audio data 1610) is, optionally, sent by device 699a on the same communication channel. For example, the audio data optionally contains a stream of audio data packets, each with a header (e.g., non-audio encoding information) and a payload that encodes a voice signal. In this case, the control signal data is, optionally, encoded in the header of one or more data packets in the audio data steam (e.g., the first packet in the audio data stream). As an example, if audio data is transmitted to device 600 according to the RTP standard, the corresponding control signal data is optionally encoded in the RTP extension header of the first RTP packet in the audio data stream. Alternatively and/or additionally, if audio data is transmitted to device 600 according to the TCP standard, the corresponding control signal data is optionally encoded in the TCP extension header of the first TCP packet in the audio data steam.

Referring back to FIGS. 6AG through 6AI, it is contemplated that the foregoing described visual indications 624, 624a, 628, 628a, displayed at the affordances 604, 604a, 606, 606a, indicate when the communication channel is occupied in sending/receiving voice data and when the communication channel is free. In some examples, the live audio communication session is a full-duplex communication session whereby both ends can send and receive voice data at the same time. In some examples, the live audio communication channel is a half-duplex communication session where the communication channel permits bidirectional communication but only in one direction of flow at a single time. In some examples, the live audio communication session permits duplex communication, but the talk affordances 606, 606a cannot be activated when their respective devices 600, 699a have received indication that the other device 600 or 699a has already activated the respective talk affordance 606 or 606a, until the receiving device 600 or 699a receives a subsequent indication that activation of the talk affordance 606, 606a at the opposing end has stopped. In some examples, the talk affordance 606, 606a regulates flow of communication signals in the communication channel.

As discussed above in connection with FIG. 15, a receiving device (e.g., device 600 or 699a) may prevent audio input to its microphone in response to receiving control signal data (e.g., control signal 1504 or control signal 1604), even in a full-duplex connection. If talk affordances 606 and 606a are activated on both devices at roughly the same time, the receiving device (e.g., device 600) may detect user activation of the talk affordance before receiving control signal data 1604, but after the talk affordance on the sending device (e.g., device 699a) was activated. This may be caused by latency, the non-instantaneous nature of signal transmission, or a number of other factors. In these cases, it is necessary to determine whether the talk affordance of the receiving device was activated before the control signal data was generated by the sending device. The result may then determine which device transmits audio data over media channel 1606 and which device's audio output is disabled.

In some embodiments, resolving conflicts between incoming and outgoing control signals may be done at the network server (e.g., network 1702 of FIG. 17). In the example above, determining if the user input that activated talk affordance 606a occurred before the incoming control signal (e.g., control signal 1504) was generated may be based on clocking data contained in the incoming control signal and/or the outgoing control signal (e.g., control signal 1604). In some embodiments, the clocking data may be a time stamp specifying the absolute time (e.g., time elapsed since a time predetermined by the signaling standard) at which the control signal was generated. In other embodiments, the clock data may be a time stamp specifying the time elapsed since the audio communication session between devices 600 and 699a was established. Generally, this determination is performed in response to receiving the user input activating talk affordance 606a a predetermined time before receiving control signal data 1504. For example, the conflict determination may be performed if the time difference between the time-stamp of the incoming control signal (e.g., control signal 1504) and the time-stamp of the outgoing control signal (e.g., control signal 1604) is less than the average signal transmission time between devices 600 and 699a. In other embodiments, the conflict determination may be performed directly by device 699a and/or device 600 (e.g., by comparing the time-stamp on the incoming control signal to the time at which the talk affordance was activated).

In accordance with a determination that the user input to activate talk affordance 606a occurred before the incoming control signal was generated, device 699a may enable audio input to its microphone and/or forgo outputting incoming audio data (e.g., voice audio data 1510) from its speaker. This allows device 699a to transmit voice data to device 600 even though the talk affordance on device 600 has been activated at roughly the same time. However, in accordance with a determination that the user input to activate talk affordance 606a occurred after the incoming control signal was generated, device 699a may prevent audio input to its microphone and/or output incoming audio data from its speaker. In this case, device 699a receives and plays back voice data even though the talk affordance on device 699a has been activated at roughly the same time.

Returning to a discussion of user interface flow, FIGS. 6BA to 6BD illustrate stopping audio output of incoming voice data before it is automatically output, and/or before initiating its automatic output. For example, at FIG. 6BA, John's touch-sensitive display screen at device 600 is in an off state. At FIG. 6BB, Jane's device 699*a* detects touch input 620*b* at talk affordance 606*a*, which causes issuance of the perceptual output 622*a* at Jane's device 699*a* and signals John's device 600 of the activation. John's device 600 receives the signal indication and issues perceptual notification 626. In the present example, John's display screen remains off during issuance of perceptual notification 626, while in some examples the display screen turns on from the off state and/or immediately initiates display of the voice communication application. At FIG. 6BC, a quiet gesture 638 is detected at John's device 600 after issuing the perceptual notification 622. In some examples, the quiet gesture 638 is a palm-to-display gesture in which a user covers a majority of the display screen 636 with the user's palm. In the present example, the device 600 detects that the quiet gesture 638 is received within a predetermined delay period after issuing the perceptual notification 626 and prior to initiating audio output of the voice data. When the quiet gesture 638 is detected within the predetermined delay period, device 600 foregoes outputting the audio data, as shown at FIG. 6BD. In the present example, the quiet gesture 638 maintains the off state at display screen and/or turns the display screen to the off state. In some examples, upon detecting quiet gesture 638, the device 600 responds to the external device 699*a* that the receiving device 600 is not available for voice communications at this time. In some examples, device 600 drops the communication channel in response to quiet gesture 638.

At FIG. 6BD, in response to receiving indication at external device 699*a* that the receiver is unavailable, device 699*a* transitions from displaying talk user interface 602*a* at FIG. 6BC, which in the present example includes visual input indication 624*a* indicating activation of talk affordance 606*a* in response to touch input 620*b*, to a contact unavailable screen 640*a*. In the present example, the contact unavailable screen 640*a* is a shaded or otherwise greyed-out screen that includes a visual representation 642 of the contact that is unavailable, such as an image, monogram, and/or affordance representing the contact (in this case, John's image) and brief text indicating the contact's unavailability (e.g., "John is unavailable"). In some examples, contact unavailable screen 640*a* includes add affordance that can be selected (e.g., with a tap input) to display a contact list for connecting to another contact, and in some cases to permit the user to attempt to reconnect to the currently unavailable contact. As discussed further below, in some examples, quiet gesture 638 at device 600 causes device 600 to enter a temporary do-not-disturb mode for a predetermined period of time during which no voice communications via the voice communication application from any contacts are received for output at the device 600. In such cases, device 600 automatically exits the do-not-disturb mode upon lapse of the predetermined period of time to resume normal operation at the voice communication application.

FIGS. 6CA to 6CE illustrate stopping audio output of the voice data while the voice data is being output at the receiving device 600. As shown at FIGS. 6CA to 6CB, John's display screen at device 600 is off (e.g., off, asleep, screensaver, dark). John's device 600 issues perceptual notification 626 in response to receiving an indication that external device 699*a* has activated, via touch input 620*c*, the talk affordance 606*a*. Since a quiet gesture (e.g., quiet gesture 638) is not detected during the predetermined delay period after issuing the perceptual notification 626, device 600 automatically proceeds with causing audio output 630 of voice data that is received from external device 699*a*, as shown at FIG. 6CC. FIGS. 6CB to 6CC further illustrate that upon initiating audio output 630 and during audio output 630, John's display screen is turned on to display the talk user interface 602 associated with the contact of the incoming voice data, as indicated at the contact affordance 604 representing Jane. As shown at FIG. 6CD, during audio output 630, in response to receiving quiet gesture 638, the device 600 ends audio output 630 and stops receiving voice data from external device 699*a*.

From FIGS. 6CD to 6CE, device 600 transitions the display screen from the on state to the off state, as shown at FIG. 6CE. Further in response to quiet gesture 638, device 600 indicates to external device 699*a* (e.g., by sending a signal and/or by way of dropping the communication channel at device 600 when quiet gesture 638*a* is received) that the receiver is unavailable. In response to detecting John is unavailable and/or otherwise that communication channel is no longer available, external device 699*a* automatically transitions from the talk user interface 602*a* at FIG. 6CD to the contact unavailable screen 640*a* having the visual representation 642 showing John's image and text indicating that John is unavailable. As shown in FIGS. 6CD to 6CE, the transition from talk user interface 602*a* to contact unavailable screen 640*a* occurs while touch input 620*c* is detected at talk affordance 606*a* and while Jane's voice input is being captured at device 699*a*. In this way, in response to detecting that device 600 is unavailable, device 699*a* interrupts the capturing of voice input and the sending of voice data to device 600. It is noted that in some cases, device 699*a* does not immediately know when device 600 becomes unavailable, until a subsequent activation of talk affordance 606*a* attempts to reach device 600 and the attempt is unsuccessful.

Turning now to FIGS. 6DA to 6DE, in some examples, John's device 600 is in a do-not-disturb mode where no voice communications can be sent and/or received at the voice communications application on device 600. In some examples, voice communications from a particular contact, e.g., a contact corresponding to the source of the voice data when the quiet gesture 638 is detected, are blocked while other contacts can optionally send voice data to the device 600 via other communication channels. In some examples, voice communications from any contact are blocked at the voice communication application during the do-not-disturb mode. In some cases, device 600 responds to any incoming voice data with an indication that device 600 is unavailable and does not store any alert or indication that an attempt to reach device 600 occurred during the unavailable state. It this case, without indication of missed voice communications and/or without saving incoming voice data for later retrieval, it is contemplated that the voice communications described herein provide an ephemeral form of personal communications through electronic communications As mentioned above, in some cases, detection of quiet gesture 638 causes device 600 to enter a temporary do-not-disturb mode for a predetermined period of time before automatically exiting the temporary do-not-disturb mode to resume voice communications. Entering the temporary do-not-disturb mode automatically toggles the do-not-disturb toggle switch 612 (e.g., as shown at FIG. 6AA in an on position) to an off position and can be manually toggled to an on position prior to lapse of the predetermined period of time, in some embodiments.

For example at FIG. 6DA, John's device 600 is in temporary do-not-disturb mode in response to quiet gesture 638 of FIGS. 6BA to 6BD or FIGS. 6CA to 6CE. At FIG. 6DA, activation input 648 such as a press on the rotatable input mechanism 616 turns display screen on and transitions to a home screen 650 that includes a plurality of application launch icons, including a voice communication application launch icon 652. Application launch icons when selected launch their corresponding underlying applications. In response to detection of touch input 654 on the voice communication application launch icon 652 at FIG. 6DB, device 600 launches the voice communication application and displays do-not-disturb screen 656 at FIG. 6DC. In the present example at FIG. 6DC, the do-not-disturb screen 656 is a greyed-out screen that includes a visual representation 642 of the last contact that was in communication via the voice communication application (e.g., an image of Jane) prior to entering do-not-disturb mode, and includes toggle switch 612 as shown in an off position. In response to detecting touch input 660 at the toggle switch 612 (off position) at FIG. 6DD, device 600 transitions from the do-not-disturb screen 656 to displaying the talk user interface 602 corresponding to the last contact that was in communication, as represented at the contact affordance 604 which shows Jane's image (e.g., visual representation 642 for Jane). At FIG. 6DE, the toggle switch 612 is displayed in the on position in the talk user interface 602. In some cases, the talk user interface 602 is displayed only when the last contact is still available for voice communications at the time after toggling back on. In some cases if the last contact is unavailable when device 600 toggles back on, device 600 displays a contact unavailable screen corresponding to the last contact (e.g., with Jane's image) upon toggling back on.

Further, in some examples when the device 600 automatically exits the do-not-disturb mode based on lapse of the predetermined period of time, upon detection of touch input 654 on the voice communication application launch icon 652 at FIG. 6DB, device 600 launches the voice communication application and displays the talk user interface 602 with switch 612 in the on position if the last contact is still available, without displaying do-not-disturb screen 656.

Shown further in FIGS. 6DA to 6DE, external device 699a, when in the voice communication application, displays the contact unavailable screen 640a for the contact when the contact is toggled off. For example, at FIGS. 6DA to 6DD, external device 699a displays contact unavailable screen 640a (e.g., John's image and "John is unavailable") and automatically transitions back into talk user interface 602a at FIG. 6DE upon detecting that the communication channel with the contact is available again, and/or otherwise upon receiving an indication that John's device 600 is available for voice communications. At FIG. 6DE, John and Jane are able to send and receive voice data through the communication channel as discussed in the techniques above using talk affordances 606, 606a at their respective talk user interfaces 602, and 602a.

FIGS. 6EA to 6EB, 6FA to 6FF, 6GA to 6GF, and 6HA to 6HH illustrate examples for handling incoming notifications during voice communications at the voice communications application. In some examples, notifications are suppressed at the device 600 or 699a while displaying the talk user interface 602 or 602a, and/or only while the talk affordance 606 or 606a is being activated, and/or only while receiving incoming voice data and outputting voice data 630 or 630a, and/or not suppressed at all, and/or any combination thereof. In some cases, handling incoming notifications is customized by user settings. In some cases when incoming notifications are suppressed, the incoming notifications are stored in a notifications drawer and accessible for later retrieval (e.g., via a notifications module). In other examples, incoming notification(s) are queued for output at a later time (e.g., when talk user interface 602 or 602a is no longer displayed, when talk affordance 606 or 606a is no longer being activated, and/or when voice data is not currently being output).

For example, at FIGS. 6EA to 6EB, both devices 600, 699a are connected to a voice communication channel for sending and receiving voice communications with one another via their respective talk user interfaces 602, 602a. In FIG. 6EA, incoming notification 664a is received at device 600. The incoming notification 664a corresponds to a notification or alert from another application at the device 600, incoming text message, email alert, and so on. In the present example, incoming notification 664a is suppressed or otherwise not output for display, as shown at FIG. 6EB which continues to display talk user interface 602. In practice, suppressing notifications from being displayed and/or otherwise from being perceptually output allows voice communication sessions to be uninterrupted. In some examples, only notifications having priority status are displayed and permitted for output during the voice communications.

Turning now to FIGS. 6FA to 6FF, in an example shown at FIGS. 6FA to 6FF, initially, both devices 600,699a are connected to a voice communication channel for sending and receiving voice communications with one another via their respective talk user interfaces 602, 602a. In FIG. 6FA, incoming notification 664a is received at device 600 and, instead of being suppressed, is displayed at FIG. 6FB showing notification alert 666a. For example, the notification alert 666a is permitted to appear when talk user interface 602 is displayed while talk affordance 606 is not activated and/or device 600 is not actively receiving audio data from external device 699a. As shown at FIGS. 6FB to 6FC, display of notification alert 666a does not exit the voice communication application or otherwise cause device 600 to be unavailable, and external device 699a continues display of talk user interface 602a associated with communicating with device 600. In the current example, notification alert 666a corresponds to an incoming email and displays a portion of the notification, (e.g., "Your order has been shipped!"), an indication 668 of the application corresponding to the notification, an application launch affordance 670 (also referred to as "view affordance" 670) and a dismiss notification affordance 672 (also referred to as "dismiss affordance" 672). At FIG. 6FC, device 600 detects touch input 674a on dismiss notification affordance 672 to remove display of notification alert 666a and resume display of talk user interface 602 at FIG. 6FD. In some examples, notification alert 666a is displayed briefly and automatically disappears without user selection of dismiss affordance 672.

In another example, at FIG. 6FE, touch input 674b is detected on launch affordance 670 of the notification alert 666a, which causes the mail application to launch and display a remainder of the incoming notification (e.g., the full email) in a mail application user interface 666b. As shown at FIG. 6FF, launching the mail application causes the mail application to be the active application and therefore leaves the voice communication application and/or ends connection to the voice communication channel associated with external device 699a. In response to an indication that the communication channel with device 600 is no longer available, external device 699a transitions display from talk user interface 602a at FIG. 6FE to contact unavailable screen 640a. In some examples, connection with device 600 can be re-initiated or attempted to be re-initiated by device 699a via the add affordance 644 and subsequent selection of the same contact (e.g., John) from the contact list, as discussed further below. It is noted that in some examples, external device 699a continues displaying talk user interface 602a without interruption if device 600 leaves the voice communication application only momentarily and returns to the talk user interface 602 prior to lapse of the momentarily window of time before device 600 tears down connection with the communication channel. In this way, users are permitted to quickly view notifications in their respective applications without necessarily ending the communication channel.

In the examples shown at FIGS. 6GA to 6GF, initially, both devices 600, 699a are connected to a voice communication channel for sending and receiving voice communications with one another via their respective talk user interfaces 602, 602a. In FIG. 6GA, the incoming notification 664a is received at device 600 during an active voice communication where touch input 620d is detected at talk affordance 606 and voice data is sent from device 600 to external device 699a, causing audio output 630a corresponding to the voice data and visual output indication 628a at contact affordance 604a at external device 699a. In this case, incoming notification 664a is suppressed from output at FIGS. 6GA to 6GB for the duration of the active voice communication. At FIG. 6GC, the active voice communication ends whereupon device 600 no longer detects the touch input 620d, and displays the notification alert 666a at FIG. 6GD corresponding to the incoming notification 664a. At FIG. 6GE, in response to touch input 674 on dismiss affordance 672, notification alert 666a is removed from display and device 600 resumes display of talk user interface 602 at FIG. 6GF. Throughout FIGS. 6GA to 6GF, external device 699a displays talk user interface 602a without interruption, since device 600 did not leave the voice communication application. It is noted that in some examples, displaying notification alerts causes the device to become unavailable for voice communications while the notification is displayed.

In the examples shown at FIGS. 6HA to 6HH, initially, both devices 600,699a are connected to a voice communication channel for sending and receiving voice communications with one another via their respective talk user interfaces 602, 602a. At FIG. 6HA, incoming notification 664a is received first, followed by second incoming notification 664c at device 600. Both incoming notifications 664b,644c are received during an active voice communication where touch input 620e is detected at talk affordance 606 and voice data is sent from device 600 to external device 699a, causing, at external device 699a, audio output 630a corresponding to the voice data and visual output indication 628a at contact affordance 604a. At FIGS. 6HA to 6HB, incoming notifications 664a, and c are queued in their arrival order and suppressed from output for the duration of the active voice communication. At FIG. 6HC, the active voice communication ends whereupon device 600 no longer detects the touch input 620e.

Subsequently at FIGS. 6HD to 6HG, device 600 displays the queued notification alerts 666a, 666c in the order that their corresponding notifications arrived. As shown at FIGS. 6HE and 6HG, touch inputs 674a and 674c, respectively, on dismiss affordance 672 at each notification alert 666a, 666c removes display of the notification alert and talk user interface 602 is displayed again at FIG. 6HH. In some cases, the notification alerts 666a, 666c are automatically cycled through display in their queued order without requiring inputs on each dismiss affordance 672. Throughout FIGS. 6HA to 6HH, external device 699a displays talk user interface 602a without interruption, since device 600 did not leave the voice communication application.

Turning now to FIGS. 6IA to 6IC, in some examples, when either device 600 or 699a becomes unavailable during voice communication, the communication channel becomes unavailable at both devices 600 and 699a and a contact unavailable screen is displayed. For instance, at FIG. 6IB, while external device 699a is detecting touch input 620f at its talk affordance 606a and capturing voice input while sending the captured voice input as voice data to device 600, external device 699a becomes unavailable and its display screen turns off. Device 600 detects that the communication channel has dropped and/or that external device 699a has become unavailable at the communication channel, and transitions from talk user interface 602 to contact unavailable screen 640, which includes visual representation 642 of the external contact (e.g., in this case, Jane's image), text (e.g., "Jane is unavailable"), and add affordance 644.

Figure 6J:
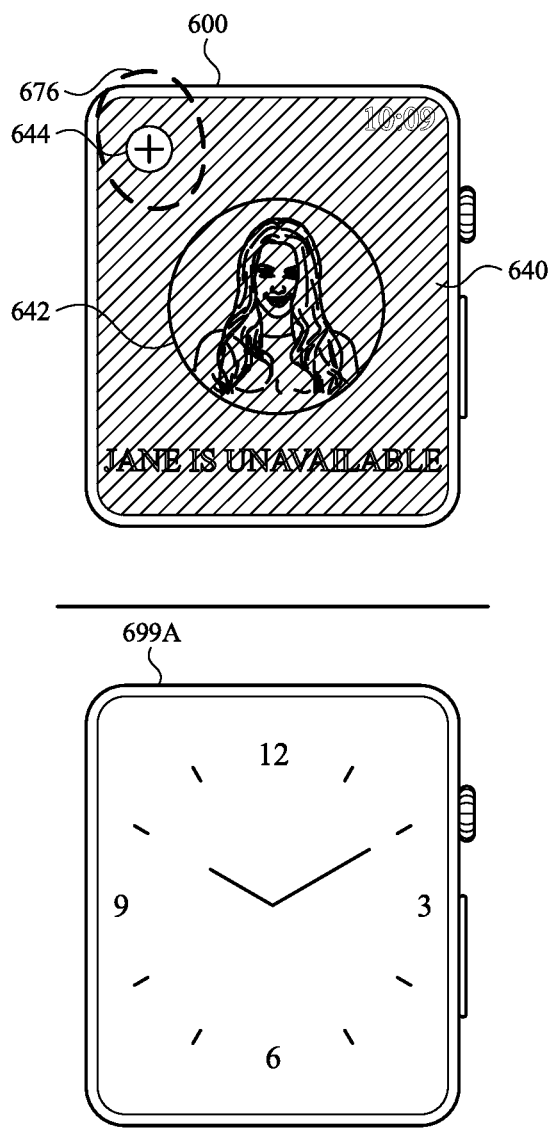
FIGS. 6JA to 6JK illustrate exemplary techniques and user interfaces for electronic voice communications, including examples for connecting to a new contact, in accordance with some embodiments.

Merely by way of example, the contact unavailable screen 640 is evoked when device 600 detects that external device 699a has: entered a timeout period for a do-not-disturb mode, that device 699a is a wearable device (e.g., smart watch) that is not currently being worn, device 699a is in another phone or VoIP call, device 699a is powered off or in an airplane mode setting where device 699a is not connected to any networks, device 699a is do-not-disturb mode, a silent mode, or another type of mode that suppresses notifications from being output, including a theater mode and a sleep mode, and/or device 699a is connected to another communication channel Turning now to FIGS. 6JA to 6JK, an example of connecting to a new contact via add affordance 644 initiated at contact unavailable screen 640 is shown. In the present example, John's device 600 detects touch input 676 on add affordance 644 (FIG. 6JA) and in response displays contacts list 678. At FIG. 6JB, in some examples, contacts list 678 slides onto display from a bottom of display screen of the device 600. In the present example, contacts list 678 is sectioned by sub-lists, including a most recent contacts sub-list (e.g., including Jane Appleseed at device 699a that was previously in communication) that precedes remaining phonebook contacts list indexed alphabetically. In some examples, contacts list 678 first shows a sub-list of other contacts associated with other external devices that are identified as being capable of receiving voice communications via voice communications application and/or are identified as being currently available (e.g., powered on, having network connectivity) prior to displaying remaining phonebook contacts. Still, in some examples, contacts list 678 is sorted by frequency of use based on frequency of use by the voice communications application or generally frequent contacts of phonebook contacts. At FIG. 6JB, contacts list 678 further includes cancel affordance 680 that when selected removes display of the contacts list 678 (e.g., by sliding the contacts list 678 downwardly off the display screen) and resumes to a previous display (e.g., contact unavailable screen 640 at FIG. 6JA).

At FIG. 6JC, device 600 detects touch input 682 (e.g., tap input) on a contact in the contact list 678 (e.g., contact named Aaron Smith) or otherwise selects a contact from the contact list. In response to touch input 682, device 600 initiates connection with Aaron's external device 699b to establish a communication channel unique to devices 600 and 699b. While the communication channel is building pending acceptance by Aaron's external device 699b, device 600 displays contact pending screen 684 at FIGS. 6JD to 6JE. In the present example, contact pending screen 864 includes the visual representation 642, in this case corresponding to the external contact that is pending connection (e.g., an image or monogram representing Aaron), text indicating the connection is pending (e.g., "Waiting for Aaron"), an animation 688 such as an arc circling Aaron's visual representation 642 providing visual feedback that connection is actively pending, and the add affordance 644 for causing display of the contacts list 678 when selected.

As shown further at FIGS. 6JD, Aaron's device 699b receives connection request from John's device 600 and transitions display (e.g., from a clock screen displaying a current time) to an invitation screen 690b that includes text indicating the contact request (e.g., "John Appleseed wants to talk to you over Talk App. Do you want to talk?"), and an accept affordance 692 and decline affordance 694 (also referred to herein as "not now" affordance 694). In the present example, Aaron's device 699b displays invitation screen 690b in accordance with a determination that the pending connection with John is a new connection for device 699b, such as a new communication channel between devices 600 and 699b. In some embodiments, device 699b displays an "always accept" affordance, in addition to or in lieu of, one or more of the affordances of FIG. 6JD. In such embodiments, in response to detecting "always accept" affordance, device 699b launches the voice communication application, finishes building the communication channel, and/or adds the contact John Appleseed (e.g., adds account(s) and/or device(s) associated with John Appleseed) to a whitelist for automatically answering future incoming session initiation requests, as discussed in more detail below.

At FIG. 6JE, device 699b detects selection of the accept affordance 692 via touch input 696, which causes launching of the voice communication application and/or finishing building the communication channel.

By way of example, at FIG. 6JF, devices 600 and 699b display respective connection pending screens 698 and 698b, respectively, indicating that the communication channel between devices 600, 699b has been accepted at both ends and is building connection. In some examples, connection pending screens 698, 698b are not displayed at one or both devices when network connection is speedy. In the current example, John's device 600 transitions from contact pending screen 684 to connection pending screen 698 by maintaining display of Aaron's visual representation 642 and the animation 688, while removing add affordance 644 and updating the text (e.g., updated with "Connecting to Aaron"). At Aaron's device 699b, connection pending screen 698b shows visual representation 642 for John.

FIGS. 6JG to 6JK illustrate an example animation occurring at both devices 600, 699b as they transition from connecting to displaying their respective talk user interfaces 602, 602b. For example, at John's device 600, visual representation 642 of Aaron initially enlarges in size at FIG. 6JG and then reduces in size while receding toward an edge of device 600 and defining an updated contact affordance 604 that previously represented the previous contact, Jane. Talk affordance 606 appears at FIG. 6JK, centralized on the display and visual indication 608 is animated forming around the contact affordance 604 and talk affordance 600. At FIG. 6JK, Aaron's device 699b displays similar talk user interface 602b including talk affordance 606b, contact affordance 604b with visual representation 642 representing John, and visual indication 608b. At FIG. 6JK, devices 600 and 699b are ready for voice communications.

Meanwhile, as a further example shown at FIGS. 6JA to 6JG, Jane's device 699a receives indication that John's device 600 is unavailable anytime Jane's device 699a attempts to connect to John's device 600 while John's device 600 is connected to another communication channel. In the current illustrated example, Jane's device 699a detects activation input 648a at rotatable input mechanism 616a (FIG. 6JB), detects touch input 654 on voice communication application launch icon 652 (FIG. 6JC) from home screen 650a, and displays do-not-disturb screen 656a including a visual representation 642 corresponding to the latest contact (e.g., John's image). At FIG. 6JE, Jane's device 699a detects touch input 660a at switch 612 (off position) and toggles off the do-not-disturb mode that may have been established previously at Jane's device 699a. At FIG. 6JF, since John's device 600 is current unavailable, Jane's device 699a transitions from the do-not-disturb screen 656a to contact unavailable screen 640a indicating that John, the last contact, is unavailable.

The following FIGS. 6KA to 6KN, 6LA to 6LD, 6MA to 6MC, 6NA to 6NF illustrate various examples for handling invitations for communication channels and connecting to new contacts. For clarity, the top row of illustrations in FIGS. 6KA to 6KN, 6LA to 6LD, 6MA to 6MC, 6NA to 6NF corresponds to user interfaces displayed on John's device 600, and the bottom row of illustrations corresponds to user interfaces displayed on Aaron's device 699b, also referred to as external device 699b.

As shown in FIGS. 6KA to 6KN, in some examples, invitations to connect are received and/or accepted when either device 600, 699b is out-of-app (e.g., not currently in the voice communications application or "Talk App" as shown in the figures). For example, John's device 600 at FIGS. 6KA to 6KD first displays contact list 678 and detects selection of Aaron Smith from the contact list 678 in response to touch input 682. John's device 600 transitions to contact pending screen 684 which in the present depiction includes the elements discussed previously, including visual representation 642 for Aaron. Meanwhile, Aaron's device 699b receives indication of the incoming connection from John's device 600 and displays a notification 6000b (and/or in some examples, displays the invitation) that indicates the application (e.g., "Talk App") corresponding to the notification 6000b. At FIGS. 6KD to 6KE, Aaron dismisses the notification 6000b with touch input 6002 (e.g., swipe input). As shown at FIG. 6KE, dismissing the notification 6000b is animated as being swept off of the display screen.

Meanwhile, at FIG. 6KD, John's device 600 detects activation input 648 at rotatable input mechanism 616 while displaying the contact pending screen 684, and in some cases exits the voice communications application and displays another screen (e.g., current time at FIG. 6KE) while waiting for Aaron to accept connection. In FIGS. 6KF to 6KK, John may check whether Aaron's connection is still pending by, merely by way of example, activating the display screen again at FIG. 6KF to display the home screen 650 at FIG. 6KG, detecting touch input 654 on the voice communication application launch icon 652 at FIG. 6KH, and launching the application which causes display of the contact pending screen 684 at FIG. 6KI, since Aaron has not yet accepted. At FIG. 6KI, John may close the application again via activation input 648 and resume display of another screen (e.g., current time at FIGS. 6KJ to 6KK). In another example, John may choose to connect to another contact via add affordance 644 on contact pending screen 684.

While John is waiting on Aaron's acceptance, Aaron at a later time (e.g., at FIG. 6KF) can see an unread message indicator 6004 on the display screen at device 699*b*, such as a circle or dot on an upper portion of the display. The unread message indicator 6004 corresponds to the unread talk app notification 6000*b* that was previously dismissed. Aaron requests to view the notification 6000*b* at the later time via touch input 6002*a* (e.g., swipe input downward and/or opposite direction of 6002) which brings notification 6000*c* back into display (e.g., a banner view of notification 6000*b*). In response to detecting touch input 6000*c* on the notification 6000*c*, invitation screen 690*b* appears and Aaron accepts the connection via touch input 696 on accept affordance 692 at FIG. 6KK.

At FIG. 6KK, Aaron accepts the invitation while John's device 600 is out-of-app. At FIG. 6KL, Aaron's device 699*b* transitions from the invitation screen 690*b* to connection pending screen 698*b* has accepted connection of the communication channel between device 600 and 699*b* by nature of John's invitation request to Aaron. Since John's device 600 is out-of-app, John's device 600 receives indication that Aaron's device 699*b* and displays invitation status notification 6008. At FIG. 6KL, the invitation status notification 6008 includes text indicating the status of the invitation (e.g., "Aaron Smith accepted your invitation."), launch affordance 670 (e.g., "Talk") and dismiss affordance 672. At FIG. 6KM, touch input 674*d* (e.g., tap) on launch affordance 670 launches the voice communication application which displays the talk user interface 602 with contact affordance 604 having a visual representation of Aaron, while Aaron's device 699*b* displays talk user interface 60*b* with contact affordance 604*b* having a visual representation of John. At FIG. 6KN, John and Aaron are connected at the communication channel and can communicate with one another by activation of the talk affordances 606, 606*b* on the respective talk user interfaces 602, 602*b*.

Turning now to FIGS. 6LA to 6LD, in another example, John dismisses the invitation status notification 6008 via touch input 674*e* on dismiss affordance 694 and returns to displaying another screen (e.g., current time at FIGS. 6LB to 6LC). Meanwhile, Aaron has accepted the invitation and is connected to the communication channel at FIG. 6LA, and displays the talk user interface 602*b* associated with John. At FIGS. 6LC to 6LD, Aaron activates talk affordance 606*b* with touch input 620 to talk to John, and John's device, in response, issues perceptual notification 626 followed by the audio output 630 corresponding to Aaron's speech and launching of the voice communication application that displays the talk user interface 602 corresponding to Aaron.

Turning now to FIGS. 6MA to 6MC, in another example, John's device 600 is out-of-app when Aaron declines the invitation. For example, at FIG. 6MB, Aaron's device 699*b* detects touch input 696 on the decline affordance 694, which removes display of the invitation screen 690*b* at FIG. 6MC and causes device 699*b* not to connect to the communication channel. While John's device 600 is in-app and showing contact pending screen 684, John's device 600 receives indication that the communication channel is not available, or otherwise that Aaron has not accepted the connection, and transitions to contact declined screen 6010 at FIG. 6MC, which includes visual representation 642 of the contact (e.g., image of Aaron), text indicating the invitation is declined (e.g., "Aaron declined"), and add affordance 644 for choosing another contact for connection via contacts list.

Figure 6N:
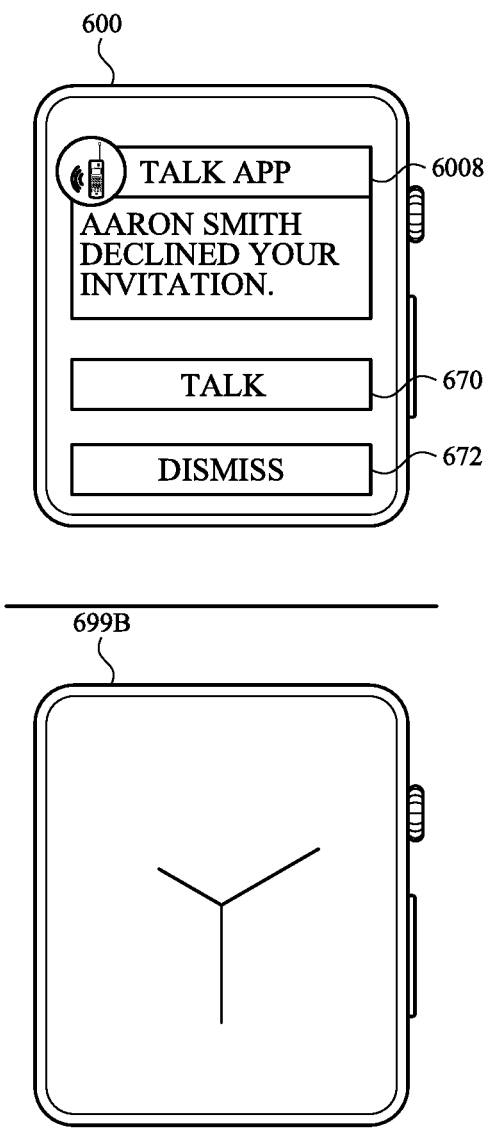
FIGS. 6NA to 6NF illustrate exemplary techniques and user interfaces for electronic voice communications, including further examples for handling invitations and connecting to new contacts, in accordance with some embodiments.

Turning now to FIGS. 6NA to 6NC, in some examples, invitations are declined while the sender is out-of-app. Merely by way of example, John's device 600 at FIGS. 6NA to 6NE first displays contact list 678 and detects selection of Aaron Smith from the contact list 678 in response to touch input 682. John's device 600 transitions to contact pending screen 684. John decides to not wait on the contact pending screen 684 by providing activation input 648 at rotatable input mechanism 616, which removes display of the contact pending screen 684 at FIG. 6NE. Meanwhile, Aaron's device 699*b* receives indication of the incoming connection from John's device 600 and displays a notification 6000*b* (and/or in some examples, displays the invitation) that indicates the application (e.g., "Talk App") corresponding to the notification 6000*b*.

Referring now to exemplary specifics of establishing voice communications from the perspective of Aaron's device 699*b*, device 699*b* receives a request to establish a live audio communication session with an additional device (e.g., John's device 600). For example, the request is, in some cases, a signal transmitted according to Session Initiation Protocol (SIP) that includes an INVITE request and a description unit specifying the media format of the live audio communication session. In the example of FIG. 6NB, the request is sent to Aaron's device 699*b* by John's device 600 in response to detecting selection of Aaron Smith from contact list 678 by touch input 682.

In response to the session initiation request, device 699*b* in some cases, determines whether a contact associated with device 600 (e.g., John) is on a list. In some embodiments, the list is a whitelist that contains contacts with which device 699*b* has previously established a live audio communication session via the application (e.g., the "Talk App"). In another embodiment, the list is Aaron's contact list, similar to contact list 678 displayed on device 600.

If device 699*b* finds the contact associated with requesting device 600 on the list, device 699*b* automatically accepts the session initiation request and proceeds to establish a live audio communication session with device 600 without first receiving a user input that acknowledges the request. Media channels and/or control channels are optionally allocated to the audio communication session, allowing device 600 to send control data and/or voice audio data to device 699*b*. In this way, device 699*b* automatically answers a session initiation request (e.g., an incoming call) from a device associated with a whitelisted contact.

In some embodiments, in accordance with a determination that the contact is not on the list, however, device 699*b* establishes the live audio communication session (e.g., connect to the appropriate media and/or control channels) only in response to detecting a user input that acknowledges the session invitation. In particular, referring back to the examples of FIGS. 6JD and 6J5, Aaron's device 699*b* receives a session initiation request from a device (e.g., device 600) associated with an un-vetted contact. If device 699*b* determines that the contact associated with the requesting device 600 is not on its whitelist, device 699*b* waits for a user input that accepts the request (e.g., user input 696 on accept affordance 692). Invitation screen 690*b* is displayed while waiting for the user input. In response to detecting a user input at the accept affordance, device 699*b* establishes the live audio communication session with requesting device 600 by sending one or more SIP response codes to device 600 and connecting to the one or more communication channels allocated to the live audio communication session. Optionally, device 699*b* adds the contact associated with requesting device 600 to the whitelist. Thus, future session invitations from device 600 will be automatically accepted as discussed above.

In some embodiments, device 699*b* disables audio input to its microphone (e.g., microphone 113) immediately after establishing the full-duplex live audio communication session. Alternatively and/or additionally, device 699*a* optionally mutes its uplink to media channel 1506. In some cases, the transmitter, the analog-to-digital converter associated with the transmitter and/or the audio codec associated with the transmitter on device 699*a* are also powered down while the microphone is disabled. Audio input to the microphone (and/or the various transmitter components of device 699*b*) optionally remains disabled until enabled by the user (e.g., by activating talk affordance 606*a*).

Referring now to the specifics of sending voice communication requests from the perspective of 699*b*, device 699*b* receives a user input (e.g., a touch gesture) corresponding to selection of a contact (e.g., from contact list 678) associated with an external device (e.g., device 600). In response to receiving the user input, device 699*b* optionally queries the network (e.g., network 1702) to determine if the contact supports communications using the voice communication application. Alternatively, the contact list (e.g., contact list 678) for the voice communication application is optionally populated only by contacts that support communication over the voice communication application. In response to the user input selecting an appropriate contact, device 699*a* sends a request to establish a live audio communication session to device 600. For example, in some cases, the request is a signal transmitted according to Session Initiation Protocol (SIP) that includes an INVITE request and a description unit specifying the media format of the live audio communication session. After sending the session initiation request, device 699*b* optionally adds the contact associated with device 600 to its whitelist such that future requests from device 600 are automatically accepted in the manner discussed above. In the example of FIGS. 6LA through 6LD, John's device 600 has whitelisted Aaron's device 699*b* by accepting a previous session request from device 699*b* (see FIG. 6KK). As a result, when Aaron activates talk affordance 606*b* (e.g., with touch input 620*g*), the session request sent to John's device is automatically accepted and John's device outputs incoming audio data and displays talk user interface 602.

Referring back to user interface flow associated with session invitations and to FIGS. 6ND to 6NF, notification 6000*b* was not dismissed and proceeds to displaying invitation screen 690*b*. Aaron chooses the decline affordance 694 via touch input 696 and the invitation screen 690*b* is removed from display at FIG. 6NF. At FIG. 6NF, John's device 600 is out-of-app and receives indication that Aaron declined the connection. John's device 600 displays invitation status notification 6008 with launch affordance 670 to launch the voice communication application, connect to another contact, and dismiss affordance 672 to remove the notification 6008.

Turning now to FIGS. 6OA to 6OH, examples of when a contact is unavailable is shown. For clarity, the top row of illustrations in FIGS. 6OA to 6OH corresponds to user interfaces displayed on John's device 600, the middle row of illustrations corresponds to user interfaces displayed on Jane's device 699*a*, and the bottom row of illustrations corresponds to user interfaces displayed on Aaron's device 699*b*.

Initially at FIGS. 6OA to 6OB, John's device 600 and Jane's device 699*a* are in an active voice communications, where touch input 620*h* is detected at talk affordance 606*a* in Jane's talk user interface 602*a* and voice data is sent from Jane's device 699*a* to John's device 600, causing, at John's device 600, audio output 630 corresponding to the voice data. At FIG. 6OB, John's device 600 detects touch input 660 at switch 612 to toggle off and enter do-not-disturb mode, as indicated with display of do-not-disturb screen 656 at FIGS. 6OC to 6OG. Accordingly, Jane's device 699*a* detects that John's device 600 is no longer available and transitions from talk user interface 602*a* to contact unavailable screen 640*a* at FIGS. 6OC to 6OG. At FIG. 6OG, John's device 600 detects another touch input 660 at switch 612 to toggle on and exit do-not-disturb mode, and while Jane's device 699*a* is still in-app, both devices 600, 699*a* transition to display their respective talk user interfaces 602, 602*a* again at FIG. 6OH.

Meanwhile at Aaron's device 699*b* in FIGS. 6OA to 6OD, Aaron launches the voice communication application from home screen 650 at FIG. 6OB and displays contact unavailable screen 640*b*, showing visual representation 642 of John who was the last connection at Aaron's device 699*b*. In some examples, the contact unavailable screen 640*b* for John appears when the connection with John has timed out or was otherwise previously ended. At FIG. 6OD, Aaron selects add affordance 644 via touch input 676 to cause display of contacts list 678, which shows John in the "recents" sub-list since John was a recent contact. At FIG. 6OF, Aaron selects John with touch input 682 and attempts to connect to John's device 600. However, as shown at FIGS. 6OG to 6OH, Aaron's device 699*a* receives indication that John's device 600 is unavailable and displays contact unavailable screen 640*b*. In this case, John's device 600 is unavailable to Aaron's device 699*b* since John's device 600 is already in communication with Jane's device 699*a*.

It is noted that some examples, contact unavailable screen 640, 640*a*, or 640*b* is displayed after a connection at a communication channel has timed out, and/or otherwise ended by closing the voice communication application. For example, subsequent to FIGS. 6OI, both John and Jane's devices 600, 699*a* can transition to contact unavailable screens 640, 640*a* indicating John and Jane are unavailable to each other. At the same time however, John's device 600 may appear available to Aaron's device 699*a*. Similarly, John and/or Jane may re-establish connection by choosing the other from their respective contacts lists.

The following figures starting with the set of FIGS. 7AA to 7AI through ending with the set of FIGS. 7EA to 7ED illustrate exemplary user interfaces for electronic communications, and transitions between the user interfaces, in accordance with some embodiments. The user interfaces in these figures are used to illustrate the processes described below, including the processes shown at FIG. 10. It is noted that the flow of the user interfaces presented herein are only some examples of a variety of possible flows available in the voice communications techniques disclosed herein, and that in some cases, the flow of user interfaces can be modified and/or rearranged without departing from the spirit of the invention.

FIGS. 7AA to 7AI and 7BA to 7BH depict exemplary user interfaces and transitions thereof for voice communications, and particularly examples for switching communication channels, between the users of computing devices 600, 699*a*, and 699*b*. For clarity, the top row of illustrations corresponds to user interfaces displayed on John's device 600, the middle row of illustrations corresponds to user interfaces displayed on Jane's device 699*a*, and the bottom row of illustrations corresponds to user interfaces displayed on Aaron's device 699*b*. Further, a fourth row of illustrations at FIGS. 7CA to 7CH, 7DA to 7DD, and 7EA to 7ED corresponds to user interfaces displayed on Emily's device 699*c*, which is also a computing device 100, 300, or 500 (FIGS. 1A-1B, 3, and 5A-5B).

FIGS. 7AA to 7AI show examples for switching voice communications between contacts via a channel switch mode provided at the talk user interface. For example, at John's device 600, while talk user interface 602 is in channel-switch mode, the talk user interface 602 is updated to channel switch mode user interface 700 (also referred to as channel switch mode 700) while maintaining connection to a currently connected voice communications channel. Initially at FIG. 7AA, John's device 600 and Jane's device 699a are in the voice communication application and currently connected to one another through the communication channel, as indicated at their respective talk user interfaces 602, 602a, respectively. Specifically, John's talk user interface 602 includes a first contact affordance 704a (hereinafter referred to as Jane's contact affordance 704a) while Jane's talk user interface 602a includes John's contact affordance 604a.

To enter channel-switch mode at John's device 600, touch input 702a on Jane's contact affordance 704a is detected and transitions display from talk user interface 602 at FIG. 7AA to channel switch mode 700 at FIG. 7AC. Merely by way of example, an animated transition to (and subsequently, from) channel switch mode 700 is demonstrated at an intermediate stage at FIG. 7AB, where talk user interface 602x is transitioning into channel switch mode 700 and visual indication 608x begins to separate into a first indicator 608y and second indicator 608z of FIG. 7AC. At FIG. 7AC, channel switch mode 700 is shown, and includes Jane's contact affordance 704a at a first position with first indicator 608y and an add affordance 644 at a second position. Second indicator 608z is displayed at talk affordance 606. The first and second indicators 608y, 608z provide visual feedback that John's device 600 is still connected to the communication channel with Jane's device 699a even though the display has changed. Accordingly, Jane's device 699a at FIGS. 7AA to 7AC continues to display talk user interface 602a as the communication channel is not interrupted by entering channel switch mode 700. For example, voice communications can still be relayed between devices 600 and 699a, as demonstrated at FIG. 7AD. At FIG. 7AD, Jane's device 699a shows talk affordance 606a being activated by touch input 620i, which captures voice input at device 699a and sends voice data corresponding to the captured voice input to John's device 600. John's device 600 continues to issue audio output 630 and provide visual output indication 628 at Jane's contact affordance 704a even though the talk user interface 602 has transitioned into the channel switch mode 700. Similarly, John can activate talk affordance 606 from the channel switch mode 700 at FIG. 7AD to send voice data back to Jane's device 699a.

At FIG. 7AD, while John's device 600 is in channel switch mode 700, touch input 702j is detected at the add affordance and causes display of the contacts list 678 at FIG. 7AE. At FIG. 7AF, touch input 682 selects a contact (e.g., Aaron Smith) from the contacts list 678 and attempts to connect to the external device associated with the contact (e.g., Aaron's device 699b). While waiting for Aaron's device to connect, John's device displays contact pending screen for Aaron and ceases to display the talk user interface 602, because the communication channel with Jane's device 699a has become unavailable since John's device 600 can only connect to a single communication channel at the voice communications application at a time. Accordingly, Jane's device 699a transitions from talk user interface 602a to contact unavailable screen 640a at FIGS. 7AG to 7AI.

At FIGS. 7AG to 7AH, Aaron's device 699b receives the connection request to connected to a communication channel with John's device 600 and displays invitation screen 690b including the accept affordance 692 and decline affordance 694. In response to detecting selection of accept affordance 692 via touch input 696 at FIG. 7AH, Aaron's device 699b transitions the display into talk user interface 602b at FIG. 7AI showing contact affordance 604b (representing John). John's device 600 receives an indication that the communication channel between devices 600, 699b has been established and/or otherwise that Aaron has approved connection. At FIG. 7AI, John's device 600 displays talk user interface 602 with an updated contact affordance showing Aaron's contact affordance 704b. Aaron's contact affordance 704b is associated with talk affordance 606 via the visual indicator 608.

Figure 7B:
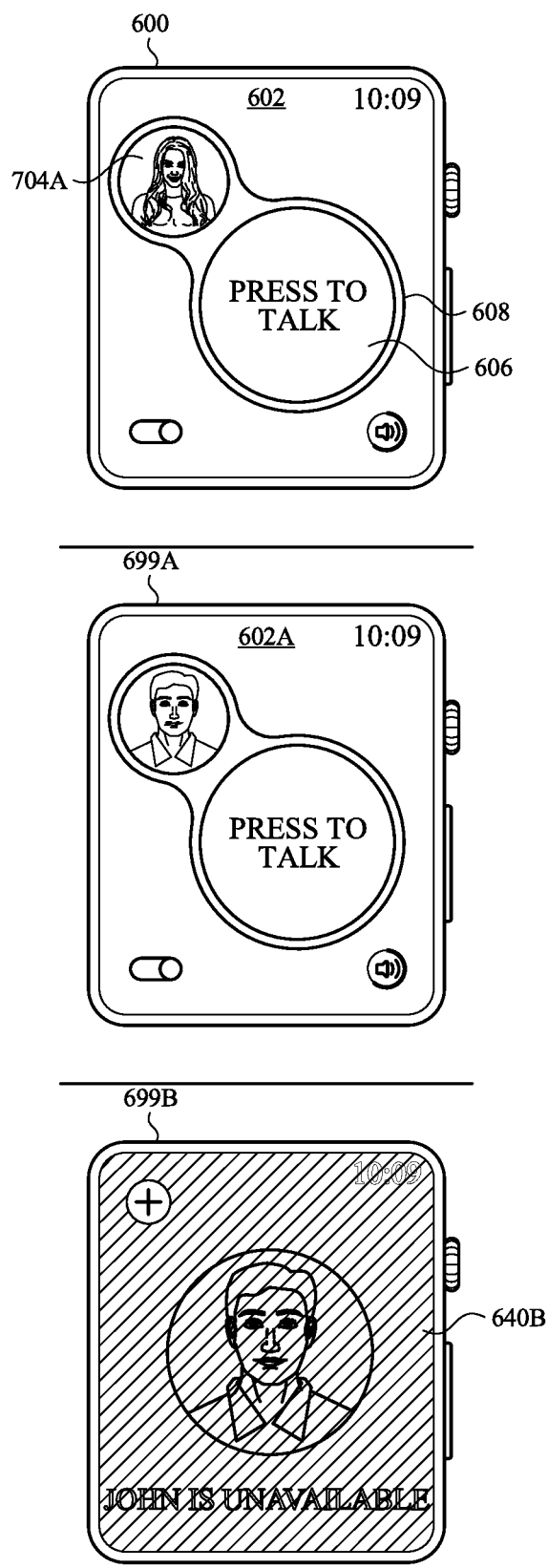
FIGS. 7BA to 7BH illustrate exemplary techniques and user interfaces for electronic voice communications, including switching between different contacts, in accordance with some embodiments.

Turning now to FIGS. 7BA to 7BH, an example channel switch mode 700 is shown where device 600 has previously connected to another contact's device (e.g., Jane's device 699a). The channel switch mode 700 allows users to quickly switch between communication channels of recent contacts by displaying the contact affordance of a most-recent and/or a most-frequent contact to allow for quick selection and connection to that contact.

For example, at FIG. 7BA, while John's device 600 displays talk user interface 602 with Aaron's contact affordance 704b, touch input 702b on Aaron's contact affordance 704b initiates transition (at FIG. 7BB) into channel switch mode 700 at FIG. 7BC. At FIG. 7BC, channel switch mode 700 maintains display of Aaron's contact affordance 704b and causes further display of Jane's contact affordance 704a since Jane was the last contacted contact. Specifically, Jane's contact affordance 704a is displayed at the second position (e.g., the second position where add affordance 644 was located in FIGS. 7AC to 7AD) adjacent to Aaron's contact affordance 704b at the first position, and add affordance 644 is bumped to the far right at a third position. In the channel switch mode 700, indicator 608y at Aaron's contact affordance 704b indicates that the communication channel between John's device 600 and Aaron's device 699a is still connected. As such, Aaron's device 699b from FIGS. 7BA to 7BD continues to display the talk user interface 602b associated with John, while Jane's device 699a continues to display contact unavailable screen 640a indicating John is unavailable.

At FIGS. 7BD to 7BE, upon detecting selection of Jane's contact affordance 704a from touch input 702c, John's device 600 disconnects from the communication channel associated with Aaron's device 699b and connects to the communication channel associated with Jane's device 699a. As such, Jane's device 699a transitions from displaying contact unavailable screen 640a to talk user interface 602a associated with John, while Aaron's device 699b transitions from displaying talk user interface 602b associated with John to displaying contact unavailable screen 640b.

As further shown at FIG. 7BE, at John's device 600, indicator 608y has jumped to the selected contact's affordance, Jane's contact affordance 704a, to indicate that talk affordance 606 is now associated with Jane's device 699a. FIGS. 7BF to 7BH show an example animated transition from channel switch mode 700 to talk user interface 602, where the previous contact affordance, Aaron's contact affordance 704b, slides off of display as it is being pushed off from the first position by Jane's contact affordance 704a, and add affordance 644 collapses or otherwise shrinks and disappears. FIG. 7BG shows another intermediate stage of the animation at talk user interface 602x, where indicators 608y and 608z are in the process of merging into a single border 608x associating Jane's contact affordance 704a with talk affordance 606.

Turning now to FIGS. 7CA to 7CH, a further example of channel switch mode 700 is shown. While John's device 600 and Jane's device 699a are connected at their communication channel, at FIG. 7CA, in response to touch input 702d detected at Jane's contact affordance 704a, device enters channel switch mode 700 at FIG. 7CB. As shown in channel switch mode 700, Jane's contact affordance 704a is maintained at the first position with indicator 608y indicating that the current communication channel is associated with Jane's device 699a. Aaron's contact affordance 704b is shown at the second position, indicating Aaron's device is a most recent and/or most frequent contact of any remaining other contacts. At FIG. 7CC, John's device 600 detects touch input 702e on add affordance and displays contacts list 678 at FIG. 7CD, which shows Jane Appleseed and Aaron Smith under a "recents" sub-list. At FIG. 7CE, contacts list 678 has been scrolled down to find another contact, Emily Miles, and subsequently receive touch input 678 selecting Emily Miles. In response to detecting the selection, John's device 600 at FIGS. 7CF to 7CH displays contact pending screen 684 showing a visual representation for Emily before transitioning to talk user interface 602 at FIG. 7CH, which shows Emily's contact affordance 704c, after Emily's device 699c has accepted the connection via touch input 696 on accept affordance 692 of invitation screen 690c at FIG. 7CG.

In the present example, in response to detecting the selection via touch input 678 for Emily from the contacts list 678, device 600 disconnects from the communication channel with Jane's device 699a in order to establish connection or otherwise attempt to connect to another communication channel with Emily's device 699c. As shown, Jane's device 699a transitions to contact unavailable screen 640a at FIGS. 7CE to 7CH upon receiving indication that the communication channel with John's device 600 is no longer available.

Turning now to FIGS. 7DA to 7DD, in some examples during channel switch mode 700, no channels are switched. For example, as shown at FIG. 7DA to 7DB, John's device 600 is connected to the communication channel with Emily's device 699c. In response detecting touch input 704f on Emily's contact affordance 704c at talk user interface 602, device 600 enters channel switch mode 700 at FIG. 7DB, which maintains Emily's contact affordance 704c at the first position, causes display of Jane's contact affordance 704a at the second position indicating Jane was the most recent or most frequent contact, and add affordance 644. As shown at FIG. 7DC, in response to detecting another touch input 704g at Emily's contact affordance 704c during channel switch mode 700, device 600 maintains the communication channel that is currently connected and transitions back to talk user interface 602 associated with Emily's contact affordance 704c. As shown at Emily's device 699c, the talk user interface 602c associated with John's device 600 continues to be displayed through FIGS. 7DA to 7DD since the communication channel was not disconnected.

Turning now to FIGS. 7EA to 7ED, in some examples during channel switch mode 700, no communication channels are connected and the device enters an idle state at the voice communication application. For example, as shown at FIG. 7EA to 7EB, John's device 600 is connected to the communication channel with Emily's device 699c. In response detecting touch input 704h on Emily's contact affordance 704c at talk user interface 602, device 600 enters channel switch mode 700 at FIG. 7EB, which maintains Emily's contact affordance 704c at the first position, causes display of Jane's contact affordance 704a at the second position indicating Jane was the most recent or most frequent contact, and add affordance 644. As shown at FIG. 7EC to 7ED, in response to detecting a touch input 704i at Jane's contact affordance 704a during channel switch mode 700, device 600 disconnects from the communication channel with Emily's device 699c and attempts to connect to the communication channel that is associated with Jane's device 704a. In this example, Jane's device 699a may be powered off, lacking network connectivity, and/or otherwise unavailable. At FIG. 7ED, John's device 600 receives indication of the status of Jane's device 600a and displays contact unavailable screen 640 indicating that Jane is unavailable. At this state, John's device 600 is disconnected from Emily's device 699c and did not connect to Jane's device 699a and is therefore in an idle state where no communication channel is currently connected. Optionally, John can select add affordance 644 at contact unavailable screen 640 to connect to another communication channel.

The following figures FIGS. 8A-8X illustrate exemplary user interfaces for electronic communications, and transitions between the user interfaces, in accordance with some embodiments. The user interfaces in these figures are used to illustrate the processes described below, including the processes shown at FIG. 11. It is noted that the flow of the user interfaces presented herein are only some examples of a variety of possible flows available in the voice communications techniques disclosed herein, and that in some cases, the flow of user interfaces can be modified and/or rearranged without departing from the spirit of the invention.

FIGS. 8A-8X depict exemplary user interfaces and transitions thereof for voice communications between the users of computing devices 600 and 699a in an example first time user setup or onboarding experience at the voice communications application at device 600. For clarity, the top row of illustrations corresponds to user interfaces displayed on John's device 600, and the bottom row of illustrations corresponds to user interfaces displayed on Jane's device 699a.

As shown at FIG. 8A, device 600 receives activation input 648 on rotatable input mechanism 616 and displays, at FIG. 8B, home screen 650 including voice communications application launch icon 652. In response to detecting touch input 654 selecting the launch icon 652, and in accordance with a determination no relationships have been previously established at the device 600, voice communications application displays a welcome screen 800 that includes a representative symbol or glyph 802 of the application, brief text describing the application (e.g., "A fun way to talk to other Watch users"), name of the application (e.g., "Talk App"), and a get started affordance 804 for continuing with onboarding.

In response to detecting touch input 806a at the get started affordance 804 at FIG. 8D, device 600 transitions to displaying an add screen 808 including initial add affordance 810 and brief instructions (e.g., "Add a person to begin"). At FIG. 8F, in response to detecting touch input 806b on the displayed initial add affordance 810, device 600 displays contact list 678. At FIG. 8H, in response to detecting selection of a contact, for example detecting touch input 682 on Jane Appleseed from contacts list 678, device 600 attempts to connect to Jane's device 699a, which receives indication of the attempt and issues a perceptual notification 812. In some examples, perceptual notification 812 is similar to the haptic and/or audible output as perceptual notification 626 described in the foregoing paragraphs.

As shown at FIGS. 8I-8J, after initiating connection with Jane's device 699a from contacts list 678, device John's device 600 displays contact pending screen 684 while waiting for Jane's device 699a to accept or decline connection. Jane's device 699a displays invitation screen 690a including the accept affordance 692 and not now affordance 694, and detects touch input 696 on accept affordance 692 at FIG. 8J to accept connection to the communication channel with John's device 600.

As shown throughout FIGS. 8K-8P, voice inputs are captured at their respective devices 600, 699a in response to activation of talk affordances 606a and 606 with touch inputs 620j (FIGS. 8L-8M) and 620k (FIGS. 8O-8P), and transmitted as voice data between Jane's device 699a and John's device 600 at the communication channel. At FIG. 8Q, activation input 648 at rotatable input mechanism 616 at John's device 600, and/or activation input 648 at rotatable input mechanism 616a at Jane's device 699a, closes the voice communication application and disconnects the communication channel. Merely by way of example, if John's activation input 648 initiates disconnection before Jane's activation input 648a, then Jane's device 699a receives indication that John has closed or otherwise exited the voice communications application at John's device 600, and that the communication channel is no longer available. In response, Jane's device 699a automatically closes the voice communications application and displays another screen at device 699a (e.g., current time at FIG. 8K). However, if Jane's activation input 648a is first to disconnect the communication channel, then John's device 600 detects that the communication channel is no longer available, and automatically closes or exits the voice communications application and displays another screen at device 600 (e.g., current time at FIG. 8K).

As shown further throughout FIGS. 8S-8X, in some examples, John's device 600 re-enters voice communication application upon detecting subsequent selection 654 of voice communications application launch icon 652 from home screen 650 (FIG. 8U). In some examples at FIGS. 8V-8X, communications via the communication channel are resumed upon detecting touch input 620l on talk affordance 606 at John's device 600.

FIG. 9 is a flow diagram illustrating a method 900 for electronic voice communications using an electronic device in accordance with some embodiments. Method 900 is performed at a device (e.g., 100, 300, 500) with a display with a touch-sensitive surface, such as a touch-sensitive display, and in some examples further with a microphone and speakers. Some operations in method 900 are, optionally, combined, the order of some operations are, optionally, changed, and some operations are, optionally, omitted.

As described below, method 900 provides an intuitive way for electronic voice communications. The method reduces the cognitive burden on a user for voice communications, thereby creating a more efficient human-machine interface. For battery-operated computing devices, enabling a user to communicate faster and more efficiently conserves power and increases the time between battery charges.

At block 902, the electronic device receives a data signal, including voice data, from an external device (e.g., device 699a) associated with a contact. For example, the data signal can optionally include a start message and audio data.

In accordance with some embodiments, the electronic device, in response to receiving the data signal, activates the display screen and launches an application associated with the voice data (e.g., FIGS. 6CB to 6CC). For example, the device launches the application and displays the talk user interface 602.

At block 904, in response to receiving the data signal, the electronic device issues a perceptual notification (e.g., perceptual notification 626) distinct from the voice data. For example, the device can optionally issue a haptic output and audible ding in response to receiving the start message. Issuing the perceptual notification in response to receiving the data signal provides the user with feedback that an incoming communication has arrived at the device and provides further feedback to the user indicating that voice data is about to be automatically and audibly output. In some examples, the perceptual notification permits the user to stop automatic audio output of the voice data in situations where it is inconvenient for audio output. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the electronic device determines whether a user input (e.g., quiet gesture 638) is detected during the predetermined delay period (e.g., 250 ms, 500 ms, or 1000 ms).

In accordance with some embodiments, the perceptual notification (e.g., perceptual notification 626) includes a haptic output or an audible output. For example, the perceptual notification can include both haptic output and audible output.

At block 906, subsequent to issuing the perceptual notification and in accordance with a determination that a user input is not detected on the display within a predetermined delay period (e.g., 250 ms, 500 ms, or 1000 ms), the electronic device causes audio output (e.g., audio output 630) of the voice data. For example, the user input is a palm-to-watch gesture that, when not received, causes automatic output of voice data at the speaker or through headphones. Automatically causing audio output of the received voice data when the user input is not detected allows the user to quickly and efficiently communicate with the contact without needing to provide further input (e.g., to answer the contact's incoming message before playing) and enables the user to multitask while still hearing the live voice data when it arrives and without delay. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, at block 908, in response to detecting the user input (e.g., quiet gesture 638) during the predetermined delay period (e.g., 250 ms, 500 ms, or 1000 ms), the electronic device enters a timeout period for a predetermined duration of time (e.g., 5 minutes, 7 minutes, or 10 minutes) and automatically exits the timeout period upon expiration of the predetermined duration of time. In some examples, the electronic device receives a second data signal including second voice data. In some examples, the electronic device, in accordance with a determination that the second data signal is received during the timeout period, forego issuance of a second perceptual notification corresponding to the second data signal and respond to a source of the second data signal with an unavailable status (e.g., contact unavailable screen 640). In some examples, the electronic device, in accordance with a determination that the second data signal is not received during the timeout period (e.g., 5 minutes, 7 minutes, or 10 minutes), issues the second perceptual notification (e.g., perceptual notification 626) distinct from the second voice data. Automatically entering a timeout period in response to detecting the user input allows the user to quickly silence the device and prevent audio output of voice data under inconvenient circumstances (e.g., user is in a meeting) and enables the user to stay in the do-not-disturb mode for a period of time without requiring further inputs to enter a do-not-disturb mode. Automatically exiting the timeout period further allows the user to continue to receive incoming voice data, for example at a later time, and prevents accidentally missing incoming voice data if the user forgets to exit the timeout period. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the electronic device, in response to receiving a user request (e.g., touch input 660 at switch 612) to exit the timeout period during the timeout period, exits the timeout period (e.g., FIG. 6DE). For example, prior to lapse of the timeout period (e.g., 5 minutes, 7 minutes, or 10 minutes), the device detects touch input 660 to manually toggle switch 612 to an on position, which exits the timeout period and transitions from do not disturb screen 656 to talk user interface 602 with a most-recent contact.

In accordance with some embodiments, the electronic device, while causing audio output, displays a talk user interface (e.g., talk user interface 602) including a talk affordance (e.g., talk affordance 606) for communicating data with the external device (e.g., external device 699*a*), wherein the external device is a first external device associated with a first contact, and a contact affordance (e.g., contact affordance 604), wherein the contact affordance is a first affordance representing the first contact. For example, the communicated data includes voice data corresponding to voice input captured at the microphone. In another example, the monogram or image represents the first contact at the contact affordance 604.

In accordance with some embodiments, the electronic device, while causing audio output (e.g., audio output 630), displays, in the talk user interface (e.g., talk user interface 602), an output indication (e.g., visual output indication 628). For example, output indication is animation of ripples emerging from the contact affordance 604 that is displayed for a duration of the audio output 630 and removed after the audio output 630 ceases. In some examples, the device issues an end-of-message perceptual notification for a haptic output and audible output to indicate an end of the audio output 630.

In accordance with some embodiments, the electronic device displays in the talk user interface (e.g., talk user interface 602) a visual indication (e.g., visual indication 608) that communications via the talk user interface are associated with the first contact. For example, the visual indication is merged white circles at the talk affordance 606 and contact affordance 604.

In accordance with some embodiments, the electronic device, while causing audio output (e.g., audio output 630*a*), adjusts a volume level of the audio output in accordance with a detected rotational input (e.g., rotational input 632) at a rotatable input mechanism (e.g., rotatable input mechanism 616*a*) at the device. For example, the device displays an indication of the adjusted volume level on the talk user interface 606 by animating the volume icon 610 on the talk user interface 602 in accordance with the rotation.

In accordance with some embodiments, the electronic device, in response to detecting activation of the talk affordance (e.g., talk affordance 606), captures voice input at the microphone, and while capturing voice input, sends an outgoing data signal including outgoing voice data corresponding to the captured voice input to the first external device (e.g., external device 699*a*). For example, the device captures voice input while a press-and-hold gesture at talk affordance 606 is detected, and/or while a single tap to start and subsequent tap to stop activation is detected. Further, for example, the device sends live voice data to the first external device.

In accordance with some embodiments, the electronic device, in response to detecting activation of the (e.g., talk affordance 606), issues a perceptual output (e.g., perceptual output 622) including a haptic output or an audible output, and while capturing voice input, displays, in the talk user interface (e.g., talk user interface 602), an input indication (e.g., visual input indication 624). For example, the device issues a perceptual output prior to capturing voice input. Further, for example, the device displays an animation associated with the talk affordance 606 for a duration of the activation, such as ripples emerging from talk affordance 606.

In accordance with some embodiments, the electronic device receives a communication (e.g., incoming notification 664*a*) from a second external device. Further, the device can optionally, in response to receiving the communication and in accordance with a set of first time notification criteria being satisfied, including a criterion that is satisfied when the talk user interface (e.g., talk user interface 602) is not displayed, issue a third perceptual notification at a first time, and in response to receiving the communication and in accordance with the set of first time notification criteria not being satisfied, forgo issuing the third perceptual notification at the first time (e.g., FIGS. 6GA). For example, the device delays issuing the perceptual notification to a second time later than the first time or not issuing the perceptual notification, and in some embodiments, logs the incoming communication for later retrieval from a notification center.

In accordance with some embodiments, the electronic device, while displaying the talk user interface (e.g., talk user interface 602), receives an indication that the first contact is unavailable, and in response to detecting that the first contact becomes unavailable, ceases display of the talk user interface (e.g., FIGS. 6IB to 6IC). For example, the device receives an indication that the communication channel is disconnected and subsequently closes the voice communications application, or replaces display of the talk user interface 602 with display of a contact unavailable screen 640.

In accordance with some embodiments, while the talk user interface (e.g., talk user interface 602*b*) is not being displayed, the electronic device receives third data signal from a third external device associated with a third contact. In some examples, the electronic device, in response to receiving the third data signal and in accordance with a determination that the third contact satisfies an acceptance requirement criteria, including a criterion that is satisfied when the third contact has not been previously accepted for communication via the talk user interface, displays an invitation screen (e.g., invitation screen 690b) including an accept affordance (e.g., accept affordance 692) and a reject affordance (e.g., not now affordance 694). In some examples, the electronic device, in response to receiving selection (touch input 696) of the accept affordance (e.g., accept affordance 692), replaces display of the invitation screen (e.g., invitation screen 690b) with display of the talk user interface (e.g., talk user interface 602b) and updates the contact affordance (e.g., contact affordance 604) with a third contact affordance representing the third contact. In some examples, the electronic device, in response to receiving user selection of the reject affordance (e.g., not now affordance 694), ceases display of the invitation screen (e.g., invitation screen 690b). Further, for example, the device does not display talk user interface 606 when the device is in an idle state and/or is not connected to any communication channels.

At block 910, subsequent to issuing the perceptual notification (e.g., perceptual notification 626) and in accordance with a determination that the user input (e.g., quiet gesture 638) is detected on the display within the predetermined delay period (e.g., 250 ms, 500 ms, or 1000 ms), the electronic device forgoes causing audio output of the voice data (e.g., FIG. 6BD). For example, the palm-to-watch gesture detected before audio data is audibly output stops the audio data from being output and silences the device. Forgoing causing audio output of voice data after issuing the perceptual notification and in accordance with the determination that the user input is received within the delay period (e.g., 250 ms, 500 ms, or 1000 ms) allows the user to stop unwanted output of the voice communication in situations where audio output is undesirable and enables the user to do so quickly and easily without requiring numerous inputs. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the user input (e.g., quiet gesture 638) comprises a palm gesture covering a majority of the display.

In accordance with some embodiments, the electronic device, in response to detecting the user input (e.g., quiet gesture 638) while the display screen is on, turn the display screen off (e.g., FIG. 6CE).

In accordance with some embodiments, at block 912, the electronic device determines whether a second input (e.g., quiet gesture 638) is detected during audio output (e.g., audio output 630) of the voice data, and in accordance with a determination that the second user input (e.g., quiet gesture 638) is detected on the touch-sensitive display during audio output of the voice data, ceases audio output of the voice data (e.g., FIG. 6CE). For example, the electronic device interrupts audio output 630 and stops receiving further voice data from electronic device 699a. Ceasing audio output of voice data after the audio output has already started if a second user input is detected provides the user with more control of the device by helping the user avoid unintentionally executing audio output (e.g., when the user unintentionally misses the predetermined delay period to enter the first user input) and allows the user to hear at least a portion of the voice data prior to deciding whether to continue with audio output. Providing additional control options enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 900 (e.g., FIG. 9) are also applicable in an analogous manner to the methods described below. For example, methods 1000 and 1100 optionally include one or more of the characteristics of the various methods described above with reference to method 900. For example, methods 1000 and 11000 can be combined with method 900 to further include that subsequent to issuing the perceptual notification and in accordance with a determination that the user input is detected on the display within the predetermined delay period (e.g., 250 ms, 500 ms, or 1000 ms), the device forgoes causing audio output of the voice data. For brevity, these details are not repeated below.

FIG. 10 is a flow diagram illustrating a method for electronic voice communications using an electronic device in accordance with some embodiments. Method 1000 is performed at a device (e.g., 100, 300, 500) with a display with a touch-sensitive surface, such as a touch-sensitive display, and in some examples further with a microphone and speakers. Some operations in method 1000 are, optionally, combined, the order of some operations are, optionally, changed, and some operations are, optionally, omitted.

As described below, method 1000 provides an intuitive way for electronic voice communications. The method reduces the cognitive burden on a user for communicating with others, thereby creating a more efficient human-machine interface. For battery-operated computing devices, enabling a user to communicate faster and more efficiently conserves power and increases the time between battery charges.

At block 1002, while the electronic device is connected to (e.g., active, open line) a first communication channel associated with a first external device (e.g., device 699b) of a first contact and not connected (e.g., inactive, closed line) to a second communication channel associated with a second external device (e.g., device 699a) of a second contact, the electronic device concurrently displays a first affordance (e.g., contact affordance 704b) associated with the first contact and a second affordance (e.g., contact affordance 704a) associated with the second contact. For example, each of the first and second affordances is an image or monogram. Displaying both the first and second contact affordances while the device is currently connected to only one of the two contacts provides the user with feedback that another contact can be connected for voice communications and provides visual feedback to the user indicating a suggested other contact, for example a most-recent and/or most-frequent contact. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, at block 1004, the second contact (e.g., contact affordance 704a) is a most-recent contact that is determined based on meeting a set of most-recent contact criteria, including a criterion that is met when the second communication channel corresponding to the second contact is a most-recently-connected channel that was connected prior to connecting to a currently connected channel, wherein the currently connected channel is the first communication channel. Providing a most recent contact as the second contact allows the user to quickly switch between different voice communication channels, such as a between a currently connected channel and a previously connected channel, which may be more relevant to the user at the time than another communication channel that was not recently connected. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the electronic device concurrently displays the first affordance (e.g., contact affordance 704b) and the second affordance (e.g., contact affordance 704a) in response to receiving a first user request (e.g., touch input 702b) to enter a channel-switch mode (e.g., channel switch mode 700), wherein the first affordance (e.g., contact affordance 704b) is displayed at a first position on the display and the second affordance (e.g., contact affordance 704a) is displayed at a second position relative to the first position on the display. For example, the user request is tap input (e.g., touch input 702b) on the first affordance (e.g., contact affordance 704b) that causes display of the second affordance (e.g., contact affordance 704a).

In accordance with some embodiments, the second contact (e.g., contact affordance 704a) is a most-frequent contact that is determined based on meeting a set of most-frequent contact criteria, including a criterion that is met when the second communication channel corresponding to the second contact is ranked a most-frequently-connected communication channel of a plurality of previously-connected communication channels at the device.

In accordance with some embodiments, the second contact (e.g., contact affordance 704a) is a currently-available contact that is determined based on meeting a set of availability criteria, including a criterion that is met when the device receives an indication that the second communication channel corresponding to the second contact is available for connecting to the device. For example, the second contact (e.g., contact affordance 704a) is in network and/or has an electronic device that supports voice communications disclosed herein, such as any of devices 100, 300, and/or 500, and/or has the voice communications application on the electronic device.

In accordance with some embodiments, the electronic device while concurrently displaying the first affordance (e.g., contact affordance 704b) and the second affordance (e.g., contact affordance 704a) and while the device is connected to the first communication channel and not connected to the second communication channel, displaying a first talk affordance (e.g., talk affordance 606) for communicating with the first contact (e.g., contact affordance 704b) through the first communication channel.

In accordance with some embodiments, while the device is connected to the first communication channel and not connected to the second communication channel, the electronic device displays a first visual indication (e.g., indicators 608y, 608z) that the device is connected to the first communication channel, wherein the first visual indication (e.g., indicators 608y, 608z) is distinct from the visual indication (e.g., visual indication 608). For example, the first visual indication is two separate borders at the first affordance (e.g., contact affordance 704b) and the talk affordance (e.g., talk affordance 606).

In accordance with some embodiments, subsequent to receiving a first data signal including first voice data at the first communication channel from the first contact (e.g., contact affordance 704b), the electronic device causes audio output (e.g., audio output 630) of the first voice data. In some examples, in response to detecting activation of the first talk affordance (e.g., talk affordance 606), the electronic device captures first voice input at a microphone and sends, through the first communication channel, first outgoing data signal including first outgoing voice data corresponding to the captured first voice input.

At block 1006, while the electronic device is connected to (e.g., active, open line) a first communication channel associated with a first external device (e.g., device 699b) of a first contact and not connected (e.g., inactive, closed line) to a second communication channel associated with a second external device (e.g., device 699a) of a second contact, the electronic device detects a touch input (e.g., touch input 702c) on the second affordance (e.g., contact affordance 704a).

At block 1008, while the electronic device is connected to (e.g., active, open line) a first communication channel associated with a first external device (e.g., device 699b) of a first contact and not connected (e.g., inactive, closed line) to a second communication channel associated with a second external device (e.g., device 699a) of a second contact, the electronic device, subsequent to detecting the touch input (e.g., touch input 702c) on the second affordance (e.g., contact affordance 704a), disconnects from the first communication channel and connects to the second communication channel. For example, the electronic device disconnects in response to the touch input (e.g., touch input 702c) on the second affordance (e.g., contact affordance 704a), or in some examples after further touch input (e.g., touch input 620) on the talk affordance (e.g., talk affordance 606), and/or after a backend check that the second contact (e.g., contact affordance 704a) is available.

In accordance with some embodiments, the electronic device disconnects from the first communication channel and connects to the second communication channel in response to detecting the touch input (e.g., touch input 702c) on the second affordance (e.g., contact affordance 704b). Disconnecting from the first communication channel and connecting to the second communication channel in response to detecting the touch input allows the user to quickly switch communication channels with a single touch input. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

At block 1010, the electronic device displays a visual indication (e.g., indicators 608y, 608z in channel-switch mode 700, and visual indicator 608 in the talk user interface 602) indicating that the device is not connected to the first communication channel and is connected to the second communication channel. For example, the electronic device switches visual borders (e.g., indicators 608y, 608z) from a first affordance (e.g., contact affordance 704b), to second affordance (e.g., contact affordance 704a), and swaps places of first affordance (e.g., contact affordance 704b) and second affordance (e.g., contact affordance 704a). Displaying the visual indication that the device is not connected to the first communication channel and is connected to the second communication channel provides the user with feedback that confirms which communication channel the device is connected to and which contact the user is in voice communications with when multiple contacts are displayed, and further provides visual feedback to the user indicating whether the user's request to switch communication channels has been implemented. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, at block 1004, while the electronic device is connected to the second communication channel and not connected to the first communication channel, the electronic device displays the second affordance (e.g., contact affordance 704a) and a second talk affordance (e.g., talk affordance 606) for communicating data through the second communication channel.

In accordance with some embodiments, while the electronic device is connected to the second communication channel and not connected to the first communication channel, the electronic device displays the second affordance (e.g., contact affordance 704a) and a second talk affordance (e.g., talk affordance 606) for communicating data through the second communication channel. For example, the electronic device displays the visual indication (e.g., visual indication 608) and displays the second affordance (e.g., contact affordance 704a) without displaying the first affordance (e.g., contact affordance 704b).

In accordance with some embodiments, subsequent to receiving a second data signal including second voice data at the second communication channel from the second contact (e.g., contact affordance 704a), the electronic device causes audio output (e.g., audio output 630) of the second voice data. In some examples, in response to detecting activation of the second talk affordance (e.g., talk affordance 606), the electronic device captures second voice input at the microphone and sends, through the second communication channel, second outgoing data signal including second outgoing voice data corresponding to the captured second voice input.

In accordance with some embodiments, in response to detecting the touch input (e.g., touch input 630c) on the second affordance (e.g., contact affordance 704a), the electronic device exits the channel-switch mode (e.g., channel switch mode 700). For example, a touch input (touch input 630c) on second affordance (e.g., contact affordance 704a) disconnects the first channel and connects to the second channel and exiting the channel-switch mode (e.g., channel switch mode 700) includes collapsing the first affordance (e.g., contact affordance 704b). In some examples, while the device is connected to the second communication channel and not connected to the first communication channel, in response to receiving a second user request (e.g., touch input 702d) to re-enter the channel-switch mode (e.g., channel switch mode 700), the electronic device concurrently displays the second affordance (e.g., contact affordance 704a) at the first position and the first affordance (e.g., contact affordance 704b) at the second position.

In accordance with some embodiments, while concurrently displaying the first affordance (e.g., contact affordance 704b) and the second affordance (e.g., contact affordance 704a) in response to receiving the second user request (e.g., touch input 702d), the electronic device displays a second visual indication (e.g., indicators 608y, 608z) that the device is connected to the second communication channel and not connected to the first communication channel, wherein the second visual indication (e.g., indicators 608y, 608z) is distinct from the visual indication (e.g., visual indication 608). For example, the second visual indication (e.g., indicators 608y, 608z) is two separate borders at the second affordance (e.g., contact affordance 704a) and the talk affordance (e.g., talk affordance 606), while the visual indication (e.g., visual indication 608) is a single border encompassing the second affordance (e.g., contact affordance 704a) and the talk affordance (e.g., talk affordance 606) when the device is not in channel-switch mode (e.g., channel switch mode 700).

In accordance with some embodiments, while concurrently displaying the first affordance (e.g., contact affordance 704b) and the second affordance (e.g., contact affordance 704a) in response to receiving the second user request (e.g., touch input 702f), in response to detecting a user intent (e.g., touch input 702g) to stay connected to the second communication channel, the electronic device exits the channel-switch mode (e.g., channel switch mode 700) and removes display of the first affordance (e.g., contact affordance 704b). For example, the user intent is a touch input (e.g., touch input 702g) on the first affordance (e.g., contact affordance 704b) or talk affordance (e.g., talk affordance 606), or a lack of touch input during channel-switch mode (e.g., channel switch mode 700) for a period of time). Further for example, the electronic device removes the first affordance (e.g., contact affordance 704b) while maintaining the second affordance (e.g., contact affordance 704a), and/or transitions display of the second visual indication (e.g., indicators 608x, 608y) back to the visual indication (e.g., visual indication 608).

In accordance with some embodiments, in response to detecting the user intent (e.g., touch input 702g), the electronic device replaces display of the second visual indication (e.g., indicators 608x, 608y) with the visual indication (e.g., visual indication 608). For example, the electronic device displays separate borders (e.g., indicators 608x, 608y) merging into single border (e.g., visual indication 608).

In accordance with some embodiments, while the device is connected to the second communication channel and not connected to the first communication channel, the electronic device concurrently displays the first affordance (e.g., contact affordance 704b) and the second affordance (e.g., contact affordance 704a) with an add affordance (e.g., add affordance 644) at a third position relative to the first position and the second position on the display, detects a second touch input (e.g., touch input 702e) on the add affordance (e.g., add affordance 644), subsequent to detecting the second touch input (e.g., touch input 702e) on the add affordance (e.g., add affordance 644), displays a contact list (e.g., contact list 678) including a third contact, and in response to detecting selection (e.g., touch input 682) of the third contact, disconnects from the second communication channel and connects to a third communication channel corresponding to a third external device (e.g., external device 699c) associated with the third contact. For example, while connecting, the electronic device displays a connection pending screen (e.g., contact pending screen 684 and/or connection pending screen 698) if the connection is slow to establish.

In accordance with some embodiments, while the device is connected to the third communication channel and is not connected to the second communication channel, in response to receiving a third user request (e.g., touch input 702h) to enter the channel-switch mode (e.g., channel switch mode 700), concurrently displaying a third affordance (e.g., contact affordance 704c) corresponding to the third contact at the first position, the second affordance (e.g., contact affordance 704a) at the second position, and the add affordance (e.g., add affordance 644) at the third position. For example, the third user request (e.g., touch input 702h) is a tap input on the third affordance (e.g., contact affordance 704c) representing the third contact.

In accordance with some embodiments, while connecting to the third communication channel subsequent to disconnecting from the second communication channel, the electronic device determines that the third communication channel cannot be connected, and in accordance with the determination that the third communication channel cannot be connected, ceases connecting to the third communication channel and enters an idle state (e.g., FIG. 7ED) wherein the device is not connected to any communication channel.

In accordance with some embodiments, in accordance with the determination that the third communication channel cannot be connected, the electronic device displays a contact unavailable screen (e.g., contact unavailable screen 640).

Note that details of the processes described above with respect to method 1000 (e.g., FIG. 10) are also applicable in an analogous manner to the methods described above and below. For example, methods 900 and 1100 optionally include one or more of the characteristics of the various methods described above with reference to method 1000. For example, methods 900 and 1100 can be combined with method 1000 to further include concurrently display a first affordance associated with the first contact and a second affordance associated with the second contact. For brevity, these details are not repeated below.

FIG. 11 is a flow diagram illustrating a method for communicating with others using an electronic device in accordance with some embodiments. Method 1100 is performed at a device (e.g., 100, 300, 500) with a display with a touch-sensitive surface, such as a touch-sensitive display, and in some examples further with a microphone and speakers. Some operations in method 1100 are, optionally, combined, the order of some operations are, optionally, changed, and some operations are, optionally, omitted.

As described below, method 1100 provides an intuitive way for communicating with others. The method reduces the cognitive burden on a user for communicating with others, thereby creating a more efficient human-machine interface. For battery-operated computing devices, enabling a user to communicating with others faster and more efficiently conserves power and increases the time between battery charges.

At block 1102, the electronic device launches a voice communication application (e.g., application launch icon 652, and/or FIGS. 61A to 61B). For example, the electronic device displays the voice communication application.

In accordance with some embodiments, at block 1104, the electronic device launches the voice communication application automatically upon receiving incoming voice data from the external device (e.g., external device 699a) associated with the contact through the communication channel (e.g., FIGS. 61A to 61B). Automatically launching the voice communication application upon receiving incoming voice data allows the user to quickly access the communication channel via the application (e.g., to see the source of the voice data and/or to respond to the sender) and enables the user to engage in the voice communications without requiring further input to gain access to the voice communications since the application is automatically displayed. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the electronic device launches the voice communication application in response to detecting a first touch input (e.g., touch input 654) on an application icon (e.g., voice communication application launch icon 652) corresponding to the voice communication application on a home screen (e.g., home screen 650).

In accordance with some embodiments, the electronic device launches the voice communication application in response to detecting a second touch input (e.g., touch input 696) on an accept affordance (e.g., accept affordance 692) in an invitation alert (e.g., invitation screen 690).

In accordance with some embodiments, the electronic device launches the voice communication application in response to detecting a third touch input (e.g., touch input 674d on and/or touch input 674e) on a launch affordance (e.g., launch affordance 670) in an invitation declined alert (e.g., invitation status notification 6008 at FIG. 6NF). For example, the electronic device displays an invitation declined alert and detects a touch input on an icon that launches the application instead of only dismissing the alert.

In accordance with some embodiments, the electronic device launches the voice communication application in response to detecting a fourth touch input (e.g., touch input 674d) on a launch affordance (e.g., launch affordance 670) in an invitation accepted alert (e.g., invitation status notification 6008 at FIG. 6KM).

In accordance with some embodiments, subsequent to launching the application, the electronic device determines whether the communication channel between the device and the external device (e.g., external device 699a) meets availability criteria. For example, the electronic device determines whether a communication channel is available and/or already connected. Further for example, while the voice communication application is launched and/or while displaying the talk affordance 606, the device continuously determines whether the communication channel is available.

At block 1106, in accordance with a determination that a communication channel between the device and an external device (e.g., device 699a) associated with a contact meets a set of availability criteria, the electronic device displays a talk affordance (e.g., talk affordance 606) associated with the contact. For example, the electronic device checks if any communication channels are available to be connected to or are currently connected. Displaying the talk affordance associated with the contact if the device determines that the communication channel is available provides the user with feedback that voice communications can be exchanged with the contact since the contact is currently available. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the availability criteria include a first criterion that is met when the device receives a first indication that the external device has previously accepted the communication channel for communication via the application. For example, the electronic device receives an indication that a previous invitation (e.g., invitation screen 690a) was previously accepted and/or the external device (e.g., device 699a) was previously connected.

In accordance with some embodiments, the availability criteria include a second criterion that is met when the communication channel at the device is not in a do-not-disturb mode (e.g., do-not-disturb screen 656) and the device receives a second indication that the communication channel at the external device (e.g., device 699a) is not in the do-not-disturb mode (e.g., do-not-disturb screen 656a). For example, one or both of the devices 600, 699a are in the do-not-disturb mode in situations where either user is toggled-off or in a timeout period, when either device 600, 699a is not being worn if the device is a wearable device (e.g., a skin contact sensor at the device indicates a lack of physical skin contact), and/or when either device 600, 699a is in another phone or VoIP call.

In accordance with some embodiments, the availability criteria include a third criterion that is met when a network connectivity status at the device is a connected status, and the device receives a third indication that a network connectivity status at the external device (e.g., device 699a) is the connected status. For example, neither device is powered off or in an airplane mode setting where the device 600 or 699a is not connected to any networks.

In accordance with some embodiments, the availability criteria include a fourth criterion that is met when a notifications setting at the device is enabled, wherein notifications corresponding to alerts are not suppressed from output, and the device receives a fourth indication that a notifications setting at the external device (e.g., 699a) is enabled. For example, neither device 600 nor 699a is in a do-not-disturb mode, a silent mode, or another type of mode that suppresses notifications from being output, including a theater mode and a sleep mode.

In accordance with some embodiments, the availability criteria include a fifth criterion that is met when the device receives a fifth indication that the external device (e.g., device 699a) is not currently connected to another communication channel. For example, external device 699a is not connected to another communication channel in the voice communications application at the device 699a, and/or a third party application or phone call.

In accordance with some embodiments, while displaying the talk affordance (e.g., talk affordance 606) associated with the contact, the electronic device displays an availability toggle (e.g., switch 612) in an on position, wherein the device is connected to the communication channel when the availability toggle (e.g., switch 612) is in the on position. In some examples, in response to detecting a fifth touch input (e.g., touch input 660) at the availability toggle (e.g., switch 612) to change the on position to an off position, the device disconnects from the communication channel and enters a do-not-disturb mode (e.g., do-not-disturb screen 656), wherein the device is not available for communication via the voice communication application. For example, the electronic device replaces the talk affordance (e.g., talk affordance 606) with a do-not-disturb screen (e.g., do-not-disturb screen 656), and the communication channel no longer meets availability criteria. Further for example, the device enters in idle state wherein no communication channels are connected at the application.

In accordance with some embodiments, while the device is connected to the communication channel, the electronic device receives voice data from the external device (e.g., device 699a) and causes audio output (e.g., audio output 630) of the voice data. In some examples, in response to detecting the fifth touch input (e.g., touch input 660) while causing audio output (e.g., audio output 630) of the voice data, the electronic device ceases receiving the voice data or ceases audio output (e.g., audio output 630) of the voice data. For example, the electronic device interrupts audio output and/or stops receiving further voice data from device 699a.

In accordance with some embodiments, in response to detecting a sixth touch input (e.g., touch input 660 at FIG. 6OG) at the availability toggle (e.g., switch 612) to change the off position to an on position, the electronic device exits the do-not-disturb mode (e.g., do-not-disturb mode 656), in accordance with a determination that the communication channel meets the set of availability criteria, the device connects to the communication channel and displays the talk affordance (e.g., talk affordance 606) while connected to the communication channel (e.g., connects to a most-recent channel), and in accordance with a determination that the communication channel does not meet the set of availability criteria, the device forgoes displaying the talk affordance (e.g., talk affordance 606) associated with the contact and enters an idle state wherein the device remains disconnected to the communication channel. For example, in the idle state, the device is not connected to any communication channels in the voice communications application.

In accordance with some embodiments, while displaying the talk affordance (e.g., talk affordance 606) associated with the contact, wherein the device is connected to the communication channel when the talk affordance (e.g., talk affordance 606) is displayed, determining whether the communication channel meets the availability criteria, and in accordance with a determination that the communication channel no longer meets the availability criteria, the device disconnects from the communication channel and ceases displaying the talk affordance (e.g., talk affordance 606). For example, when the contact at the external device 699a toggles off and/or loses network connectivity, the electronic device displays a contact unavailable screen (e.g., contact unavailable screen 640) and/or enters an idle state.

At block 1108, in response to detecting a touch input (e.g., touch input 620) on the talk affordance (e.g., talk affordance 606) at the touch-sensitive display, the electronic device captures voice input. For example, the device captures voice input at a microphone (e.g., microphone 113).

At block 1110, in response to detecting a touch input (e.g., touch input 620) on the talk affordance (e.g., talk affordance 606) at the touch-sensitive display, the electronic device sends voice data representing the voice input to the external device (e.g., device 699a) associated with the contact. For example, the electronic device sends live voice input to device 699a.

In accordance with some embodiments, while the device is connected to the communication channel, the electronic device detects the touch input (e.g., touch input 620) on the talk affordance (e.g., talk affordance 606), and in accordance with the determination that the communication channel no longer meets the availability criteria while detecting the touch input (e.g., touch input 620) on the talk affordance (e.g., talk affordance 606), the device ceases sending voice data representing the voice input to the external device (e.g., device 699*a*). In some examples, the device also ceases to capture the voice output.

In accordance with some embodiments, while the device is connected to the communication channel and in accordance with the determination that the communication channel no longer meets the availability criteria, the device displays a contact unavailable screen (e.g., contact unavailable screen 604), and in accordance with a determination that the communication channel meets the set of availability criteria while displaying the contact unavailable screen (e.g., contact unavailable screen 604), the device connects to the communication channel and replaces display of the contact unavailable screen (e.g., contact unavailable screen 604) with the talk affordance (e.g., talk affordance 606) associated with the contact. In some examples, the electronic device reconnects to the contact's device 699*a*.

At block 1112, in accordance with a determination that the communication channel does not meet the set of availability criteria, the electronic device forgoes displaying the talk affordance (e.g., talk affordance 606). For example, the device launches the voice communication application and displays a do-not-disturb screen (do-not-disturb screen 656, contact unavailable screen (e.g., contact unavailable screen 640), invite pending screen (e.g., contact pending screen 684, connection pending screen 698), invite declined screen (e.g., contact declined screen 6010) and/or a first-time user setup screen (e.g., welcome screen 800). Forgoing displaying of the talk affordance when the communication channel is not available provides the user with feedback the function of capturing and sending voice to the contact is not an option at this time and provides visual feedback to the user indicating that the contact's device cannot receive voice communications through the communication channel at this time. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, at block 1114, in accordance with the determination that the communication channel does not meet the availability criteria, wherein the communication channel is not connected, the electronic device displays a status screen indicating a status of the communication channel, wherein the status screen comprises at least one of a contact unavailable screen (e.g., contact unavailable screen 640), an incoming invitation screen (e.g., invitation screen 690), an invitation pending screen (e.g., contact pending screen 684, connection pending screen 698), and an invitation declined screen (e.g., contact declined screen 6010). Displaying a status screen when the communication channel is not available upon launch of the application provides the user with feedback about why the communication channel is not available and whether a connection is currently pending and provides visual feedback to the user indicating whether the communication channel may change to available under various circumstances described above and/or whether the user may have to communicate with the unavailable contact through other forms of communication. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, in accordance with a determination that the communication channel meets the set of availability criteria while displaying the status screen, wherein the availability criteria include a sixth criterion that is met when the device receives a sixth indication that the status of the communication channel has changed, the electronic device connects to the communication channel and replaces display of the status screen with display of the talk affordance (e.g., talk affordance 606) associated with the contact.

In accordance with some embodiments, the status screen is the invitation pending screen (e.g., contact pending screen 684, connection pending screen 698) and the criterion is met when the status changes from a pending-acceptance status to a contact-accepted status when the external device (e.g., device 699*a*) accepts connection to the communication channel.

In accordance with some embodiments, the status screen is the incoming invitation screen (e.g., invitation screen 690) including an accept affordance (e.g., accept affordance 692) and the criterion is met when the status changes from a pending-acceptance status to a user-accepted status in response to detecting a seventh touch input (e.g., touch input 697) on the accept affordance (e.g., accept affordance 692) to accept connection to the communication channel.

In accordance with some embodiments, subsequent to launching the application and in accordance with the determination that the communication channel does not meet the availability criteria, including a seventh criterion that is not met when the device has not previously connected to any communication channel via the application (e.g., and no pending invitations exist), the electronic device displays an add contacts user interface (e.g., welcome screen 800, add screen 808), and subsequent to displaying the add contacts user interface (e.g., welcome screen 800, add screen 808) and in response to detecting a first user request (e.g., touch input 682) to connect to a first contact, the device connects to a first communication channel associated with a first external device (e.g., device 699*a*) corresponding to the first contact. For example, the device displays a welcome screen 800 including a start affordance 804, detects touch input 806*a* on the start affordance 804, and transitions from the welcome screen 800 to add contacts user interface 808 including an add affordance 810. Further for example, in response to detecting a touch input 806*b* on the add affordance 810, the device displays a scrollable contacts list 678 including a plurality of contacts, and in response to selecting (e.g., touch input 682) the first contact of the plurality of contacts, the device connects to the first communication channel and replaces display of the scrollable contact list 678 with a status screen (e.g., contact pending screen 684) including a visual representation (e.g., visual representation 642) of the contact and an add affordance 644 for causing redisplay of the scrollable contacts list 678. In some examples, the screen is an invitation pending screen In accordance with some embodiments, while connecting to the first communication channel while the application is launched for display, in accordance with a determination that the first communication channel meets the set of availability criteria, the device displays a first talk affordance (e.g., talk affordance 606) associated with the first contact while the device is connected to the first communication channel, and in accordance with a determination that the first communication channel does not meet the set of availability criteria, wherein the first communication channel cannot be connected, the device ceases connecting to the first communication channel and displays an invitation declined screen (e.g., contact declined screen 6010). For example, the device replaces display of the invitation pending screen (e.g., contact pending screen 684) with at least one of the scrollable contact list 678 and a contact unavailable screen 640 that includes an add affordance 644 for causing redisplay of the scrollable contact list 678.

In accordance with some embodiments, subsequent to detecting the first user request (e.g., touch input 682) to connect to the first contact and while the application is not currently launched for display, in accordance with a determination that the first external device (e.g., device 699*a*) has accepted connecting to the first communication channel, the electronic device displays an invitation accepted alert (e.g., invitation status notification 6008, including a launch affordance 670 to launch the application and display the talk affordance 606 associated with a first affordance (e.g., contact affordance 604) representing the first contact), and in accordance with a determination that the first external device (e.g., 699*a*) has declined connecting to the first communication channel, displaying an invitation declined alert (e.g., invitation status notification 6008 at FIG. 6NF, including a dismiss affordance 672 to remove display of the notification 6008).

Note that details of the processes described above with respect to method 1100 (e.g., FIG. 11) are also applicable in an analogous manner to the methods described above. For example, methods 900 and 1000 optionally include one or more of the characteristics of the various methods described above with reference to method 1100. For example, methods 900 and 1000 can be combined with method 1100 to further include that in accordance with a determination that the communication channel does not meet the set of availability criteria, the device foregoes displaying the talk affordance. For brevity, these details are not repeated below.

FIG. 12 is a block diagram illustrating a method of signal transmission between two electronic devices for electronic voice communication. The method of FIG. 12 may be performed by any one of devices 100, 300, 500, 600, and 699*a*. Some operations in the method of FIG. 12 are, optionally, combined, the order of some operations are, optionally, changed, and some operations are, optionally, omitted.

While in a full-duplex live audio communication session (e.g., live audio communication session 1500) with an external device (e.g., device 600), the full-duplex live audio communication session configured to transmit control signal data (e.g., using control channel 1502) and separately transmit audio data (e.g., using media channel 1506), the electronic device receives control signal data (e.g., control signal data 1504) from the external device at block 1202. In some embodiments, the control signal data is transmitted to the external device when the user activates a talk affordance (e.g., talk affordance 606) on the external device. Optionally, the control signal may be encoded in the application-specific data of a Real-Time Transfer Control Protocol (RTCP) signal. In some examples, the control signal data presents as a rising signal edge on a control channel (e.g., control channel 1502, signal goes high from a default-low state). In other embodiments, the control signal data presents as an interruption in a steady-state high signal (e.g., a falling signal edge on control channel 1502)

At block 1204, the electronic device issues a perceptual notification (e.g., perceptual notification 626*a*) in response to receiving the control signal. In some embodiments, the perceptual notification is an audio output (e.g., from speaker 113 on device 100), a visual notification on a touch display (e.g., touch screen 112), a haptic output, or any combination thereof.

Optionally, at block 1206, the electronic device prevents audio input to a microphone (e.g., microphone 113 on device 699*a*) in response to receiving the control signal. In some embodiments, a touch affordance (e.g., touch affordance 606*a* on device 699*a*) allowing the user to enable the microphone is optionally disabled. In another such embodiment, the electronic device optionally mutes its uplink connection to a media channel (e.g., media channel 1506) in response to receiving the control signal data, thereby preventing second audio data (e.g., audio data 1610) from being sent to the external device. Since the control signal data is received before the audio data, disabling audio input to the microphone in this manner effectively prevents the electronic device from sending voice audio data to the external device immediately prior to receiving and while outputting the audio data. Alternatively and/or additionally, device 699*a* optionally does not transmit audio data on media channel 1506 while audio data 1510 is being received (e.g., device 699*a* may mute its uplink to media channel 1506). Optionally, the microphone, the transmitter, the analog-to-digital converter associated with the transmitter and/or the audio codec associated with the transmitter on device 699*a* are also powered down while receiving audio data 1510, lowering or eliminating power on media channel 1506 and/or control channel 1510. Thus, for the full-duplex live audio communication session between the electronic device and the external device (e.g., the session allows sending and receiving audio data simultaneously), disabling audio input in response to the control signal, under some circumstances, allows only one of the external device or the electronic device (e.g., devices 600 and 699*a*) to transmit audio data at any given time.

Optionally, at block 1208, the electronic device prevents other applications (e.g., applications shown on home screen 650 of device 600) from issuing notifications (e.g., notifications 664*a*) for a third predetermined time period (e.g., until talk user interface 602 or 602*a* is no longer displayed, when talk affordance 606 or 606*a* is no longer being activated, and/or when voice data is not currently being output) in response to the receiving the control signal. For example, perceptual notifications from other applications suppressed in response to the control signal include audio, visual and/or haptic alerts corresponding to receipt of a text message, e-mail alert, and so on. Optionally, the suppressed perceptual notifications are then issued after the predetermined time period elapses or after the full-duplex live audio communication session between the external device and the electronic device is terminated.

At block 1210, after a first predetermined time period (e.g., predetermined time period 1512) since receiving the control signal, the electronic device receives audio data (e.g., voice audio data 1510) from the external device. In some examples, the audio data is a digital data stream that encodes a voice signal (e.g., the voice signal picked up by the microphone (e.g., microphone 113) on external device 600 after activating talk affordance 606) and is interspersed in an existing audio data stream (e.g., the audio data steam transmitted over media channel 1506). During the full-duplex live audio communication session, baseline audio data (e.g., baseline audio data 1508, a baseline signal from a muted microphone) is, in some cases, still transmitted even though it does not encode a voice signal. In this case, baseline audio data is, optionally, transmitted at a lower bit rate than the audio data, which may encode a voice signal. In some embodiments, the audio data and baseline audio data are compressed using MPEG, AWS, EVS, ACELD, or any other audio codec suitable for real-time applications.

At block 1212, after a second predetermined time period (e.g., 100 ms, 150 ms, 250 ms, 500 ms, 1 s, etc.) since issuing the perceptual notification, the electronic device outputs the audio data from a speaker (e.g., speaker 111 on electronic device 699*a*).

In accordance with some embodiments, control signal data (e.g., control signal data 1504) is received on a first channel (e.g., control channel 1502) and audio data (e.g., voice audio data 1510) is received on a second channel (e.g., media channel 1506) that is different than the first channel during the full-duplex live audio communication session.

In accordance with some embodiments, the audio data (e.g., voice audio data 1510) comprises a plurality of audio data packets each having a header (e.g., RTP extension header, TCP extension header, non-audio encoding information) and a payload (e.g., RTP signal that encodes a voice signal). In some examples, the control signal data (e.g., control signal data 1504) is encoded in the header of at least one audio data packet in the plurality of audio data packets. In this case, the control signal data and audio data are received by the electronic device on the same channel. As an example, if audio data is transmitted to the electronic device according to the RTP standard, the corresponding control signal data is optionally encoded in the RTP extension header of the first RTP packet in the audio data stream. Alternatively and/or additionally, if audio data is transmitted to the electronic device according to the TCP standard, the corresponding control signal data is optionally encoded in the TCP extension header of the first TCP packet in the audio data steam.

In accordance with some embodiments, audio input to the microphone (e.g., microphone 113) is optionally enabled and second control signal data (e.g., control signal data 1604) is optionally output to the external device (e.g., device 600). In some embodiments, the audio input to the microphone is enabled in response to receiving a user input at the electronic device (e.g., user touch 620*a* that activates talk affordance 606*a*). In some embodiments, audio input to the microphone is enabled only if the user input is detected prior to receiving the control signal data (e.g., control signal 1504) from the external device or after playback of audio data sent by the external device (e.g., voice audio data 1510) has finished.

In accordance with some embodiments, audio input to the microphone is enabled a fourth predetermined time period (e.g., 100 ms, 150 ms, 250 ms, or any suitable time period, predetermined time period 1612) after receiving a user input (e.g., user touch 620*a* that activates talk affordance 606*a*).

In accordance with some embodiments, second audio data (e.g., audio data 1610) is output to the external device at a fourth predetermined time period (e.g., predetermined time period 1612) after outputting the second control signal data. For example, the second audio data is a digital data stream that encodes a voice signal (e.g., the voice signal picked up by the microphone (e.g., microphone 113) on electronic device 699*a* after activating talk affordance 606*a*) and is interspersed in an existing audio data stream (e.g., audio data transmitted over media channel 1606). In some cases, during the full-duplex live audio communication session, baseline audio data (e.g., baseline audio data 1608, a baseline signal from a muted microphone) is still transmitted (e.g., on media channel 1606 even though it does not encode a voice signal. In this case, baseline audio data is, optionally, transmitted to the external device at a lower bit rate (e.g., sample rate) than the audio data. In some cases, the audio data and baseline audio data is compressed using MPEG, AWS, EVS, ACELD, or any other audio codec suitable for real-time applications.

In accordance with some embodiments, the device determines if the user input occurred before the control signal data (e.g., control signal data 1504) was generated based on clocking data (e.g., a time-stamp) within the control signal data. For example, if talk affordances 606 and 606*a* are activated on both the electronic device and the external device at roughly the same time, the external device (e.g., device 600), in some cases, detects user activation of the talk affordance before receiving the second control signal data (e.g., control signal data 1604), but after the talk affordance on the electronic device (e.g., device 699*a*) was activated. Under some circumstances, this timing conflict is caused by latency, the non-instantaneous nature of signal transmission, or a number of other factors. In these cases, it is necessary to determine whether the talk affordance of the external device was activated before the control signal data was generated by the sending device. In some examples, the result then determines which device transmits audio data (e.g., over media channel 1606) and which device's audio output is disabled. In the example above, determining if the user input that activated talk affordance 606*a* occurred before the control signal data (e.g., control signal 1504) was generated is, optionally, based on clocking data contained in the control signal data and/or the second control signal (e.g., control signal 1604). In some embodiments, the clocking data is a time stamp specifying the absolute time (e.g., time elapsed since a time predetermined by the signaling standard) at which the control signal data was generated. In other embodiments, the clock data is a time stamp specifying the time elapsed since the audio communication session between the electronic device and the external device was established. In some examples, the determination is performed if the time difference between the time-stamp of the control signal data (e.g., control signal data 1504) and the time-stamp of the second control signal data (e.g., control signal 1604) is less than the average signal transmission time between the electronic device and the external device.

In some embodiments, in accordance with a determination that the user input occurred before the control signal data (e.g., control signal data 1504) was generated, the electronic device enables audio input to the microphone (e.g., microphone 113) and forgo outputting the audio data (e.g., audio data 1510) from the speaker. In accordance with a determination that the user input occurred after the control signal data was generated, the electronic device optionally prevents audio input to the microphone from being enabled and outputs the audio data from the speaker.

In accordance with some embodiments, the first predetermined time period (e.g., predetermined time period 1512) and the second predetermined time period have different lengths.

In accordance with some embodiments, the first predetermined time period (e.g., predetermined time period 1512) has the same length as the second predetermined time period.

In accordance with some embodiments, the first and second audio data (e.g., audio data 1510 and audio data 1610) are transmitted according to a voice over internet protocol (VoIP) standard selected from the group consisting of: FaceTime Audio, Real-Time Transfer Protocol, Secure Real-Time Transfer Protocol, Universal Datagram Protocol, and Transmission Control Protocol.

In accordance with some embodiments, the first and second control signal data (e.g., control signal data 1504 and control signal data 1604) are transmitted according to a voice over internet protocol (VoIP) standard selected from the group consisting of: Real-Time Transfer Control Protocol, Real-Time Transfer Protocol, and Transmission Control Protocol.

FIG. 13 is a flow chart illustrating a method for initiating live audio communication sessions between two electronic devices for electronic voice communications. The method of FIG. 13 is optionally performed by any one of devices 100, 300, 500, 600, and 699*a*. Some operations in the method of FIG. 13 are, optionally, combined, the order of some operations are, optionally, changed, and some operations are, optionally, omitted.

At block 1302, an electronic device (e.g., device 699*a*) receives, from an external device (e.g., device 600) associated with a contact (e.g., Aaron, John, Jane etc.) a request (e.g., session initiation protocol request signal) to establish a full-duplex live audio communication session (e.g., live audio communication session 1500) between the electronic device and the external device. For example, the request is, in some cases, a signal transmitted according to Session Initiation Protocol (SIP) that includes an INVITE request and a description unit specifying the media format of the full-duplex live audio communication session. In the example of FIG. 6NB, the request is sent to the external device by the electronic device in response to detecting selection of Aaron Smith from contact list 678 by touch input 682.

At block 1304, the electronic device determines whether the contact is on a list (e.g., a whitelist representing a list of contacts associated with external devices with which the electronic device has established a communication session via the "Talk App" and/or contact list 678).

In accordance with a determination that the contact is on the list, the electronic device establishes the full-duplex audio communication session (e.g., connects to control channel 1502 and media channel 1506 allocated to the full-duplex audio communication session) between the electronic device and the external device at block 1306. In particular, the electronic device establishes the full-duplex live audio communication session without receiving a user input (e.g., user touch 692) that acknowledges the request.

Optionally, at block 1308, the electronic device disables audio input to a microphone (e.g., microphone 113) on the electronic device in response to establishing the full-duplex live audio communication session. In accordance with some embodiments, the microphone is disabled for a predetermined period of time (e.g., 1 s, 5 s, 10 s, 30 s, etc.) after establishing the full-duplex live audio communication session. In accordance with other embodiments, the audio input to the microphone is disabled until playback of audio data (e.g., voice audio data 1510) is finished playing back through a speaker (e.g., speaker 113) on the electronic device. In yet other embodiments, audio input to the microphone is disabled until a talk affordance on the electronic device (e.g., talk affordance 606*a*) is activated.

In accordance with a determination that the contact is not on the list, the electronic device waits for a user input (e.g., user touch 692 at touch screen 112) that accepts the request at block 1310 and establishes the full-duplex live audio communication session only if the user input is detected (e.g., at touch screen 112).

Optionally, at block 1312, the electronic device establishes the full-duplex live audio communication session and adds the contact to the list in response to the detecting the user input.

Optionally, in response to establishing the full-duplex live audio communication after detecting the user input, the electronic device disables audio input to the microphone at block 1314.

In accordance with some embodiments, in response to detecting an additional user input (e.g., touch input 682 that selects a contact from contact list 678), the electronic device sends a request (e.g., an SIP request) to establish a second full-duplex live audio communication session between the electronic device and a second external device (e.g., device 699*b*) associated with a second contact. In some examples, in response to sending the request to the second external device, the electronic device adds the additional contact to the whitelist (e.g., whitelist on device 600). For example, the request is, in some cases, a signal transmitted according to Session Initiation Protocol (SIP) that includes an INVITE request and a description unit specifying the media format of the full-duplex live audio communication session.

Figure 14A:
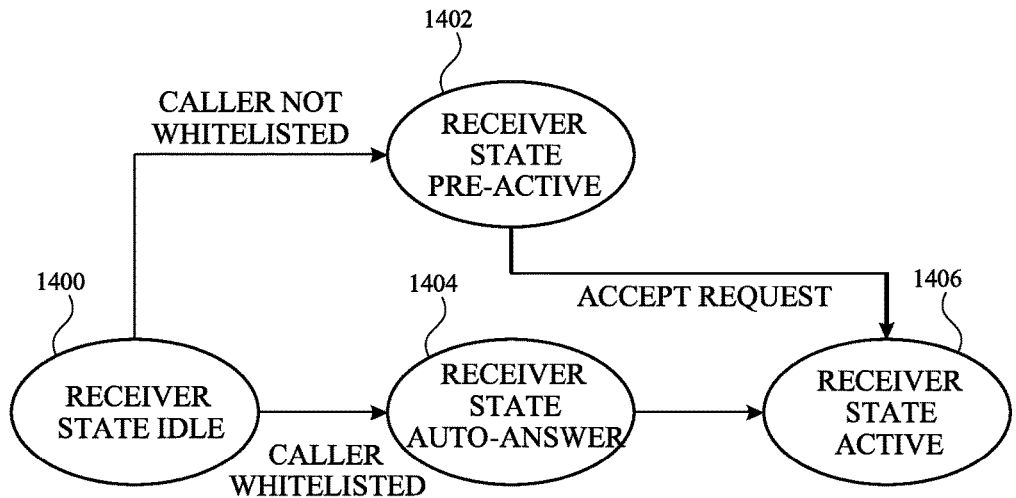
FIG. 14A illustrates a diagram of different states and state transitions of a receiver device for electronic voice communications, in accordance with some embodiments.

Referring now to a high-level discussion of exemplary receiver states (e.g., states of devices 600, 699*a*, and/or 699*b* while performing processes 900, 1000, 1100, 1200 and/or 1300), FIG. 14A illustrates various states of a receiving device and transitions between those states. Before receiving a session initiation request (e.g., an SIP signal), the receiver device is in idle state 1400. As an example, device 699*b* in FIG. 6KA is in idle state 1400 prior to receiving an incoming call. In idle state 1400, talk user interface 602*b*, request 6000*c*, and any other affordances associated with the voice communication application are not displayed, and the receiving device (e.g., 699*b*) is not connected to other devices over the voice communication application.

In response to receiving an incoming voice communication session request from an external device (e.g., at block 1302 of FIG. 13), the receiving device determines whether or not the contact associated with that external device is on a whitelist (e.g., a list of vetted contacts the device has previously communicated with over the voice application) as discussed above (e.g., at block 1302 of FIG. 13). If the contact is not whitelisted (e.g., is not on the whitelist, determined at block 1310 of FIG. 13), the receiving device transitions to pre-active state 1402. As an example, device 699*b* in FIG. 6KJ is in pre-active state 1402 after receiving a session initiation request from an external device (e.g., device 600) associated with non-whitelisted contact (e.g., John). In pre-active state 1402, the device optionally waits for a user input that accepts the request and establish the audio communication session only if a user input that accepts the request is detected (e.g., at block 1310 of FIG. 13). While waiting for a user input that accepts the request, the receiving device optionally displays an invitation screen (e.g., invitation screen 690*b*) that includes a visual indication of the call request, as well as affordances to either accept (e.g., accept affordance 692) or decline (e.g., decline affordance 694) the incoming call. In some cases, the receiving device optionally issues an audio, visual or haptic notification in response to receiving the incoming call (e.g., at block 1204 of FIG. 12). In some examples, the receiving device also sends a response signal (e.g., an SIP response code) to the external device that acknowledges receipt of the session initiation request, but does not accept or decline.

In response to receiving a user input that accepts the request (e.g., user touch 696 at accept affordance 692 in FIG. 6KK, block 1312 of FIG. 13), the receiving device transitions to active state 1406. As an example, device 699*b* in FIG. 6KN is in active state 1406. In active state 1406, the receiver device is connected to one or more communication channels allocated to a live audio communication session with the calling device (e.g., device 600). For example, the receiving device optionally connects to the calling (external) device via control channel 1502 and media channel 1506 shown in FIG. 15. In active state 1406, the receiving device (e.g., device 699*b*) optionally receives and transmits audio and/or control data to/from the external device. In particular, while in active state 1406, the receiving device optionally receives control signal data from the calling device (e.g., at block 1202 of FIG. 12) and issues an additional perceptual notification (e.g., notification 630 at block 1204 of FIG. 12) in response to receiving the control signal data. After a predetermined time since receiving the control signal data, while still in active state 1416, the receiving device also receives audio data from the external device (e.g., audio data 1510 at block 1210 of FIG. 12). After a second predetermined time period since issuing the additional perceptual notification and while still in active state 1416, the receiving device outputs audio data received from the external device on a speaker (e.g., speaker 111, block 1212 of FIG. 12) While in active state 1406, the receiving device optionally displays a talk user interface (e.g., talk user interface 602*b*), as well as a talk affordance (e.g., talk affordance 606*b*) that may be activated to transmit audio data to the external device (e.g., using microphone 113). In the example of FIG. 14A, after disconnecting from the live audio communication session (e.g., due to time-out, exiting the voice communication application, etc.), or if network connectivity is lost, the receiving device returns to idle state 1400.

In the example of FIG. 14A, if the contact associated with the calling device is whitelisted (e.g., in response to determining that the contact is on a list at block 1304 of FIG. 13), the receiving device transitions to auto-answer state 1404. As an example, device 600 in FIG. 6L-4 is in auto-answer state 1404. While in auto-answer state 1404, the receiving device optionally connects to one or more communication channels allocated to a live audio communication session with the calling device so that incoming audio data can be received. In some examples, device 600 also issues an audio, visual, and/or tactile notification (e.g., notification 626) indicating that the audio session is being established and audio data is incoming. After connecting to the one or more communication channels, the receiver device automatically transitions to active state 1406 without receiving a user input that acknowledges the session initiation request (e.g., establish the full-duplex live audio communication session at block 1306 of FIG. 13).

Figure 14B:
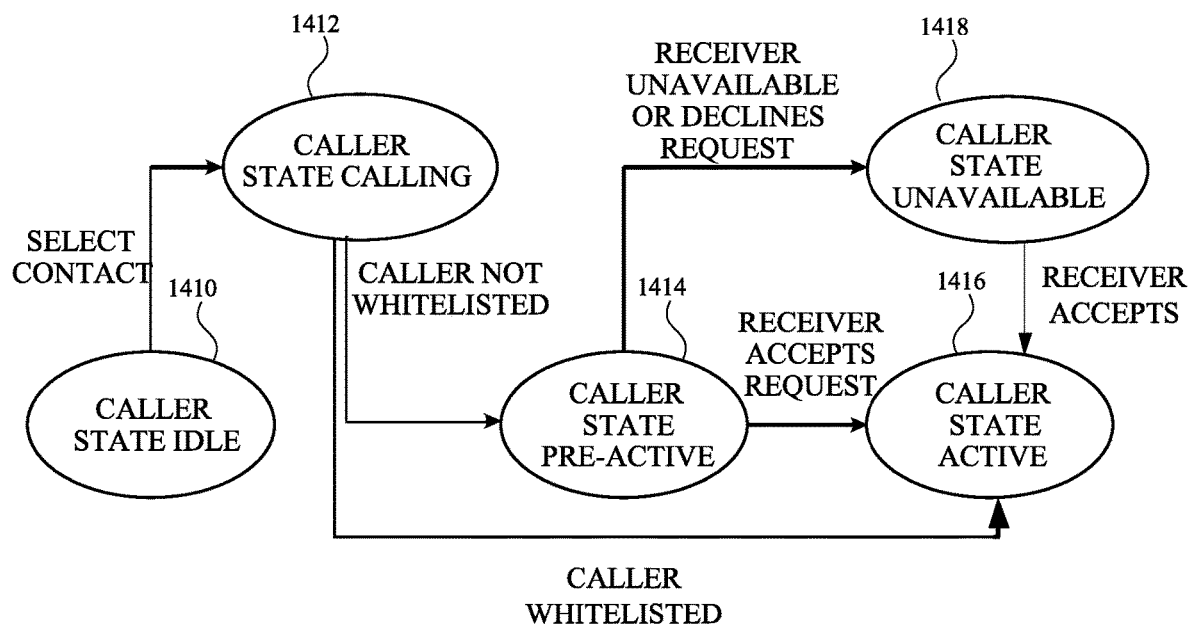
FIG. 14B illustrates a diagram of different states and state transitions of a caller device for electronic voice communications, in accordance with some embodiments.

Similarly, FIG. 14B illustrates exemplary states of a calling device (e.g., device 600, 699*a*, and/or 699*b*) and transitions between those states (e.g., according to processes 1200 and 1300 in FIGS. 12 and 13). Before opening the voice communication application or placing a call, the calling device is in an idle state 1410. As an example, device 600 in FIG. 6KA is in idle state 1410. In this state, the calling device is not connected to another device through the voice communication application, but optionally displays a contact list (e.g., contact list 678) representing contacts to which a call can be made. Alternatively, the calling device (e.g., device 600) optionally displays a home screen (e.g., home screen 650 in FIG. 6KG) or the user interface of another application besides the voice communication application.

In the example of FIG. 14B, in response to selecting a contact associated with an external device (e.g., from contact list 678), the calling device transitions to calling state 1412.

As an example, device 600 in FIG. 6KA is shown in calling state 1412. In this state, the calling device optionally displays a contact pending screen (e.g., contact pending screen 684), indicating that the calling device is waiting to connect. In some cases, while in calling state 1412, the calling device (e.g., device 600) sends a session initiation request (e.g., an SIP request signal) to the external device (e.g., device 699*b*), and optionally connects to one or more communication channels allocated to a live audio communication session with the external device (e.g., control channel 1602 and media channel 1606 in FIG. 16).

If the calling device is whitelisted by the receiving device, the calling device immediately transitions to active state 1416 (e.g., receiving device auto-accepts the session request sent at calling state 1412). As an example, device 600 in FIG. 6KN is in active state 1416. In active state 1416, both the calling device and receiving device are connected through the live audio communication session and may either transmit or receive media and/or control data (e.g., over media channel 1606 and control channel 1602). Calling device 600 optionally displays talk user interface 602 with talk affordance 606, activation of which allows the user to send voice audio data to the receiving device (e.g., device 699*b*) as discussed above. In the example of FIG. 14B, after disconnecting from the live audio communication session (e.g., due to time-out, exiting the voice communication application, etc.), or if network connectivity is lost, the calling device returns to idle state 1410

If the calling device is not whitelisted by the receiving device, the calling device transitions to pre-active state 1414 (e.g., after receiving an SIP response code from the receiving device acknowledging the SIP request sent at the calling state). Similar to calling state 1412, the calling device optionally displays a contact pending screen such as contact pending screen 684 shown on device 600 in FIG. 6KA. While in pre-active state 1414, the calling device waits for a signal (e.g., an SIP response code) indicating that the receiving device either accepted or denied the session initiation request.

If the receiving device accepts the session initiation request, the calling device transitions to active state 1416 discussed above.

If the receiving device declines the session initiation request or otherwise becomes unavailable (e.g., due to network failure), the calling device transitions to unavailable state 1418. As an example, device 600 in FIG. 6MC is in unavailable state 1418. In this state, device 600 optionally displays contact declined screen 6010 (e.g., in the case that the receiver declined the request). Alternatively, the device optionally displays an indication that the contact is unavailable (e.g., contact unavailable screen 640*a* displayed on device 699*a* in FIG. 6OC) in the case that the receiver device is not connected to a network or is on another call. In the example of FIG. 14B, the calling device then transitions back to idle state 1410. For example, the device transitions back to idle state 1410 either at a predetermined time after entering unavailable state 1418, or in response to the user exiting the voice communication application. However, if the receiving device later accepts the request within a predetermined time period (e.g., 5 m, 10 m, 30 m, or another suitable time period), the calling device optionally transitions directly into active state 1416. In this example, the receiving device automatically answers a call returned by the receiver within a predetermined window.

FIGS. 19A-19AC illustrate exemplary user interfaces for providing different types of feedback for an outgoing communication and an incoming communication. The user interfaces in these figures are used to illustrate the processes described below, including the processes in FIGS. 20A-20B.

FIG. 19A illustrates an electronic device 1900. In some embodiments, electronic device 1900 is a wearable device (e.g., a smartwatch). In some embodiments, electronic device 1900 includes a display 1902 and one or more input devices (e.g., a touch-sensitive surface of display 1902, a rotatable input device 1904). In FIG. 19A, electronic device 1900 is displaying, on display 1902, a time user interface 1906 (e.g., a default user interface that is shown when the display is turned on) that includes an indication of the current time. While displaying time user interface 1906, electronic device 1900 detects an activation 1901 of rotatable input device 1904 (e.g., a press input causing rotatable input device 1904 to "click").

Figure 19B:
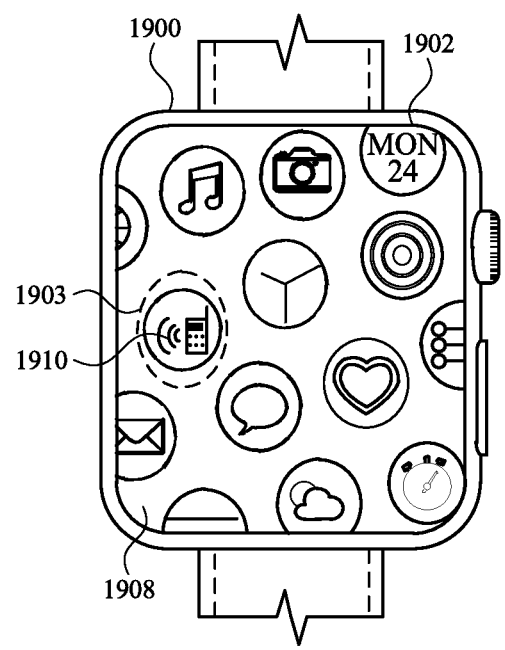

As shown in FIG. 19B, in response to detecting activation 1901 of rotatable input device 1904, while displaying time user interface 1906, electronic device 1900 displays, on display 1902, an applications user interface 1908 (e.g., a main user interface of the operating system that includes one or more icons corresponding to applications installed on the electronic device). Each of the one or more icons, when activated, causes display of a corresponding application on display 1902. In some embodiments, applications user interface 1908 includes a voice communication application icon 1910 corresponding to a voice communication application (e.g., a walkie-talkie application). In FIG. 19B, while displaying applications user interface 1908, electronic device 1900 detects (e.g., via a touch-sensitive surface of display 1902) an activation 1903 (e.g., a touch input) of voice communication application icon 1910.

Figure 19C:
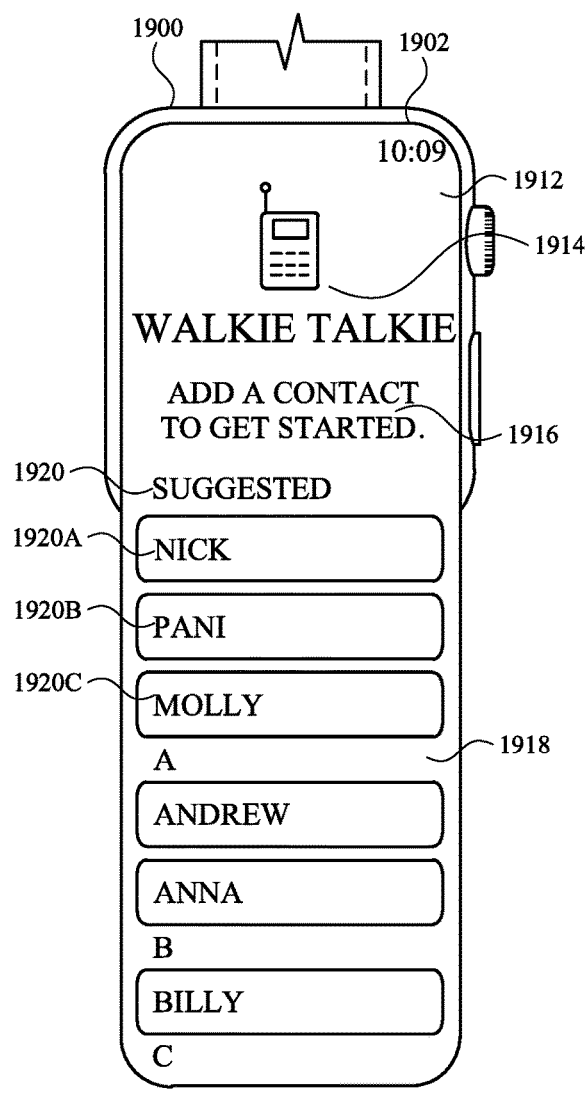

Activation 1903 of voice communication application icon 1910 corresponds to the first (initial) launch of the voice communication application on electronic device 1900 (and thus a user of electronic device 1900 has not yet used the voice communication application on electronic device 1900). In some embodiments, in accordance with a determination that the voice communication application is launched for the first time on the device, electronic device 1900 displays a setup user interface 1912 of the voice communication application, as shown in FIG. 19C. In some embodiments, setup user interface 1912 includes an indication 1914 (e.g., a graphical and/or textual indication, stating "Walkie-Talkie") that the application is associated with enabling voice communications. In some embodiments, setup user interface 1912 also includes an indication 1916 (e.g., stating "Add a contact to get started") instructing that the user add (and thus approve) one or more contacts to begin performing voice communications using the voice communication application. Setup user interface 1912 and other user interfaces are sometimes displayed exceeding the size of display 1902 for the ease of the user's understanding.

In some embodiments, setup user interface 1912 includes a contacts list 1918 that includes a list of one or more other users that can be added as an approved contactable user for performing voice communications using the voice communication application. In some embodiments, contacts list 1918 corresponds to a remote contacts list (e.g., stored on a different electronic device of the user, such as a smartphone, or stored on an external server accessible by electronic device 1900) associated with the user of electronic device 1900. In some embodiments, contacts list 1918 includes a suggested contacts list 1920 (e.g., including suggested users 1920A-1920C) showing one or more other contactable users that can be added as an approved contactable user for performing voice communications using the voice communication application (e.g., because each of these users are associated with an electronic device that is configured to and/or is capable of running the voice communication application). In some embodiments, contacts list 1918 includes one or more other users that are associated with electronic devices that are configured to and/or are capable of running a corresponding voice communication application and one or more other users that are associated with electronic devices that are not configured to and are not capable of running the corresponding voice communication application. In some embodiments, at least a portion of the listed other users in contacts list 1918 are listed in alphabetical order. In some embodiments, contacts list 1918 does not include users that are not configured to and/or are not capable of running a corresponding voice communication application.

Figure 19D:
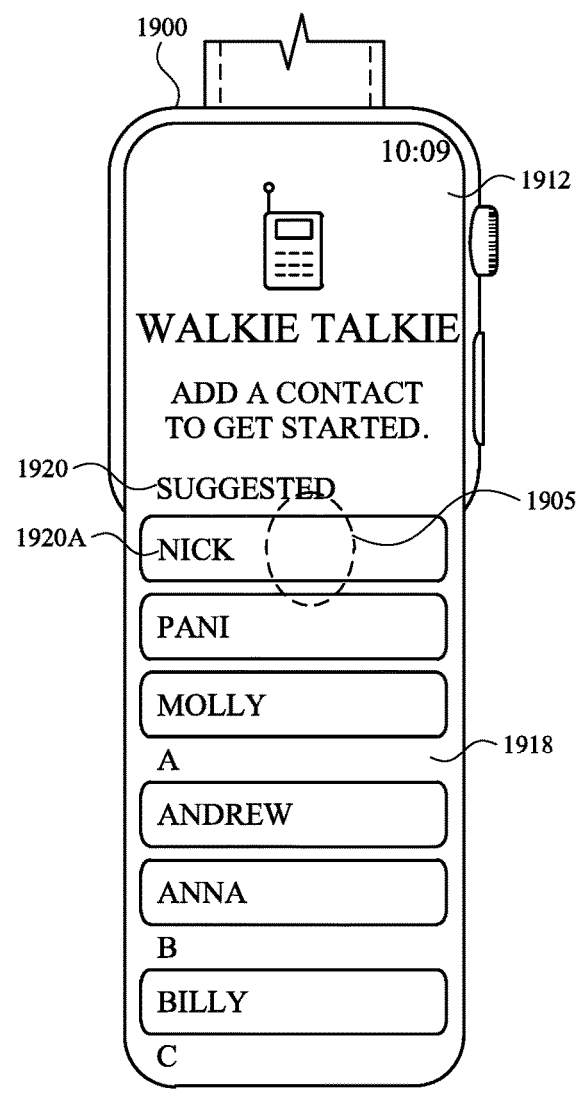

In FIG. 19D, while displaying, on display 1902, contacts list 1918, electronic device 1900 detects a selection 1905 (e.g., a touch input) of a first contactable user 1920A (e.g., named "Nick") from suggested contacts list 1920. In some embodiments, first contactable user 1920A is included in suggested contacts list 1920 because first contactable user 1920A is associated with an electronic device that is configured to and/or is capable of running the voice communication application. In some embodiments, in response to detecting selection 1905 of first contactable user 1920A, electronic device 1900 adds first contactable user 1920A as an approved contactable user (and thus first contactable user 1920A is approved to engage in voice communications with the user of electronic device 1900 via the voice communication application). In some embodiments, upon adding first contactable user 1920A as an approved contactable user, electronic device further adds a representation (e.g., a platter) of first contactable user 1920A to contactable user selection user interface 1938, as illustrated in FIG. 19AC.

Figure 19E:
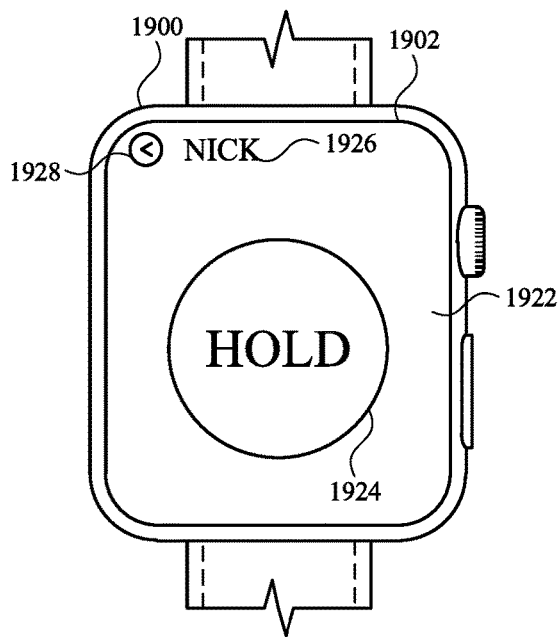

FIG. 19E illustrates electronic device 1900 displaying, on display 1902, a communication user interface 1922 of the voice communication application in response to detecting selection 1905 of first contactable user 1920A. In FIG. 19E, because first contactable user 1920A was previously selected, the voice communication application is set for communication with first contactable user 1920A, as indicated by a current contactable user indication 1926 (e.g., stating the name of first contactable user 1920A, "Nick"). In some embodiments, communication user interface 1922 also includes a back affordance 1928 for viewing one or more contactable users that have been approved by the user of electronic device 1900 to engage in voice communications with the user via the voice communication application.

As also shown in FIG. 19E, communication user interface 1922 includes a communication button 1924 for use during a voice communication (e.g., to record an outgoing communication). As explained in greater detail below, communication button 1924 can be activated to record an outgoing voice communication. Further, in some embodiments, a respective region of communication button 1924 and/or a respective region surrounding communication button 1924 of communication user interface 1922 provide different types of visual feedback (e.g., for when an outgoing voice communication is being recorded, for when an incoming voice communication is being played).

Figure 19F:
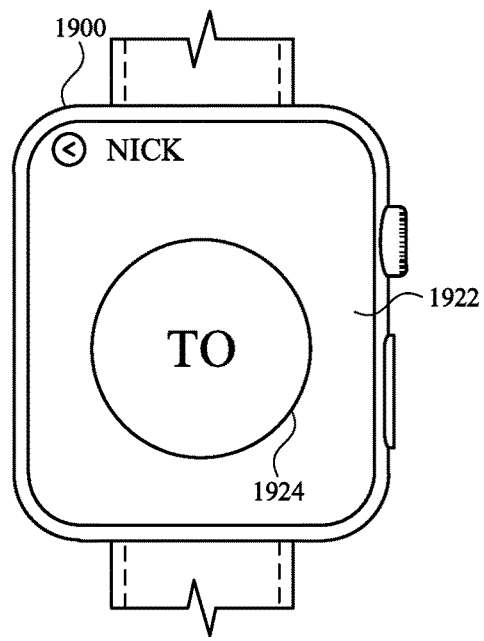
Figure 19G:
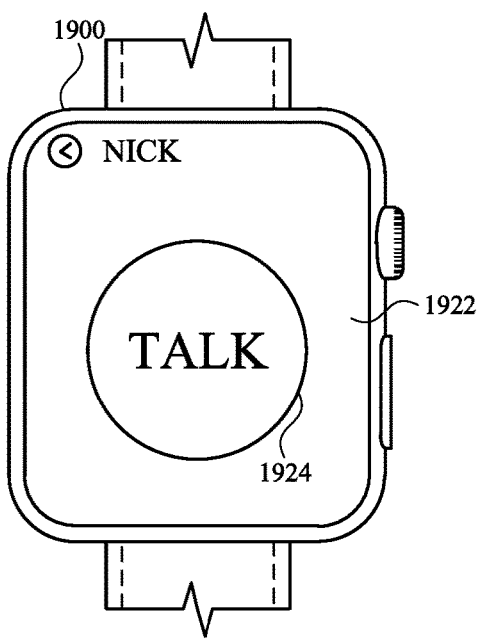

In some embodiments, as shown in FIGS. 19E-19G, if the current launch of the voice communication application corresponds to the first (initial) launch of the application on the device (and thus there has been no prior communications performed using the application on the device), the voice communication application provides (e.g., on communication button 1924) a sequence of indications (e.g., a sequence of texts stating "Hold" "To" "Talk") explaining that communication button 1924 can be used to record an outgoing voice communication (to the other communication participant, Nick). For example, "Hold" is replaced by "To", which is then replaced by "Talk". In some examples, "Talk" is then replaced by "Hold" and the process continues for 1 or more additional iterations. In some embodiments, the voice communication application does not provide the sequence of indications when the current launch of the voice communication application does not correspond to the first (initial) launch of the application on the device.

Figure 19H:
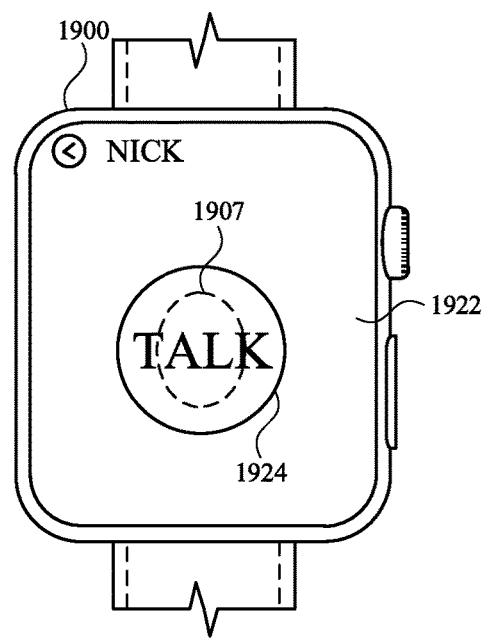
Figure 19I:
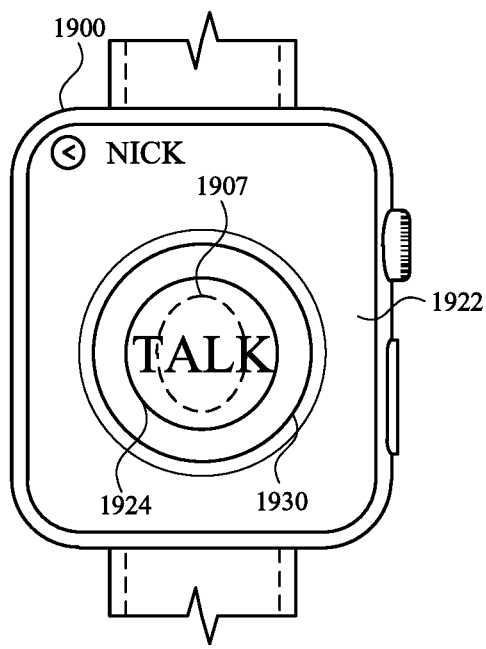
Figure 19J:
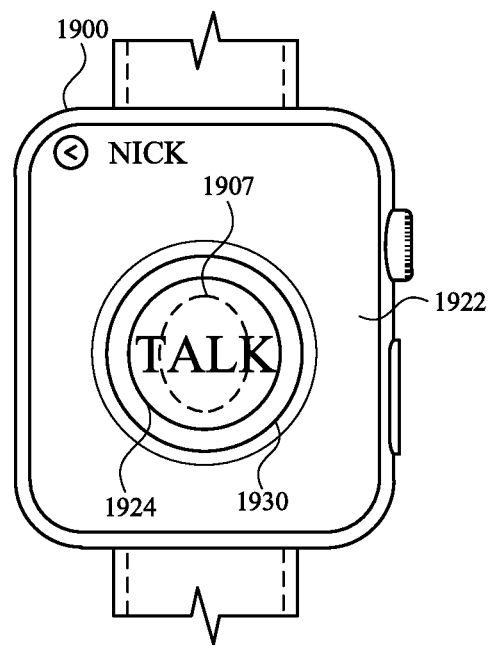
Figure 19K:
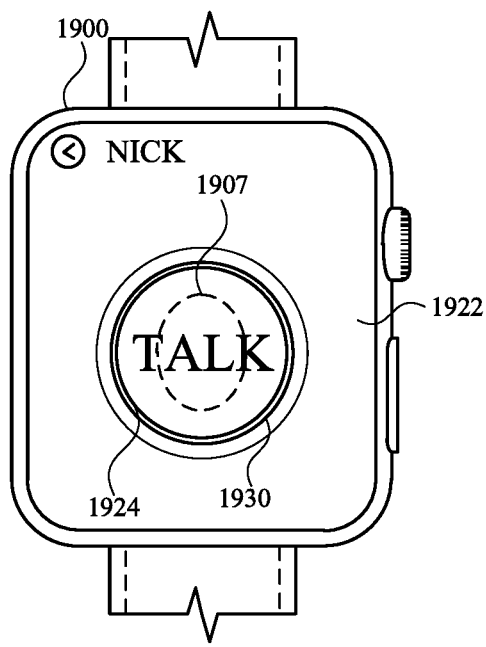

In FIG. 19H, while displaying communication user interface 1922, electronic device 1900 detects (e.g., via a touch-sensitive surface of display 1902), an activation 1907 of communication button 1924. In some embodiments, activation 1907 is a press-and-hold input that is maintained on communication button 1924. As explained below, electronic device 1900 performs a recording (e.g., using a mic of the device) of the user's spoken input (and/or other audio) while activation 1907 is maintained on communication button 1924; when electronic device 1900 detects that activation 1907 is no longer maintained on communication button 1924 (because the user has ceased the press-and-hold input on the button), the device ceases the recording.

In some embodiments, in response to (and while) detecting activation 1907 on communication button 1924, electronic device 1900 initiates the establishment of a live communication channel (e.g., via a wireless communication radio of the device) with a second electronic device involved in the voice communication (e.g., the device of first contactable user 1920A, Nick). In some embodiments, upon successfully establishing the live communication channel with the second electronic device and while continuing to detect activation 1907 of communication button 1924, electronic device 1900 transmits, in real-time, the user's spoken user input received (e.g., using a mic of the device) by electronic device 1900 via the live communication channel. In some embodiments, in response to (and while) detecting activation 1907 but prior to successfully establishing the live communication channel with the second electronic device (e.g., the delay period between detecting activation 1907 and successfully establishing the live communication channel in response to detecting activation 1907), electronic device 1900 records (and stores) the user's spoken input if any input is received during this time. Upon successfully establishing the live communication channel with the second electronic device, electronic device 1900 transmits the recorded spoken input and then switches to real-time transmittal of the user's spoken input via the live communication channel.

In FIGS. 19H-19K, activation 1907 (e.g., a press-and-hold input) is maintained on communication button 1924 of communication user interface 1922. In some embodiments, while detecting that activation 1907 on communication button 1924 is maintained, electronic device 1900 provides a record visual feedback 1930 indicating that an outgoing voice communication is being recorded by the device. During this time, electronic device 1900 performs an audio recording (e.g., via a mic of the device), such as an audio recording of the user's voice intended to be the outgoing voice communication.

In some embodiments, electronic device 1900 provides record visual feedback 1930 within a respective region surrounding and/or within communication button 1924. In some embodiments, record visual feedback 1930 comprises a ripple-like animation where a plurality of ring-like patterns are moving in an inward direction (e.g., akin to inward-moving ripples). In some embodiments, electronic device 1900 also provides a haptic feedback upon initiating a recording.

Figure 19L:
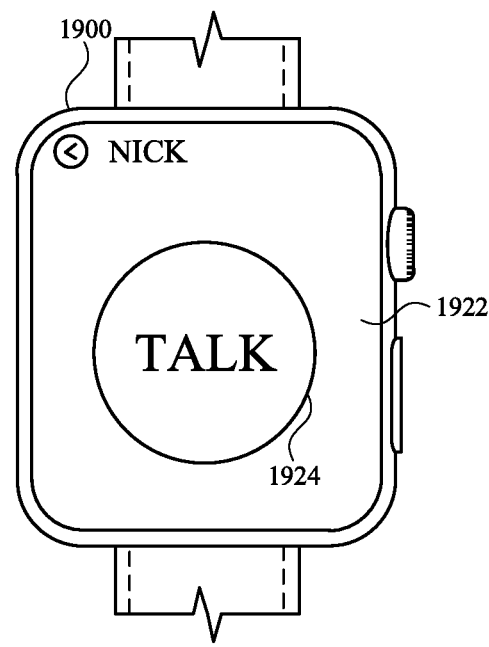

As shown in FIG. 19L, upon ceasing to detect activation 1907 of communication button 1924, electronic device 1900 ceases performing the audio recording of the user's voice (and other audio) and (concurrently) ceases displaying record visual feedback 1930 on communication user interface 1922. Thus, in FIG. 19L, the voice communication application is in an idle state (e.g., as indicated by a lack of any type of visual feedback provided on and/or surrounding communication button 1924)—electronic device 1900 is neither recording an outgoing voice communication nor playing an incoming voice communication.

Figure 19M:
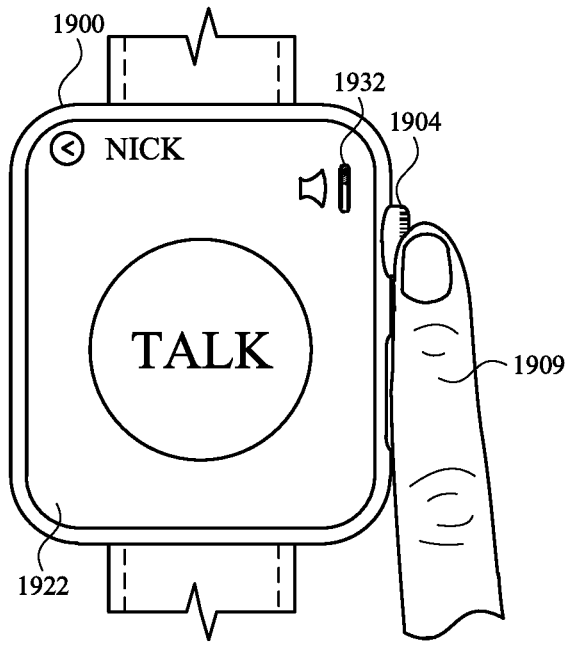

In FIG. 19M, while displaying communication user interface 1922 of the voice communication application, electronic device 1900 detects an input 1909 on rotatable input device 1904, where input 1909 corresponds to a rotation of rotatable input device 1940. In some embodiments, in response to detecting input 1909, electronic device 1900 displays, in communication user interface 1922, a volume indicator 1932 (e.g., which includes a volume bar). Volume indicator 1932 reflects the audio volume setting of electronic device 1900. In some embodiments, upon detecting input 1909 in a first direction (e.g., a clockwise direction), electronic device 1900 increases the audio volume setting and reflects the change in volume via volume indicator 1932 (e.g., by increasing the level of the volume bar). In some embodiments, upon detecting input 1909 in a second direction (e.g., a counter-clockwise direction), electronic device 1900 decreases the audio volume setting and reflects the change in volume via volume indicator 1932 (e.g., by decreasing the level of the volume bar).

Figure 19N:
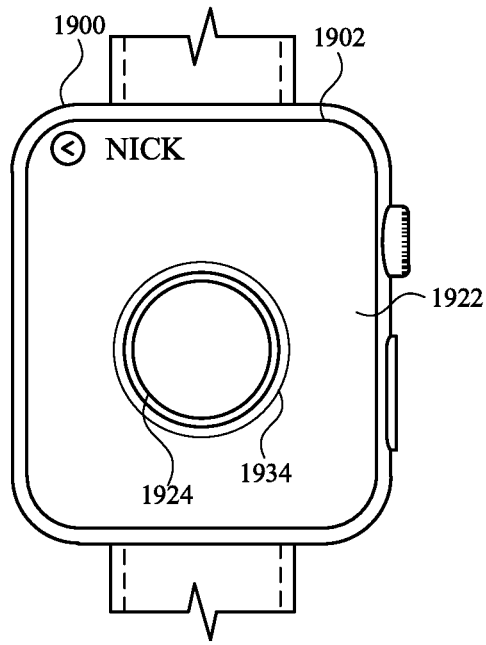
Figure 19O:
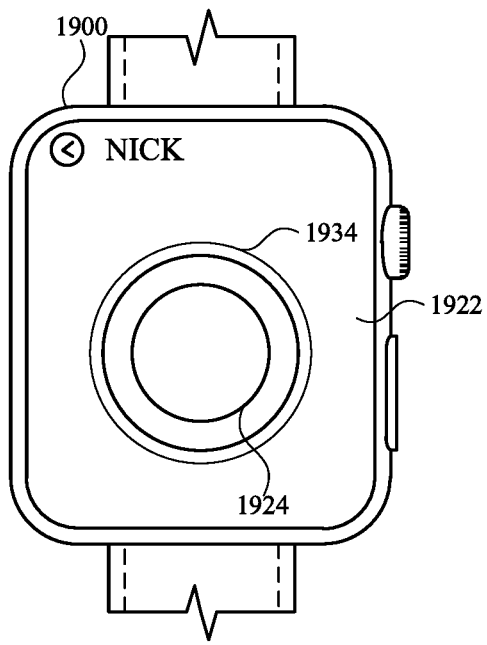
Figure 19P:
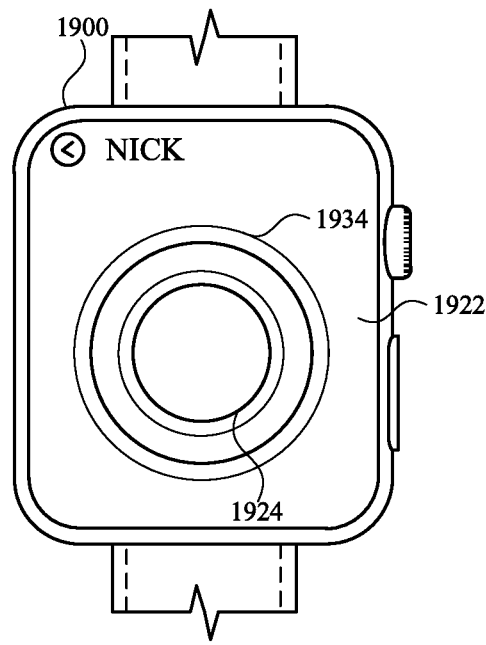

FIGS. 19N-19P illustrate electronic device 1900 displaying, on display 1902, communication user interface 1922 while playing (e.g., via one or more speakers of the device) an incoming voice communication (e.g., from Nick) received by the device. The incoming voice communication corresponds to a voice (or other audio) recording performed by the sender (e.g., Nick) using a corresponding voice communication application on the sender's electronic device.

In some embodiments, as shown in FIGS. 19N-19P, while playing the incoming voice communication, electronic device 1900 provides a play visual feedback 1934 indicating that an incoming voice communication is being played by electronic device 1900. During this time, electronic device 1900 plays (e.g., via one or more speakers of the device) an audio recording corresponding to the incoming voice communication (e.g., from Nick).

In some embodiments, electronic device 1900 provides play visual feedback 1934 within a respective region surrounding and/or within communication button 1924. In some embodiments, play visual feedback 1934 comprises a ripple-like animation where a plurality of ring-like patterns are moving in an outward direction (e.g., akin to outward-moving ripples). Thus, in some embodiments, play visual feedback 1934 is provided in an opposite (or contrasting) pattern to record visual feedback 1930. In some embodiments, electronic device 1900 also provides a haptic feedback upon receiving an incoming voice communication to be played by the device.

Figure 19Q:
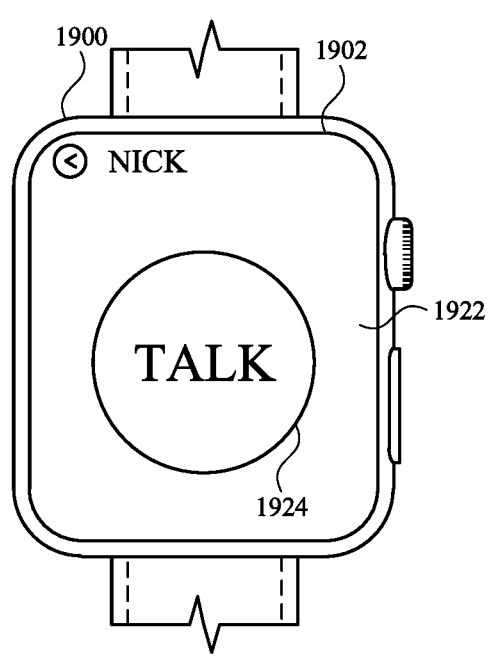

FIG. 19Q illustrates electronic device 1900 displaying, on display 1902, communication user interface 1922 with communication button 1924 after having played an incoming voice communication (e.g., from Nick). Thus, in FIG. 19Q, the voice communication application is in an idle state (e.g., as indicated by a lack of any type of visual feedback provided on and/or surrounding communication button 1924)—electronic device 1900 is neither recording an outgoing voice communication nor playing an incoming voice communication.

FIGS. 19R-19U illustrate the voice communication application transitioning from being in a voice communication session with the previous contactable user (e.g., Nick) to being in a voice communication session with a different contactable user (e.g., Pani) upon receiving an (new) incoming voice communication from the new contactable user (e.g., where the new contactable user is, like the previous contactable user, approved to engage in communication via the voice communication application with the user of electronic device 1900).

In some embodiments, upon receiving a new incoming voice communication from a new contactable user (e.g., Pani) while the device is in a voice communication session with the previous contactable user (e.g., Nick), electronic device 1900 automatically (e.g., without user input) transitions from the voice communication session with the previous contactable user to a voice communication session with the new contactable user. Thus, in some embodiments, the new incoming voice communication from the new contactable user (e.g., Pani) "bumps" (replaces) the previous contactable user (e.g., Nick) from the current voice communication session. Alternatively, in some embodiments, at least a predetermined number of incoming voice communications within a predetermined time period (e.g., 3 voice messages in 1 minute, 5 voice messages in 2 minutes) is required before the voice communication application bumps the previous contactable user from the current voice communication session in favor of the new contactable user.

Figure 19R:
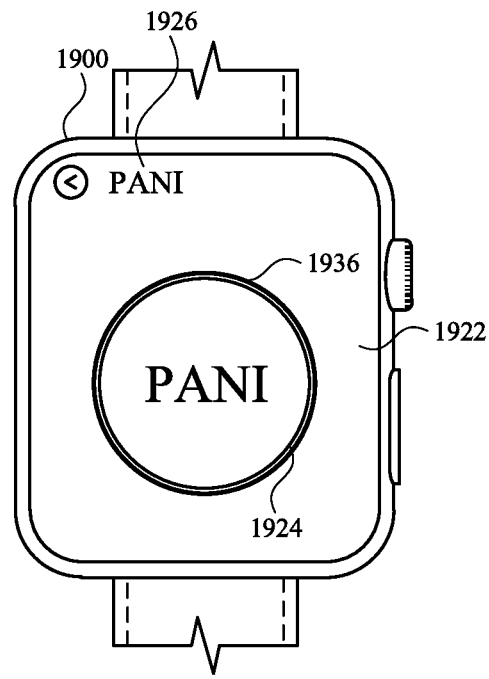
Figure 19S:
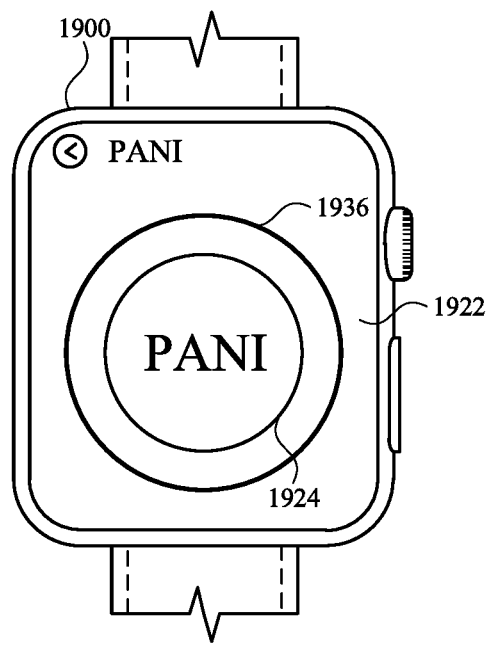
Figure 19T:
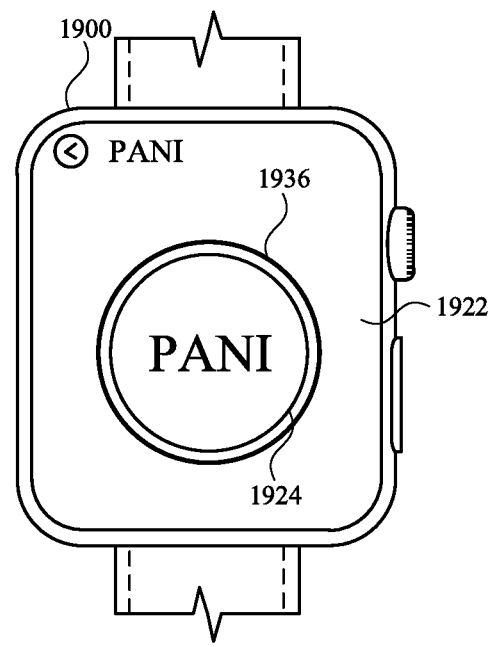

As shown in FIG. 19R, upon/after bumping the previous contactable user (e.g., Nick) from the voice communication session in favor of the new contactable user (e.g., Pani), electronic device 1900 updates current contactable user indication 1926 of communication user interface 1922 to indicate that the voice communication session is now set to be with the new contactable user instead of the previous contactable user. In some embodiments, as shown in FIG. 19R, electronic device 1900 further indicates, in communication button 1924, that the current communication session is configured to be with the new contactable user (e.g., by replacing a default text stating "Talk" with the name of the new contactable user). In some embodiments, as shown in FIGS. 19R-19T, electronic device 1900 further provides a transition visual feedback 1936 indicating that the previous contactable user has been bumped from the current voice communication session in favor of the new contactable user. In some embodiments, while providing visual feedback 1936, electronic device 1900 plays (e.g., via one or more speakers of the device) a voice (or audio) message corresponding to the new incoming voice communication (e.g., from Pani) that caused the previous contactable user to be bumped from the current voice communication session.

In some embodiments, electronic device 1900 provides transition visual feedback 1936 within a respective region surrounding and/or within communication button 1924. In some embodiments, transition visual feedback 1936 comprises one or more ring-like patterns moving back and forth (e.g., within a tight area surrounding communication button 1924). In some embodiments, electronic device 1900 also provides a haptic feedback in addition to (or alternatively to) providing transition visual feedback 1936.

Figure 19U:
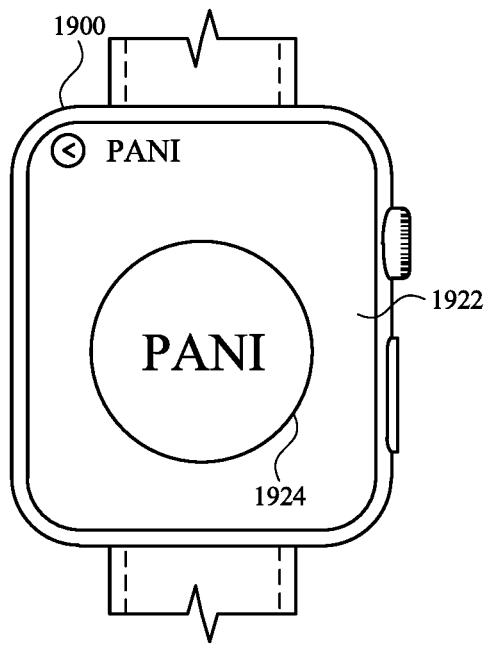

FIG. 19U illustrates electronic device 1900 displaying, on display 1902, communication user interface 1922 after having bumped the previous contactable user (e.g., Nick) in favor of the new contactable user (e.g., Pani) (and after having played the new incoming voice communication from Pani and providing transition visual feedback 1936 indicating the transition from the previous to the new contactable user). Thus, in FIG. 19U, the voice communication application, while set to engage in communication with the new contactable user, is in an idle state-electronic device 1900 is neither recording an outgoing voice communication nor playing an incoming voice communication.

Figure 19V:
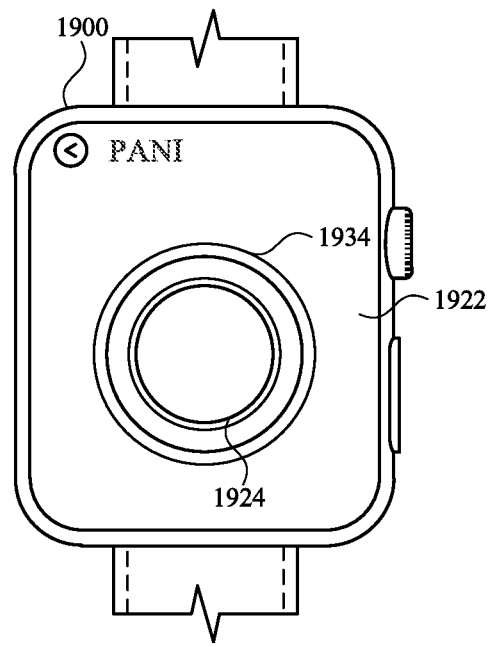
Figure 19W:
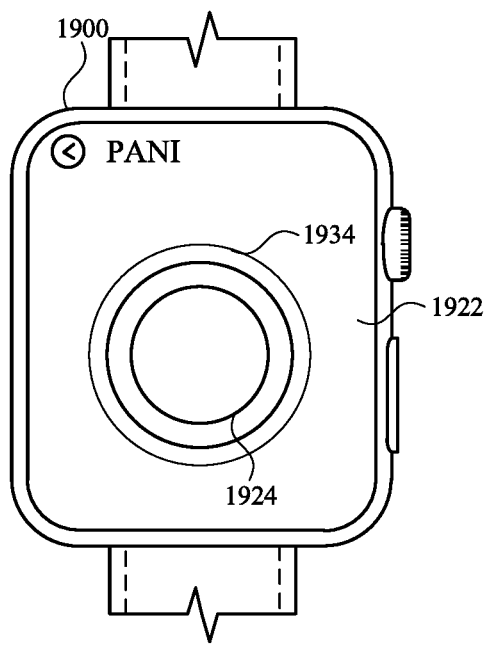

FIGS. 19V-19W illustrate electronic device 1900 playing (after bumping the previous contactable user and providing transition visual feedback 1936) a voice message corresponding to the new incoming voice communication that bumped the previous contactable user (e.g., Nick) in favor of the new contactable user (e.g., Pani). In some embodiments, if a plurality of incoming voice communications were received before/while bumping the previous contactable user in favor of the new contactable user, all of the voice messages corresponding to the received incoming voice communications are played. Because a voice message is being played, electronic device 1900 provides, in communication user interface 1922, play visual feedback 1934 indicating that the message is being played.

Figure 19X:
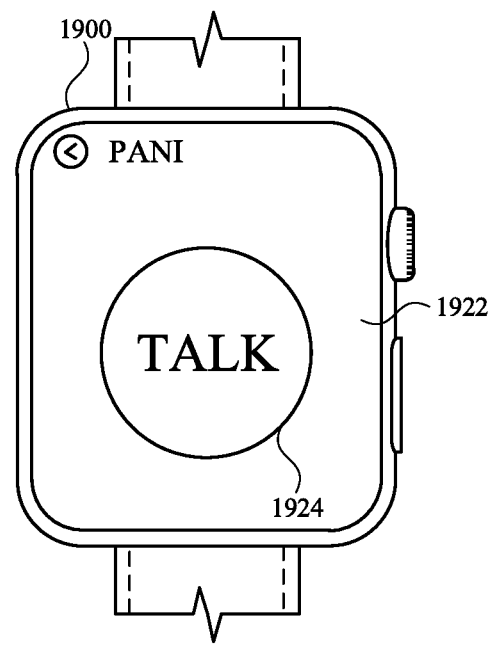
Figure 19Y:
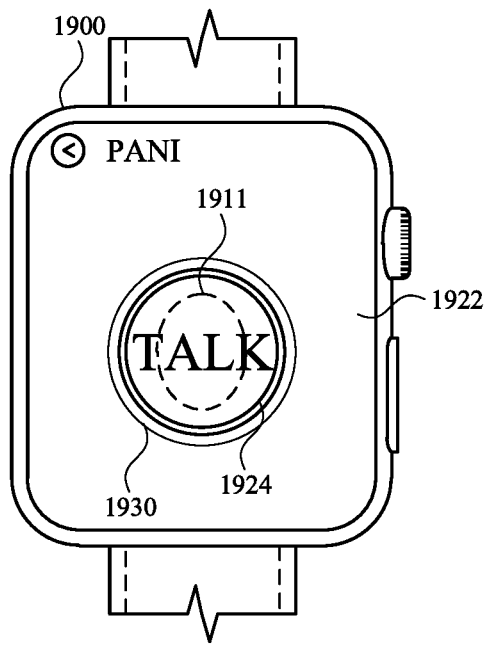
Figure 19Z:
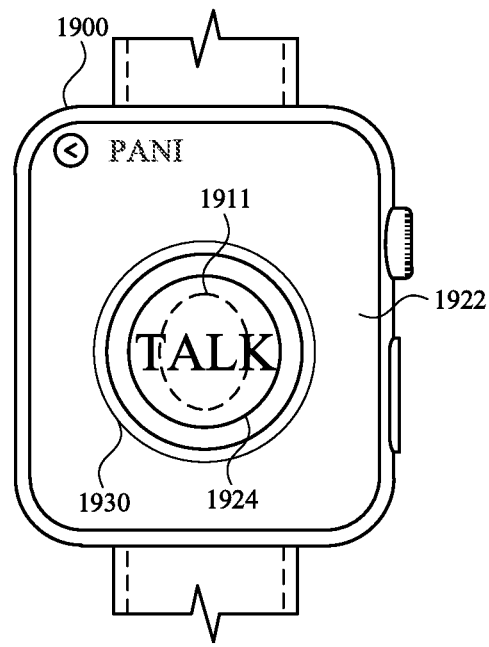
Figure 19A:
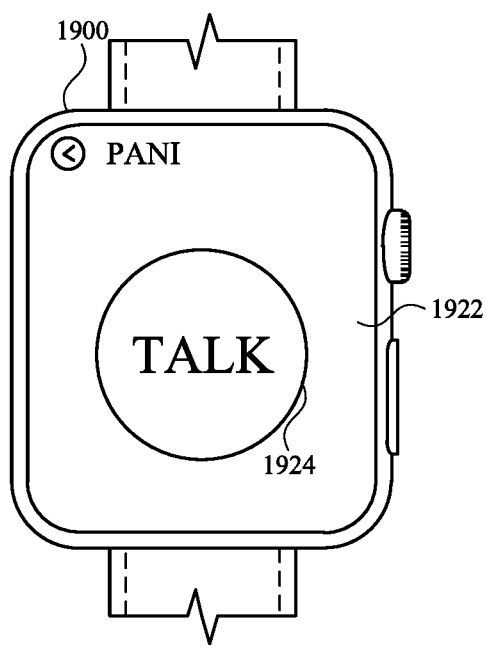
Figure 19A:
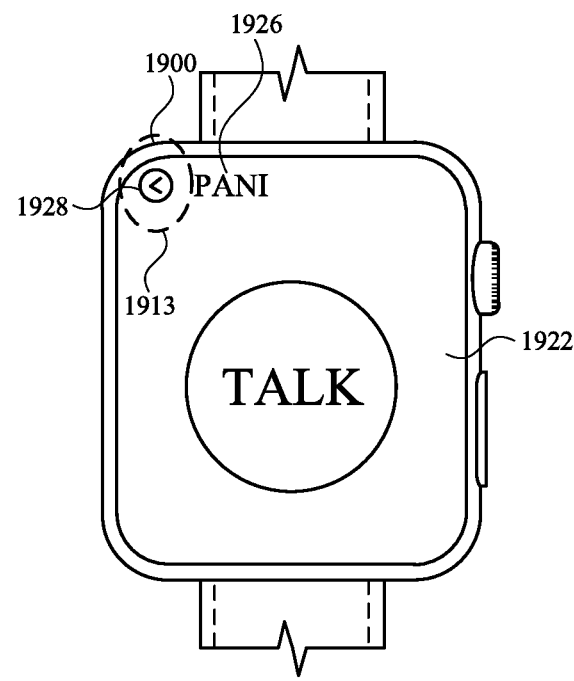
Figure 19A:
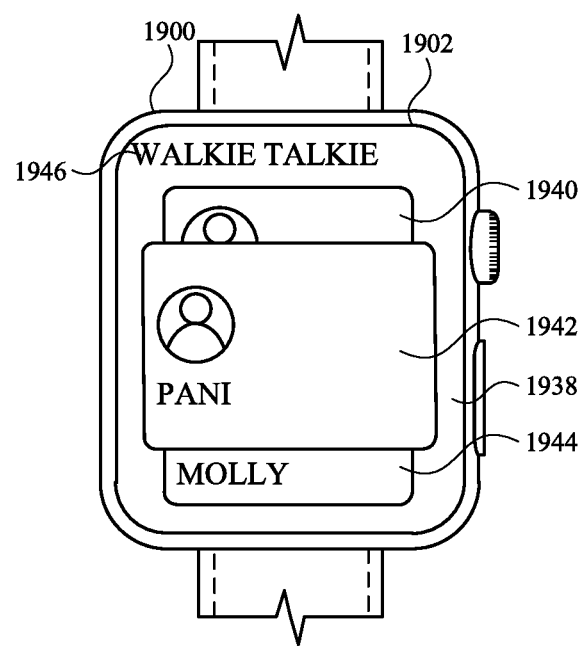

FIG. 19X illustrates electronic device 1900 displaying, on display 1902, communication user interface 1922 with communication button 1924 while the voice communication application is again in an idle state (with the current communication still set to be with the new contactable user (e.g., Pani)). In FIG. 19Y, while idle, electronic device 1900 detects (e.g., via a touch-sensitive surface of display 1902) an activation 1911 (e.g., a press-and-hold input) of communication button 1924 to record a voice message for an outgoing voice communication (e.g., to Pani). As shown in FIG. 19Y-19Z, in response to and while detecting activation 1911 on communication button 1924, electronic device 1900 records the voice message and provides record visual feedback 1930 while the voice message is being recorded by the device. Subsequent to recording the voice message, the electronic device transmits the voice message (e.g., to the device of the new contactable user) as an outgoing voice communication.

FIG. 19AA illustrates electronic device 1900 displaying, on display 1902, communication user interface 1922 with communication button 1924 while the voice communication application is again in an idle state after having transmitted the outgoing voice communication. In FIG. 19AB, while displaying communication user interface 1922 (and while idle) electronic device 1900 detects (e.g., via a touch-sensitive surface of display 1902) an activation 1913 (e.g., a touch input) of back affordance 1928 for viewing one or more contactable users that have been approved by the user of electronic device 1900 for performing communications via the voice communication application.

As shown in FIG. 19AC, in response to detecting activation 1913 of back affordance 1928, electronic device 1900 displays (e.g., replaces communication user interface 1922 with) a contactable user selection user interface 1938 of the voice communication application, where contactable user selection user interface 1938 includes a plurality of (selectable) representations (e.g., platters 1940-1944) corresponding to contactable users (e.g., Nick and Pani) approved by the user of electronic device 1900 to engage in voice communication via the voice communication application. In some embodiments, a representation of an approved contactable user includes an image/photo/avatar associated with the contactable user (e.g., image indication 1942A of platter

1942) and a name associated with the contactable user (e.g., name indication 1942B of platter 1942). In some embodiments, contactable user selection interface 1938 also includes an indication 1946 (e.g., stating "Walkie Talkie") that the user interface is associated with the voice communication application. Features related to contactable user selection user interface 1938 is described in greater detail below with reference to the user interfaces illustrated in FIGS. 21A-21Y.

FIGS. 20A-20B are a flow diagram illustrating a method for providing different types of feedback during a communication, in accordance with some embodiments. Method 2000 is performed at a device (e.g., 100, 300, 500, 600, 699A, 699B, 1900, 2100) with a display (e.g., 1902), one or more input devices (e.g., 1904, a touch-sensitive surface, a rotatable input device, a mic), one or more output devices (e.g., a speaker, a haptic generator), and a wireless communication radio (e.g., for LTE, WiFi, Bluetooth connections). Some operations in method 2000 are, optionally, combined, the orders of some operations are, optionally, changed, and some operations are, optionally, omitted.

As described below, method 2000 provides an intuitive way for performing communications, such as voice communications. The method reduces the cognitive burden on a user for performing communications, such as voice communications, thereby creating a more efficient human-machine interface. For battery-operated computing devices, enabling a user to perform communications, such as voice communications, faster and more efficiently conserves power and increases the time between battery charges.

The electronic device (e.g., 1900) displays (2002), on the display (e.g., 1902), a communication user interface (e.g., 1922) of a first application (e.g., a talk application, a walkie-talkie application) that includes an activatable indicator (e.g., 1924, a talk button for performing audio communications with a selected contact using the talk application). Displaying an activatable indicator on a communication user interface provides visual feedback to the user indicating that the indicator can be activated to perform an operation that relates to a communication. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the activatable indicator (e.g., 1924) includes an indication (e.g., text showing "talk") that the activatable indicator must be activated (e.g., via the user's press-and-hold input, input 1907) in order to record an outgoing communication. In some embodiments, the indication is displayed on the activatable indicator while recording the outgoing communication and the indication is not displayed on the activatable indicator while playing the incoming communication. Displaying the indication on the activatable indicator while recording a outgoing communication and not displaying the indication on the activatable indicator while playing an incoming communication provides the user with visual feedback about the current state of the communication (e.g., whether an outgoing communication is being recorded or an incoming communication is being played). Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The electronic device (e.g., 1900), while displaying the communication user interface (e.g., 1922) and while communication (with a second electronic device different from the electronic device) is not occurring, detects (2004) (e.g., via the one or more input devices, such as a touch-sensitive surface, or via the wireless communication radio) a start of communication via the first application (e.g., a user input on/activation of activatable indicator 1924, such as a press-and-hold input 1907, a receiving of an incoming message).

The electronic device (e.g., 1900), in conjunction with detecting the start of the communication via the first application, displays (2006) feedback (e.g., 1930, 1934) indicative of the communication while the communication is ongoing, including: in accordance with a determination (2008) that communication via the first application is an outgoing communication triggered by activation (e.g., a press-and-hold input) of the activatable indicator (e.g., 1924) (e.g., detected via the one or more input devices, such as a touch-sensitive surface): recording (2010), via the one or more input devices (e.g., a mic), an outgoing communication and displaying (2012), on the display (e.g., 1902), a first type of visual feedback (e.g., 1930) in a respective region of the communication user interface (e.g., 1922) that is proximate to the activatable indicator (e.g., 1924) (e.g., proximate to and/or on the activatable indicator). Displaying the first type of visual feedback in a respective region in accordance with a determination that communication via the first application is an outgoing communication triggered by activation (e.g., a press-and-hold input) of the activatable indicator provides the user with visual feedback about the current state of the communication—that an outgoing communication is being recorded (as opposed to an incoming communication being played or no communication occurring). Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, recording the outgoing communication and displaying the first type of visual feedback (e.g., 1930) in the respective region of the communication user interface (e.g., 1922) comprises recording the outgoing communication and displaying the first type of visual feedback in the respective region of the communication user interface while the user activation (e.g., 1907) of the activatable indicator is maintained. In some embodiments, upon or in response to detecting that user activation of the activatable indicator is no longer maintained, the electronic device (e.g., 1900) ceases recording the outgoing communication and ceases displaying the first type of visual feedback in the respective region of the communication user interface. Ceasing to display the first type of visual feedback upon or in response to detecting that the user activation of the activatable indicator is no longer maintained provides visual feedback to the user about the current state of the communication—that activation of the activatable indicator is no longer being detected and thus an outgoing communication is not being recorded. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first type of visual feedback (e.g., 1930) (that is provided while recording the outgoing message) includes a graphical effect comprising shapes (e.g., rings, ripples) moving in a first direction (e.g., inward direction, towards the activatable indicator). Providing a particular graphical effect (e.g., a graphical effect comprising shapes moving in a first direction) enhances operability of the device and makes the user-device interface more efficient by enabling the user to quickly and easily recognize that the device is performing a particular operation that relates to the particular graphical effect. This additionally reduces power usage and improves battery life of the device by enabling the user to use the device more quickly and efficiently.

The electronic device (e.g., 1900), in conjunction with detecting the start of the communication via the first application, displays (2006) feedback (e.g., 1930, 1934) indicative of the communication while the communication is ongoing, including: in accordance with a determination (2014) that communication via the first application is an incoming communication (e.g., recorded on and sent from a second electronic device using a counterpart first application on the second electronic device) received via the wireless communication radio: playing (2016), via the one or more output devices (e.g., a speaker), the incoming communication, and, while playing the incoming communication (2018): displaying (2020), on the display (e.g., 1902), a second type of visual feedback (e.g., 1934) in the respective region of the communication user interface (e.g., 1922) (e.g., proximate to and/or on the activatable indicator) that is different from the first type of visual feedback and disabling (2022) the activatable indicator (e.g., 1924) from being activated to initiate an outgoing communication via the first application. Displaying a second type of visual feedback in accordance with a determination that communication via the first application is an incoming communication provides the user with visual feedback about the current state of the communication—that an incoming communication is being played. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Further, disabling the activatable indicator from being activated to initiate an outgoing communication in accordance with a determination that communication via the first application is an incoming communication enables the user to easily recognize that one or more operations associated with the activatable indicator (e.g., recording an outgoing communication) cannot be performed at this time (e.g., while playing an incoming communication), thus enhancing the operability of the device and making the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with a determination that communication via the first application is an incoming communication, in accordance with a determination that the first application is set to a second availability mode (e.g., an "unavailable" mode, a "do not disturb" mode), the electronic device (e.g., 1900) (automatically) transmits (2024), to a second electronic device involved in the communication, an error communication indicating that a user of the electronic device is unavailable for the communication without playing the incoming communication. Automatically transmitting an error communication to a second electronic device involved in the communication indicating that a user of the electronic device is unavailable for the communication in accordance with a determination that the first application is set to the second availability mode enables other contactable users to be informed that the user is currently unavailable to engage in a communication without the user needing to manually inform (e.g., via one or more inputs on the device) each contactable user that has transmitted a communication. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, playing the incoming communication occurs in accordance with a determination that the first application is set to a first availability mode (e.g., an "available" mode). In some embodiments, instead of playing the incoming communication, the electronic device (e.g., 1900) (automatically) forgoes playing the incoming communication in accordance with a determination that the first application is not set to the first availability mode or is set to a second availability mode (e.g., an "unavailable" mode, a "do not disturb" mode). Automatically forgoing playing the incoming communication in accordance with a determination that the first application is not set to the first availability mode or is set to a second availability mode allows the user to bypass having to manually stop the playing of an incoming communication when the user cannot engage in the communication. Performing an operation without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the second type of visual feedback (e.g., 1934) (that is provided while playing the incoming message) includes a graphical effect comprising shapes (e.g., rings, ripples) moving in a second direction (e.g., outward direction, away from the activatable indicator) opposite to the first direction. Providing a particular graphical effect (e.g., a graphical effect comprising shapes moving in a second direction) enhances operability of the device and makes the user-device interface more efficient by enabling the user to quickly and easily recognize that the device is performing a particular operation that relates to the particular graphical effect. This additionally reduces power usage and improves battery life of the device by enabling the user to use the device more quickly and efficiently.

In some embodiments, while playing the incoming communication (2018), the electronic device (e.g., 1900) detects (2026) (e.g., using one or more sensors, such as a motion sensor, an image sensor, or a camera) a first gesture (e.g., a user's hand gesture that at least partially covers the display of the electronic device). In some embodiments, in response to detecting the first gesture, the electronic device stops playing (2028) the incoming communication. Stopping playing an incoming communication in response to detecting a first gesture enables a user to quickly and easily (e.g., without having to make further user inputs on the device) stop the communication. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to detecting the first gesture, the electronic device (e.g., 1900) (automatically) transmits (2030) (e.g., to the second electronic device that sent the incoming communication), via the wireless communication radio, an error communication indicating that a user of the electronic device is unavailable for the communication. Automatically transmitting an error communication indicating that a user of the electronic device is unavailable for the communication enables other contactable users to be informed that the user is currently unavailable to engage in a communication without the user needing to manually inform (e.g., via one or more inputs on the device) each contactable user that has transmitted a communication. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while the communication via the first application is ongoing (and while the electronic device is displaying the communication user interface), where the communication is with a first contactable user, the electronic device (e.g., 1900) detects (2032), via a wireless communication radio, an incoming communication associated with the first application from a second contactable user different from the first contactable user.

In some embodiments, in response to detecting the incoming communication from the second contactable user, the electronic device (e.g., 1900) displays (2034), on the display (e.g., 1902), a (user-selectable) representation of the second contactable user (e.g., where the representation includes a name and/or avatar associated with the second contactable user). Displaying a representation of the second contactable user in response to detecting an incoming communication from the second contactable user provides the user with visual feedback about communication from a different contactable user. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, the representation of the second contactable user is shown on the respective region of the communication user interface. In some embodiments, the representation of the second contactable user includes a name and/or avatar associated with the second contactable user. In some embodiments, displaying the representation of the second contactable user (e.g., where the representation includes a name and/or avatar associated with the second contactable user) comprises replacing a representation of the first contactable user with the representation of the second contactable user.

In some embodiments, in addition to displaying the representation of the second contactable user, the electronic device (e.g., 1900) generates an audio and/or haptic alert indicating that the incoming communication from the second contactable user has been received. Generating an audio and/or haptic alert provides (in addition to visual) further feedback to the user about the incoming communication from the second contactable user. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, if the electronic device (e.g., 1900) detects user selection of the representation of the second contactable user, the electronic device starts communication via the first application with a second electronic device of the second contactable user (e.g., instead of continuing the communication with a device of the first contactable user).

In some embodiments, in response to detecting the incoming communication from the second contactable user, the electronic device (e.g., 1900) (temporarily, for a predetermined amount of time) disables (2036) the activatable indicator (e.g., 1924) (such that it cannot be activated by the user of the electronic device). Disabling the activatable indicator in response to detecting the incoming communication from the second contactable user enables the user to easily recognize that one or more operations associated with the activatable indicator (e.g., recording an outgoing communication to the first contactable user) cannot be performed at this time (e.g., in response to detecting the incoming communication from the second contactable user), thus enhancing the operability of the device and making the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to detecting the incoming communication from the second contactable user, the electronic device (e.g., 1900) displays (2038), on the display (e.g., 1902), a third type of visual feedback (e.g., 1936) in the respective region of the communication user interface (e.g., proximate to and/or on the activatable indicator) that is different from the first type of visual feedback (e.g., 1930) and from the second type of visual feedback (e.g., 1934). Displaying a third type of visual feedback that is different from the first type of visual feedback and from the second type of visual feedback in response to detecting the incoming communication from the second contactable user provides visual feedback to the user that the detected communication pertains to the second contactable user (and not the first contactable user). Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while the communication via the first application is ongoing (and while the electronic device is displaying the communication user interface), the electronic device (e.g., 1900) detects (2040), via a wireless communication radio, an incoming communication associated with the first application from a second contactable user different from the first contactable user, where the communication that is ongoing is a communication with a first contactable user.

In some embodiments, in response to detecting the incoming communication from the second contactable user, the electronic device (e.g., 1900) (automatically, without user input) ceases (2042) the existing communication with the first contactable user and initiates a new communication with the second contactable user. Automatically ceasing the existing communication with the first contactable user and initiating a new communication with the second contactable user in response to detecting the incoming communication from the second contactable user enables the user to quickly and easily transition from engaging in communication with the first contactable user to communication with the second contactable user (without manual user inputs). Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 2000 (e.g., FIGS. 20A-20B) are also applicable in an analogous manner to the methods described above and below. For example, method 900 optionally includes one or more of the characteristics of the various methods described above with reference to method 2000. For another example, method 1000 optionally includes one or more of the characteristics of the various methods described above with reference to method 2000. For another example, method 1100 optionally includes one or more of the characteristics of the various methods described above with reference to method 2000. For another example, method 2200 optionally includes one or more of the characteristics of the various methods described above with reference to method 2000. For example, contactable user selection user interface 1938 described with reference to FIG. 19AC corresponds to contactable user selection user interface 2110 described below with reference to FIGS. 21A-21Y. For brevity, these details are not repeated below.

FIGS. 21A-21Y illustrate exemplary user interfaces for changing an availability mode and adding one or more contactable users. The user interfaces in these figures are used to illustrate the processes described below, including the processes in FIGS. 22A-22C.

FIG. 21A illustrates an electronic device 2100. In some embodiments, electronic device 2100 is a wearable device (e.g., a smartwatch). In some embodiments, electronic device 2100 includes a display 2102 and one or more input devices (e.g., a touch-sensitive surface of display 2102, a rotatable input device 2104). In FIG. 21A, electronic device 2100 is displaying, on display 2102, an applications user interface 2106 (e.g., a main user interface of the operating system that includes one or more icons corresponding to applications installed on the electronic device). In some embodiments, applications user interface 2106 includes a voice communication application icon 2108 corresponding to a voice communication application (e.g., a walkie-talkie application). In FIG. 21A, while displaying applications user interface 2106, electronic device 2100 detects (e.g., via a touch-sensitive surface of display 2102) an activation 2101 (e.g., a touch input) of voice communication application icon 2108.

Figure 21B:
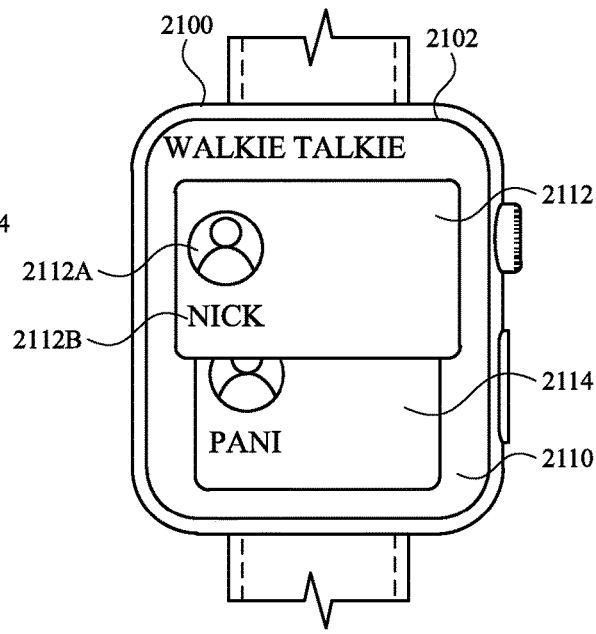

As shown in FIG. 21B, in response detecting activation 2101 of voice communication application icon 2108, electronic device 2100 displays, on display 2102, a contactable user selection user interface 2110 of the voice communication application. Contactable user selection user interface 2110 includes a plurality of (selectable) representations (e.g., platters 2112-2114) corresponding to contactable users (e.g., Nick and Pani) approved by the user of electronic device 2100 to engage in voice communication via the voice communication application (e.g., approved using the process described with respect to FIGS. 19C-19D). In some embodiments, a representation of an approved contactable user includes an image/photo/avatar associated with the contactable user (e.g., image indication 2112A of platter 2112 associated with Nick) and a name associated with the contactable user (e.g., name indication 2112B of platter 2112 associated with Nick). In some embodiments, contactable user selection user interface 2110 also includes an indication 2116 (e.g., stating "Willkie Talkie") that the user interface is associated with the voice communication application.

Figure 21C:
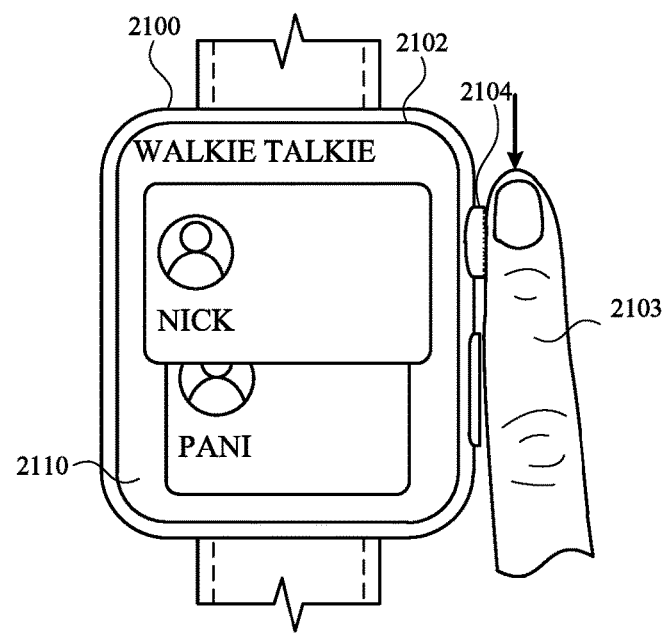

In FIG. 21C, while displaying contactable user selection user interface 2110 with platters 2112-2114 (e.g., associated with Nick and Pani, respectfully) shown, electronic device 2100 detects a scrolling gesture 2103 (e.g., in a counter-clockwise direction) on rotatable input device 2104. In some embodiments, electronic device 2100 detects a scrolling input (e.g., in a downwards direction) on the touch-sensitive surface of display 2102 instead of scrolling gesture 2103. In some embodiments, the audio volume setting is not adjusted based on detecting rotation of the rotatable input device 2104 (as discussed with respect to FIG. 19M) because the contactable user selection user interface 2110 is displayed when the scrolling gesture 2103 is detected, as shown in FIG. 12C.

Figure 21D:
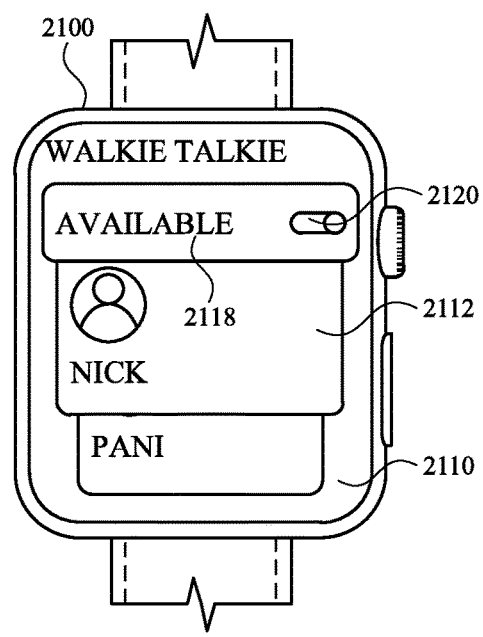

In FIG. 21D, in response to detecting scrolling gesture 2103 (e.g., and if platter 2112 associated with Nick is the first representation of a contactable user of the plurality of representations of contactable users included in contactable user selection user interface 2110), electronic device 2100 displays, on display 2102, an availability indication 2118 (that includes a toggle 2120) indicating whether the voice communication application is currently set to an available mode or to an unavailable mode. In some embodiments, toggle 2120 in an "on" state corresponds to the available mode (indicating that the user is available to engage in a voice communication via the voice communication application with a contactable user) and toggle 2120 in an "off" state corresponds to an unavailable mode (indicating that the user is not available to engage in a voice communication via the voice communication application with a contactable user). In some embodiments, the default state of toggle 2120 is the "on" state (e.g., the available mode).

In FIG. 21E, while displaying contactable user selection user interface 2110 showing availability indication 2118 with toggle 2120 in the "on" state (e.g., available mode), electronic device 2100 detects (e.g., via a touch-sensitive surface of display 2102) an input 2105 (e.g., a touch input) on toggle 2120. In response to detecting input 2105 on toggle 2120 of availability indication 2118, electronic device 2100 transitions toggle 2120 from the "on" state (e.g., available mode) to the "off" state (e.g., unavailable mode), as shown in FIG. 21F, and transitions the state of the voice communication application from the available mode to the unavailable mode. In some embodiments, as also shown in FIG. 21F, electronic device 2100 darkens (e.g., greys-out, fades-out) contactable user selection user interface 2110 (e.g., other than availability indication 2118), thereby visually indicating that the voice communication application is now in unavailable mode (instead of available mode).

FIG. 21G illustrates electronic device 2100 displaying, on display 2102, contactable user selection user interface 2110 (e.g., as previously shown in FIG. 21B), where contactable user selection user interface 2110 includes at least platter 2112 corresponding to a representation of a first contactable user (e.g., Nick) and platter 2114 corresponding to a representation of a second contactable user (e.g., Pani). In FIG. 21G, while displaying contactable user selection user interface 2110, electronic device 2100 detects a scrolling gesture 2107 (e.g., in a clockwise direction) on rotatable input device 2107 (to navigate the contactable users shown in contactable user selection user interface 2110). In some embodiments, electronic device 2100 detects a scrolling input (e.g., in an upwards direction) on the touch-sensitive surface of display 2102 instead of scrolling gesture 2107.

FIGS. 21G-21I illustrate electronic device 2100 displaying, on display 2102, contactable user selection user interface 2110 while continuing to detect scrolling gesture 2107 (e.g., in a clockwise direction) on rotatable input device 2104 (e.g., or, alternatively, continuing to detect a scrolling input, in an upwards direction, on the touch-sensitive surface of display 2102). As shown in FIGS. 21G-21I, while detecting scrolling gesture 2107, electronic device 2100 displays the plurality of representations of contactable users (e.g., platters 2112, 2114, 2122) being navigated (e.g., scrolled through, flipped through). In some embodiments, while the platters are being navigated, electronic device 2100 visually emphasizes the "current" platter (e.g., the representation of a contactable user corresponding to the representation that is most visible/central in the user interface at that moment in time) by displaying and enlarging the current platter (e.g., platter 2114 associated with Pani in FIG. 21I) at the center region of contactable user selection user interface 2110. In some embodiments, while at the center region of contactable user selection user interface 2110, the current platter (e.g., platter 2114 associated with Pani in FIG. 21I) is enlarged such that the right and left edges of the platter touch the right and left edges of display 2102, respectively.

In FIGS. 21J-21K, while displaying contactable user selection user interface 2110 with platter 2114 (associated with Pani) set as the current platter, electronic device 2100 detects (e.g., via a touch-sensitive surface of display 2102) an input 2109 (e.g., a touch-swipe input in the left direction) on platter 2114. In some embodiments, while detecting input 2109, platter 2114 transitions from the center region of contactable user selection user interface 2110 towards and off of the left edge of display 2102 (e.g., by following the direction and movement of input 2109), as shown in FIG. 21K.

As also shown in FIG. 21K, in response to detecting input 2109 on platter 2114, electronic device 2100 displays (e.g., adjacent to the displayed portion of platter 2114 in the center region of contactable user selection user interface 2110, a remove affordance 2124 for removing the contactable user associated with the corresponding platter 2114 (e.g., Pani) from the approved contactable users (and thus removing the representation of the contactable user, platter 2114, from being shown in contactable user selection user interface 2110). In some embodiments, in addition to displaying remove affordance 2124, electronic device 2100 darkens (e.g., greys-out, fades-out) contactable user selection user interface 2110 (e.g., other than remove affordance 2124 and corresponding platter 2114), thereby visually emphasizing which contactable user (e.g., Pani) the remove affordance corresponds to.

Figure 21M:
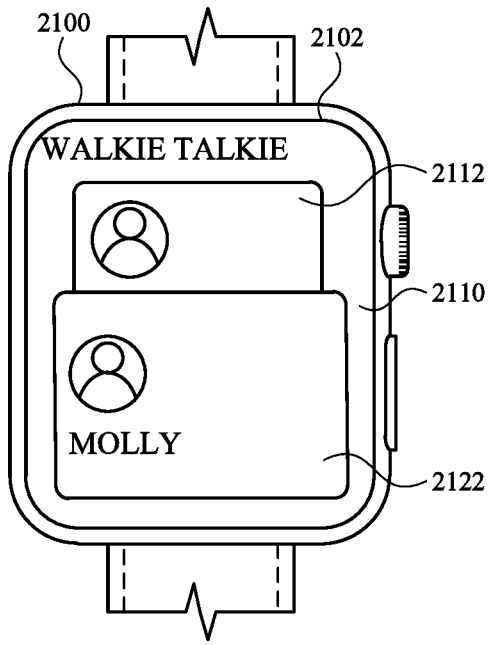

In FIG. 21L, while displaying remove affordance 2124 corresponding to platter 2114, electronic device 2100 detects (e.g., via a touch-sensitive surface of display 2102) an activation 2111 of remove affordance 2124. In response to detecting activation 2111, electronic device 2100 removes the corresponding platter 2114 (e.g., associated with Pani) from the plurality of representations of contactable users shown in contactable user selection user interface 2110 (thus causing the contactable user associated with the removed platter, Pani, to be removed from the plurality of contactable users approved by the user for voice communication via the voice communication application). Thus, as shown in FIG. 21M, platter 2114 (e.g., associated with Pani is no longer included in contactable user selection user interface 2110 (while platter 2112 associated with Nick and platter 2122 associated with Molly remains in contactable user selection user interface 2110).

Figure 21N:
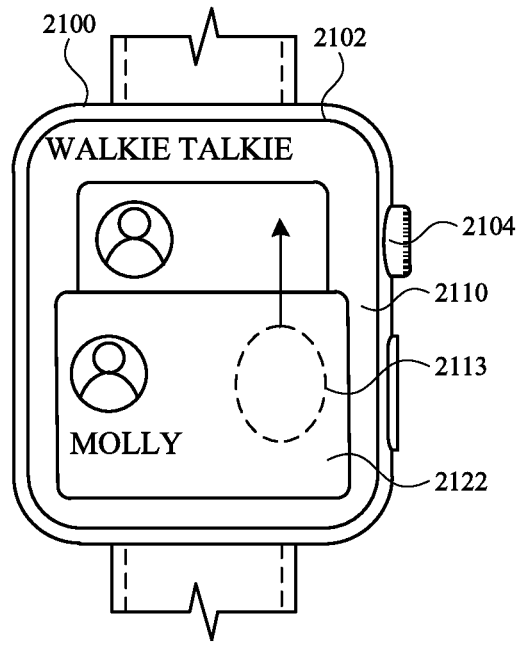

In FIG. 21N, while displaying contactable user selection user interface 2110, electronic device 2100 detects (e.g., via a touch-sensitive surface of display 2102) a scrolling input 2113 (e.g., in an upwards direction). In some embodiments, alternatively to scrolling input 2113, electronic device 2100 detects a scrolling gesture on rotatable input device 2104 (e.g., rotation of the rotatable input device 2104).

Figure 21O:
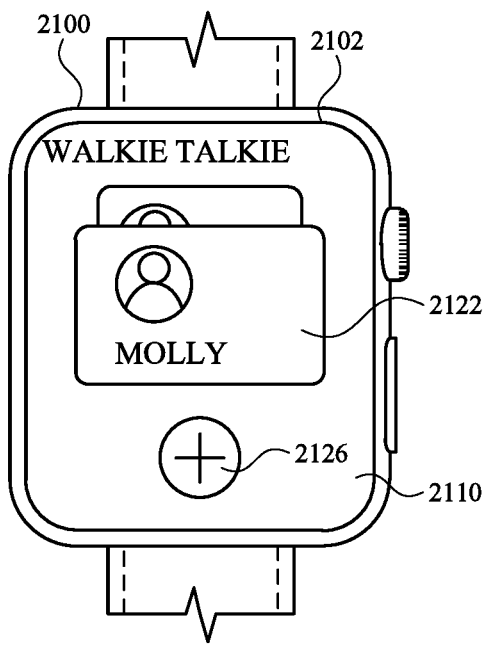

In FIG. 21O, in response to detecting scrolling input 2113 (e.g., and if platter 2122 associated with Molly is the last representation of a contactable user of the plurality of representations of contactable users included in contactable user selection user interface 2110), electronic device 2100 displays, on display 2102, an add affordance 2126 for adding (and thus approving) one or more new contactable users not currently approved for voice communication with the user via the voice communication application.

Figure 21P:
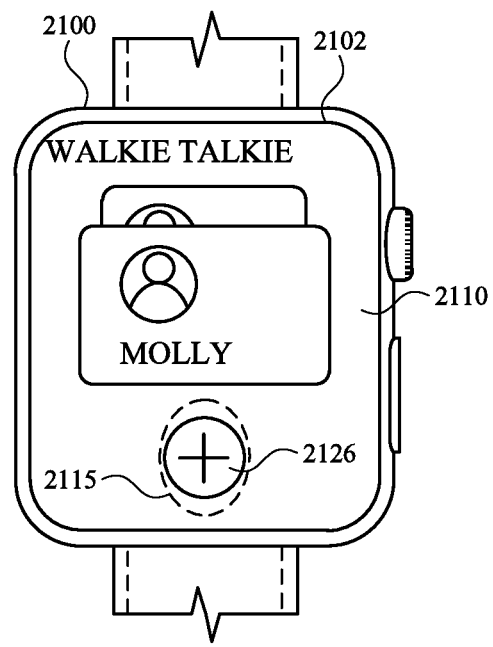

In FIG. 21P, while displaying add affordance 2126 in contactable user selection user interface 2110, electronic device 2100 detects (e.g., via a touch-sensitive surface of display 2102) an activation 2115 of add affordance 2126.

Figure 21Q:
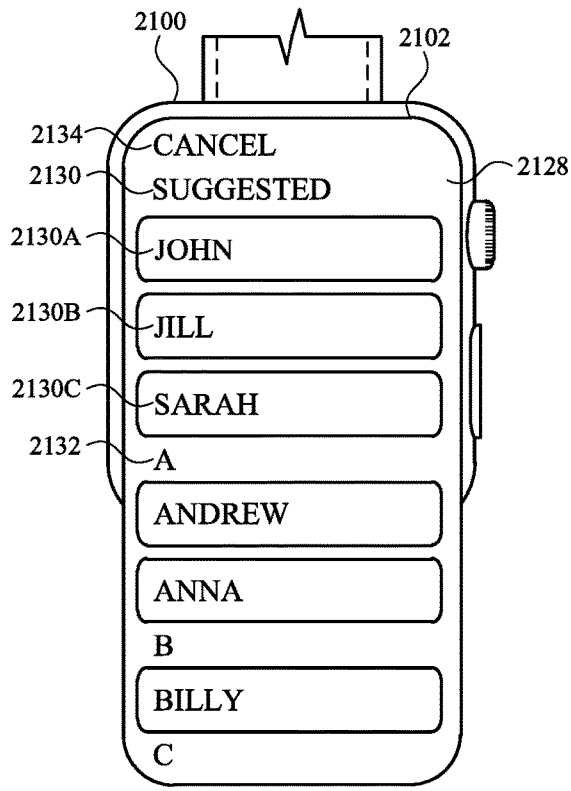

In response to detecting activation 2115 of add affordance 2126, electronic device 2100 displays, on display 2102, a contacts list 2128 that includes one or more contactable users that have not been approved by the user for voice communication via the voice communication application (and thus are not included as platters in contactable user selection user interface 2110), as shown in FIG. 21Q. Alternatively, in some embodiments, contacts list 2128 also includes approved contactable users that have already been approved by the user for voice communication via the voice communication application (and thus are already included as platters in contactable user selection user interface 2110). In some embodiments, contacts list 2128 is synchronized with a remote contacts list that is stored on a different electronic device (e.g., a paired electronic device such as a smartphone belonging to the user, an external server). In some embodiments, the remote contacts list is also associated with (and can be accessed, displayed by) different applications installed on electronic device 2100, such as a phone dialer application, an email application, and/or an instant messaging application. Contacts list 2128 and other user interfaces are sometimes displayed exceeding the size of display 2102 for the ease of the user's understanding.

In some embodiments, as shown in FIG. 21Q, contacts list 2128 includes a suggested contacts list 2130 (e.g., including suggested contactable users 2130A-2130C), where each suggested contactable user shown in suggested contacts list 2130 is associated with a respective electronic device (e.g., similar to electronic device 2100, a smartwatch) that is configured to and/or capable of running the voice communication application (e.g., because the respective electronic device is equipped with necessary hardware components to run the voice communication application and/or is running an operating system that is compatible with the voice communication application). In some embodiments, contacts list 2128 includes (e.g., if contacts list 2128 includes suggested contacts list 2130) an other contacts list 2132 that includes contactable users that are not associated with a respective electronic device that is configured to and/or capable of running the voice communication application. In some embodiments (e.g., if contacts list 2128 does not include suggested contacts list 2130), other contacts list 2132 includes both contactable users that are associated with and contactable users that are not associated with a respective electronic device that is configured to and/or capable of running the voice communication application. In some embodiments, contactable users included in contacts list 2128 are listed in an alphabetical order (e.g., based on last names). In some embodiments, contacts list 2128 includes a cancel affordance 2134 leaving contacts list 2128 (and returning to contactable user selection user interface 2110) without adding a new approved contactable user.

Figure 21R:

FIG. 21R illustrates electronic device 2100 displaying, on display 2102, an inaccessible error notification 2136 associated with an intended recipient (e.g., Nick) after having transmitted an outgoing voice communication to the intended recipient. In some embodiments, inaccessible error notification 2136 includes an indication 2138 (e.g., stating "Nick is not responding. Try again") that the intended recipient is inaccessible for a voice communication via the voice communication application. In some embodiments, electronic device 2100 displays inaccessible error notification 2136 because the respective electronic device associated with the intended recipient (who is an approved contactable user) cannot be reached (e.g., because the respective electronic device of the intended recipient is off or does not access to a wireless transmission signal in order to receive an electronic message corresponding to the outgoing voice communication sent by the user). In some embodiments, electronic device 2100 displays inaccessible error notification 2136 because the intended recipient (e.g., Nick) is not associated with a respective electronic device that is configured to/capable of running the voice communication application, and thus cannot engage in a voice communication via the voice communication application with the user. In some embodiments, inaccessible error notification 2136 further includes an affordance 2140 for acknowledging and ceasing display of the notification.

Figure 21S:
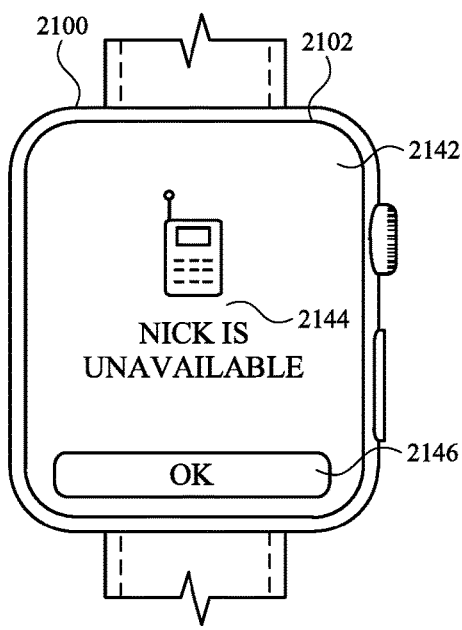

FIG. 21S illustrates electronic device 2100 displaying, on display 2102, an unavailable error notification 2142 associated with an intended recipient (e.g., Nick) after having transmitted an outgoing voice communication to the intended recipient, where the intended recipient is an approved contactable user. In some embodiments, unavailable error notification 2142 includes an indication 2144 (e.g., stating "Nick is unavailable") that the intended recipient is unavailable to engage in a voice communication with the user (though the respective device of the intended recipient can and has been reached). In some embodiments, electronic device 2100 displays unavailable error notification 2142 in accordance with (and in response to) a determination that the respective device of the intended recipient (e.g., Nick) is in unavailable mode. In some embodiments, unavailable error notification 2142 further includes an affordance 2146 for acknowledging and ceasing display of the notification.

Figure 21T:
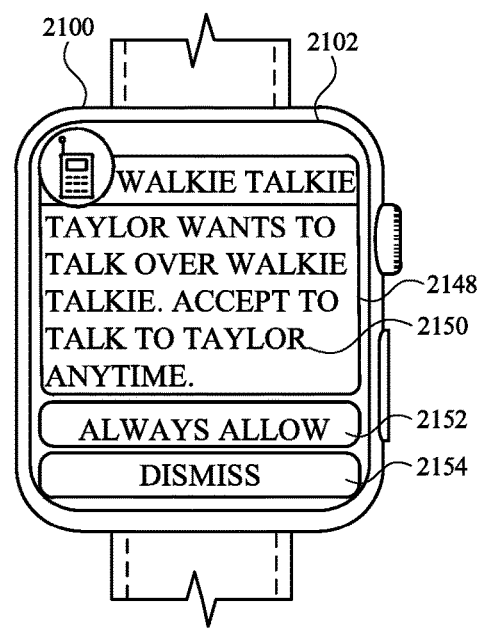

FIG. 21T illustrates electronic device 2100 displaying, on display 2102, a new sender notification 2148, where the notification is associated with a received electronic message corresponding to a new incoming voice communication sent by a respective electronic device of a new sender (e.g., Taylor) that is not an approved contactable user. In some embodiments, new sender notification 2148 includes an indication (e.g., stating "Taylor wants to talk over Walkie Talkie. Accept to talk to Taylor anytime") that a new incoming voice communication from a new sender (e.g., Taylor) has been received and that the sender is not an approved contactable user. In some embodiments, new sender notification 2148 includes an allow affordance 2152 for adding the new sender to the approved contactable users and thus approving the new sender associated with the notification for voice communication with the user via the voice communication application. In some embodiments, new sender notification 2148 includes a dismiss affordance 2154 for ceasing display of the notification (e.g., without having added the new sender to the approved contactable users).

In some embodiments, new sender notification 2148 is displayed while electronic device 2100 is displaying a user interface of the voice communication application (e.g., contactable user selection user interface 2110). In some embodiments, new sender notification 2148 is displayed while electronic device 2100 is displaying a user interface of an application different from the voice communication application.

Figure 21U:
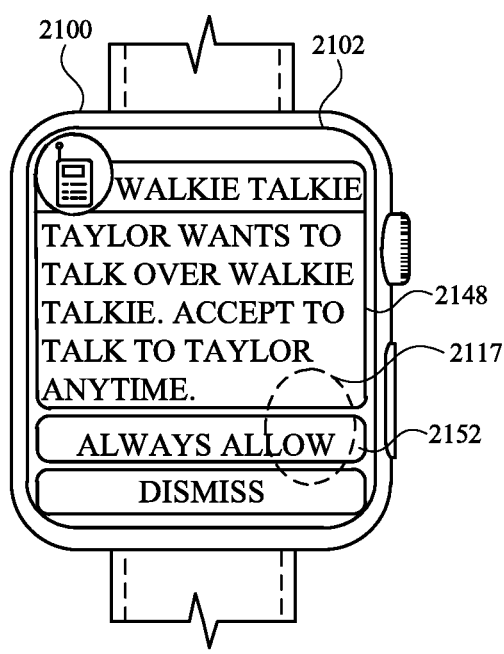

In FIG. 21U, while displaying new sender notification 2148 (e.g., corresponding to a new sender Taylor), electronic device 2100 detects (e.g., via a touch-sensitive surface of display 2102) an activation 2117 of allow affordance 2152. In some embodiments, in response to detecting activation 2117, electronic device 2100 adds the new sender (e.g., Taylor) to the approved contactable users (and thus approves the new sender associated with the notification for voice communication with the user via the voice communication application).

Figure 21V:
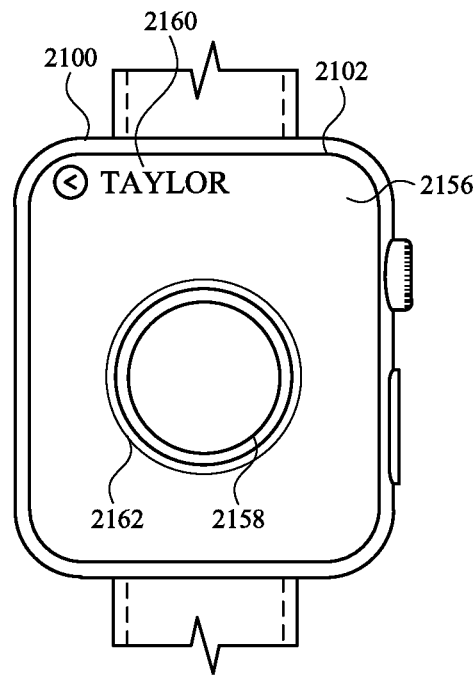

FIG. 21V illustrate electronic device 2100 displaying, on display 2102, a communication user interface 2156 (e.g., corresponding to communication user interface 1922 described above with reference to FIGS. 19A-19AC) of the voice communication application in response to detecting activation 2117 of allow affordance 2152 corresponding to new sender notification 2148 (e.g., associated with Taylor). In some embodiments, in response to detecting activation 2117, electronic device 2100 displays communication user interface 2156 with the voice communication application set for voice communication with the new sender (e.g., Taylor, as indicated by a current contactable user indication 2160).

Figure 21W:
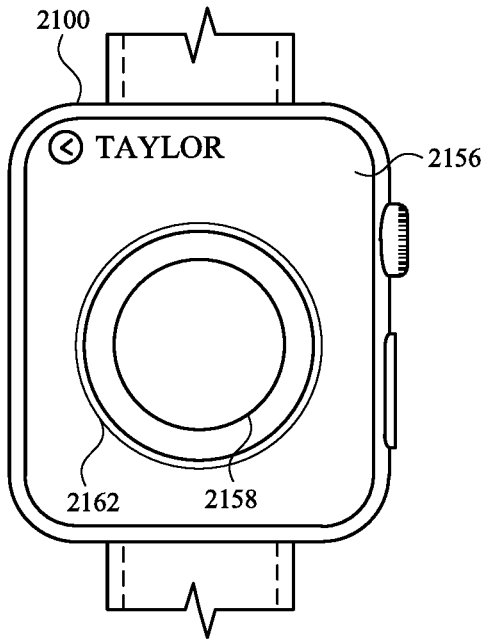
Figure 21X:
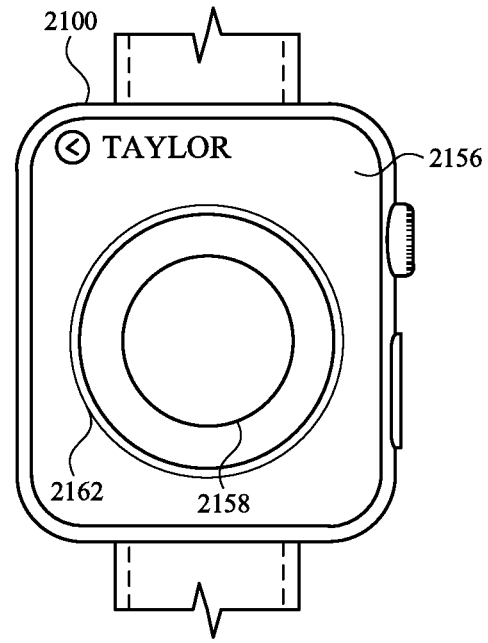

As shown in FIGS. 21V-21X, electronic device 2100 further provides a new contactable user visual feedback 2162 indicating that the current communication session is with a new approved contactable user (e.g., Taylor). In some embodiments, new contactable user visual feedback 2162 is provided within a respective region surrounding and/or within a communication button 2158 (e.g., corresponding to communication button 1924 of communication user interface 1922). In some embodiments, new contactable user visual feedback 2162 comprises a ripple-like animation where a plurality of ring-like patterns move outward-then-inward. In some embodiments, electronic device 2100 also provides a haptic feedback in addition to the visual feedback.

In some embodiments, in addition to (and while) displaying new contactable user visual feedback 2162, electronic device 2100 plays the incoming voice communication received from the new sender (e.g., an incoming voice communication from Taylor that triggered display of new sender notification 2148). In some embodiments, in addition to (and while) displaying new contactable user visual feedback 2162, electronic device 2100 disables communication button 2158 from being activated (e.g., and further removes the text stating "Talk" from being displayed on the communication button, thereby indicating to the user that the communication is not activatable while playing the incoming voice communication from the new sender).

FIG. 21Y illustrates electronic device 2100 displaying, on display 2102, communication user interface 2156 of the voice communication application (e.g., set for communication with Taylor) after providing new contactable user visual feedback 2162. The user of electronic device 2100 can now engage in a voice communication (e.g., by recording an outgoing voice communication or playing an incoming voice communication) with the newly-approved contactable user (e.g., Taylor) via the voice communication application, as described above with reference to FIGS. 19A-19AC.

FIGS. 22A-22C are a flow diagram illustrating a method for changing an availability mode and adding one or more contactable users for communications, in accordance with some embodiments. Method 2200 is performed at a device (e.g., 100, 300, 500, 600, 699A, 699B, 1900, 2100) with a display and one or more input devices (e.g., a touch-sensitive surface, a rotatable input device, a mic). Some operations in method 2200 are, optionally, combined, the orders of some operations are, optionally, changed, and some operations are, optionally, omitted.

As described below, method 2200 provides an intuitive way for performing communications, such as voice communications. The method reduces the cognitive burden on a user for performing communications, such as voice communications, thereby creating a more efficient human-machine interface. For battery-operated computing devices, enabling a user to perform communications, such as voice communications, faster and more efficiently conserves power and increases the time between battery charges.

The electronic device (e.g., 2100) displays (2202), on the display (e.g., 2102), a first user interface (e.g., 2110, a contactable user selection user interface) of a first application (e.g., a talk application), where the first user interface includes a plurality of representations (e.g., 2112, 2114, 2122) of contactable users (e.g., approved contactable users on the user's whitelist). Displaying the first user interface that includes a plurality of representations of contactable users provides visual feedback that a communication can be initiated with one or more of the displayed contactable users. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the plurality of representations (e.g., 2112, 2114, 2122) of contactable users correspond to contactable users approved, by a user of the electronic device (e.g., 2100), for communication via the first application (e.g., contactable users on the user's whitelist). Displaying (only) representations of contactable users that correspond to approved contactable users provides security and enhances operability of the device by preventing the user from (unintentionally) engaging in communication with an un-approved counterpart. This additionally reduces power usage and improves battery life of the device by enabling the user to use the device more quickly and efficiently.

In some embodiments, communication via the first application includes starting the communication (e.g., by playing an incoming communication) via the first application without receiving, from the user of the electronic device (e.g., 2100), an input corresponding to an intent to start the communication. Thus, in some embodiments, the electronic device starts the communication by playing an incoming communication without receiving user approval (e.g., via a user input of a displayed affordance asking the user whether the incoming communication should be played) to play the incoming communication. In some embodiments, user activation (e.g., via a user input) is not required to start the communication by playing an incoming communication. Starting a communication by playing an incoming communication without receiving user approval enables a user to quickly and easily engage in a communication with a (approved) contactable user without having to provide one or more additional user inputs to start the communication. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

While displaying the first user interface (e.g., 2110) with a representation (e.g., 2112, 2114, 2122) of a first contactable user displayed, the electronic device (e.g., 2100) detects (2204), via the one or more input devices, an input (e.g., 2103, a scroll gesture on a touch-sensitive surface, a rotation of a rotatable input device). In some embodiments, a representation (e.g., 2112, 2114, 2122) of a contactable user includes a name of the contactable user and/or an avatar associated with the contactable user. Including a name and/or an avatar associated with a contactable user in the representation corresponding to the contactable user enables a user to quickly and easily recognize which representation corresponds to which contactable user, thereby enhancing the operability of the device and making the user-device interface more efficient (e.g., by helping the user to provide proper inputs and reducing user mistakes when operating/ interacting with the device) which, additionally, reduces power usage and improves battery life of the device by enabling the user to use the device more quickly and efficiently.

In some embodiments, the input is (2206) a (vertical) scrolling gesture on a touch-sensitive surface of the electronic device (e.g., 2100). In some embodiments, the input (e.g., 2103) is (2208) a rotation of a rotatable input device of the electronic device. In some embodiments, if the rotation of the rotatable input device is detected while the electronic device is displaying the first user interface (e.g., 2110) of the first application, the rotation moves the plurality of representations (e.g., 2112, 2114, 2122) of contactable items of the first user interface. In some embodiments, if the rotation of the rotatable input device is detected while the electronic device is displaying a second user interface (e.g., 1922, 2156, a communication user interface) of the first application, the rotation changes an audio volume setting of the electronic device.

In response to detecting the input (e.g., 2103), in accordance with a determination (2210) that the input corresponds to a request to move (e.g., scroll) the plurality of representations (e.g., 2112, 2114, 2122) of contactable users in a first direction (e.g., an input in a first direction that scrolls/navigates the plurality of selectable items to a first item), the electronic device (e.g., 2100) displays (2212), on the display (e.g., 2102), an availability affordance (e.g., 2118, a toggle, an available/unavailable toggle, an on/off toggle) that, when activated, changes an availability mode of the first application (e.g., form an "available mode" to an "unavailable mode"). In some embodiments, the availability affordance is displayed at least partially over a representation of a contactable user (e.g., the first or top representation of the plurality of representations).

In some embodiments, prior to displaying the availability affordance (e.g., 2118), the electronic device (e.g., 2100) ceases to display the representation of the first contactable user (e.g., and displays a representation of a third contactable user that is different from the first contactable user concurrently with the availability affordance).

In some embodiments, while displaying the availability affordance (e.g., 2118), the electronic device (e.g., 2100) concurrently displays (2214), on the display (e.g., 2102), a representation of a third contactable user (e.g., a first representation of the plurality of representations of contactable users). Concurrently displaying the representation of the third contactable user while displaying the availability affordance provides visual feedback that the availability affordance pertains to the user's availability to engage in communication with the contactable users. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In response to detecting the input (e.g., 2113), in accordance with a determination (2216) that the input corresponds to a request to move (e.g., scroll) the plurality representations of contactable users in a second direction opposite to the first direction (e.g., an input in a second direction that scrolls/navigates the plurality of representations to or towards a last representation), the electronic device (e.g., 2100) ceases (2218) to display the representation of the first contactable user and displays (2220), on the display (e.g., 2102), a representation of a second contactable user that is different from the first contactable user. In some embodiments, a representation of a contactable user is displayed in a platter-like animation, and moving the plurality of representations of contactable users moved (in either the first direction or the second direction) involves moving (e.g., shuffling through, rotating through) the plurality of representations with a graphical effect (e.g., a carousel effect).

In some embodiments, while displaying the representation of the second contactable user, the electronic device (e.g., 2100) concurrently displays (2222), on the display (e.g., 2102), an add affordance (e.g., 2126, an add button) for adding one or more representations of new contactable users (e.g., other users not on the user's whitelist of approved contactable users) not (yet) included in the plurality of representations (e.g., 2112, 2114, 2122) of contactable users.

In some embodiments, while displaying the add affordance (e.g., 2126, the electronic device (e.g., 2100) receives (2224), via the one or more input devices (e.g., a touch-sensitive surface of the display), activation (e.g., 2115) of the add affordance. In some embodiments, in response to receiving the activation of the add affordance, the electronic device displays (2226), on the display (e.g., 2102), a contacts user interface (e.g., 2128), where the contacts user interface includes a contacts list comprising one or more new contactable users (e.g., 2130A-2130C). Displaying a contacts list in response to receiving the activation of the add affordance enables a user to quickly and easily recognize that the one or more users listed in the contacts list can be added to the contactable users included in the first user interface, thereby enhancing operability of the device and makes the user-device interface more efficient (e.g., by helping the user to provide proper inputs) which, additionally, reduces power usage and improves battery life of the device by enabling the user to use the device more quickly and efficiently.

In some embodiments, the contacts list is synchronized with a remote contacts list at a second electronic device (e.g., a paired device such as a smartphone, an external server) different from the electronic device. In some examples, the remote contacts list is also associated with (and can be accessed, displayed by) different applications, such as a phone dialer application, an email application, and/or an instant messaging application.

In some embodiments, the contacts list includes one or more suggested new contactable users (e.g., 2130A-2130C) that are not included in the contactable users included in the first user interface (e.g., 2110) of the first application and that can be added to the contactable users included in the first user interface of the first application (e.g., because the suggested new contactable users are associated with/have respective electronic devices that are configured to be able to run (is capable of running) a counterpart first application). In some embodiments, users in the contacts list that are not associated with/have respective electronic devices that are configured to be able to run (is capable of running) a counterpart first application are not included in the one or more suggested new contactable users (because their respective electronic devices cannot run the first application). Providing one or more suggested new contactable users that are not included in the contactable users included in the first user interface and that can be added to the contactable users included in the first user interface enables the user to quickly and easily view other users that can engage in communication via the first application (as opposed to other users that cannot engage in communication via the first application), thereby enhancing the operability of the device and makes the user-device interface more efficient. This, additionally, reduces power usage and improves battery life of the device by enabling the user to use the device more quickly and efficiently.

In some embodiments, while displaying the contacts user interface, the electronic device (e.g., 2100) detects (2228), via the one or more input devices, selection of a first contactable user of the one or more new contactable users of the contacts list. In some embodiments, in response to detecting the selection of the first contactable user, in accordance with a determination (2230) that a second electronic device associated with the first contactable user is configured to run a counterpart first application, the electronic device adds (2232) a representation of the first contactable user to the first user interface of the first application.

In some embodiments, in response to detecting the selection of the first contactable user, in accordance with a determination (2234) that the second electronic device associated with the first contactable user is not configured to run a counterpart first application, the electronic device (e.g., 2100) forgoes adding (2236) the representation of the first contactable user to the first user interface and displays (2238), on the display (e.g., 2102), a notification (e.g., 2138, an error message, a "user inaccessible" message) indicating that a counterpart first application is not accessible by the second electronic device associated with the first contactable user. Displaying a notification indicating that a counterpart first application is not accessible by the second electronic device associated with the first contactable user provides visual feedback that the user cannot engage in communication via the first application with the first contactable user. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while the first application is in a first availability mode (e.g., an "available mode"), the electronic device (e.g., 2100) receives (2240), from a second electronic device, an incoming communication (associated with a voice message) via the first application (e.g., sent by a user of the second electronic device, where the user is one of the approved contactable users), where the incoming communication includes audio information. In some embodiments, in response to (or subsequent to) receiving the incoming communication, the electronic device plays (2242) the audio information of (e.g., using one or more speakers of the electronic device) the incoming communication. In some embodiments, the first application being in the first availability mode corresponds to the availability affordance (e.g., 2118, a toggle) being in a first state (e.g., an "on" state). In some embodiments, the first availability mode is the default mode.

In some embodiments, the electronic device (e.g., 2100) displays (2244), on the display (e.g., 2102), a communication user interface (e.g., 1922, 2156) of the first application while playing the incoming communication, where the communication user interface includes a type of visual feedback (e.g., 1934) indicating that the incoming communication is being played. In some embodiments, the communication user interface includes an activatable indicator (e.g., 1924, 2158) for recording an outgoing communication. In some embodiments, the activatable indicator is disabled from being activated while playing the incoming communication. Disabling the activatable indicator from being activated while playing the incoming communication enables the user to easily recognize that one or more operations associated with the activatable indicator (e.g., recording an outgoing communication) cannot be performed at this time (e.g., while playing an incoming communication), thus enhancing the operability of the device and making the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the visual feedback (e.g., 1930, 1934) is displayed in a respective region of the communication user interface (e.g., 1922, 2156) (e.g., proximate to and/or on the activatable indicator). In some embodiments, the type of visual feedback (e.g., 1934) that is displayed in the communication user interface while playing an incoming communication is different from the type of visual feedback (e.g., 1930) that is displayed in the communication user interface while recording an outgoing communication. Providing a different type of visual feedback while playing an incoming communication and while recording an outgoing communication provides the user with visual feedback about the current state of the communication (e.g., that an outgoing communication is being recorded, an incoming communication being played, or no communication is occurring). Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while the first application is in a second availability mode (e.g., an "unavailable mode"), the electronic device (e.g., 2100) receives (2246), from a second electronic device, an incoming communication (associated with a voice message) via the first application (e.g., sent by a user of the second electronic device, where the user is one of the contactable users). In some embodiments, in response to (or subsequent to) receiving the incoming communication, the electronic device forgoes (automatically) playing (2248) (e.g., using one or more speakers of the electronic device) the incoming communication. In some embodiments, the first application being in the second availability mode corresponds to the availability affordance (e.g., 2118, a toggle) being in a second state (e.g., an "off" state). In some embodiments, in response to receiving the incoming communication corresponding to the first application, the electronic device (automatically) transmits (2250) (e.g., via one or more wireless communication radios of the electronic device) an error communication via the first application to the second electronic device, where the error communication indicates that a user of the electronic device is unavailable for the incoming communication. Automatically transmitting an error communication via the first application to the second electronic device, where the error communication indicates that a user of the electronic device is unavailable for the incoming communication, enables the other contactable user to be informed that the user is currently unavailable to engage in a communication without the user needing to manually inform (e.g., via one or more inputs on the device) the other contactable user that has transmitted the incoming communication. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a default state of the availability affordance (e.g., 2118, a toggle, an available/unavailable toggle, an on/off toggle) corresponds to a first availability mode (e.g., an "available mode," as opposed to an "unavailable mode"). In some embodiments, the availability affordance has two states, and the non-default state corresponds to a second availability mode (e.g., an "unavailable mode").

Note that details of the processes described above with respect to method 2200 (e.g., FIGS. 21A-21C) are also applicable in an analogous manner to the methods described above. For example, method 900 optionally includes one or more of the characteristics of the various methods described above with reference to method 2200. For another example, method 1000 optionally includes one or more of the characteristics of the various methods described above with reference to method 2200. For another example, method 1100 optionally includes one or more of the characteristics of the various methods described above with reference to method 2200. For another example, method 2000 optionally includes one or more of the characteristics of the various methods described above with reference to method 2200. For example, communication user interface 2156 described with reference to FIGS. 21V-21Y corresponds to communication user interface 1922 described above with reference to FIGS. 19A-19AC. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of audio content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, and exercise information), date of birth, or any other identifying or personal information.

The present disclosure recognizes that the use of such personal information data, in the present technology, can be used to the benefit of users. For example, the personal information data can be used provide live audio communication sessions. Accordingly, use of such personal information data enables users to deliver live audio content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of real-time audio services, the present technology can be configured to allow users to select to "opt in" or "opt out" of participation in the collection of personal information data during registration for services or anytime thereafter. In another example, users can select not to provide audio data and/or any other data obtained relating to a live audio communication session. In yet another example, users can select to limit the length of time the audio data (and/or any other data obtained relating to a live audio communication session) is maintained or entirely prohibit the development of a baseline user profile that includes the audio data (and/or any other data obtained during a voice communication session). In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information, or publicly available information.

What is claimed is:

1. An electronic device, comprising:
   a display;
   a touch-sensitive surface;
   one or more processors; and
   memory storing one or more programs configured to be executed by the one or more processors, the one or more programs including instructions for:
   while the device is connected to a first communication channel associated with a first external device of a first contact and not connected to a second communication channel associated with a second external device of a second contact:
   concurrently displaying a first affordance including a representation of the first contact and a second affordance including a representation of the second contact;
   detecting a touch input on the second affordance;
   in response to detecting the touch input on the second affordance, terminating a communication session with first external device over the first communication channel and connecting to the second communication channel; and
   displaying a visual indication indicating that the device has terminated the communication session with the first external device and is connected to the second communication channel.

2. The electronic device of claim 1, the one or more programs including instructions for:
   concurrently displaying the first affordance and the second affordance in response to receiving a first user request to enter a channel-switch mode, wherein the first affordance is displayed at a first position on the display and the second affordance is displayed at a second position relative to the first position on the display.

3. The electronic device of claim 1, the one or more programs including instructions for:
   subsequent to receiving a first data signal including first voice data at the first communication channel from the first contact, causing audio output of the first voice data;
   displaying a first talk affordance for communicating with the first contact through the first communication channel;
   in response to detecting activation of the first talk affordance:
   capturing first voice input at a microphone; and
   sending, through the first communication channel, first outgoing data signal including first outgoing voice data corresponding to the captured first voice input.

4. The electronic device of claim 1, the one or more programs including instructions for:
   while the device is connected to the second communication channel and not connected to the first communication channel, displaying:
   a second talk affordance for communicating data through the second communication channel.

5. The electronic device of claim 4, the one or more programs including instructions for:
   subsequent to receiving a second data signal including second voice data at the second communication channel from the second contact, causing audio output of the second voice data; and
   in response to detecting activation of the second talk affordance:
   capturing second voice input at a microphone; and
   sending, through the second communication channel, second outgoing data signal including second outgoing voice data corresponding to the captured second voice input.

6. The electronic device of claim 2, the one or more programs including instructions for:
   in response to detecting the touch input on the second affordance, exiting the channel-switch mode; and
   while the device is connected to the second communication channel and not connected to the first communication channel, in response to receiving a second user request to re-enter the channel-switch mode, concurrently displaying the second affordance at the first position and the first affordance at the second position.

7. The electronic device of claim 6, the one or more programs including instructions for:
   while concurrently displaying the first affordance and the second affordance in response to receiving the second user request, displaying a second visual indication that the device is connected to the second communication channel and not connected to the first communication channel wherein the second visual indication is distinct from the visual indication.

8. The electronic device of claim 7, the one or more programs including instructions for:
   while concurrently displaying the first affordance and the second affordance in response to receiving the second user request, in response to detecting a user intent to stay connected to the second communication channel, exiting the channel-switch mode and removing display of the first affordance.

9. The electronic device of claim 8, the one or more programs including instructions for:
   in response to detecting the user intent, replacing display of the second visual indication with the visual indication.

10. The electronic device of claim 2, the one or more programs including instructions for:
    while the device is connected to the second communication channel and not connected to the first communication channel:
    concurrently displaying the first affordance and the second affordance with an add affordance at a third position relative to the first position and the second position on the display;

detecting a second touch input on the add affordance;
subsequent to detecting the second touch input on the add affordance, displaying a contact list including a third contact; and
in response to detecting selection of the third contact, disconnecting from the second communication channel and connecting to a third communication channel corresponding to a third external device associated with the third contact.

11. A non-transitory computer-readable storage medium storing one or more programs configured to be executed by one or more processors of an electronic device with a display and a touch-sensitive surface, the one or more programs including instructions for:
while the device is connected to a first communication channel associated with a first external device of a first contact and not connected to a second communication channel associated with a second external device of a second contact:
concurrently displaying a first affordance including a representation of the first contact and a second affordance including a representation of the second contact;
detecting a touch input on the second affordance;
in response to detecting the touch input on the second affordance, terminating a communication session with first external device over the first communication channel and connecting to the second communication channel; and
displaying a visual indication indicating that the device has terminated the communication session with the first external device and is connected to the second communication channel.

12. A method, comprising:
at an electronic device with a display and a touch-sensitive surface:
while the device is connected to a first communication channel associated with a first external device of a first contact and not connected to a second communication channel associated with a second external device of a second contact:
concurrently displaying a first affordance including a representation of the first contact and a second affordance including a representation of the second contact;
detecting a touch input on the second affordance;
in response to detecting the touch input on the second affordance, terminating a communication session with first external device over the first communication channel and connecting to the second communication channel; and
displaying a visual indication indicating that the device has terminated the communication session with the first external device and is connected to the second communication channel.

13. The non-transitory computer-readable storage medium of claim 11, the one or more programs including instructions for:
concurrently displaying the first affordance and the second affordance in response to receiving a first user request to enter a channel-switch mode, wherein the first affordance is displayed at a first position on the display and the second affordance is displayed at a second position relative to the first position on the display.

14. The non-transitory computer-readable storage medium of claim 11, the one or more programs including instructions for:
subsequent to receiving a first data signal including first voice data at the first communication channel from the first contact, causing audio output of the first voice data;
displaying a first talk affordance for communicating with the first contact through the first communication channel;
in response to detecting activation of the first talk affordance:
capturing first voice input at a microphone; and
sending, through the first communication channel, first outgoing data signal including first outgoing voice data corresponding to the captured first voice input.

15. The non-transitory computer-readable storage medium of claim 11, the one or more programs including instructions for:
while the device is connected to the second communication channel and not connected to the first communication channel, displaying:
a second talk affordance for communicating data through the second communication channel.

16. The non-transitory computer-readable storage medium of claim 15, the one or more programs including instructions for:
subsequent to receiving a second data signal including second voice data at the second communication channel from the second contact, causing audio output of the second voice data; and
in response to detecting activation of the second talk affordance:
capturing second voice input at a microphone; and
sending, through the second communication channel, second outgoing data signal including second outgoing voice data corresponding to the captured second voice input.

17. The non-transitory computer-readable storage medium of claim 13, the one or more programs including instructions for:
in response to detecting the touch input on the second affordance, exiting the channel-switch mode; and
while the device is connected to the second communication channel and not connected to the first communication channel, in response to receiving a second user request to re-enter the channel-switch mode, concurrently displaying the second affordance at the first position and the first affordance at the second position.

18. The non-transitory computer-readable storage medium of claim 17, the one or more programs including instructions for:
while concurrently displaying the first affordance and the second affordance in response to receiving the second user request, displaying a second visual indication that the device is connected to the second communication channel and not connected to the first communication channel, wherein the second visual indication is distinct from the visual indication.

19. The non-transitory computer-readable storage medium of claim 18, the one or more programs including instructions for:
while concurrently displaying the first affordance and the second affordance in response to receiving the second user request, in response to detecting a user intent to stay connected to the second communication channel, exiting the channel-switch mode and removing display of the first affordance.

20. The non-transitory computer-readable storage medium of claim 19, the one or more programs including instructions for:
in response to detecting the user intent, replacing display of the second visual indication with the visual indication.

21. The non-transitory computer-readable storage medium of claim 13, the one or more programs including instructions for:
while the device is connected to the second communication channel and not connected to the first communication channel:
concurrently displaying the first affordance and the second affordance with an add affordance at a third position relative to the first position and the second position on the display;
detecting a second touch input on the add affordance;
subsequent to detecting the second touch input on the add affordance, displaying a contact list including a third contact; and
in response to detecting selection of the third contact, disconnecting from the second communication channel and connecting to a third communication channel corresponding to a third external device associated with the third contact.

22. The method of claim 12, further comprising:
concurrently displaying the first affordance and the second affordance in response to receiving a first user request to enter a channel-switch mode, wherein the first affordance is displayed at a first position on the display and the second affordance is displayed at a second position relative to the first position on the display.

23. The method of claim 12, further comprising:
subsequent to receiving a first data signal including first voice data at the first communication channel from the first contact, causing audio output of the first voice data;
displaying a first talk affordance for communicating with the first contact through the first communication channel;
in response to detecting activation of the first talk affordance:
capturing first voice input at a microphone; and
sending, through the first communication channel, first outgoing data signal including first outgoing voice data corresponding to the captured first voice input.

24. The method of claim 12, further comprising:
while the device is connected to the second communication channel not connected to the first communication channel, displaying:
a second talk affordance for communicating data through the second communication channel.

25. The method of claim 24, further comprising:
subsequent to receiving a second data signal including second voice data at the second communication channel from the second contact, causing audio output of the second voice data; and
in response to detecting activation of the second talk affordance:
capturing second voice input at a microphone; and
sending, through the second communication channel, second outgoing data signal including second outgoing voice data corresponding to the captured second voice input.

26. The method of claim 22, further comprising:
in response to detecting the touch input on the second affordance, exiting the channel-switch mode; and
while the device is connected to the second communication channel and not connected to the first communication channel, in response to receiving a second user request to re-enter the channel-switch mode, concurrently displaying the second affordance at the first position and the first affordance at the second position.

27. The method of claim 26, further comprising:
while concurrently displaying the first affordance and the second affordance in response to receiving the second user request, displaying a second visual indication that the device is connected to the second communication channel and not connected to the first communication channel, wherein the second visual indication is distinct from the visual indication.

28. The method of claim 27, further comprising:
while concurrently displaying the first affordance and the second affordance in response to receiving the second user request, in response to detecting a user intent to stay connected to the second communication channel, exiting the channel-switch mode and removing display of the first affordance.

29. The method of claim 28, further comprising:
in response to detecting the user intent, replacing display of the second visual indication with the visual indication.

30. The method of claim 22, further comprising:
while the device is connected to the second communication channel and not connected to the first communication channel:
concurrently displaying the first affordance and the second affordance with an add affordance at a third position relative to the first position and the second position on the display;
detecting a second touch input on the add affordance;
subsequent to detecting the second touch input on the add affordance, displaying a contact list including a third contact; and
in response to detecting selection of the third contact, disconnecting from the second communication channel and connecting to a third communication channel corresponding to a third external device associated with the third contact.

* * * * *

UNITED STATES PATENT AND TRADEMARK OFFICE
CERTIFICATE OF CORRECTION

| | |
|---|---|
| PATENT NO. | : 11,765,114 B2 |
| APPLICATION NO. | : 17/079216 |
| DATED | : September 19, 2023 |
| INVENTOR(S) | : Tiffany S. Jon et al. |

Page 1 of 1

It is certified that error appears in the above-identified patent and that said Letters Patent is hereby corrected as shown below:

In the Claims

Column 118, Line 44, Claim 7, delete "channel" and insert --channel,--.

Signed and Sealed this
Third Day of September, 2024

Katherine Kelly Vidal
*Director of the United States Patent and Trademark Office*